US007978877B2

(12) United States Patent
Nakamura et al.

(10) Patent No.: US 7,978,877 B2
(45) Date of Patent: Jul. 12, 2011

(54) DIGITAL WATERMARK EMBEDDING METHOD, DIGITAL WATERMARK EMBEDDING APPARATUS, AND STORAGE MEDIUM STORING A DIGITAL WATERMARK EMBEDDING PROGRAM

(75) Inventors: Takao Nakamura, Yokohama (JP); Hiroshi Ogawa, Yokohama (JP); Atsuki Tomioka, Yokohama (JP); Youichi Takashima, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 12/806,241

(22) Filed: Aug. 6, 2010

(65) Prior Publication Data

US 2011/0116679 A1     May 19, 2011

Related U.S. Application Data

(60) Continuation of application No. 11/412,151, filed on Apr. 25, 2006, now Pat. No. 7,792,323, which is a division of application No. 09/443,239, filed on Nov. 18, 1999, now Pat. No. 7,164,778.

(30) Foreign Application Priority Data

Jan. 25, 1999   (JP) ....................................... 11-16218
Jan. 25, 1999   (JP) ....................................... 11-16219

(51) Int. Cl.
*G06K 9/00*     (2006.01)
(52) U.S. Cl. ......... 382/100; 382/181; 382/232; 382/280
(58) Field of Classification Search .................. 382/100, 382/181, 232, 280
See application file for complete search history.

(56) References Cited

U.S. PATENT DOCUMENTS 5,862,260 A     1/1999     Rhoads
(Continued)

FOREIGN PATENT DOCUMENTS

EP     1148708     10/2001
(Continued)

OTHER PUBLICATIONS

Extend European Search Report dated Sep. 23, 2010 issued in corresponding EP Application No. EP 10 16 5146.
(Continued)

*Primary Examiner* — Wesley Tucker
(74) *Attorney, Agent, or Firm* — Kenyon & Kenyon LLP

(57) ABSTRACT

A method for embedding a watermark into digital data, when the watermark is to be embedded in a digital image, independently changes real number components and imaginary number components of each of coefficient values of a complex watermark coefficient matrix using key, from the watermark to be embedded in the digital image, a step for performing a discrete Fourier inverse transform on the sequence matrix of the changed watermark and generating a watermark pattern; and a step for adding like tiling the water mark pattern to the original image, and generating an embedded image.

Further more, a watermark detection method for detecting a watermark from a digital data, a step for separating a block from an arbitrary position on the detected object image, a step for performing a discrete Fourier transform on the block and obtaining a sequence matrix, a step for generating position information for a component that is to be detected and that is specified by the key, a step for detecting a position marker sequence by calculating a phase difference of a sequence by an amount of parallel displacement, for each item of the position information, and extracting offset information which is the amount of parallel displacement when there is agreement between a start point of an embedded watermark and a start point of the block cut from the detected object image, and a step for detecting the embedded watermark cut from the detected object image.

3 Claims, 138 Drawing Sheets

U.S. PATENT DOCUMENTS

| | | | |
|---|---|---|---|
| 6,044,156 | A | 3/2000 | Honsinger et al. |
| 6,185,312 | B1 | 2/2001 | Nakamura et al. |
| 6,222,932 | B1 * | 4/2001 | Rao et al. ............ 382/100 |
| 6,240,121 | B1 | 5/2001 | Senoh |
| 6,278,791 | B1 | 8/2001 | Honsinger et al. |
| 6,314,192 | B1 | 11/2001 | Chen et al. |
| 2002/0015510 | A1 | 2/2002 | Akashi |
| 2002/0146123 | A1 | 10/2002 | Tian |

FOREIGN PATENT DOCUMENTS

| | | |
|---|---|---|
| JP | 8-016793 | 1/1996 |
| JP | 08030759 | 2/1996 |
| JP | 9-172636 | 6/1997 |
| JP | 10-276321 | 10/1998 |
| WO | 96/36163 | 11/1996 |

OTHER PUBLICATIONS

Chung et al. "Digital Watermarking for Copyright Protection of MPEG2 Compressed Video" IEEE Transactions on Consumer Electronics, vol. 44, No. 3, Aug. 1998, pp. 895-901.

Podilchuk et al. "Image-Adaptive Watermarking Using Visual Models" IEEE Journal on Selected Areas in Communications, vol. 16, No. 4, May 1998.

Piva et al.:"DCT-based Watermark Recovering without Resorting to the Uncorrupted Orignal Image", Proceedings of the 1997 International Conference on Image Processing (ICIP'97), 1997.

Takao Nakamura, Hiroshi Ogawa, Youichi Takashima,:"A Watermark Technique for Still Images" NTT Review vol. 11, No. 1, Jan. 1999.

Wisetsuit Piyapisuit, Kineo Matsui,: "Block Characteristic in Color Image Watermarking Using Equivalent Signal Transform" National Conference of the Institute of Electronics, Information and Communication Engineers, D-11-42, 1999.

Miyagawa et al., :"Symbol Logic", Shokodoh, pp. 128-135. (This document describes general technology relating to "M-sequence generator" and the like.).

J.J.K. Ruanaidh, et al., "Phase Watermarking of Digital Images", Lausanne, Sep. 16-19, 1996, New York, IEEE, US, pp. 239-242, XP000199952 ISBN: 0-7803-3259-8, the whole document.

* cited by examiner

INPUT

· SYMBOL CANDIDATE
· KEY

OUTPUT

· SYMBOL SEQUENCE

INPUT
- SYMBOL CANDIDATE
- KEY

OUTPUT
- SYMBOL SEQUENCE

INPUT
- SYMBOL CANDIDATE
- KEY

OUTPUT
- SYMBOL

INPUT

- SYMBOL CANDIDATE
- KEY

OUTPUT

- SYMBOL SEQUENCE

INPUT
- DETECTED OBJECT IMAGE
- DETECTED OBJECT COMPONENT POSITION INFORMATION
- OFFSET INFORMATION

OUTPUT
- DETECTION RESULT

FIG.111
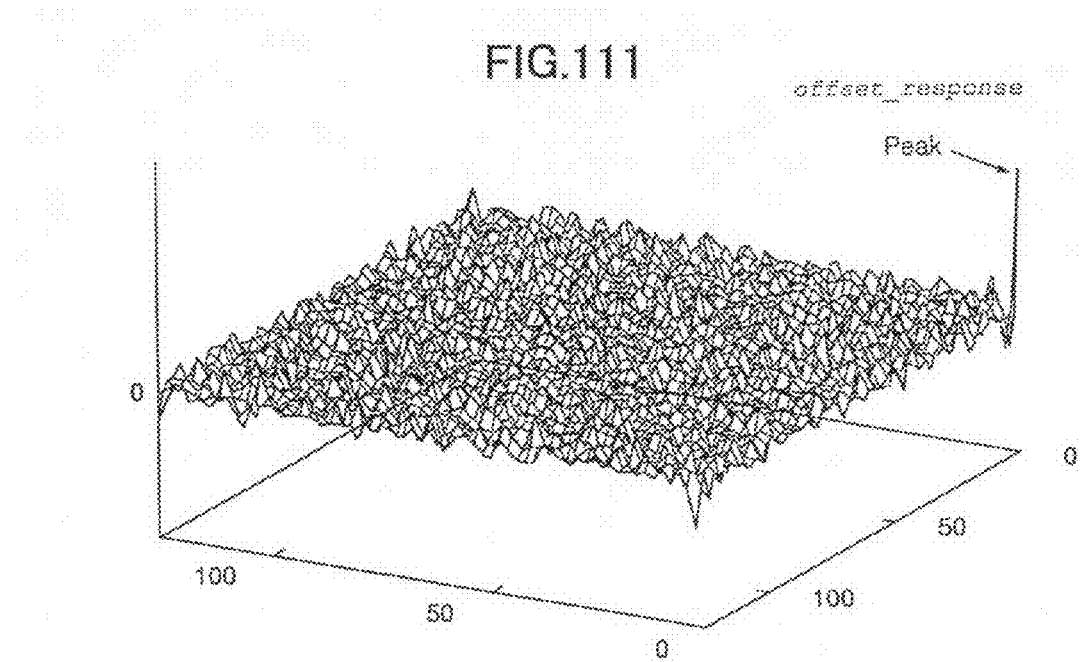
OFFSET RESPONSE   (Peak : $Y_{(0,0)} = 14.761541$)
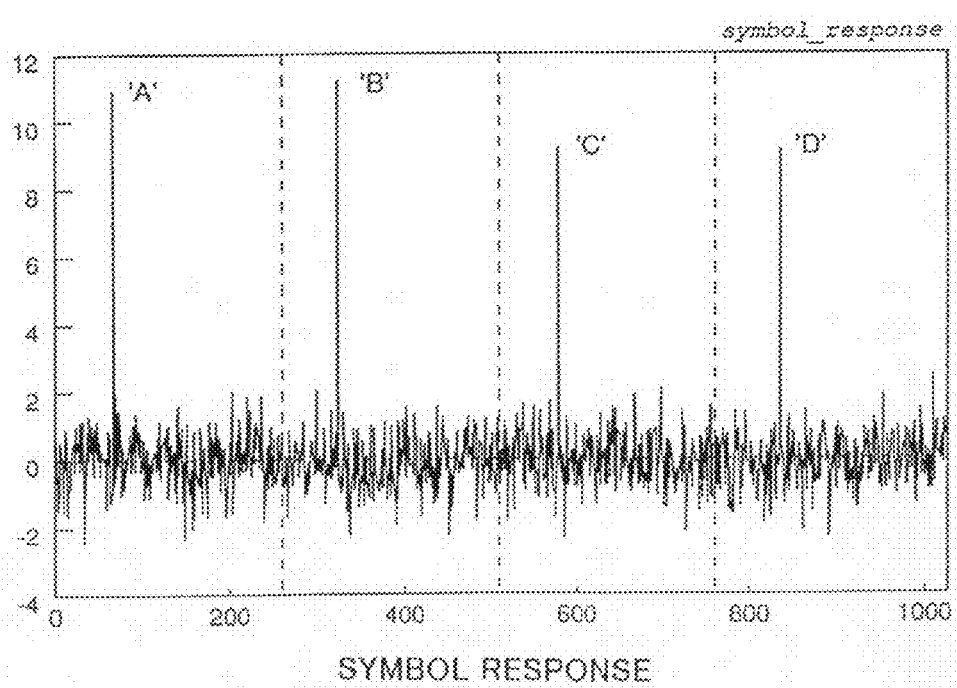
SYMBOL RESPONSE

FIG.112
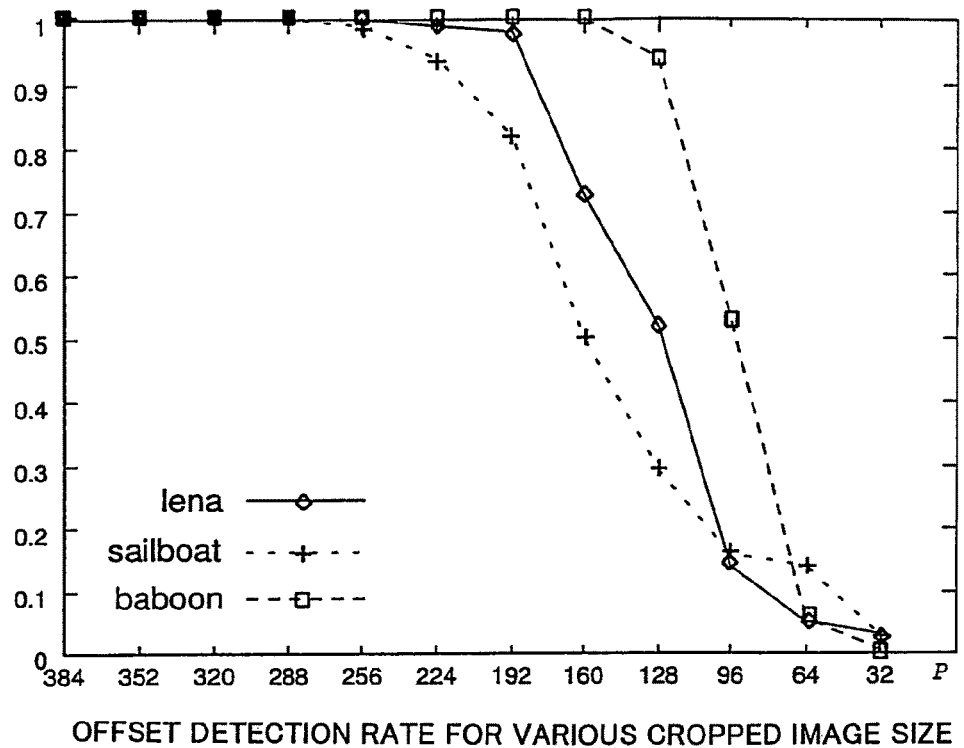
OFFSET DETECTION RATE FOR VARIOUS CROPPED IMAGE SIZE
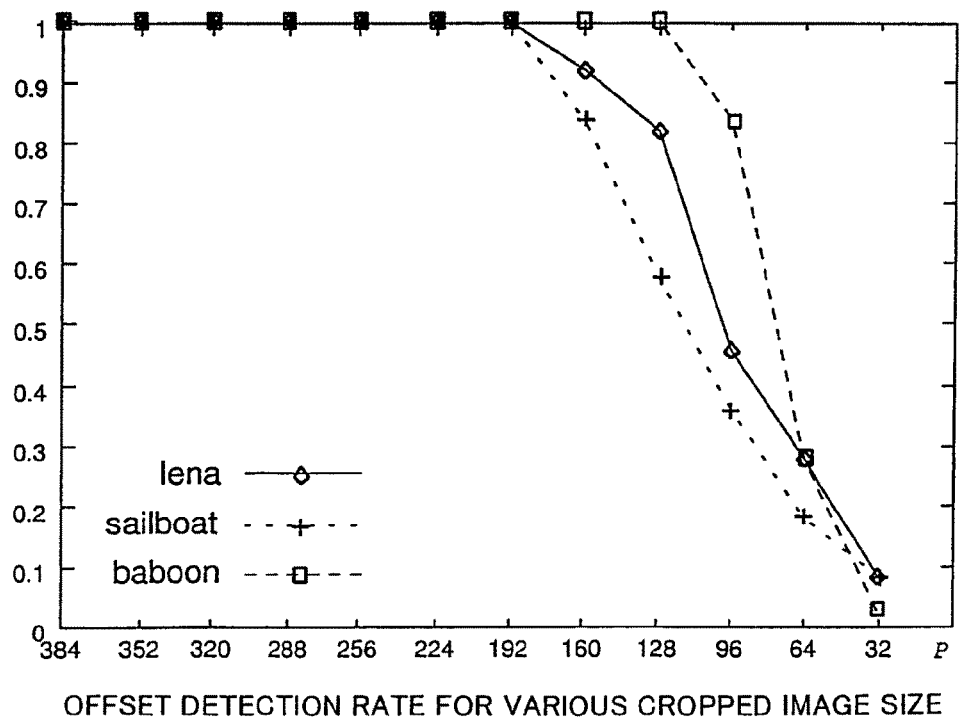
OFFSET DETECTION RATE FOR VARIOUS CROPPED IMAGE SIZE (B) FOR WHICH DETECTION WAS SUCCESSFUL

FIG. 115

THE MIXTURE IMAGE

DIGITAL WATERMARK EMBEDDING METHOD, DIGITAL WATERMARK EMBEDDING APPARATUS, AND STORAGE MEDIUM STORING A DIGITAL WATERMARK EMBEDDING PROGRAM

RELATED APPLICATION INFORMATION

This application claims the benefit and priority of and is a continuation application of U.S. patent application Ser. No. 11/412,151 filed Apr. 25, 2006 now U.S. Pat. No. 7,792,323, which is a division application of U.S. patent application Ser. No. 09/443,239 filed Nov. 18, 1999, which issued as U.S. Pat. No. 7,164,778 on Jan. 16, 2007, and which claims foreign priority benefits under 35 U.S.C. §119 of Japanese Patent Application No. 11-016218, filed Jan. 25, 1999 and Japanese Patent Application No. 11-016219, filed Jan. 25, 1999. This application is also related to U.S. patent application Ser. No. 12/590,806 filed Nov. 13, 2009, which is a copending division application of U.S. patent application Ser. No. 11/412,151 filed Apr. 25, 2006, which is a division application of U.S. patent application Ser. No. 09/443,239 filed Nov. 18, 1999, which issued as U.S. Pat. No. 7,164,778 on Jan. 16, 2007, and which claims foreign priority benefits under 35 U.S.C. §119 of Japanese Patent Application No. 11-016218, filed Jan. 25, 1999 and Japanese Patent Application No. 11-016219, filed Jan. 25, 1999, all of which are incorporated herein by reference. This application is also related to U.S. patent application Ser. No. 11/412,210 filed Apr. 25, 2006, which is a division application of U.S. patent application Ser. No. 09/443,239 filed Nov. 18, 1999, which issued as U.S. Pat. No. 7,164,778 on Jan. 16, 2007, and which claims foreign priority benefits under 35 U.S.C. §119 of Japanese Patent Application No. 11-016218, filed Jan. 25, 1999 and Japanese Patent Application No. 11-016219, filed Jan. 25, 1999, all of which are incorporated herein by reference.

BACKGROUND OF THE INVENTION

1. Field of the Invention

The present invention relates to a watermark embedding method, watermark detection method, a watermark embedding apparatus, a watermark detection apparatus, storage medium storing a watermark embedding program, storage medium storing a watermark detection program, a watermark system, and a integrated circuit, which, in order to actualize copyright protection for digital content, change personal information content by a small amount that cannot be perceived, and embed watermark so that it cannot be perceived by person, into said content.

2. Description of the Related Art

In recent years, the transfer of digital content via networks has progressed and been facilitated by technologies (such as the JPEG ['Joint Picture Coding Expert Group'] method for digital information such as voice, moving and still pictures. In addition, the distribution of content via networks has also begun to grow through information infrastructures such as the Internet.

However, content that is distributed via networks is digital information and so it is easy to make perfect copies of personal content. In addition, with information infrastructures such as the Internet, all information users can become information transmitters and so there is copyright infringement through the making and selling of illegal copies. Furthermore, the increase in the processing performance of personal computers facilitates the processing and editing of image and voice data on personal computers, facilitating copyright infringement such as illegal secondary use and use that the authors had not envisaged. The current situation is that the growth of copyright infringement such as this makes authors hesitant about supplying information and thus obstructs the distribution of information via networks.

In addition, separate from this, there is a problem from the point of view of content providers in that "even if one wishes to handle the rights to the content correctly, it is not possible to know where those rights lie if one considers the possibility of incorrect usage" and this also prohibits the reuse of content.

As described below, copyright management/protection systems using conventional technologies have been proposed with respect to these two problems.

Prior art relating to watermark technologies includes A. Piva et. al: "DCT-based Watermark Recovering with Resorting to the Uncorrupted Original Image," Proceedings of the 1997 International conference on Image Processing (ICIP'97) (Ref. 1 in the following); Takao Nakamura, Hiroshi Ogawa, Youichi Takashima: "A Watermarking Technique for Stile Image," NTT R&D Vol. 47, No. 6, 1998 (Ref.2 in the following); and Wisetsuit Piyapisuit, Kineo Matsui: "Block Characteristic in Color Image Watermaking Using Equivalent Signal Transform" National Conference of the Institute of Electronics, Information and Communication Engineers, D-11-42, 1999 (Ref.3 in the following).

The method of Ref.1 performs an orthogonal transform of an original image size obtains a frequency component matrix, and changes a coefficient value of a mid-frequency band in the frequency component matrix to embed the watermark. Changing the coefficient value is performed by changing the contrast. This provides robustness with respect to irreversible compressing and color change, and also with respect to changes in the contrast.

In addition, with the method of Ref.1, when the watermark is read, an image which is to be investigated has the watermark read by inverse spread of the coefficient values of the mid-frequency band in the frequency component matrix obtained by orthogonal transform. Through this, it is possible to compare a magnification or reduction with digital content at the original size, align it with the original digital content and perform detection.

In addition, with the method of Ref.1, when reading is performed, an attempt is made using a random number used in the spectral spread and the read watermark is that for which the response is highest. This makes it possible to detect partial images and the like where it is not known where a cut portion lies on the original digital content.

However, the above mentioned Ref.1 involves the following problems.

I. There is a low robustness with respect to partial cutting.

II. There is a large amount of processing involved for an orthogonal transform of an original image at the full size thereof, which causes a local degree of complexity.

III. There is a great amount of image deterioration when the watermark is embedded.

IV. Attempted reading is performed for all values obtained for the watermark when the watermark is detected.

With the method of Ref.2, an image is generally divided into large blocks of a block size used by non-reversible compression, an orthogonal transform is performed for each block and a frequency component matrix is obtained and normalized. A sequence that performs embedding is then selected using a key, and an inverse orthogonal transform is performed to obtain the image having an embedded watermark. With this method, there is robustness with respect to non-reversible compressing but there are problems of color change, contrast change and a low robustness with respect to partial cutting. In addition, although this method aims to improve the image quality/robustness by normalizing and embedding weakly on flat portions and strongly on complex portions of the image, it does not function effectively. Changing the low-frequency band improves the robustness.

When there is watermark detection using Ref.2, processing is performed up to normalization when there is embedding, and the watermark is detected from the key and the normalized frequency component matrix. This means that when the a block size is the same as the image size, there is robustness with respect to magnification and reduction. However, quantitative evaluations have not been performed for the reliability of the detected watermark. In addition, there is also a problem of a large amount of image deterioration when the watermark is embedded.

With the method of Ref.3, processing is implemented to take a transform matrix of an equivalent signal transform (such a RGB<-> YCbCr or the like) for a color image and change it slightly in accordance with watermark for something defined. Watermark information detection for Ref.3 involves performing an equivalent signal transform on the detected object image and then using statistical values to detect whether or not there is a special, status due to the watermark. With this detection, the method of Ref.3 has a robustness with respect to geometrical changes of the image. However, the method is extremely weak with respect to non-reversible compression and color changes. In addition, when there is multi-bit embedding, the embedding is for one bit per block and so there is a problem that the robustness with respect to geometrical transformation is extremely weak.

SUMMARY OF THE INVENTION

Accordingly, it is general object of the present invention to provide a watermark embedding method, a watermark detection method, a watermark embedding apparatus, a watermark detection apparatus, a storage medium storing a watermark embedding program, a storage medium storing a watermark detection program, a watermark system, and an integrated circuit which can perform a high-speed embedding process even when there is detection processing without an original image and it is not known which portion of a partial image corresponds to the original image.

It is another object of the present invention it to provide a watermark detection method, a watermark embedding apparatus, a watermark detection apparatus, a storage medium storing a watermark embedding program, a storage medium storing a watermark detection program, a watermark system, and an integrated circuit, which use a calculation method based on visual characteristics, for the image's degree of local complexity, to enable a relative improvement in the robustness of a watermark.

The above objects of the present invention are achieved by a method for embedding a watermark so that it cannot be sensed by a person, which method includes a step for, when the watermark is to be embedded in a digital image, independently changes real number components and imaginary number components of each of coefficient values of a complex watermark coefficient matrix using key, from the watermark to be embedded in the digital image; a step for performing a discrete Fourier inverse transform on the sequence matrix of the changed watermark and generating a watermark pattern; and a step for adding like tiling the water mark pattern to the original image and generating an embedded image.

According to the present invention, it is possible to independently change the real number components and the imaginary number components of each coefficient value of the complex watermark coefficient matrix, from the key and the watermark, perform a discrete Fourier inverse transform on the changed watermark coefficient matrix to generate a watermark pattern, add like tiling a watermark pattern to an original image, and generate an embedded image.

In addition, the above objects of the present invention are achieved by a watermark embedding method which when embedding a watermark so that cannot be perceived visually in a digital image, comprises a step for determining a degree of local complexity of an image, and, in accordance with the degree of local complexity of the image, changes complex portions of the image more than not so complex portions, and obtains an embedded image.

According to the present invention, it is possible to create image degrees of local complexity that have relatively large values for textured domains and relatively small values for smooth domains and edge portions. This makes it possible to realize more adaptive information management for the visual characteristics than does the conventional art.

In addition, the above object of the present invention are achieved by a watermark embedding method which, when embedding a watermark so that it cannot be perceived by visually in a digital image, comprises a step for generating a local degree of complexity of an image from input information that is a digital image; a step for using key necessary for embedding to generate a watermark pattern from a watermark, a step for adding the watermark pattern to the input image in accordance with the degree of local complexity of the image; and a step for generating an image in which the watermark is embedded.

According to the present invention, it is possible, when embedding, to add a pattern that expresses a design of an original image, and so enable a further improvement to the image quality, that is, the relative robustness.

In addition, the above objects of the present invention are achieved by a watermark embedding method which, when embedding a watermark so that it cannot be perceived visually in a digital image, comprises a step for dividing a digital input image into blocks of a required size and generating a degree of local complexity of an image; a step for using key necessary for embedding to generate a basic watermark pattern which forms the basis for the watermark; a step for generating an adaptive watermark pattern that has orthogonal transform sequences corresponding to the basic watermark pattern emphasized in accordance with a value of an amplitude of an orthogonal transform sequence of each block; a step for adding the basic watermark pattern and the adaptive watermark pattern to the blocks in accordance with an emphasis parameter and the degree of local complexity of the image; and a step for generating an image in which watermark pattern information is embedded.

As described above, according to the present invention, when there is a watermark embedding method of the type that divides an image into blocks, changes a sequence matrix obtained by orthogonal transform of those blocks and embeds a watermark, the degree of local complexity of each block is used to switch in gradation between the two types of watermark patterns comprising, the basic watermark pattern and an adaptive watermark pattern created from a sequence matrix obtained from orthogonal transform of the blocks, to obtain in image in which watermark pattern information is embedded. Hereby, a component value image obtained by handling edges and textures in the same manner, texture degree indexes obtained from the local density of the edge/texture component value images, and a texture component value image obtained from these two are generated so that it is possible to create a texture component image that has a relatively large value for textured domains and a relatively small value for smooth domains or for texture portions, thus realizing adaptive information embedding for visual characteristics to a greater degree than in the conventional art, and increasing the relative robustness of the watermark.

In addition, the above object of on the present invention are achieved by a watermark detection method for detecting a watermark from a digital detected object image in which a visually imperceptible watermark has been embedded therein, which method comprises a step for separating a block from an arbitrary position on the detected object image; a step for performing a discrete Fourier transform on the block and obtaining a sequence matrix; a step for generating position information for a component that is to be detected and that is specified by the key; a step for detecting a position marker sequence by calculating a phase difference of a sequence by an amount of parallel displacement, for each item of the position information, and extracting offset information which is the amount of parallel displacement when there is agreement between a start point of an embedded watermark and a start point of the block cut from the detected object image; and a step for detecting the embedded watermark cut from the detected object image.

According to the present invention, it is possible to cut a block from an arbitrary position of a detected object image and then, once a discrete Fourier transform has been performed on the block and a sequence matrix obtained, take the correlation between a sequence indicating the start point of a watermark pattern and a sequence for the phase difference of sequences according to the amount of parallel displacement of each item of the component value sequence, and so perform a search for an amount of parallel displacement, and, as a result of that search, use the amount of parallel displacement when the maximum response value is output as the amount of parallel displacement from the start point of the watermark pattern to the start point of the block cut from the start point of the watermark pattern as the amount of parallel displacement, and then use this amount of parallel displacement to further detect an embedded watermark.

In addition, the above objects of the present invention are achieved by a watermark detection method for detecting a watermark from a detected object image that has a watermark embedded therein, which method comprises a step for detecting object image phase position information from a key; a step for generating a position marker sequence from the key; and a step for using detected position marker detection information to detect offset information that indicates the degree of displacement between the start point of a watermark pattern when embedded, and a start point of a pixel block cut from the detected object image; and that uses the offset information to detect a watermark embedded in the image block.

According to the present invention, when there is a search for an amount of parallel displacement, it is not necessary to perform a discrete Fourier transform for each scan as only one discrete Fourier transform prior to the search is sufficient and so it is possible to shorten the detection processing time to less than is required for a simple search for the amount of parallel displacement (as in the method that performs an orthogonal transform while displacing coordinates and then scans).

BRIEF DESCRIPTION OF THE DRAWINGS

Other objects, features and advantages of the present invention will become more apparent from the following detailed description when read in conjunction with the accompanying drawings, in which:

FIG. 111 is a diagram showing the results of using computer simulation of the present invention to detect watermark from an image containing a watermark;

FIG. 112 is a diagram showing the result of using computer simulation of the present invention to detect watermark from a partial image;

FIG. 115 is a diagram showing a gray scale image (binary image) using a computer simulation of the present invention;

FIG. 119 is a flow chart showing the process of an edge/texture component value image creation portion according to the twenty-second embodiment of the present invention;

FIG. 120 is an example of an input image and an edge/texture component image according to the twenty-second embodiment of the present invention;

FIG. 121 is a diagram showing the configuration of a watermark embedding apparatus according to a twenty-third embodiment of the present invention;

FIG. 122 is a flow chart showing the process of the watermark embedding apparatus according to a twenty-third embodiment of the present invention;

FIG. 123 is a flow chart showing the process of a texture degree index creation portion according to the twenty-third embodiment of the present invention;

FIG. 124 is a diagram describing the process of an upsampler according to the twenty-third embodiment of the present invention;

FIG. 125 is a diagram showing an edge/texture component value image and texture degree according to the twenty-third embodiment of the present invention;

FIG. 126 is a flow chart showing the process of a watermark embedding apparatus according to a twenty-fourth embodiment of the present invention;

FIG. 127 is a flow chart showing the process of a texture degree index creation portion according to the twenty-fourth embodiment of the present invention;

FIG. 128 is a diagram showing the configuration of a watermark embedding apparatus according to a twenty-fifth embodiment of the present invention;

FIG. 129 is a flow chart showing the process of the watermark embedding apparatus according to the twenty-fifth embodiment of the present invention;

FIG. 130 is a flow chart showing the process of a texture component value image creation portion according to the twenty-fifth embodiment of the present invention;

Figure 131:
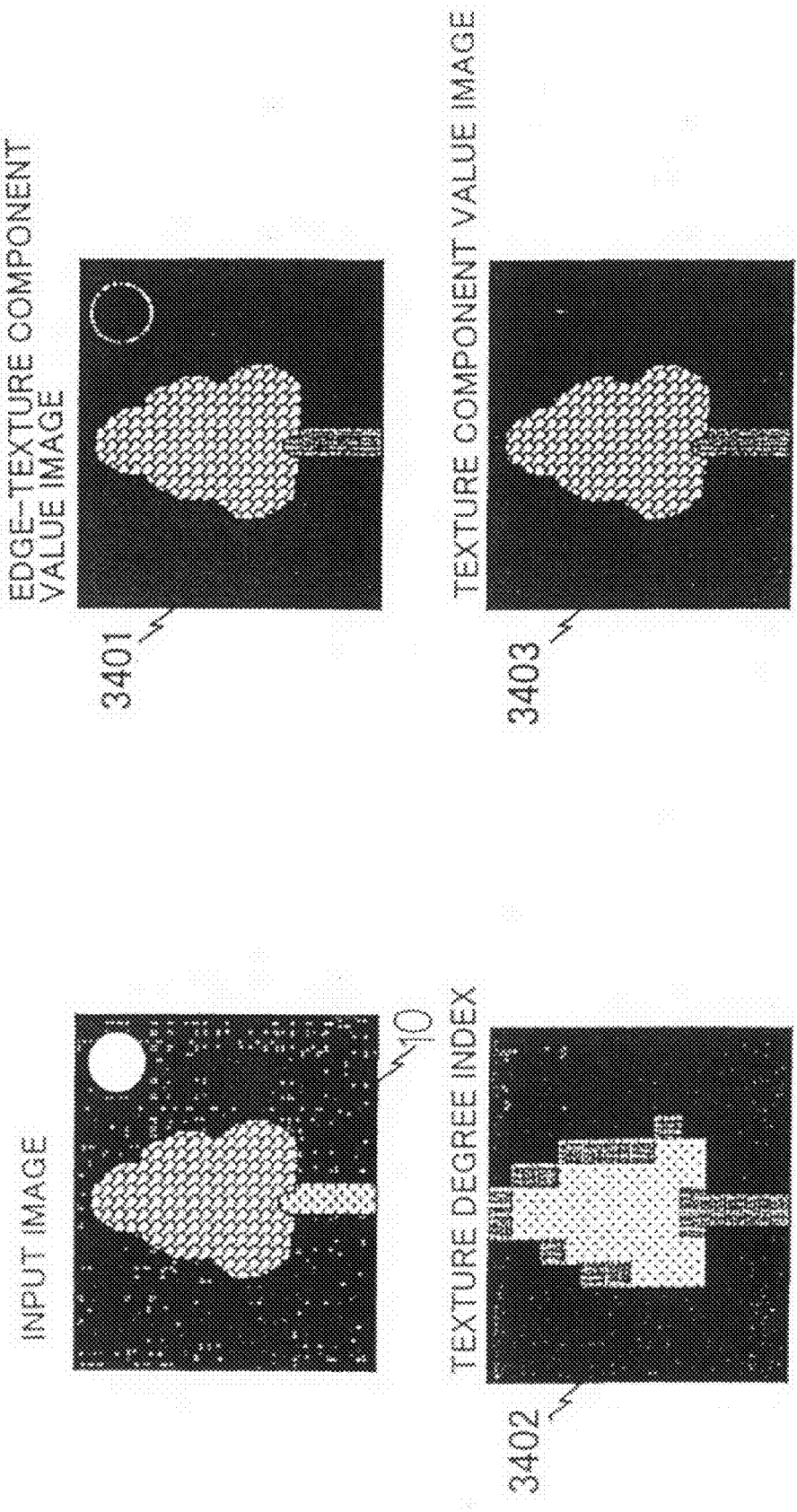
Figure 132:
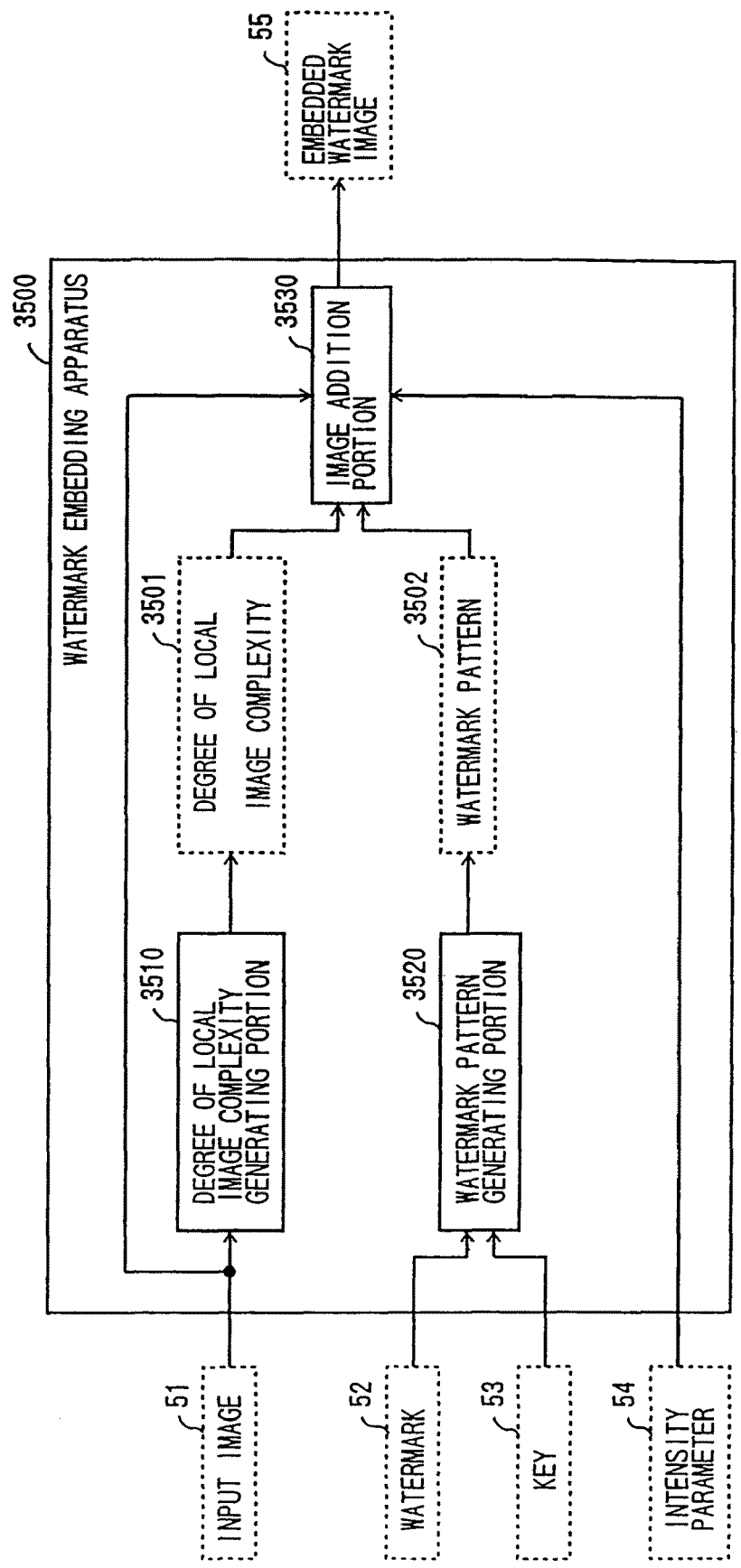
Figure 133:
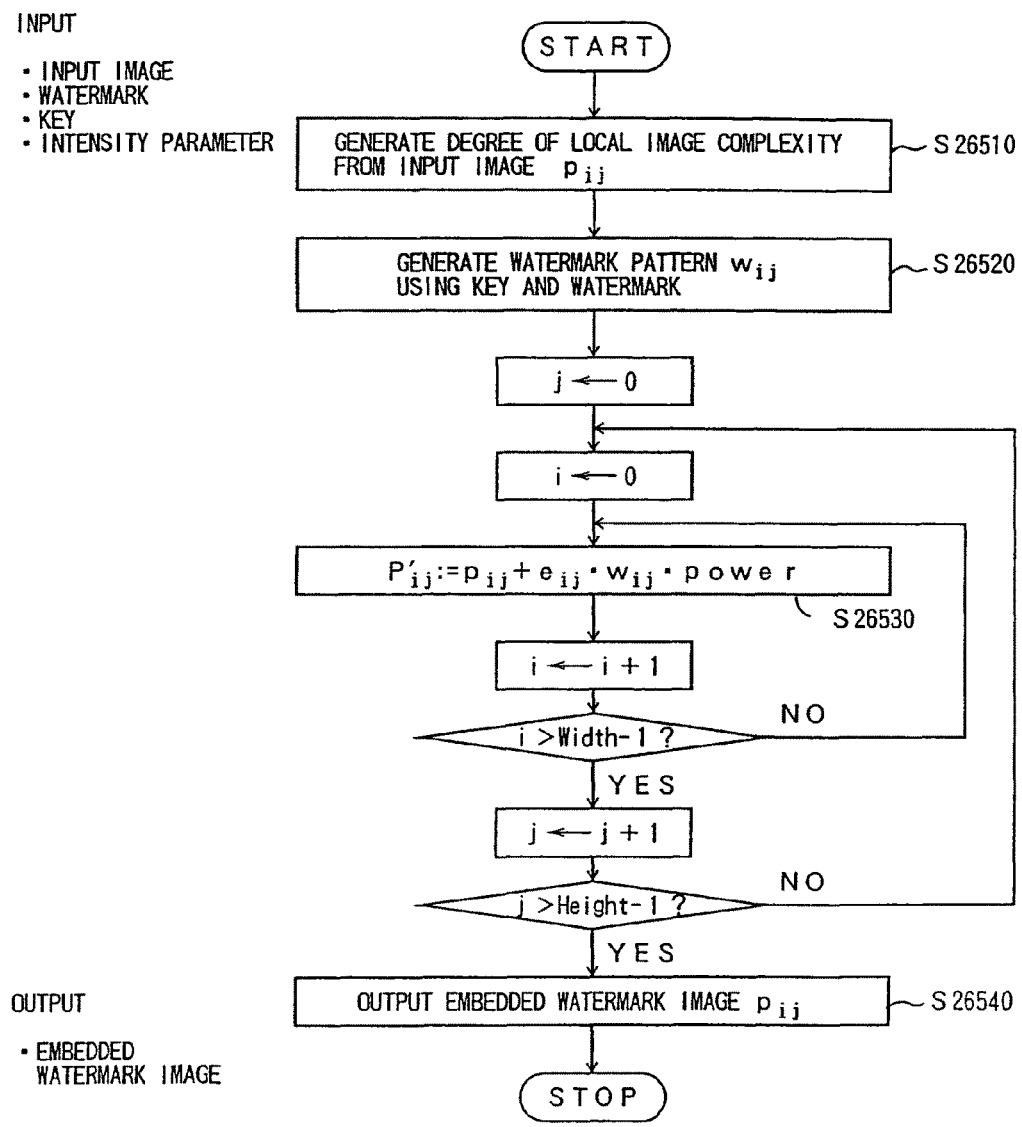
Figure 134:
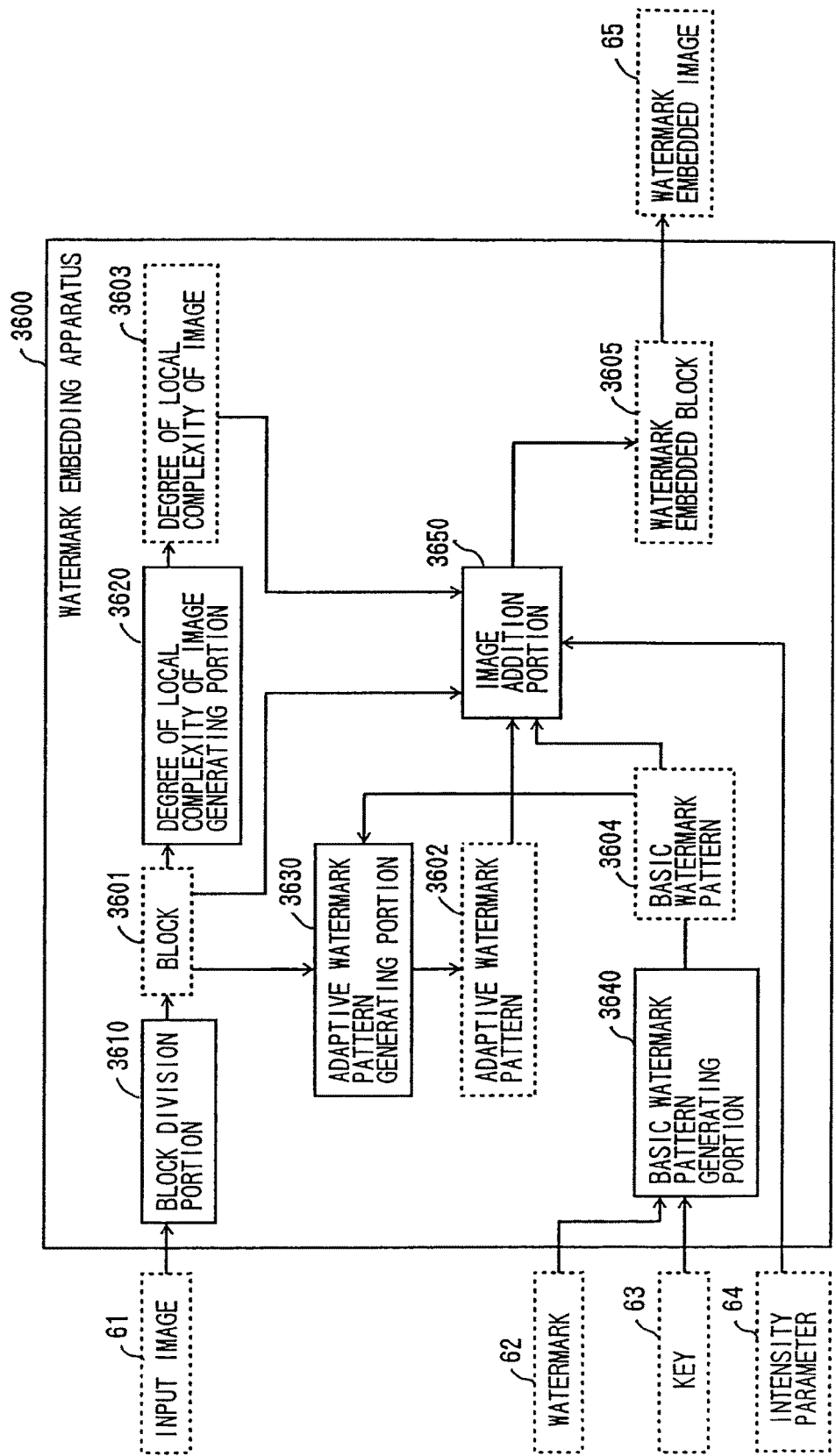
Figure 135:
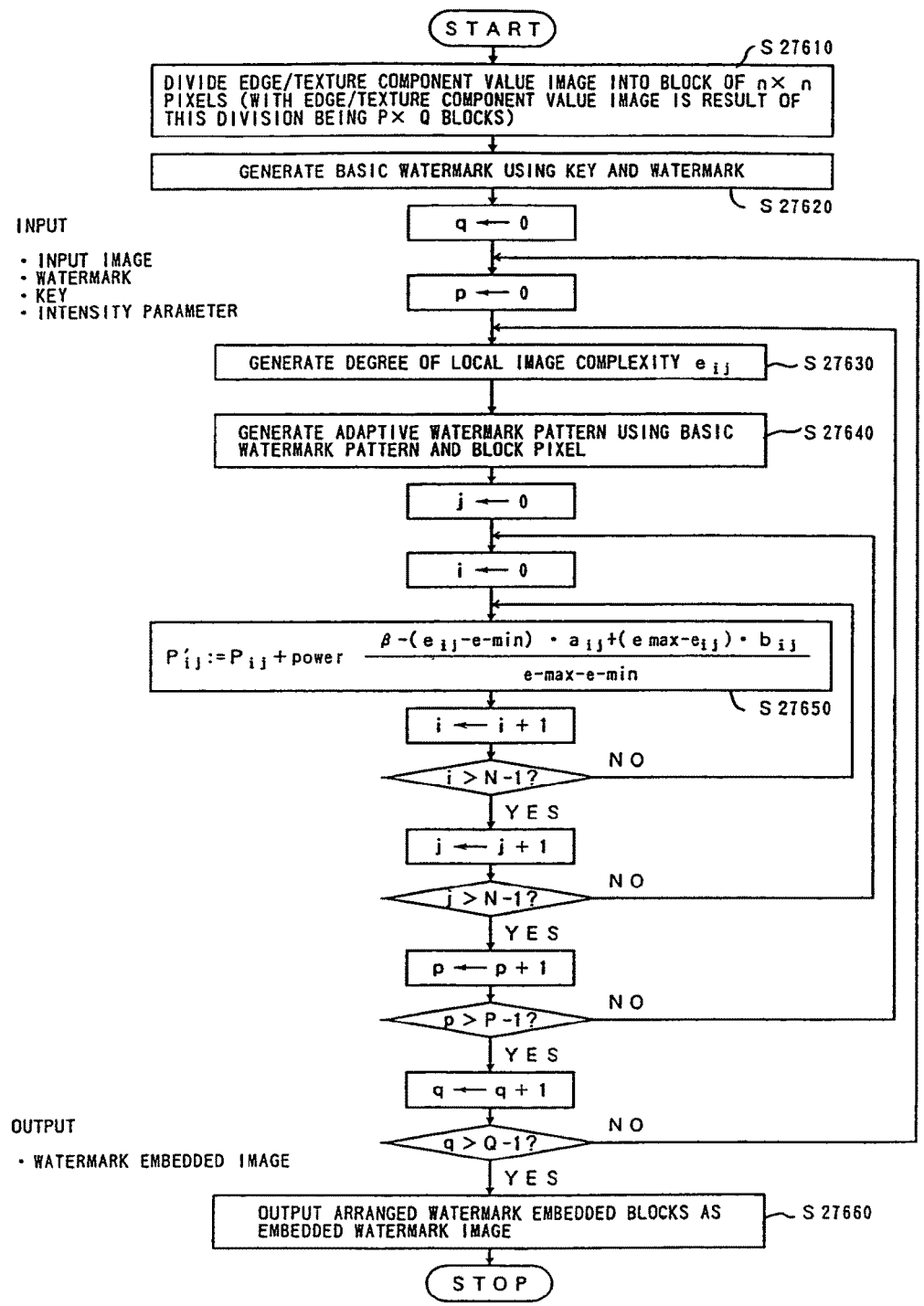
Figure 136:
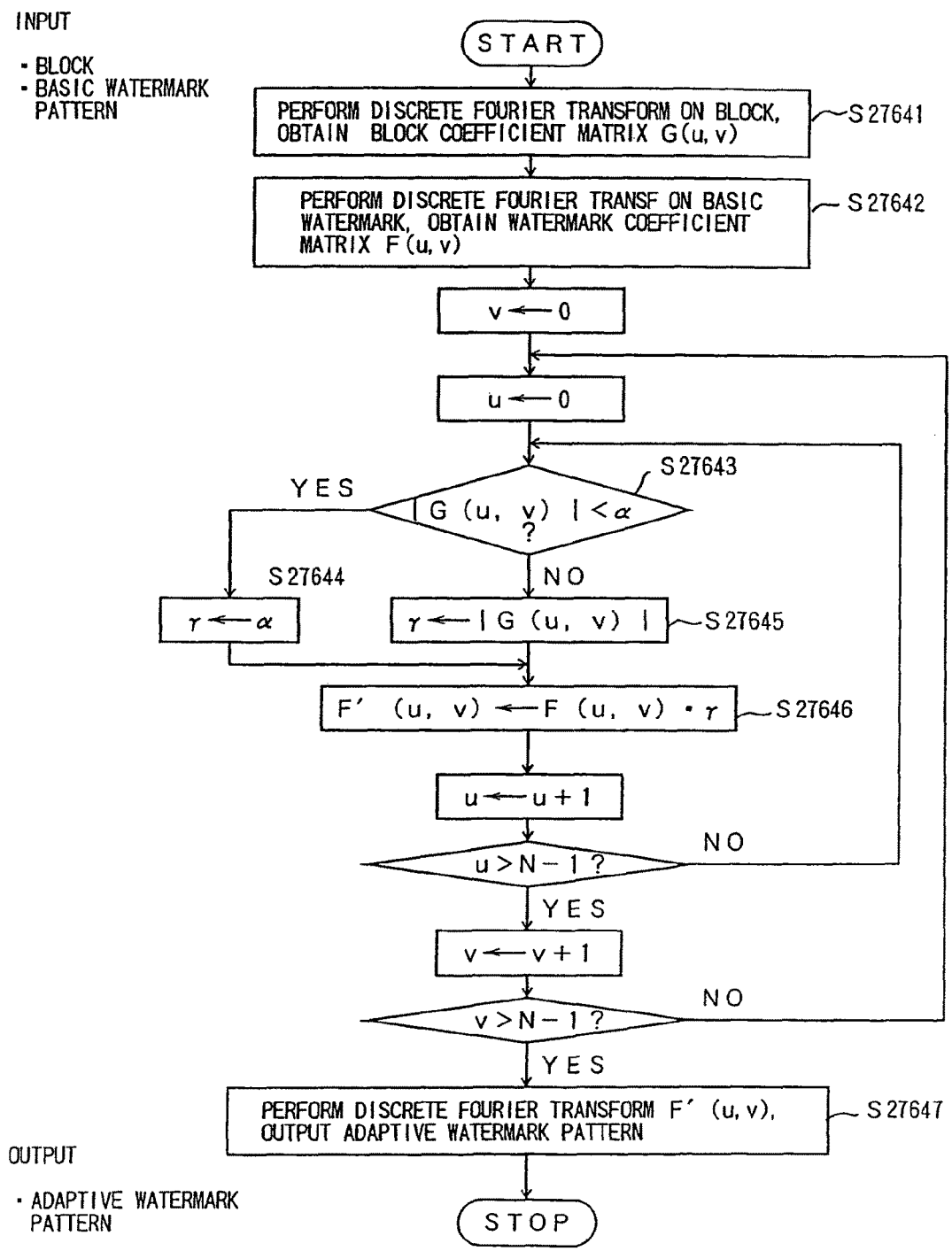
Figure 137:
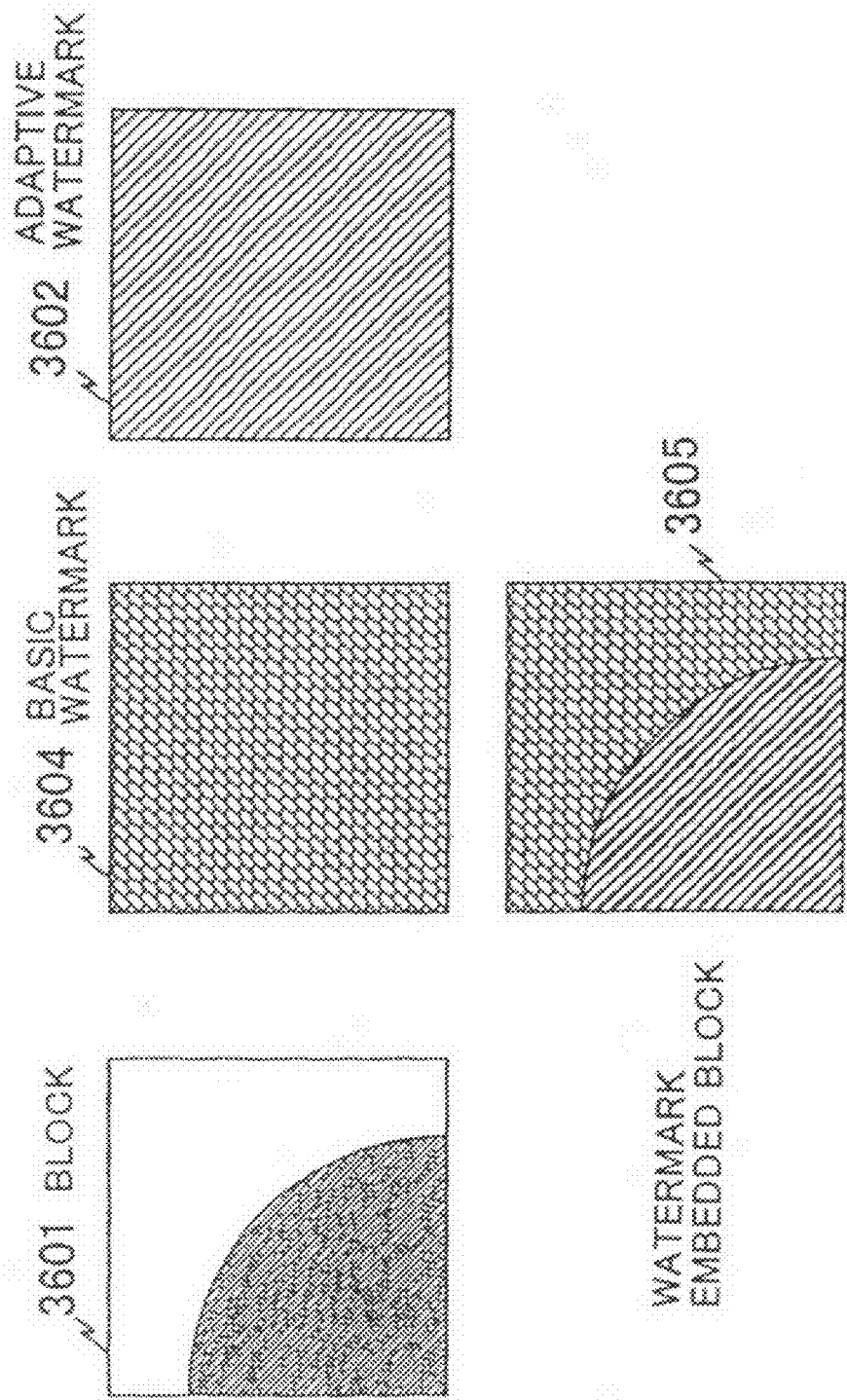

FIG. 131 is a diagram showing image input and output by each portion of the twenty-fifth embodiment of the present invention;

FIG. 132 is a diagram showing the configuration of a watermark embedding apparatus according to a twenty-sixth embodiment of the present invention;

FIG. 133 is a flow chart showing the process of the watermark embedding apparatus according to the twenty-sixth embodiment of the present invention;

FIG. 134 is a diagram showing the configuration of a watermark embedding apparatus according to a twenty-seventh embodiment of the present invention;

FIG. 135 is a flow chart showing the process of the watermark embedding apparatus according to the twenty-seventh embodiment of the present invention;

FIG. 136 is a flow chart showing the process of an adaptive watermark pattern creation portion according to the twenty-seventh embodiment of the present invention;

FIG. 137 is a diagram showing a block and pattern in the processing of embedding a watermark according to the twenty-seventh embodiment of the present invention.

Figure 138:
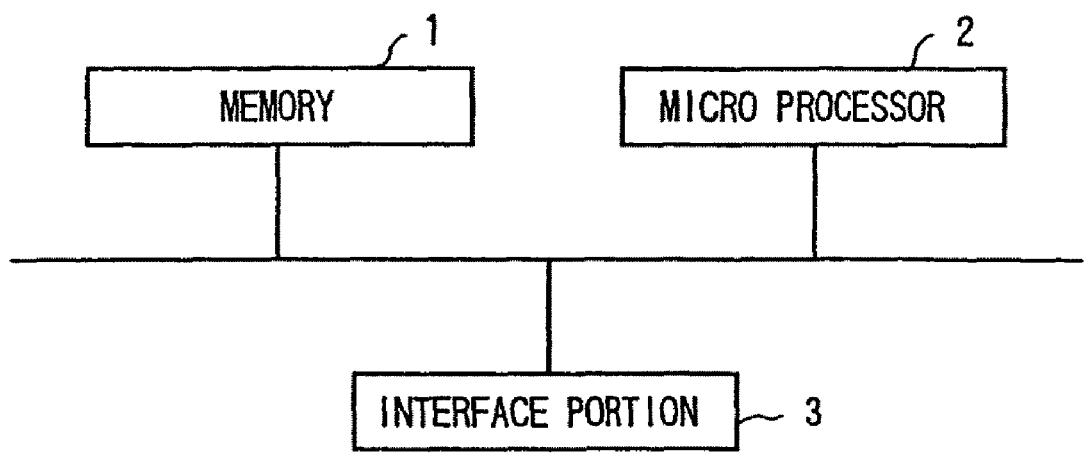

FIG. 138 is a diagram showing the configuration of a integrated circuit according to a twenty-eight embodiment of the present invention.

DETAILED DESCRIPTION OF THE PREFERRED EMBODIMENTS

A detailed description of embodiment of the present invention will now be given with reference to the figures.

First Embodiment

This embodiment describes a first embodiment of watermark embedding.

Figure 1:
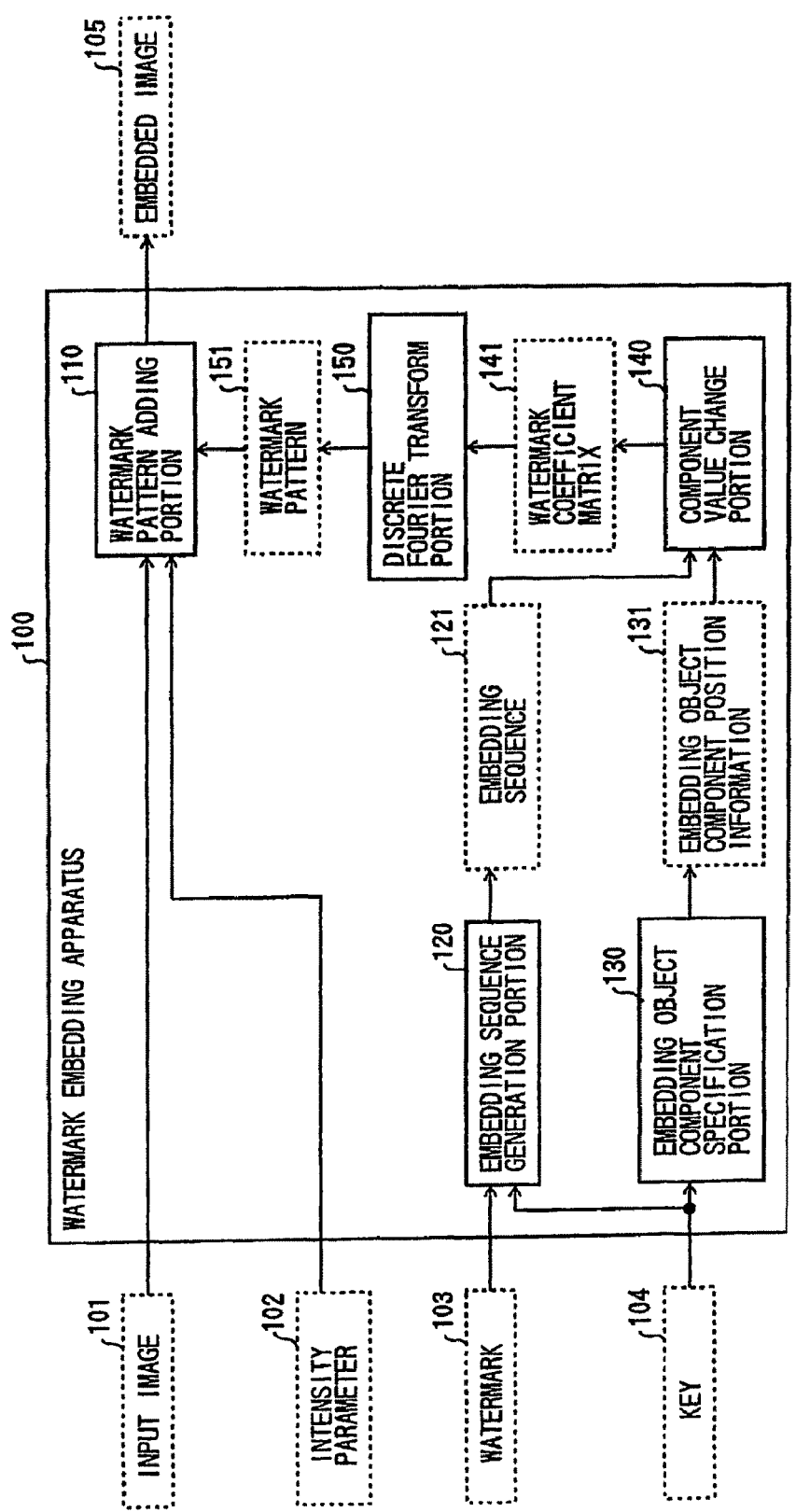
FIG. 1 is a diagram showing the configuration of an watermark embedding apparatus according to the first embodiment of the present invention.

FIG. 1 is a diagram showing the configuration of the watermark embedding apparatus according to a first embodiment of the present invention.

The watermark embedding apparatus 100 is configured by a watermark pattern adding portion 110, and embedding sequence generation portion 120, an embedding object component specification portion 130, a component value change portion 140, and a discrete Fourier inverse transform portion 150.

The watermark embedding apparatus 100 inputs an input image 101, an intensity parameter 102, a watermark 103, and a key 104, and ultimately outputs an embedded image 105.

The following is an outline of the operation according to the above configuration.

Figure 2:
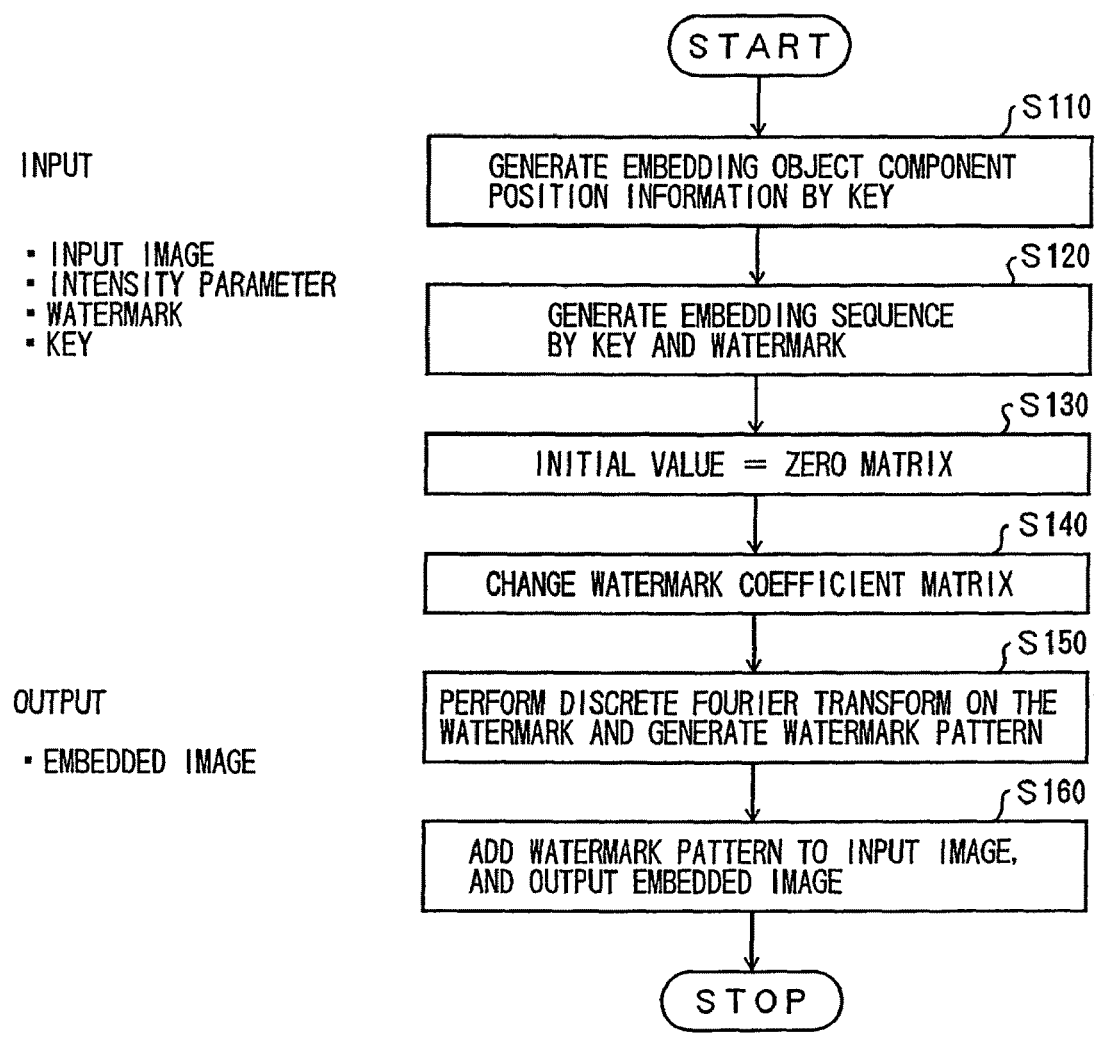
FIG. 2 is a flow chart showing the process of the watermark embedding apparatus according to the first embodiment of the present invention.

FIG. 2 is a flow chart showing the process of the watermark embedding apparatus according to the first embodiment of the present invention.

Step 110) The watermark embedding apparatus 100 that has received the above-mentioned inputs, first of all, in the embedding object component specification portion 130, uses the key 104 to generate embedding object component position information 131 which is sent to the component value change portion 140.

Step 120) In addition, in the embedding sequence generation portion 120, the key is used to disperse position marker information of the watermark to from an the embedding sequence 121, which is sent send it to the component value change portion 140.

Step 130) The component value change portion 140 uses the embedding sequence 121 and the embedding object component position information 131 from the embedding object component specification portion 130 to make an initial value of a watermark coefficient matrix 141 the zero matrix.

Step 140) The component value change portion 140 changes the component value of the watermark coefficient matrix 141.

Step 150) The discrete Fourier inverse transform portion 150 performs a discrete Fourier inverse transform on the watermark coefficient matrix and creates the watermark pattern 151.

Step 160) The watermark pattern adding portion 110 uses the intensity parameter to emphasize the watermark pattern 151, and add like tiling the watermark pattern to the input image 101, and outputs an embedded image 105.

Figure 3:
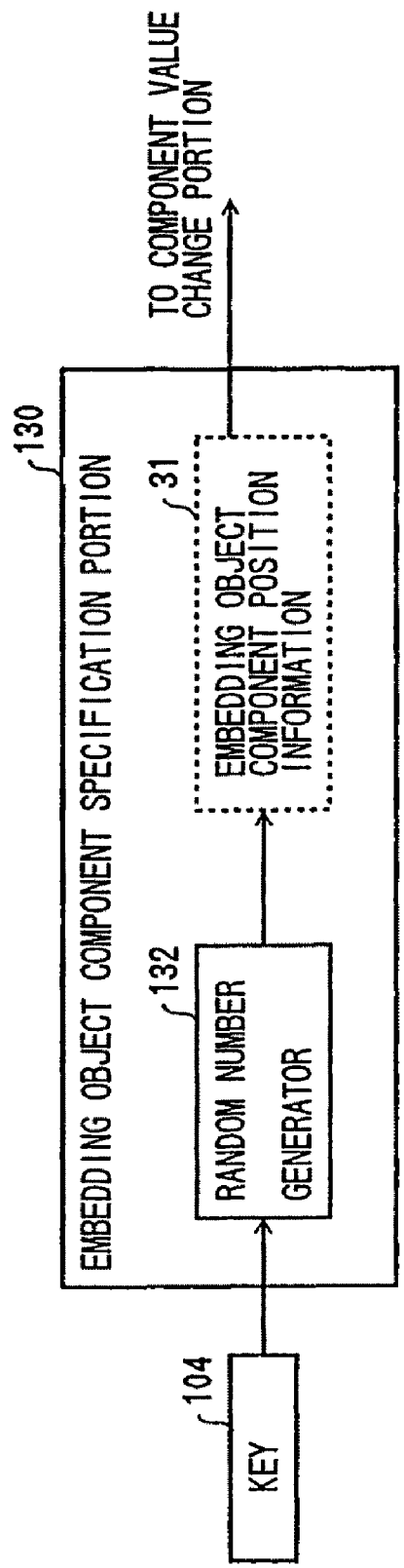
FIG. 3 is a diagram showing the configuration of an embedding object component specification portion of the first embodiment of the present invention.

The following description explains a description of the processing in the embedding object component specification portion 130. FIG. 3 is a diagram showing the configuration of embedding object component specification portion of the first embodiment of the present invention.

In this figure, the embedding object component specification portion 130 has a random number generator 132 that inputs the key 104 and generates the embedding object component position information 131.

Figure 4:
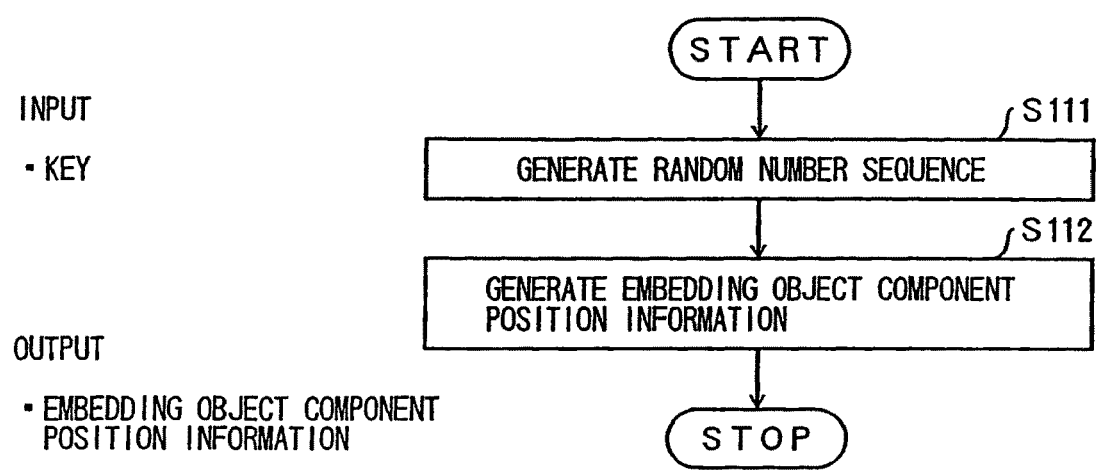
FIG. 4 is a flow chart showing the process of an embedding object component specification portion of the first embodiment of the present invention.

FIG. 4 is a flow chart showing the process of the embedding object component specification portion according to the first embodiment of the present invention.

Step 111) The embedding object component specification portion 130 inputs key 104 and uses the random number generator 132 to generate a random number sequence that takes the key 104 as its initial value.

Step 112) The embedding object component specification portion 130 also uses the generated random number sequence as the basis for generating embedding object component position information 131 which is a sequence having a length the same as the length n of the embedding sequence which will be described later.

The embedding object component position information 131 is configured as described below.

$$L_k = (x_k, y_k, z_k)(0 \leq k < n)$$

$x_k$: embedding object component sequence x-direction second degree;

$y_k$: embedding object component sequence y-direction second degree;

$z_k$: flag expressing real or imaginary for the embedding object sequence (whether or not it is a real number component or an imaginary number component)

In each item of the embedding object component position information 131, the embedding object component specification portion 130 avoids duplication (all of the three components above must not be in agreement for the two items L k and L m). In addition, in order to compensate for the addition of digital noise and irreversible decompression, $$\sqrt{x_k^2 + y_k^2} < r$$

so that there is a bandwidth limit preventing sequences from being selected from the high-frequency region. Furthermore, although signals obtained from the discrete Fourier inverse transform become real numbers, embedding which maintains a necessary symmetry of the sequence matrix, $$F(u,v) = F^*(N-u, N-v)$$

(where F(u,v) is a Fourier transform of the sample value f(x,y)(0<=x<N, 0<=y<N) where N is the size of the length and width of the sequence matrix to be described later, and * indicates a complex conjugate), requires that only positive values be selected for the x-direction second degree or the y-direction second degree of the embedding symmetry sequence. The embedding object component position information 131 is sent to the component value change portion 140.

The following is a description of the configuration of the embedding sequence generation portion 120 in the present embodiment.

Figure 5:
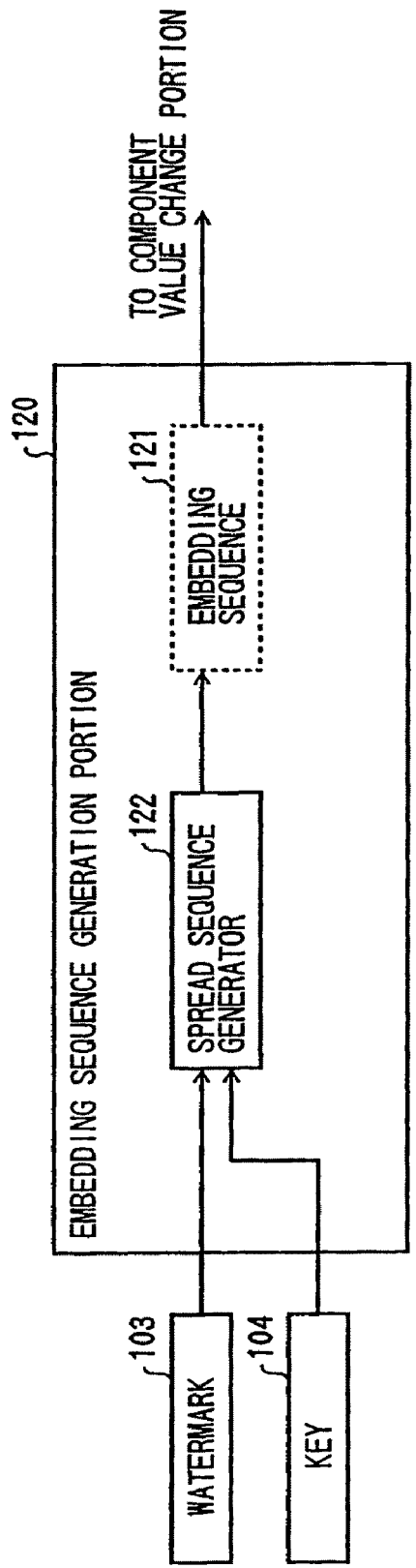
FIG. 5 is a diagram showing the configuration of an embedding sequence generation portion of the first embodiment of the present invention.

FIG. 5 is a diagram configuration of the embedding sequence generation portion of the first embodiment of the present invention. The embedding sequence generation portion 120 has a spread sequence generator 122 that inputs the watermark 103 and the key 104. Basically, the direct spread method in spread spectrum communications is used as the basis. Specifically, the spread sequence generator 122 shown in FIG. 5, generates the embedding sequence 121 which is a real number sequence of length n.

Figure 6:
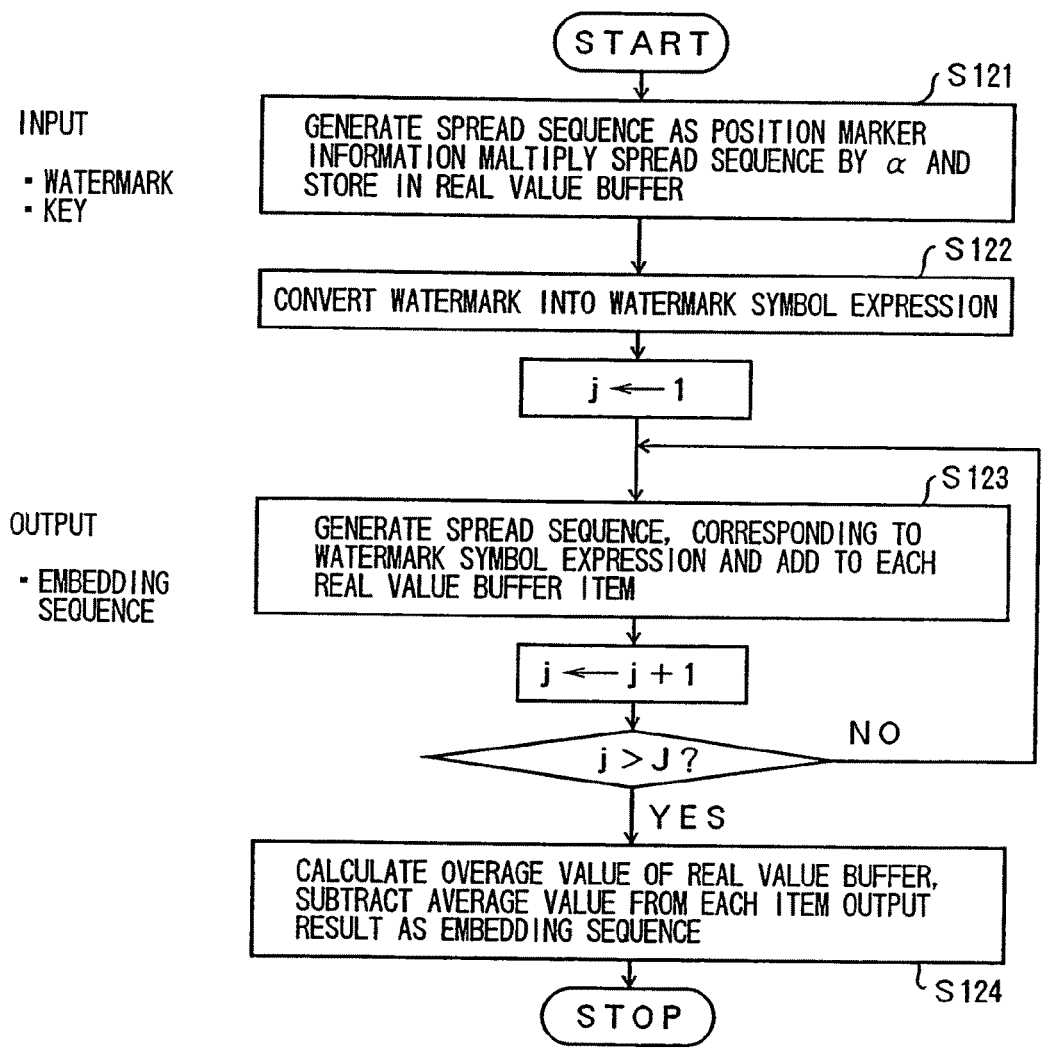
FIG. 6 is a flow chart showing the process of the embedding sequence generation portion of the first embodiment of the present invention.

FIG. 6 is a flow chart showing the process of the embedding sequence generation portion of the first embodiment of the present invention.

Step 121) Position marker spread: The spread sequence generator 122 takes a sequence of length n, and expresses each of spread sequences as $r^{(k)}$ when it is to generate K types (where 0<=k<K−1). The spread sequence uses, for example, an M-sequence, etc.).

In particular the spread sequence generator 122 takes the key 104 as an initial value and generates a spread sequence $\{r_i^{(0)}\}$ (0<=i<n), multiplies it by a weighting value alpha (>=1) that is determined beforehand, and stores the result in the real number buffer $\{m_i\}$ (0<=1<n).

Expressing this as an equation gives the following:
$m_i$=alpha·$r_i^{(0)}$ (0<=i<n)
(:=indicates that the value of the right side of the equation can be substituted into the left)

Step 122) Conversion into a watermark symbol expression:

The embedding sequence generator 120 converts the watermark 103 into a symbol expression. For example, if the watermark is 4-character 8-bits per character information and there is conversion into a symbol for each eight bits, it is possible to convert the watermark into the watermark four symbols (with the value of each symbol being from 0 ˜& 255, which is equivalent to ASCII text code). When this occurs, the number of symbols is smaller than K, and the maximum value a symbol can have is selected so that it is smaller than n. The value of each symbol is $s_j$ (1<=j<=J(<K)), with the maximum value of $s_j$ being expressed as M (<=n).

Step 123) Dispersion of the watermark:

The embedding sequence generator 120 adds a spread sequence corresponding to each symbol $s_j$ to $\{m_i\}$, for each terms of j'th item. In particular, the symbol value $s_j$ is added to the key 104, the sum is used as the initial value, and the spread sequence $\{r_i^{(0)}\}$ (0<=i<n) having the length n for the j'th item is generated by the spread sequence generator 122.

After this, the embedding sequence generator 120 adds each item of $\{r_i^{(j)}\}$ to each item $\{m_i\}$. Expressing this as an equation gives the following.

$$m_i : m_i + r_i^{(j)} (0 <= i <= n)$$

where this is repeated for the interval 1<=j<=J.

Step 124) The embedding sequence generator 120 subtract the average value from each item of $\{m_i\}$ so that the average value of $\{m_i\}$ obtained for up to Step 123 above is 0, and outputs that result as the embedding sequence 121 which is sent to the component value change portion 140. Expressing the subtraction processing as a formula gives the following.

$$\text{ave:} \frac{1}{n} \sum_{i=0}^{n-1} m_i \qquad m_i = m_i - ave (0 \leq i \leq n)$$

The following is a description of the process of the component value change portion 140 of the present embodiment.

Figure 7:
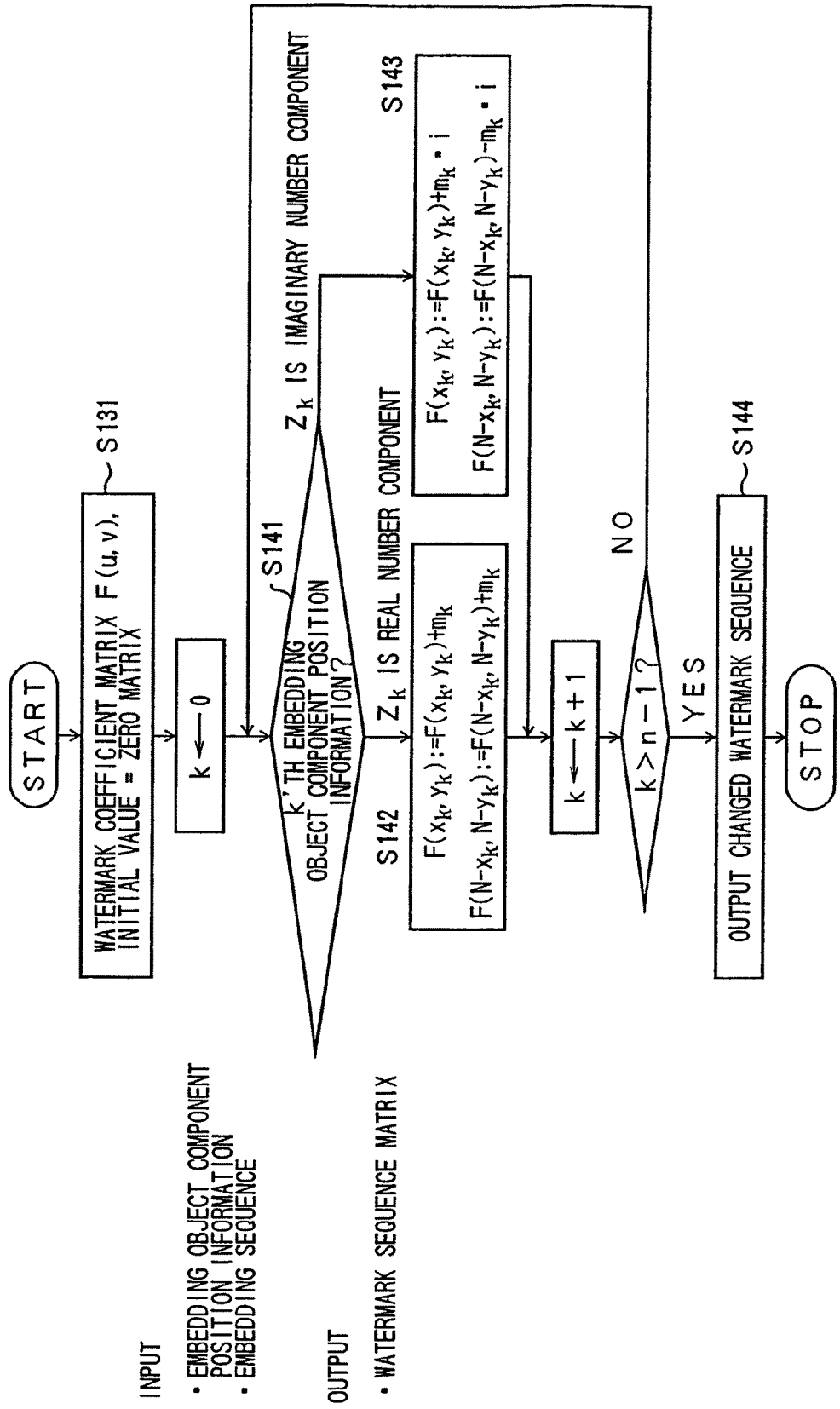
FIG. 7 is a flow chart of the process of a component value change portion of the first embodiment of the present invention.

The component value change portion 140 inputs the embedding object component position information 131 and the embedding sequence 121 and generates the watermark coefficient matrix by the procedure shown in FIG. 7.

FIG. 7 is a flow chart of the process of the component value change portion of the first embodiment of the present invention.

Step 131) In the component value change portion 140, a watermark coefficient matrix F(u,v) is prepared as a complex matrix of size N×N and the initial value is made the zero matrix.

Step 141) The component value change portion 140 uses $L_k=(x_k, y_k, z_k)$ which is the embedding object component position information 131 for the k'th item and changes the elements F(u,v).

Step 142) When zk is a value expressing a real number component: The component value change portion 140 adds the real number component $F(x_k, y_k)$ to mk. In addition, so that the Fourier transform sequence holds its symmetry, the real number component of F(N−xk, N−yk) is also added to m k. Expressing this as an equation gives the following:

$$F(x_k,x_k):=F(x_k,y_k)+mk$$

$$F(N-x_k,N-y_k):F(N-x_k,N-x_k)+m_k$$

Step 143) When zk is a value expressing an imaginary number: The component value change portion 140 adds the imaginary number component F(xk,yk) to m k. In addition, so that the Fourier transform sequence holds its symmetry, the real number component of F(N−xk, N−yk) is subtracted from mk. Expressing this as an equation gives the following:

$$F(xk,yk):=F(xk,yk)+mk\cdot i$$

$$F(N-xk,N-yk):=F(N-xk,N-yk)+mk\cdot i$$

(where i is an imaginary number unit). The above mentioned the equation performs in order to k=0 . . . n−1.

The following is a description of the process of the discrete Fourier inverse transform portion 150 of the first embodiment of the present invention.

Figure 8:
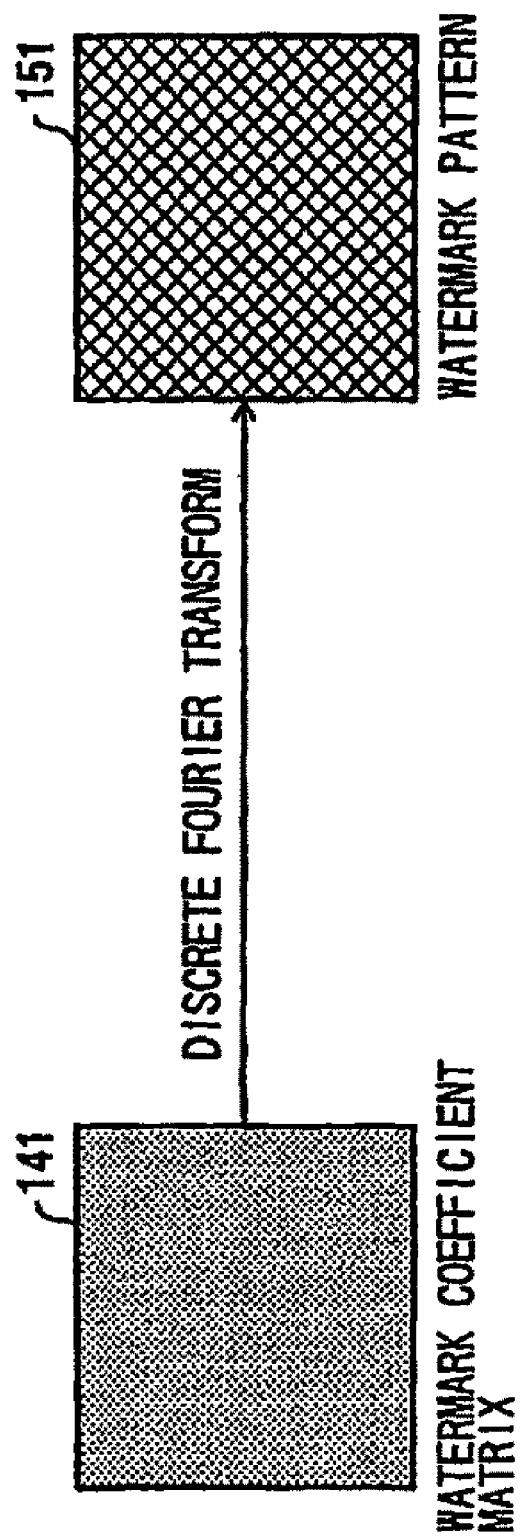
FIG. 8 is a diagram describing the process of a discrete Fourier inverse transform portion of the first embodiment of the present invention.

FIG. 8 is a diagram describing the process of the discrete Fourier inverse transform portion of the first embodiment of the present invention.

The discrete Fourier inverse transform portion 150 obtains the watermark pattern 151 that is the real number matrix (that has had the imaginary number component discarded) of size N×N obtained by performing a discrete Fourier inverse transform on the watermark coefficient matrix 141, and sends the watermark pattern 151 to the watermark pattern adding portion 110.

The following is a description of the process of the watermark pattern adding portion 110 of the first embodiment of the present invention.

Figure 9:
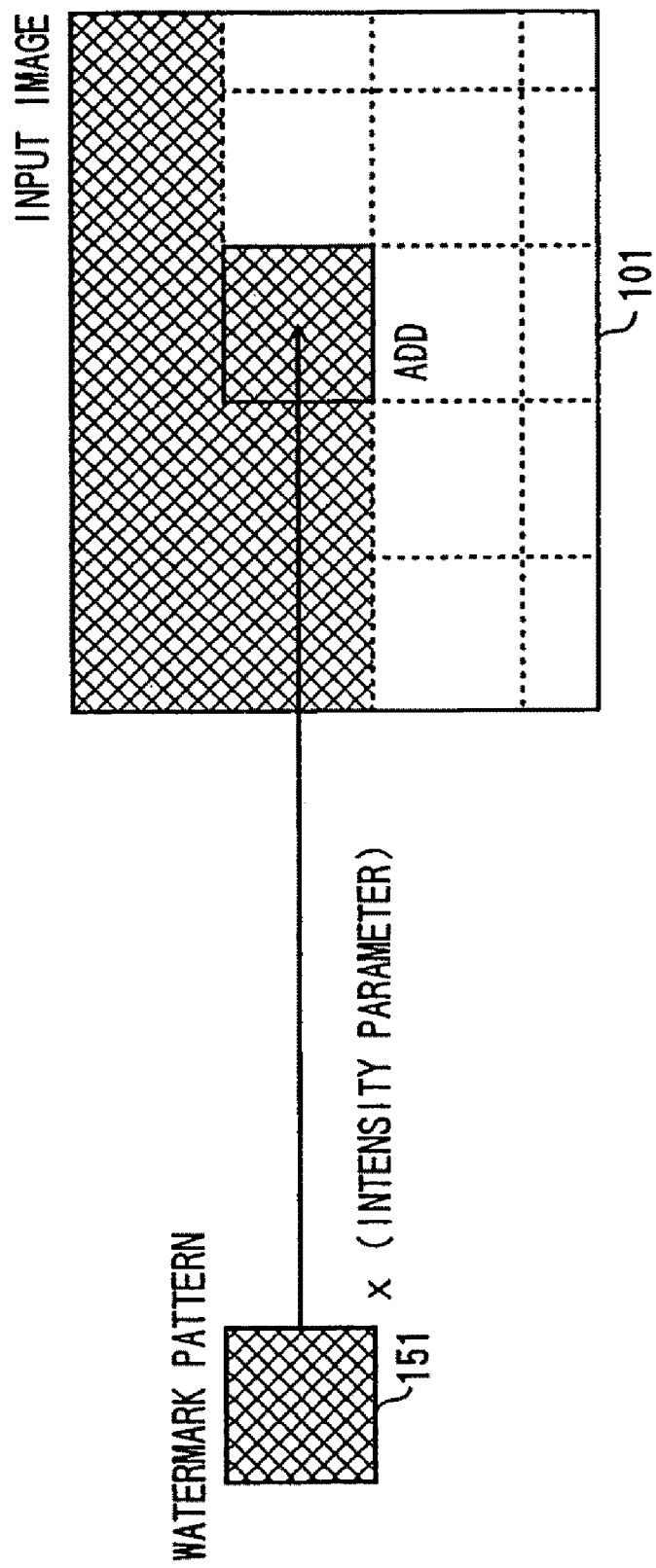
FIG. 9 is a diagram describing the process of the watermark pattern adding portion of the first embodiment of the present invention.

FIG. 9 is a diagram describing the process of the watermark pattern adding portion of the first embodiment of the present invention.

The watermark pattern adding portion 110 emphasizes the watermark pattern 151 by the value of the intensity parameter, and adds like tiling the watermark pattern 151 to the input image 101, and generates and outputs an embedded image. Expressing this as an equation gives the following.

$\{I_{xy}\}$:input image(0<=x<Width,0<=y<Height)

(Width is the horizontal size of the input image, Height is the vertical size of the input image.)

When $\{W_{ij}\}$: watermark pattern (0<=i, j<N)

power: intensity parameter, it is determined by $$I'_{xy}:=I_{xy}+\text{power}\cdot W_{x\%N,y\%N}$$

(0<=x<Width, 0</=y<Height)

(a % b) expresses the remainder when a is divided by b.) The watermark pattern adding portion 110 outputs {I'xy} as the embedded image 105.

Moreover, when the value of the intensity parameter is 1, the watermark pattern is added without any emphasis. That is, this is the same as the case when an intensity parameter is not used.

This ends the process of the watermark embedding apparatus 100 according to the present embodiment.

In the processing for the embedding of a watermark by the present embodiment, an N×N sized 2-dimensional discrete Fourier inverse transform is used once only; With the conventional technology, it is necessary to divide an image into blocks of N×N size discrete Fourier transform operations and inverse discrete Fourier transform operations for each block. For example if there is b number of blocks, the ratio of the amount of embedding processing according to the first embodiment and the conventional technology becomes 1:2b, meaning that it is possible to have high-speed embedding processing if the first embodiment is used.

Second Embodiment

The following is a description of the processing for detecting a watermark embedded by the watermark embedding apparatus of the first embodiment.

Figure 10:
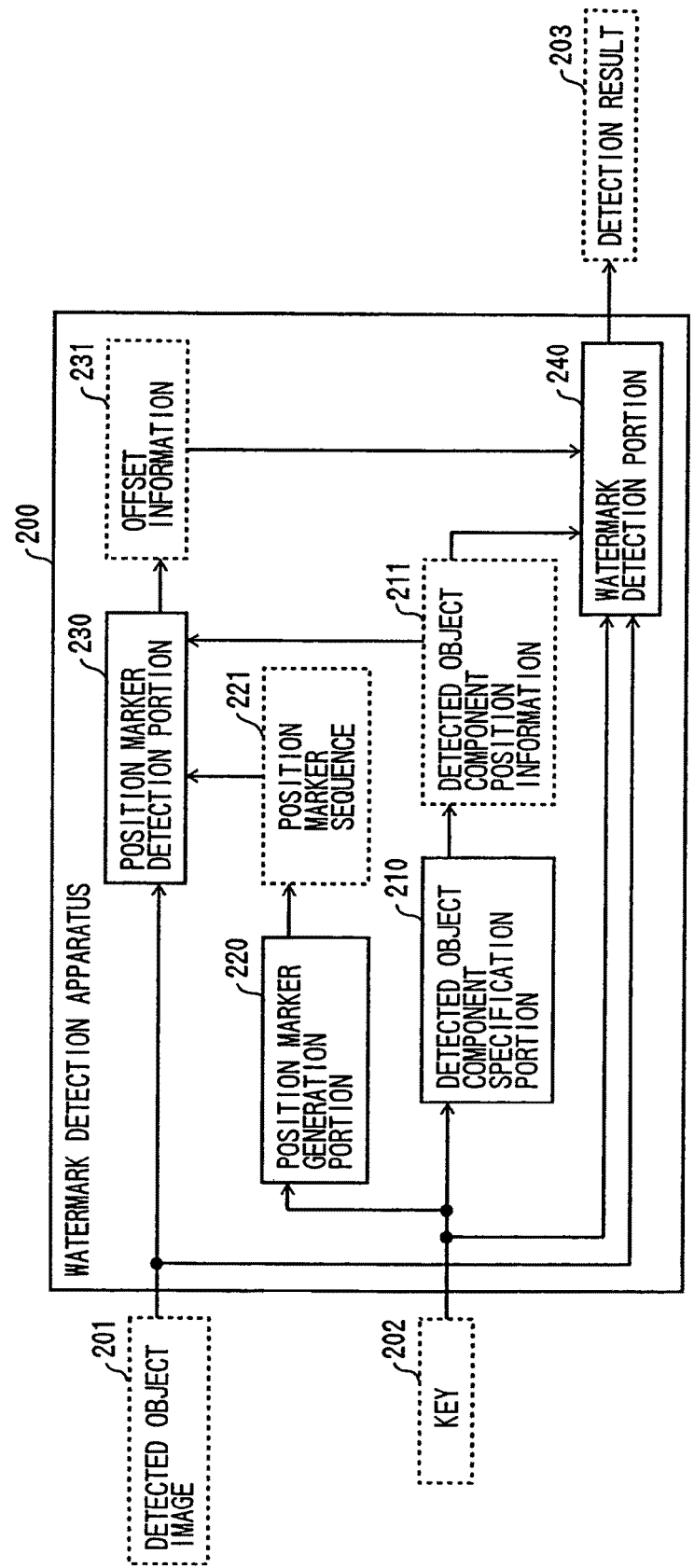
FIG. 10 is a diagram showing the configuration of a watermark detection apparatus according to the second embodiment of the present invention.

FIG. 10 is a diagram showing the configuration of a watermark detection apparatus according to a second embodiment of the present invention.

A watermark detection apparatus 200 is an apparatus for detecting an embedded watermark from an image resulting from processing (partial discard, irreversible compression, etc.) being performed on an embedded image obtained using the method of the first embodiment described above.

The watermark detection apparatus 200 comprises a detected object component specification portion 210, a position marker sequence generation portion 220, a position marker detection portion 230, and a watermark detection portion 240.

Figure 11:
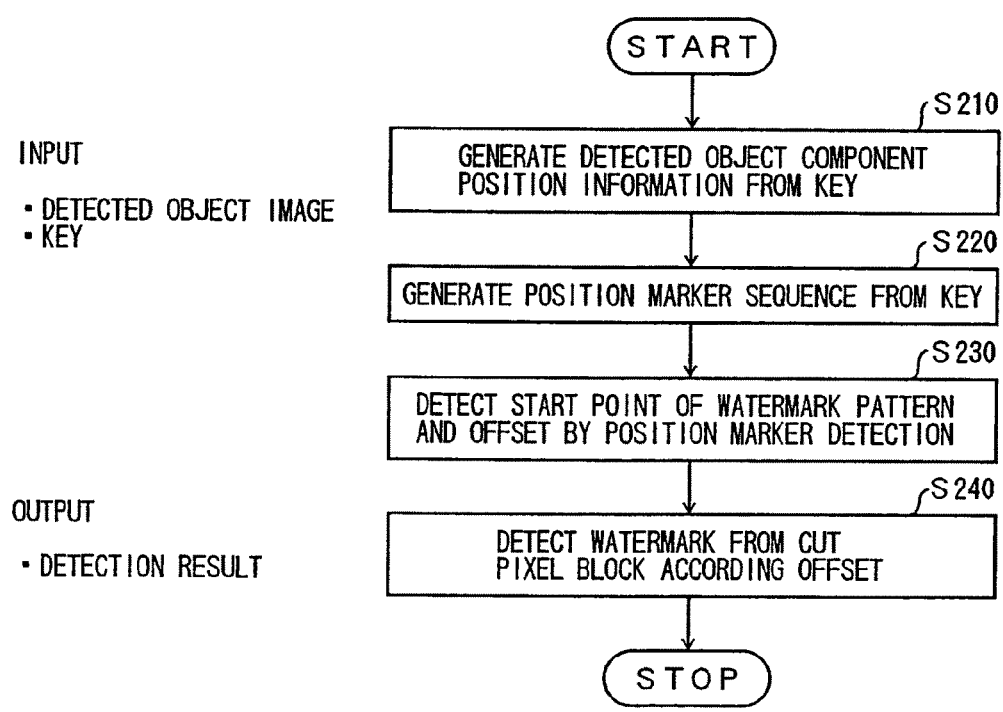
FIG. 11 is a flow chart showing the process of the watermark detection apparatus according to the second embodiment of the present invention.

FIG. 11 is a flow chart showing the process of a watermark detection apparatus according to a second embodiment of the present invention.

Step 210) The watermark detection apparatus 200 inputs a key 202 which is the same as that was used for embedding. First, in the detect object component specification portion 210, a method the same as that of the embedding object component specification portion 130 of the first embodiment described above, is used to generate detected object component position information 211 from the key, which is sent the position marker detection portion 230 and the watermark detection portion 240.

Step 220) In the position marker sequence generation portion 220, a position marker sequence 221 is generated from the key 202 and sent to the position marker detection portion 230.

Step 230) The position marker detection portion 230 cuts an N×N (N is same as the watermark pattern size in the first embodiment) size block from a detected object image 201, and, when the start point of the cut pixel block is in agreement with the start point of the embedded watermark pattern, the start point of the pixel block is output as offset information 231 and sent to the watermark detection portion 240.

Step 240) The watermark detection portion 240 cuts a pixel block of size N×N from the offset position specified by using the detected object image 201, key 202, detected object component position information 211 and offset information 231, detects the watermark embedded in that pixel block and outputs a detection result 203.

The following is a description of the detected object component specification portion 210 in the present embodiment.

Figure 12:
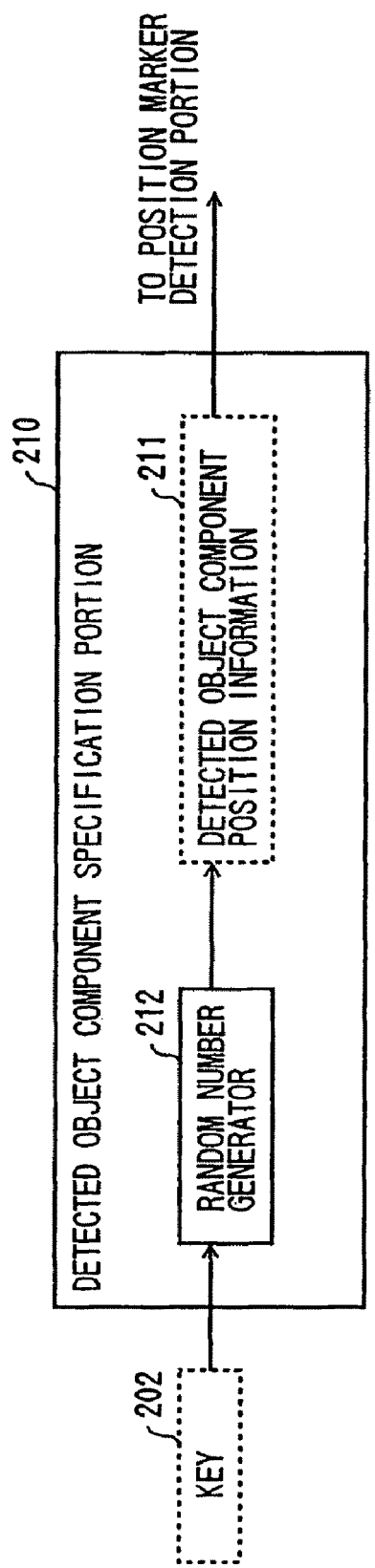
FIG. 12 is a diagram showing the configuration of a detected object component specification portion according to the second embodiment of the present invention.
Figure 13:
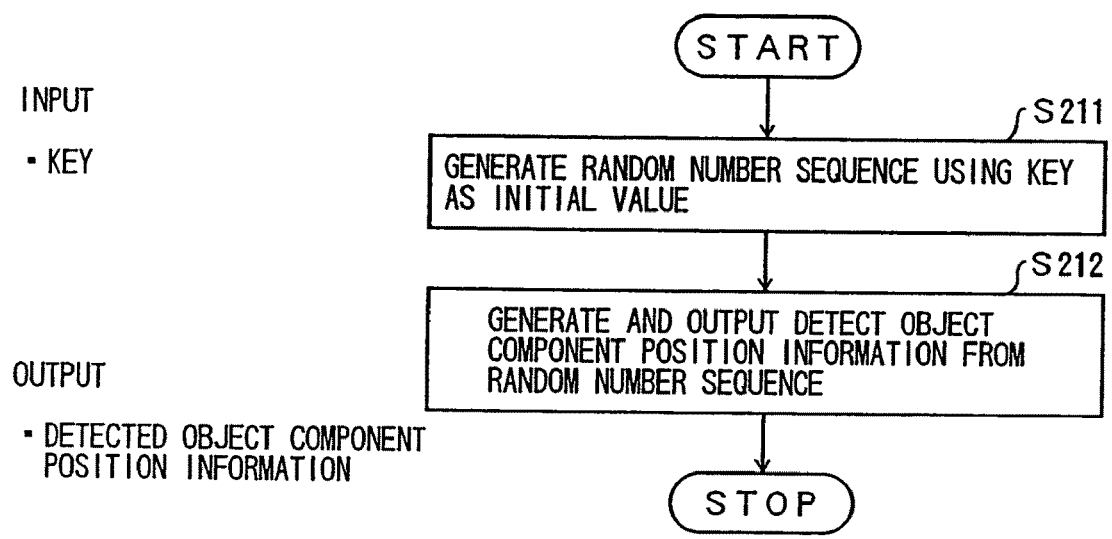
FIG. 13 is a flow chart showing the process of the detected object component specification portion according to the second embodiment of the present invention.

FIG. 12 is a diagram showing the configuration of the detected object image object component specification portion according to the second embodiment of the present invention and FIG. 13 is a flow chart showing the process of the detected object component specification portion according to the second embodiment of the present invention.

Step 211) The detected object component specification portion 210 has a random number generator 212, inputs the key 202 and uses the random number generator 212 to generate a random number sequence using said key 202 as an initial value.

Step 212) The random number sequence is used as the basis for generating the detected object component position information 211 which is a sequence having the same length as the length n of the embedding sequence used in the previously described first embodiment.

The detected object component position information 211 has the following configuration.

$$Lk=(xk, yk, zk)(0<=k<n)$$

x k: embedding object component sequence x-direction second degree;

y k: embedding object component sequence y-direction second degree;

z k: flag expressing real or imaginary for the embedding object coefficient (whether or not it is a real number component or an imaginary number component)

The detected object component specification portion 210 has exactly the same process as the embedding object component specification portion 130 of the previously described first embodiment. That is to say, the same key is used as the input, and the embedding object component position information 131 generated by the embedding object component specification portion 130 of the first embodiment and the detected object component position information 211 generated by the detected object component specification portion 210 of the present embodiment are exactly the same. The generated detected object component position information 211 is sent to the position marker detection portion 230.

The following is description of the position marker sequence generation portion 220 in the present embodiment.

Figure 14:
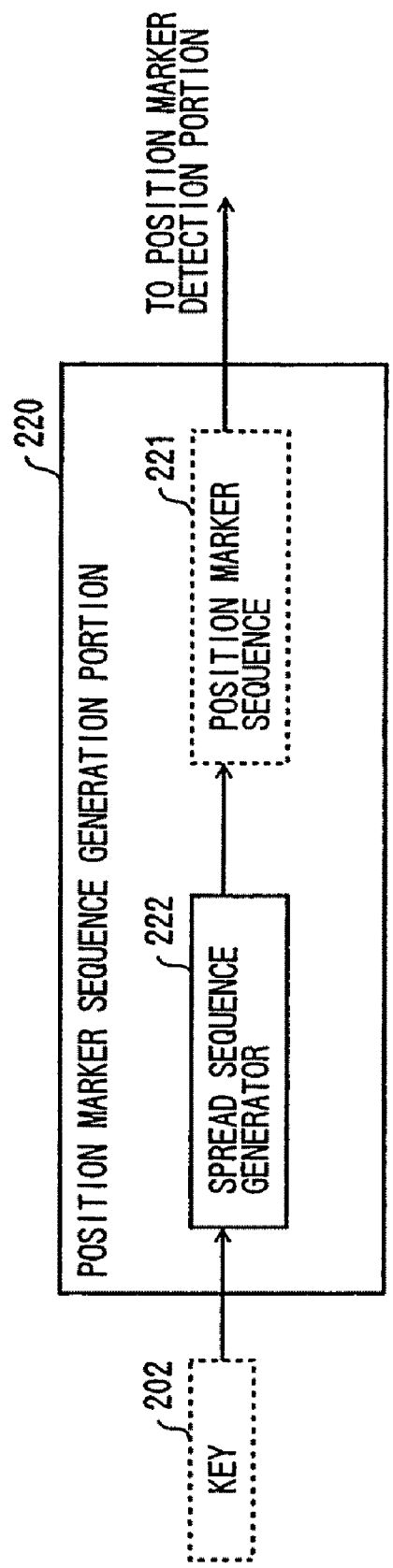
FIG. 14 is a diagram showing the configuration of a position marker sequence generation portion according to the second embodiment of the present invention.
Figure 15:
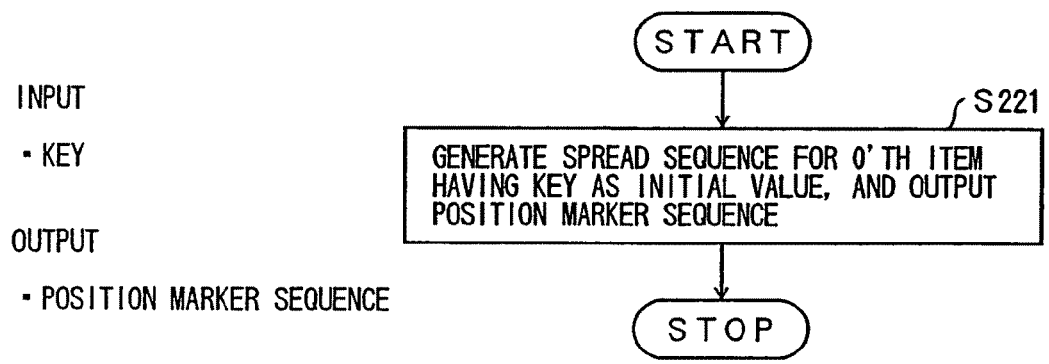
FIG. 15 is a flow chart showing the process of the position marker sequence generation portion according to the second embodiment of the present invention.

FIG. 14 is a diagram showing the configuration of the position marker sequence generation portion according to the second embodiment of the present invention, and FIG. 15 is a flow chart showing the process of the position marker sequence generation portion according to the second embodiment of the present invention.

Step 221) The position marker sequence generation portion 220 has a spread sequence generator 222, inputs the key 202, and uses the spread sequence generator 222 to generate a spread sequence $\{r_i^{(0)}\}$ of length n for the 0'th item the spread sequence having the key 202 as the initial value and being used as it is as the position marker sequence 221 ($\{p\ i\}$ $(0</=i<n)$ ($p\ i:=r_i^{(0)}(0<=i<n)$)), which is then sent to the position marker detection portion 230. The spread sequence generator 222 in the position marker sequence generation portion 220 has the same process as the spread sequence generator 122 in the embedding sequence generation portion 120 of the previously described first embodiment.

The following is a description of the process of the position marker detection portion 230 of the present embodiment.

Figure 16:
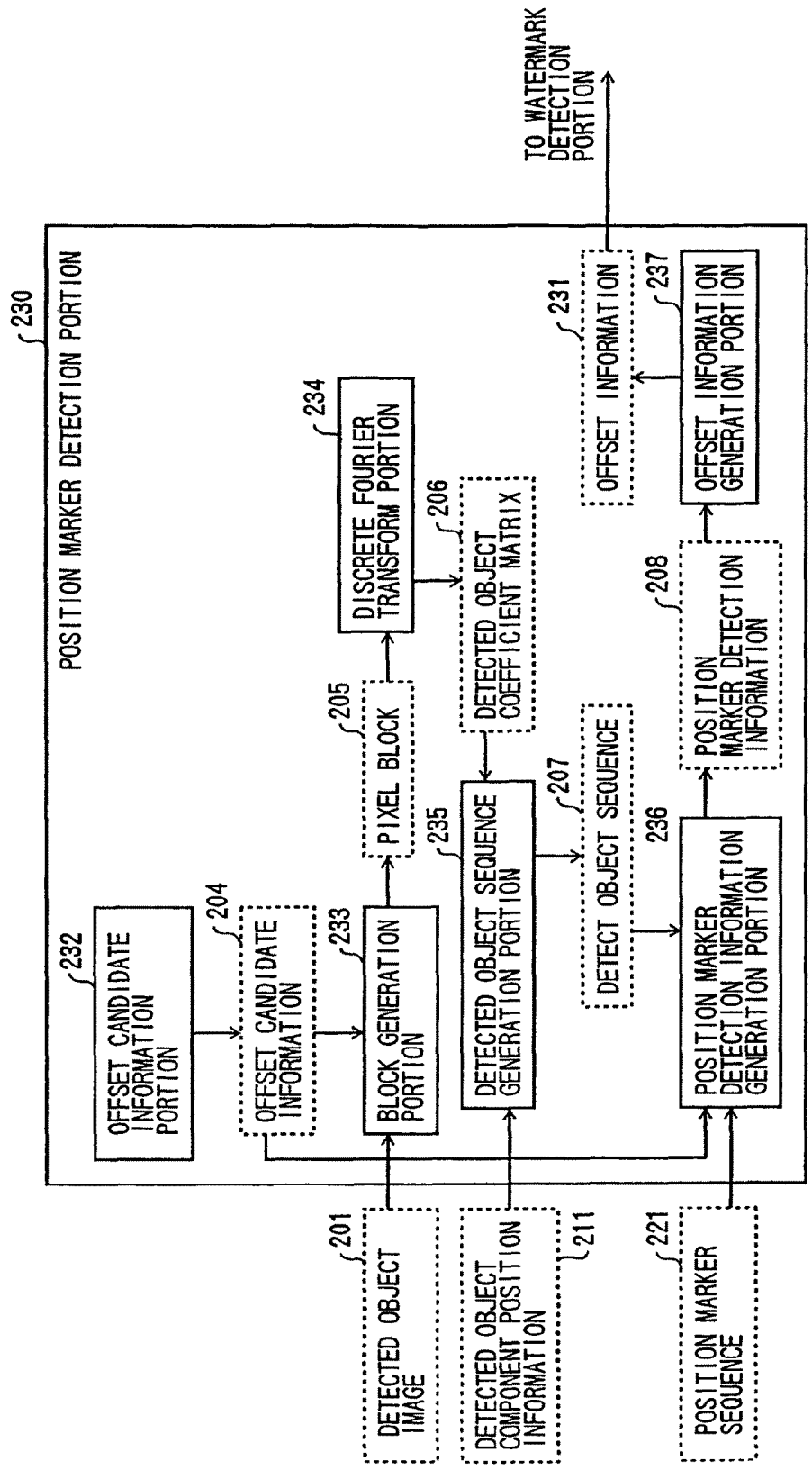
FIG. 16 is a diagram showing the configuration of the position marker detection portion according to the second embodiment of the present invention.

FIG. 16 is a diagram showing the configuration of the position marker detection portion according to the second embodiment of the present invention.

The position marker detection portion 230 shown in this figures comprises an offset candidate information generation portion 232, a block generation portion 233, a discrete Fourier transform portion 234, a detected object coefficient generation portion 235, a position marker detection information generation portion 236 and an offset information generation portion 237.

Figure 17:
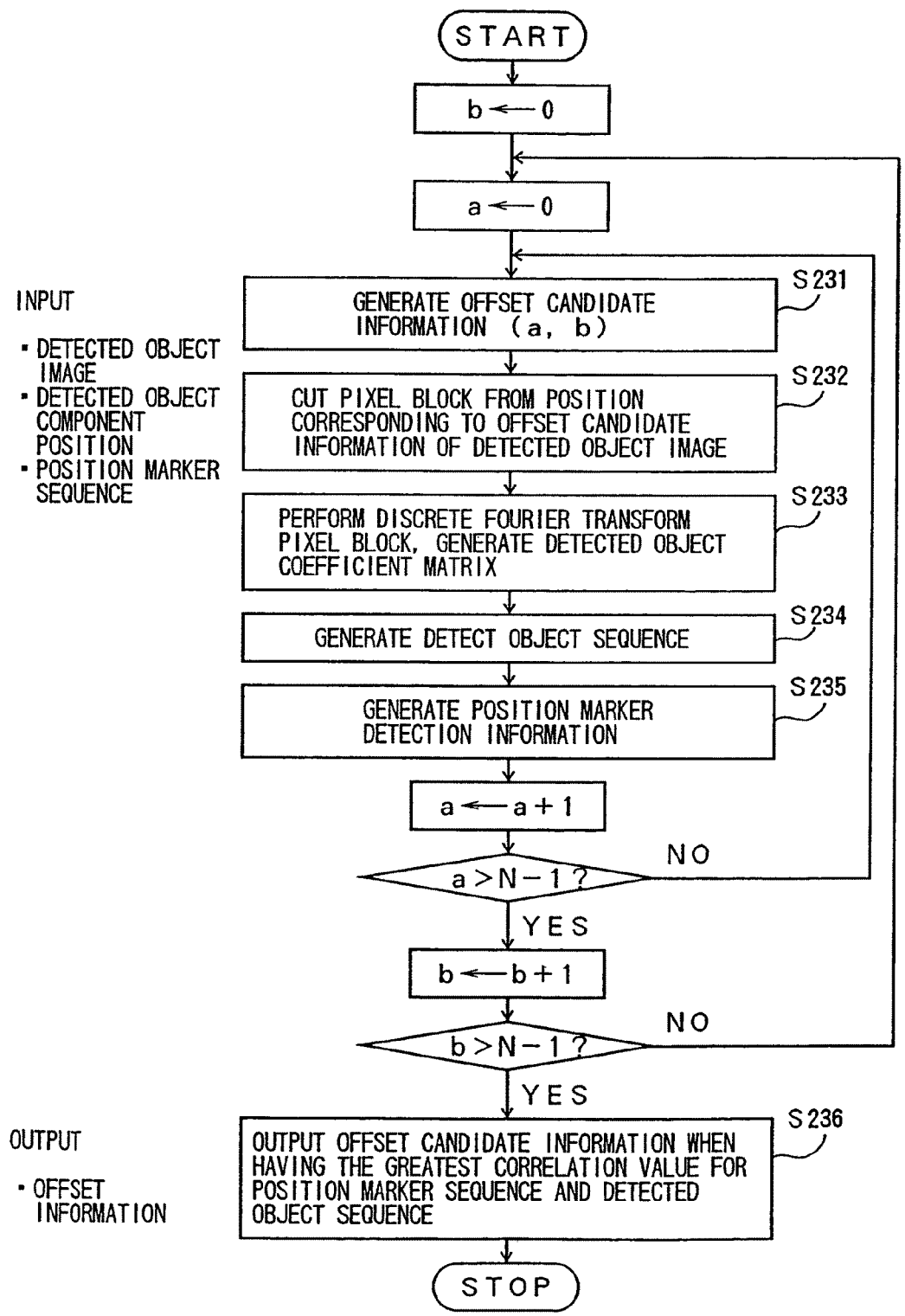
FIG. 17 is a flow chart showing the process of the position marker detection portion according to the second embodiment of the present invention.

FIG. 17 is flow chart showing the process of the position marker detection portion according to the second embodiment of the present invention.

Step 231) The position marker detection portion 230 inputs the detected object image 201, the detected object component position information 211 and, the position marker sequence 221 and first of all, in the offset candidate information generation portion 232, generates offset candidate information 204 ($a, b$) from (0,0) to (N−1, N−1).

Figure 18:
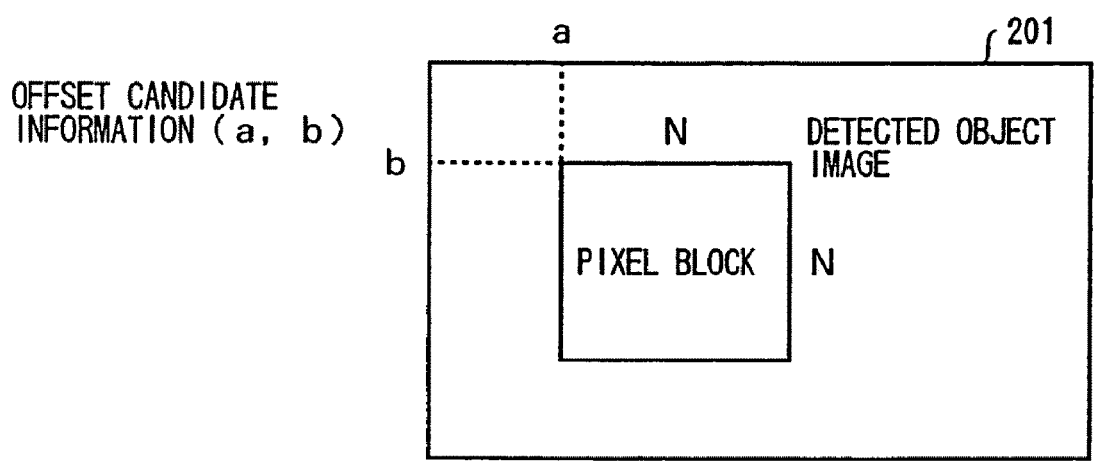
FIG. 18 is a diagram describing the process of a block generation portion according to the second embodiment of the present invention.
Figure 19:
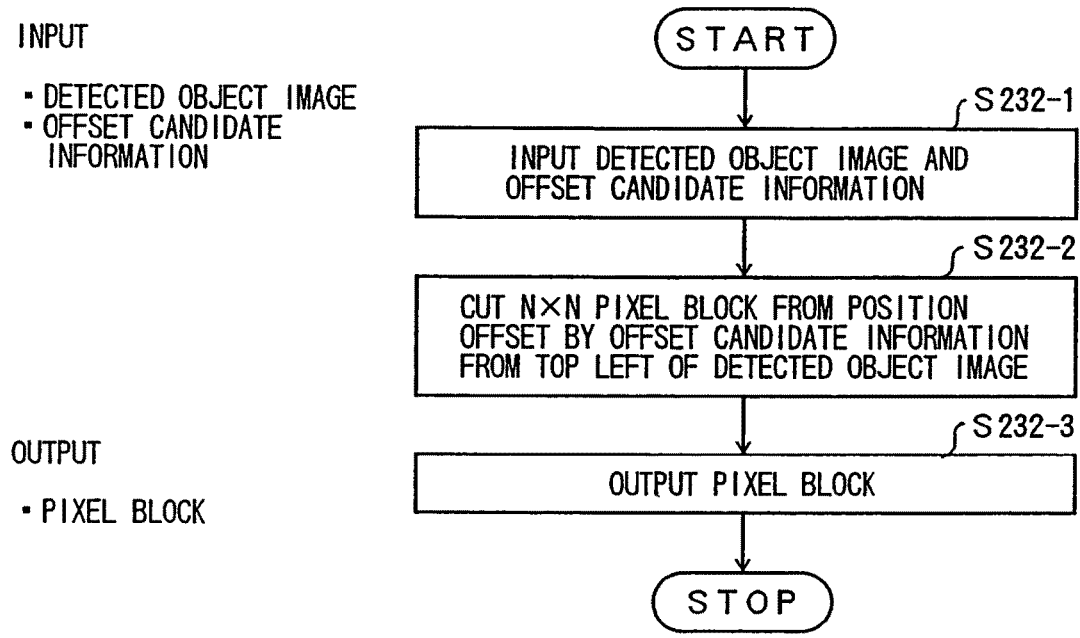
FIG. 19 is a flowchart showing the process of a block generation portion according to the second embodiment of the present invention.

Step 232) After this, processing in the block generation portion 233 to the position marker detection information generation portion 236 is performed for each of the offset candidate information. FIG. 18 is a diagram describing the process of the block generation portion according to the second embodiment of the present invention and FIG. 19 is flow chart showing the process of the block generation portion according to the second embodiment of the present invention. The following is a description of the process of the block generation portion 233 with reference to FIG. 18 and FIG. 19.

Step 232-1) The block generation portion 233 inputs the detected object image 201 and the offset candidate information 204.

Step 232-2) A pixel block of size N×N is cut from a position offset by the offset candidate information 204 ($a, b$), from the top left of the detected object image 201.

Step 232-3) The cut pixel block is sent to the discrete Fourier transform portion 234.

Step 233) The discrete Fourier transform portion 234 takes the pixel block, performs a discrete Fourier transform on the pixel block to generate a detected object coefficient matrix 206, and then sends the detected object coefficient matrix 206 to the detected object coefficient generation portion 235.

Figure 20:
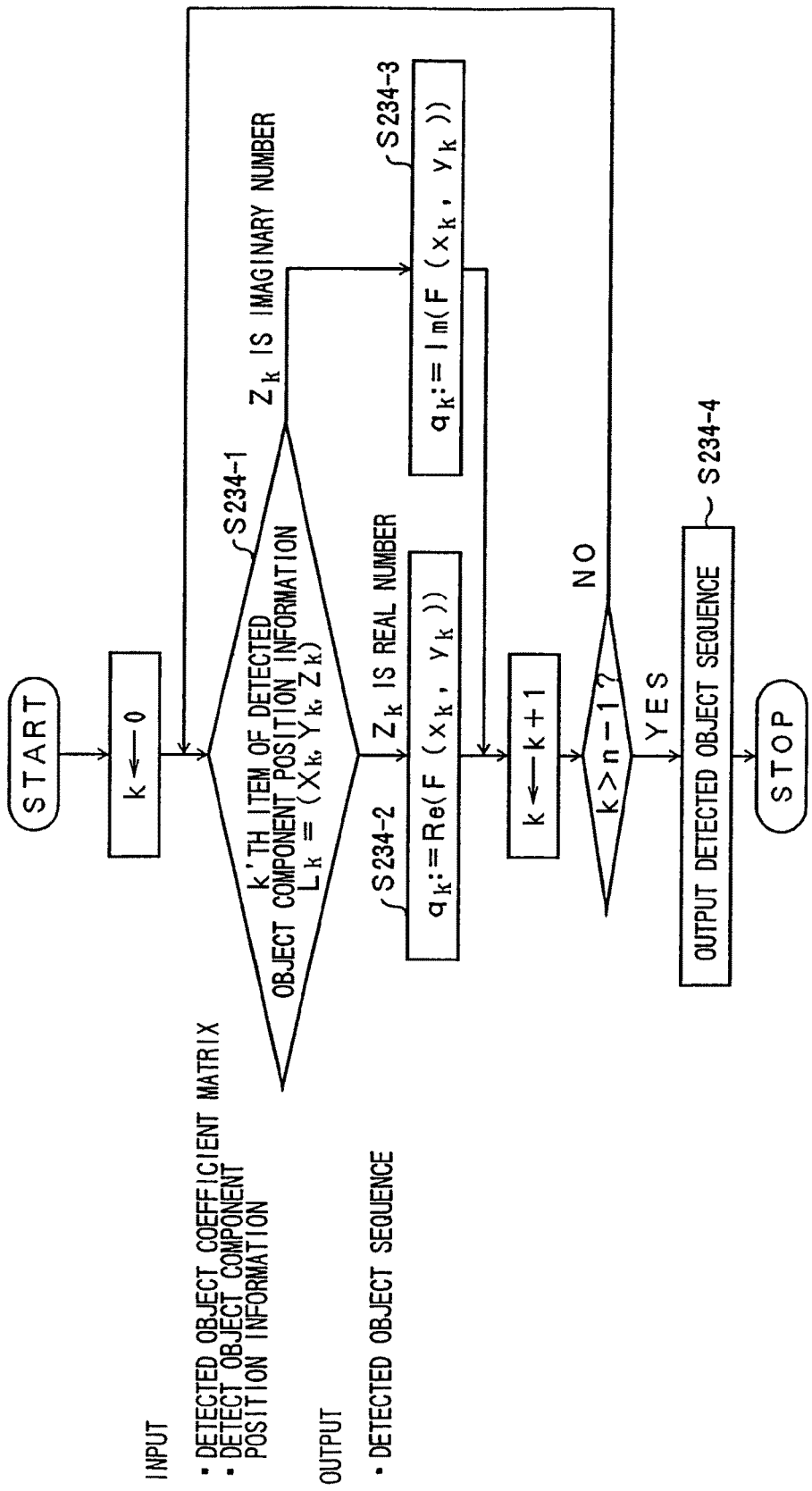
FIG. 20 is a flow chart showing the process of a detected object-image object sequence generation portion according to the second embodiment of the present invention.

Step 234) In the detected object coefficient generation portion 235, the detected object component position information 211 and the detected object coefficient matrix 206 undergo the following processing to produce a detected object coefficient. FIG. 20 is a flow chart showing the process of the detected object coefficient generation portion according to the second embodiment of the present invention.

Step 234-1) If the detected object component position information 211 is expressed as L k=(xk, y k,zk) (0<=k<n), the detected object coefficient matrix 206 is expressed as F(u, v)(0<=u<N, 0<=v<N) and a detected object coefficient 207 is expressed as $\{qk\}$ (0<=k<n), then the detected object coefficient generation portion 235 performs the following process.

Step 234-2) When z x expresses a real number component, q k=(real number component of F(x,y)).

Step 234-3) When z x expresses an imaginary number component, q k=(imaginary number component of F(x,y)). The above processing in Steps 234-1, 234-2 is performed sequentially for k=0 . . . n−1.

Step 234-4) The detected object coefficient 207 {q k} determined by the above processing is output.

Step 235) Next, in the position marker detection information generation portion 236, the following equation is used to determine a correlation value between the position marker sequence 221 and the detected object sequence 207, pair the correlation value with the offset candidate information 204 and output the result as the position marker detection information 208 corr ab. This position marker detection information 208 is determined in accordance with the following equation.

$$corr_{ab} := \frac{\sum_{i=0}^{n-1}(p_i \cdot q_i)}{\sqrt{\sum_{i=1}^{n-1}p_i^2}\sqrt{\sum_{i=0}^{n-1}q_i^2}}$$

The processing in 0he above block generation portion 233 to the position marker detection information generation portion 236 is repeated for all of the offset candidate information (a, b) from (0, 0) to (N–1, N–1).

Step 236) Of all of the input position marker detection information 208, the offset information generation portion 237 outputs that offset candidate information (a, b) that has the greatest correlation value for the all of the input position marker sequences 221 and detected object sequence 207, and sends the output offset candidate information as offset information 231 to the watermark detection portion 240.

The offset information 231 output from the position marker detection portion 230 indicates a degree to which the start point of the watermark pattern was offset from the top left of the detected object image 201 when it was embedded.

The following is a description of the watermark detection portion 240 for the present embodiment.

Figure 21:
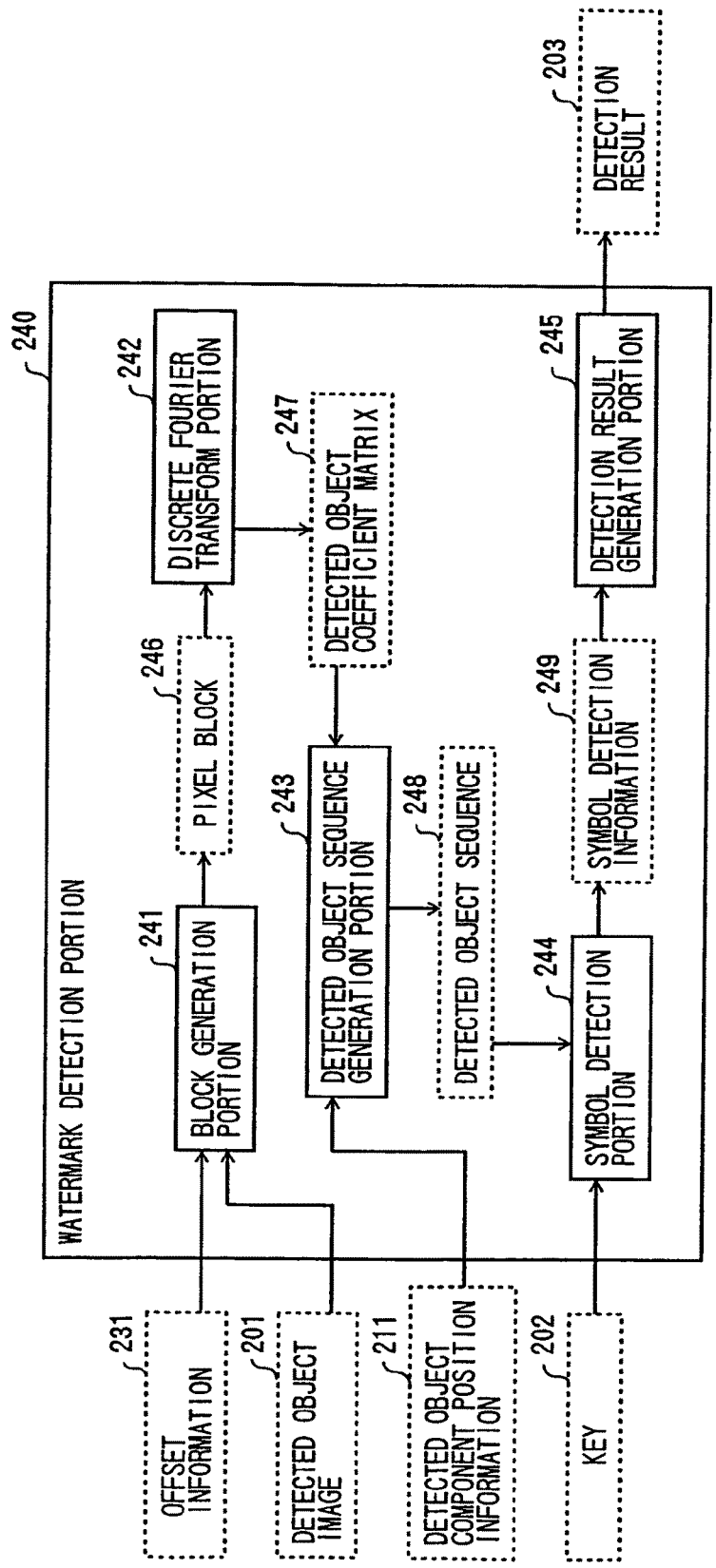
FIG. 21 is a diagram showing the configuration of a watermark detection portion according to the second embodiment of the present invention.

FIG. 21 is a diagram showing the configuration of the watermark detection portion according to the second embodiment of the present invention. As shown in the figure, the watermark detection portion 240 is configured from a block generation portion 241, a discrete Fourier transform portion 242, a detected object sequence generation portion 243, a symbol detection portion 244, and a detection result generation portion 245.

Figure 22:
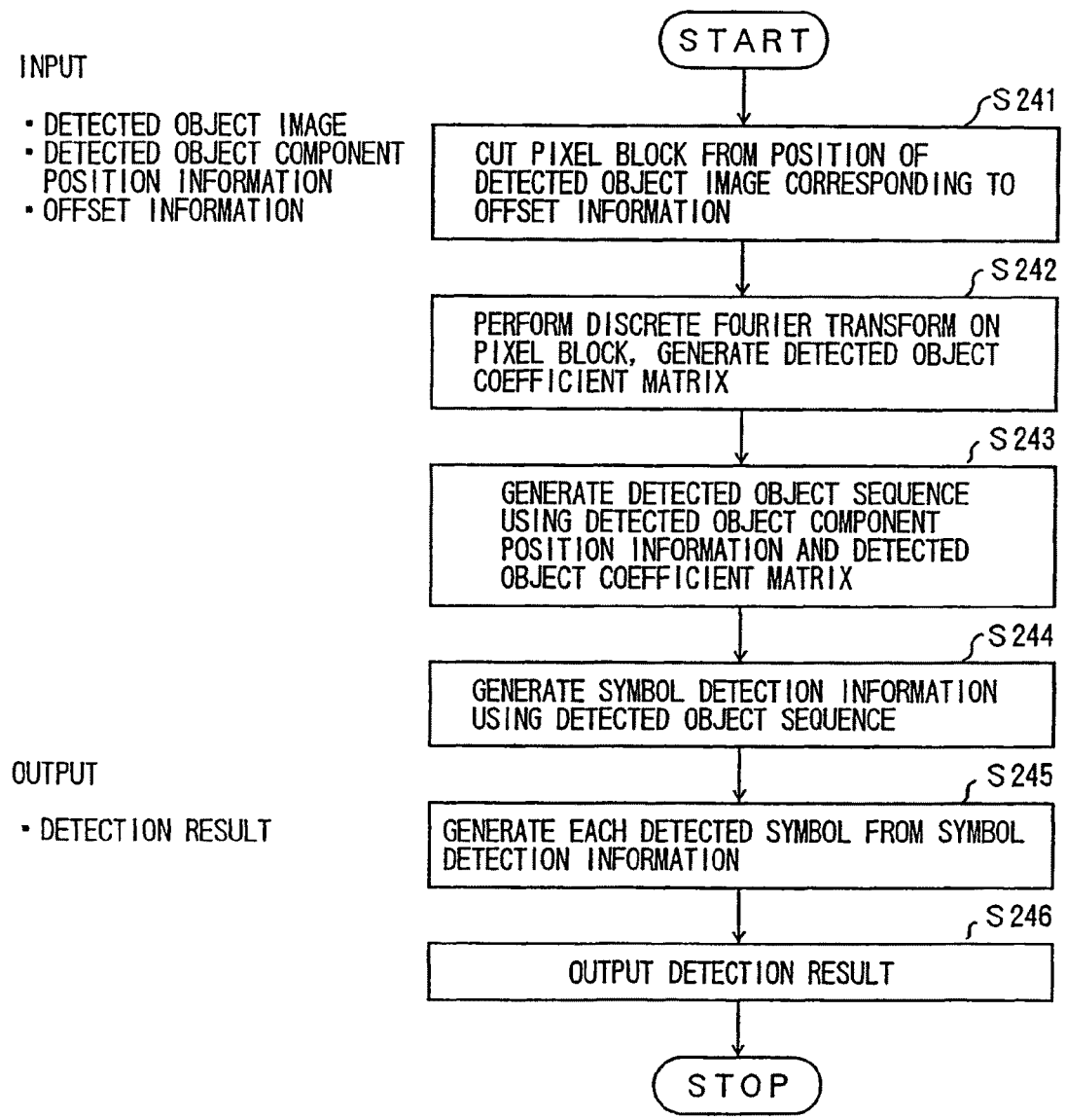
FIG. 22 is a flow chart showing the process of the watermark detection portion according to the second embodiment of the present invention.

FIG. 22 is flow chart showing the process of the watermark detection portion according to the second embodiment of the present invention.

Step 241) The watermark detection portion 240 inputs the detected object image 201, detected object component position information 211, the offset information 231 and the key 202. First of all, the block generation portion 241, cuts off a pixel block of size N×N pixels from a position offset by the amount of the offset information (a, b) from the top left of the detected object image 201.

Step 242) The discrete Fourier transform portion 242 applies a discrete Fourier transform to the pixel block, generates the detected object coefficient matrix 247 and sends the detected object coefficient matrix 247 to the detected object sequence generation portion 243.

Step 243) The detected object sequence generation portion 243 uses the same processing as the detected object sequence generation portion 235 of the position marker detection portion 230 to obtain a detected object sequence 248 and send it to the symbol detection portion 244.

Step 244) The symbol detection portion 244 determines a correlation value between the key 202, and the detected object sequence 248 and generates symbol detection information 249.

Step 245) After all of the symbol detection information 249 has been obtained, the detection result generation portion 245 takes a symbol candidate value that has the largest correlation value for each of the symbol positions in the symbol detection information 249, as a detected symbol.

Step 246) After detect symbols have been determined for all of the symbol positions, the detection result generation portion 245 outputs a result of performs an inverse transform on the detected symbols, which result has a watermark format, as the detection result 203.

Figure 23:
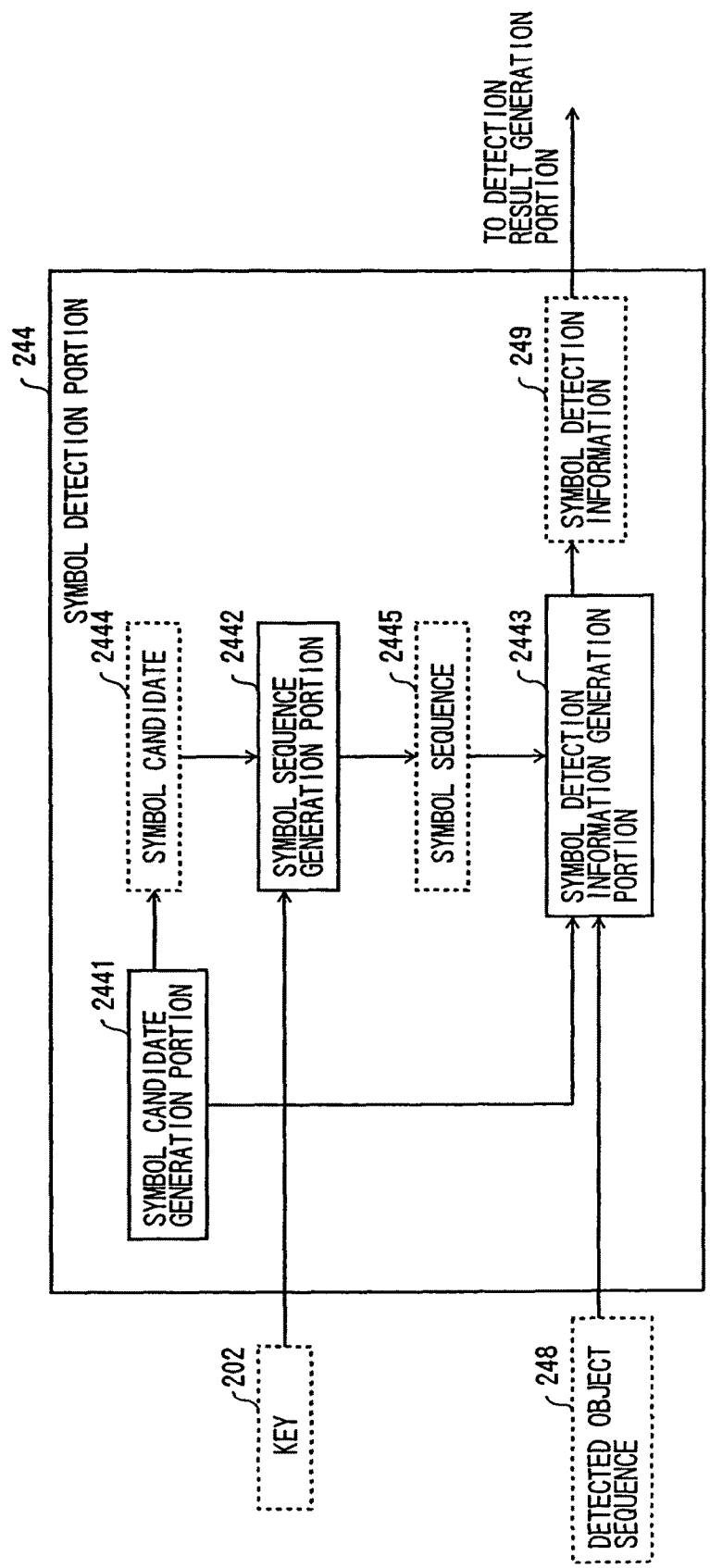
FIG. 23 is a diagram showing the configuration of symbol detection portion according to the second embodiment of the present invention.

The following is a description of the symbol detection portion 244 in the watermark detection portion 240 described above. FIG. 23 is a diagram showing the configuration of the symbol detection portion according to the second embodiment of the present invention.

The symbol detection portion 244 shown in the figure is configured from a symbol candidate generation portion 2441, a symbol sequence generation portion 2442 and a symbol detection information generation portion 2443, inputs the key 202 and the detected object sequence 248, and generates the symbol detection information 249 for each of M symbol candidates, for each of J predetermined symbol positions for detection. The following description will be for symbol detection for the j'th item (1<=j<J).

Figure 24:
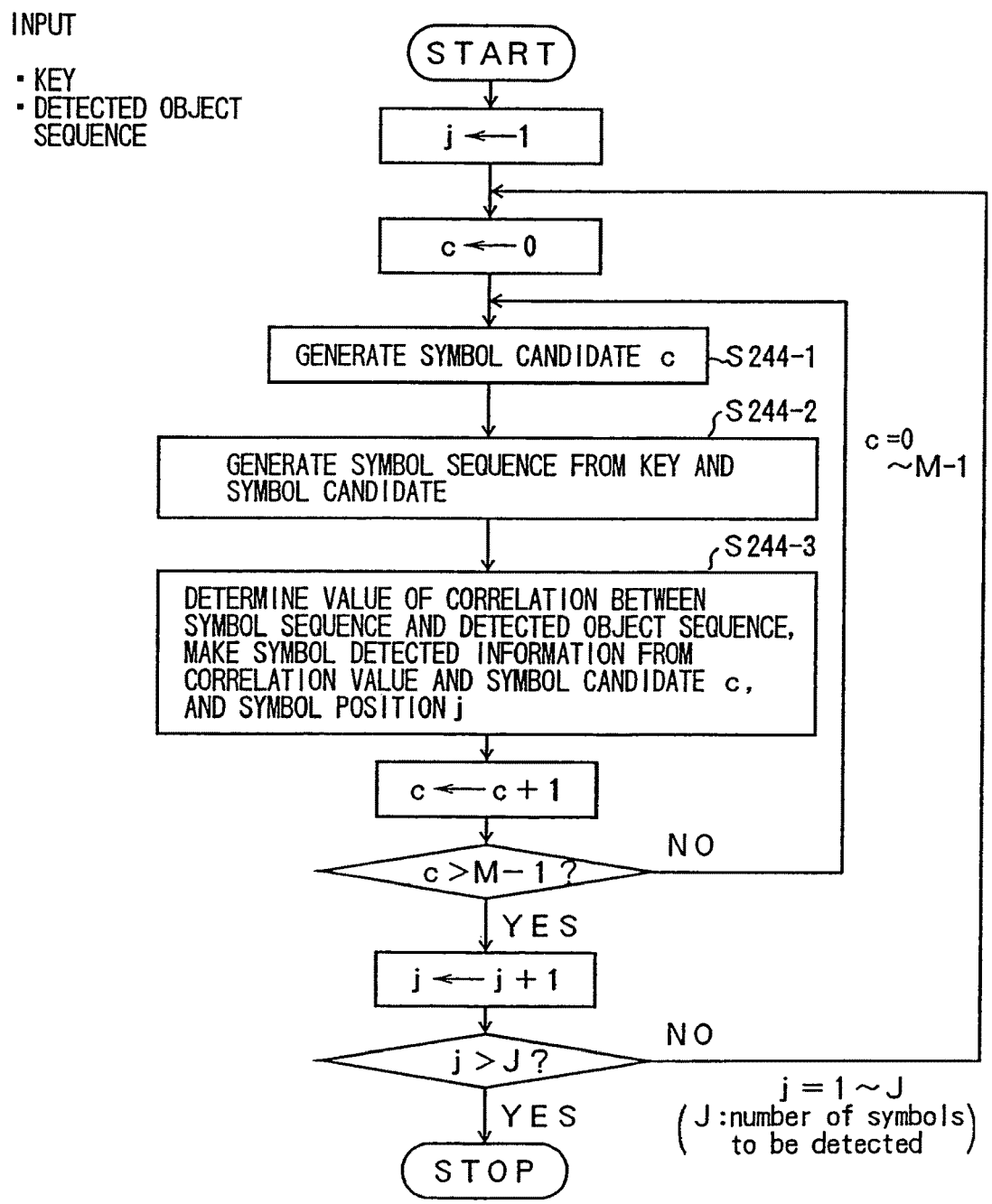
FIG. 24 is a flow chart showing the process of the symbol detection portion according to the second embodiment of the present invention.

FIG. 24 is a flow chart showing the process of the symbol detection portion according to the second embodiment of the present invention.

Step 244-1) The symbol candidate generation portion 2441 of the symbol detection portion 244 successively generates a symbol candidate c for 0 to M–1, and performs the processing from Step 2442-2 to 244-3 for each symbol candidate. M expresses the maximum value for the symbol value by symbol conversion in the previously described embodiment.

Figure 25:
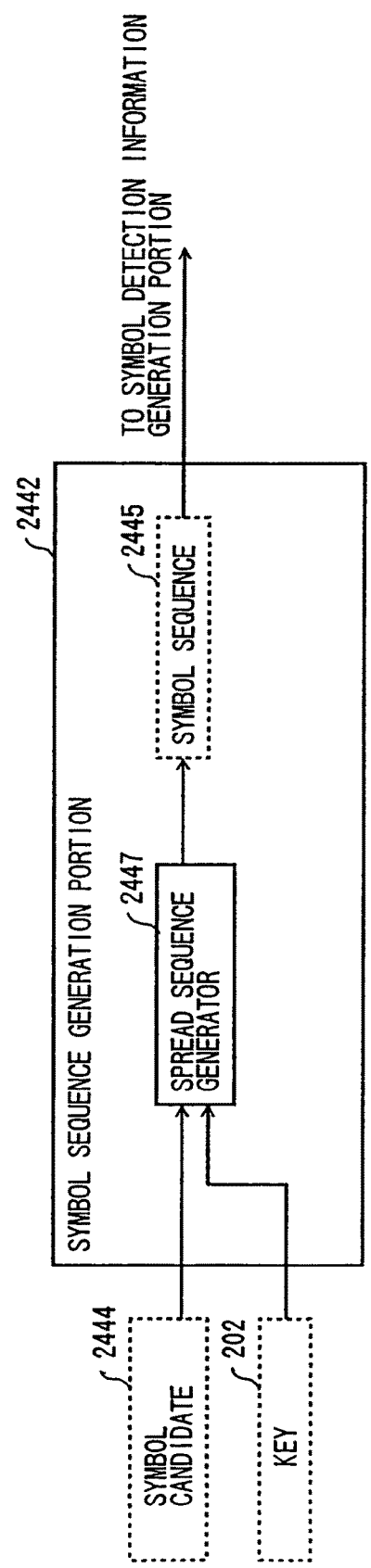
FIG. 25 is a diagram showing the configuration of symbol sequence generation portion according to the second embodiment of the present invention.
Figure 26:
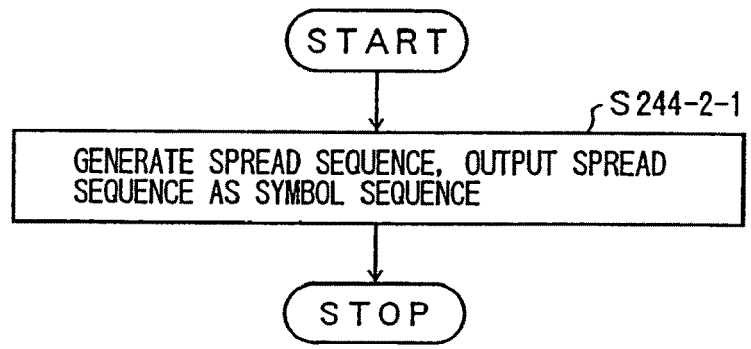
FIG. 26 is a flow chart showing the process of the symbol sequence generation portion according to the second embodiment of the present invention.

Step 244-2) The following is a description of the processing performed by the symbol sequence generation portion 2442. FIG. 25 is a diagram showing the configuration of the symbol sequence generation portion according to the second embodiment of the present invention, and FIG. 26 is flow chart showing the process of the symbol sequence generation portion according to the second embodiment of the present invention.

Step 244-2-1) The symbol sequence generation portion 2442 inputs the key 202 and the symbol candidate 2444 to a spread sequence generator 2447, and the value that is the sum of c and the key 202 is taken as the initial value to generate a spread sequence $\{r_i^{(c)}\}$ (0<=i<n) which is used, as it is, as the symbol sequence 2445 $\{p_i^{(c)}\}$ (0<=i<n) ($p_i^{(c)}:=r_i^{(c)}$ (0<=i<n).

Step 244-3) The symbol detection information generation portion 2443 uses the detected object sequence 248, the symbol sequence 2445, the symbol candidate 2445 and the symbol position j that is currently being processed, as its input, and uses the following equation to determine the value of a correlation between the symbol sequence 2445 and the detected object sequence 248, and combines the correlation value, the symbol candidate 2445 and the symbol position to generate the symbol detection information $corr_c^{(j)}$ 249.

$$corr_{c(j)} := \frac{\sum_{i=0}^{n-1}(p_i^{(j)} \cdot q_i)}{\sqrt{\sum_{i=0}^{n-1}p_i^{(j)2}}\sqrt{\sum_{i=0}^{n-1}q_i^2}}$$

The symbol detection information 249 is sent to the detection result generation portion 245.

Figure 27:
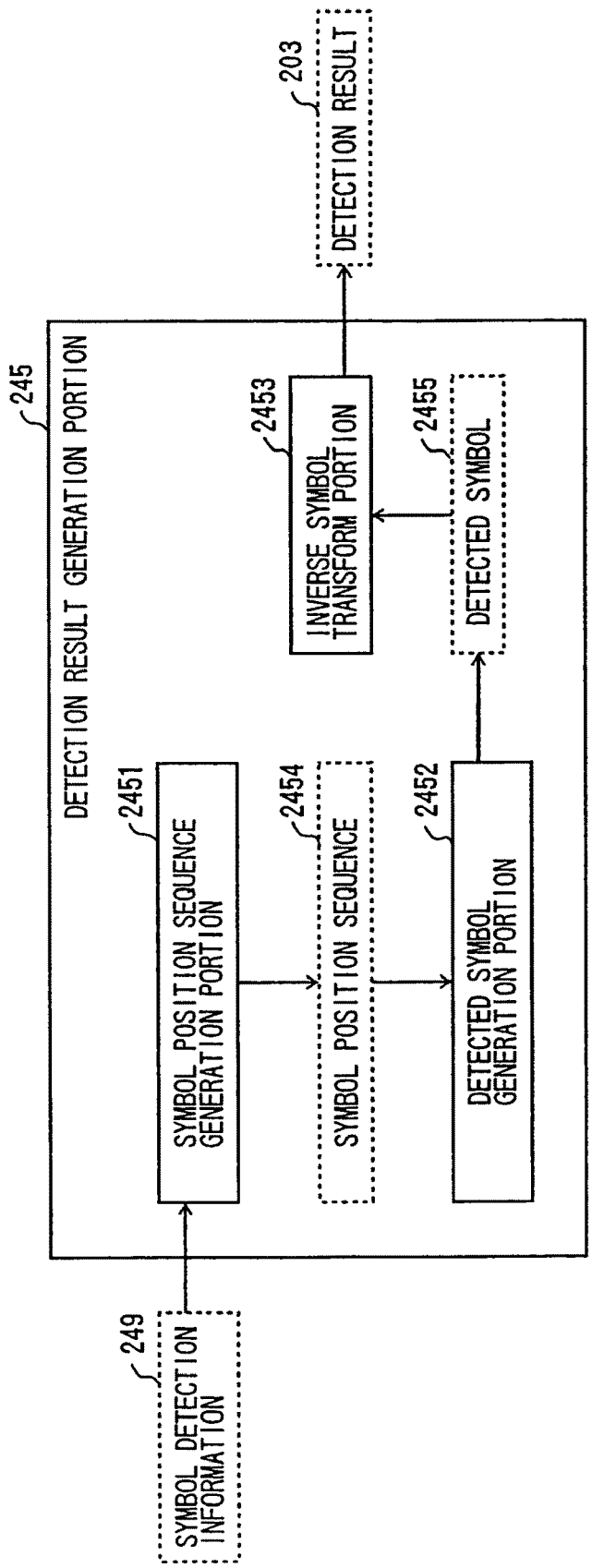
FIG. 27 is a diagram showing the configuration of a detection result generation portion according to the second embodiment of the present invention.

FIG. 27 is a diagram showing the configuration of the detection result generation portion according to the second embodiment of the present invention. The detection result generation portion 245 shown in the figure is configured from a sequence generation portion 2451 for each of the symbol positions, a detected symbol generation portion 2452 and an inverse symbol transform portion 2453.

Figure 28:
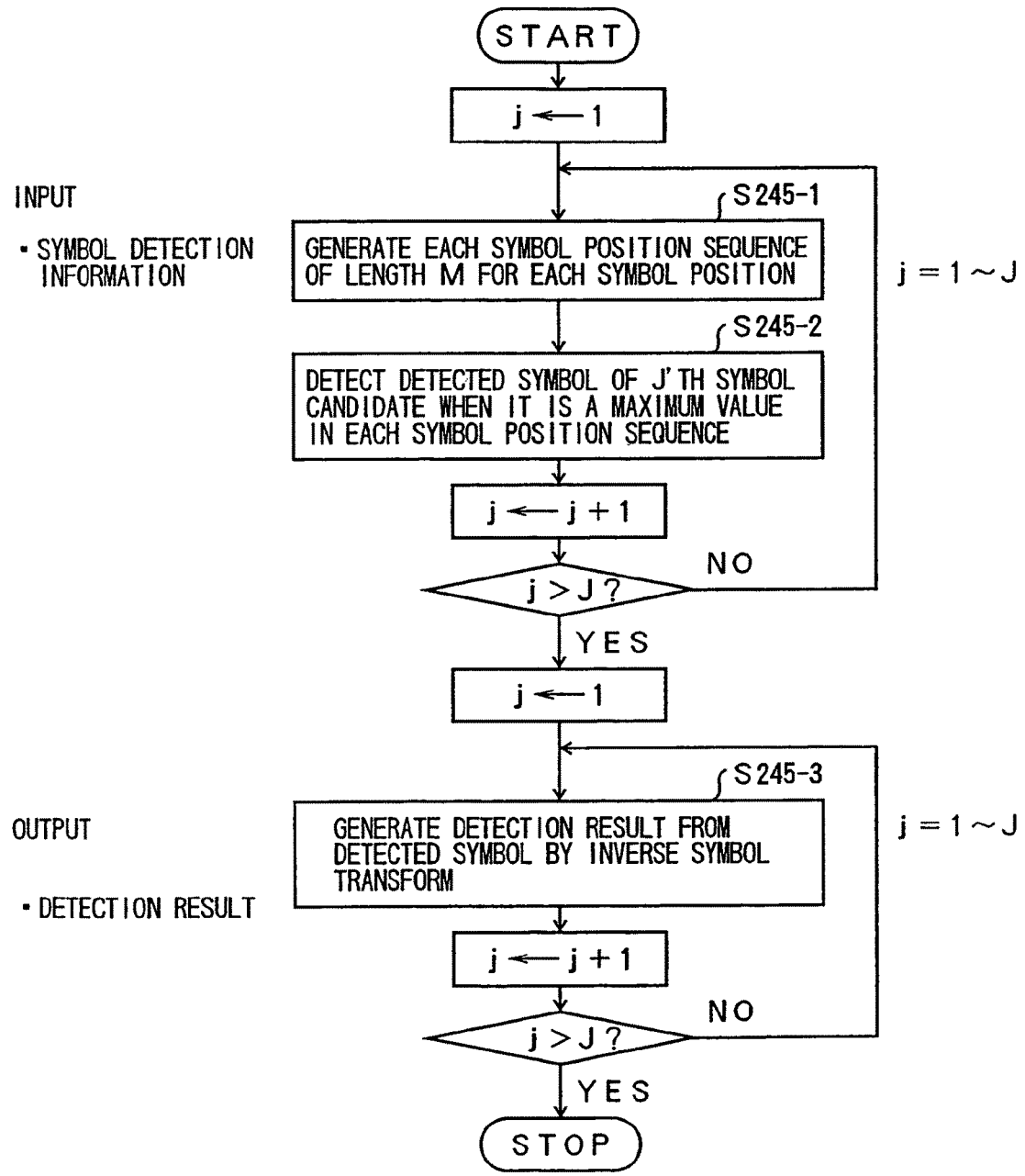
FIG. 28 is a flow chart showing the process of the detection result generation portion according to the second embodiment of the present invention.

FIG. 28 is a flow chart showing the process of the detection result generation portion according to the second embodiment of the present invention.

Step 245-1) First of all, the detection result generation portion 245 inputs the symbol detection information 249 to the sequence generation portion 2451 for each of the symbol positions, divides the symbol detection information 249 for each symbol position j and generates the sequence $corr_c^{(j)}$ ($0<=c<M$) for each symbol position and having the length M, for each j from j=1 ~ J, and sends each symbol position sequence 2454 to the detect symbol generation portion 2452.

Step 245-2) The detected symbol generation portion 2452 inputs each of the sequences 2454 for each symbol position and generates a detected symbol s j ($1<=j<J$) 2455 when it finds a symbol candidate c which produces a maximum value for the correlation of the sequences 2454 for each symbol position j.

Step 245-3) When each detected symbol sj has been determined, the inverse symbol transform portion 2453 transforms the detected symbol s j from a symbol expression to the original watermark expression (for example, where the inverse transform corresponds to the transform in the first embodiment, the inverse symbol transform portion 2453 performs processing to treat each of the values of the four detected symbols (with the value for each of the detected symbols being from 0 ~ 255) as ASCII codes and converts the code, into four eight-bit characters) and generates and outputs the detection result 203. This detection result 203 indicates a watermark embedded in the detected object image 201.

This above processing ends the processing for the watermark detection apparatus according to the second embodiment.

With the watermark detection according to the second embodiment as described above, a block of pixels is cut from the detected object image at the same time as the pixel block is displaced, a detected object sequence is obtained by performing a discrete Fourier transform, and, by finding the peak of the correlation between the detected object sequence and the position marker sequence, the degree to which the start point of the watermark pattern was offset from the top left of the detected object image when it was embedded can be determined. By doing this, in cases when the detected object image is a partial image (having a size of 2N×2N or more) cut from an arbitrary position of an image that has been embedded with a watermark pattern by the first embodiment, it is possible to correctly determine the position of the watermark pattern. Once the amount of offset has been determined, detecting the watermark pattern from the pixel block starting from that position enables the embedded watermark to be correctly detected.

In addition, with the watermark detection processing according to the second embodiment, it is not necessary to have an original image (the input image of the first embodiment). Thus, as has been described above, watermark detection according to the second embodiment enables without an original image, a watermark to be detected from an image cut from an arbitrary position of an image that has been embedded with a watermark pattern. This has not been possible with conventional technologies.

Third Embodiment

The following is a description of use of the offset information for cyclic shift of a cut pixel block according to a third embodiment of the present invention.

The following description for the third embodiment is for only those portions that are not the same as the second embodiment.

The process of the block generation portion 233 in the position marker detection portion 230 of the present embodiment will be described first.

Figure 29:
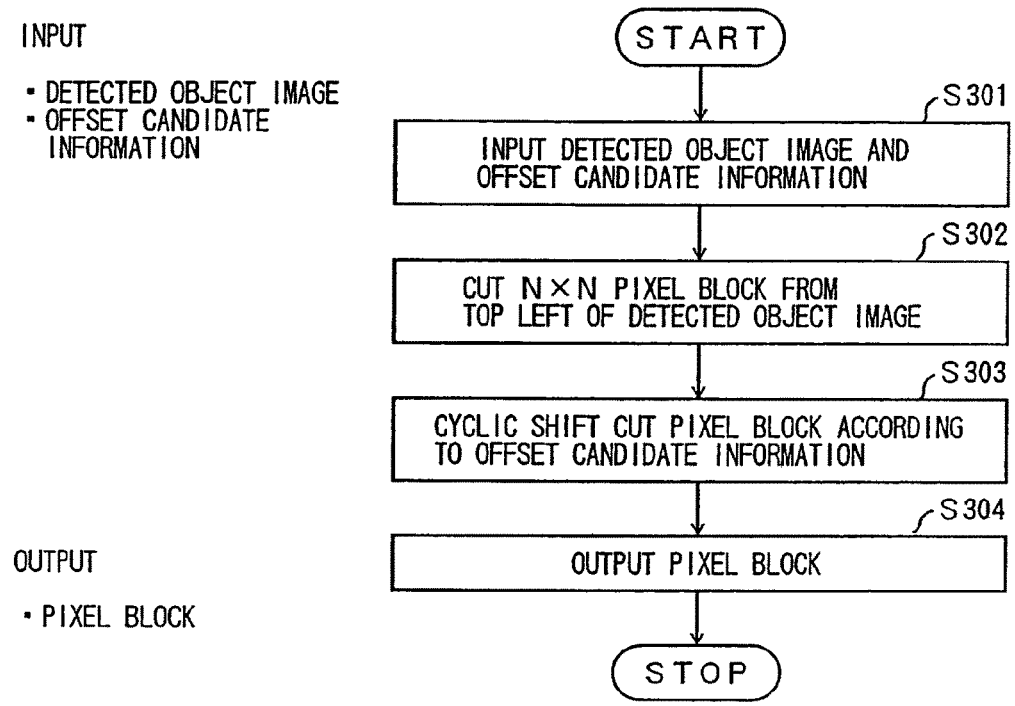
FIG. 29 is a flow chart showing the process of a block generation portion according to a third embodiment of the present invention.

FIG. 29 is a flow chart showing the process of the block generation portion according to the third embodiment of the present invention.

Step 301) The block generation portion 233 of the position marker detection portion 230 inputs the offset candidate information 204 and the detected object image 201.

Figure 30:
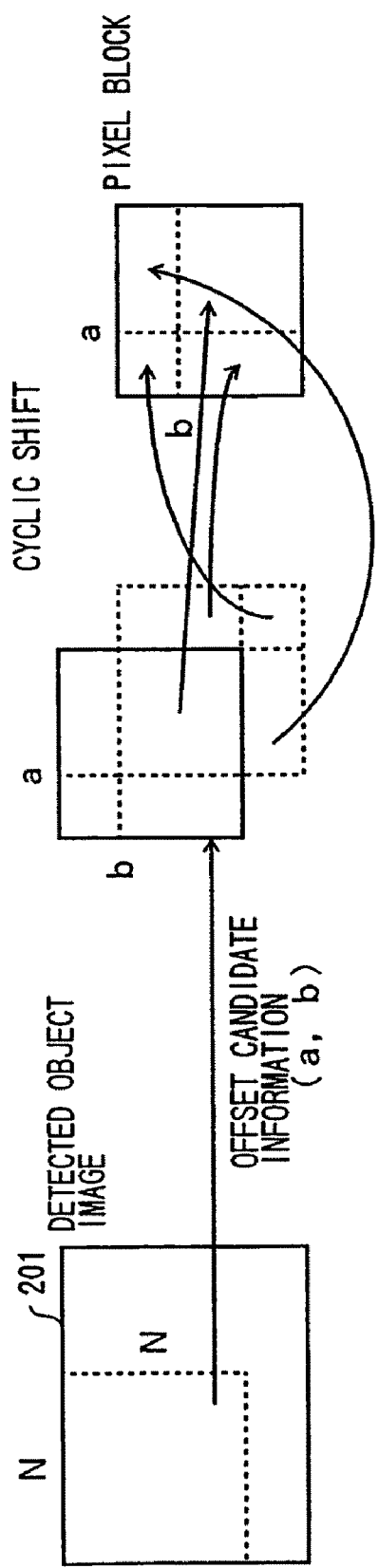
FIG. 30 is a diagram describing the process of the block generation portion according to the third embodiment of the present invention.

Step 302) First of all, the block generation portion 233 cuts a block of an N×N size from the top left of the detected object image 201 as shown in FIG. 30.

Step 303) Then, the block generation portion 233 performs cyclic shift for this block using the offset candidate information 204 as the basis (with portions of the block that protrude due to the parallel displacement being shifted to the other side of the block) and obtains the pixel block 205.

Expressing this pixel block as a formula gives
{B ij}: for a block of an N×N size cut from the top left of the detected object image 201. When the pixel block obtained by cyclic shift according to the offset candidate information (a, b) is expressed as $B'_{ij}=B_{(i+a) \% N, (j+b) \% N}$ where ($0<i<n$), ($0<=j<N$), and x % y expresses the remainder when x is divided by y, then $\{B'_{ij}\}$ is output as the pixel block 205.

The following is a description of the process of the block generation portion 241 in the watermark detection portion 240 of the third embodiment of the present invention.

The block generation portion 241 in the watermark detection portion 240 of the present invention inputs the detected object image 201 and the offset information 231 and uses cyclic shift to generate the a pixel block 246 in the same manner as the block generation portion 233 in the position marker detection portion 230 (by the input of offset information as offset candidate information), and outputs the pixel block 246.

When the present embodiment is used for watermark detection, the necessary size of the detected object image 201 is N×N instead of the minimum 2N×2N of the second embodiment, and so it is possible to perform detection from a smaller detected object image.

Fourth Embodiment

The following is a description of a fourth embodiment of the present invention in which the watermark detection depends on whether a pixel block is cut from a detected object image having a size of N×N or more, or less than N×N.

The description will commence with the block generation portion 233 of the position marker detection portion 230. Portions other than those described below are the same as for the second embodiment and the third embodiment described above.

Figure 31:
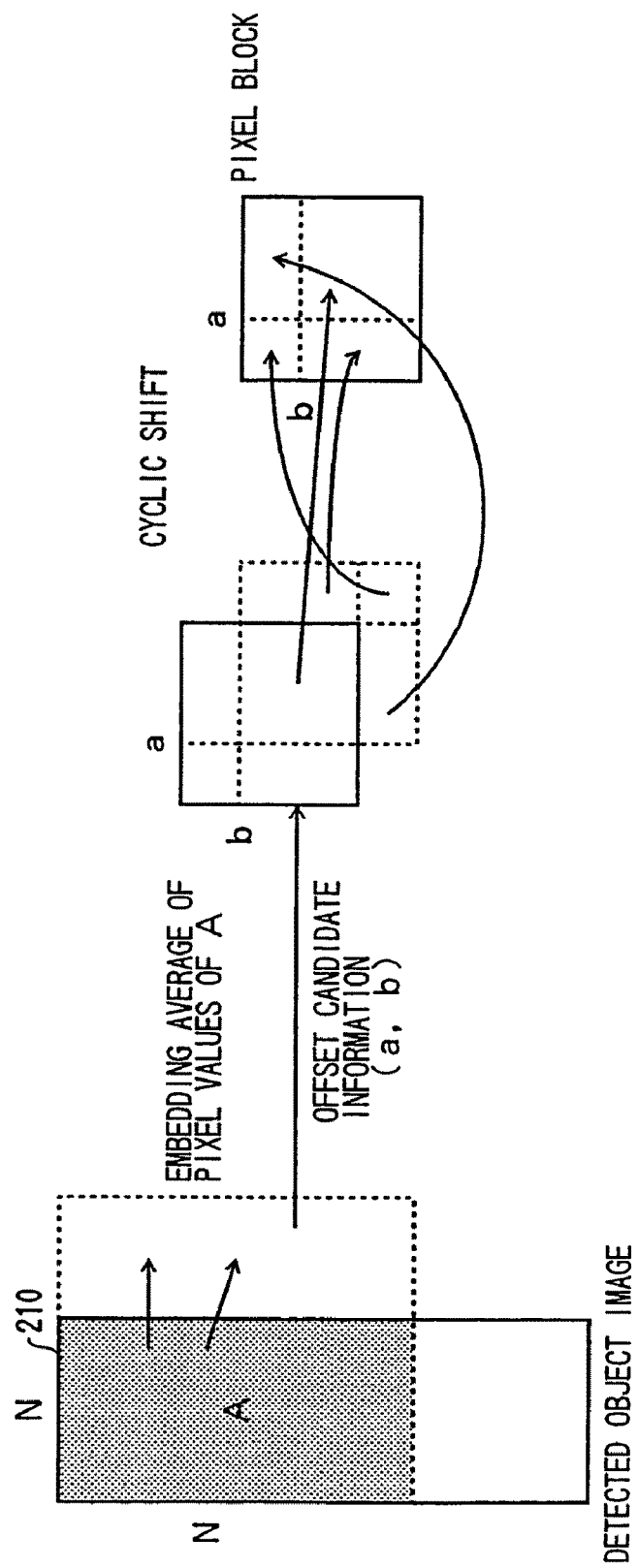
FIG. 31 is a diagram describing the process of the block generation portion according to the fourth embodiment of the present invention.
Figure 32:
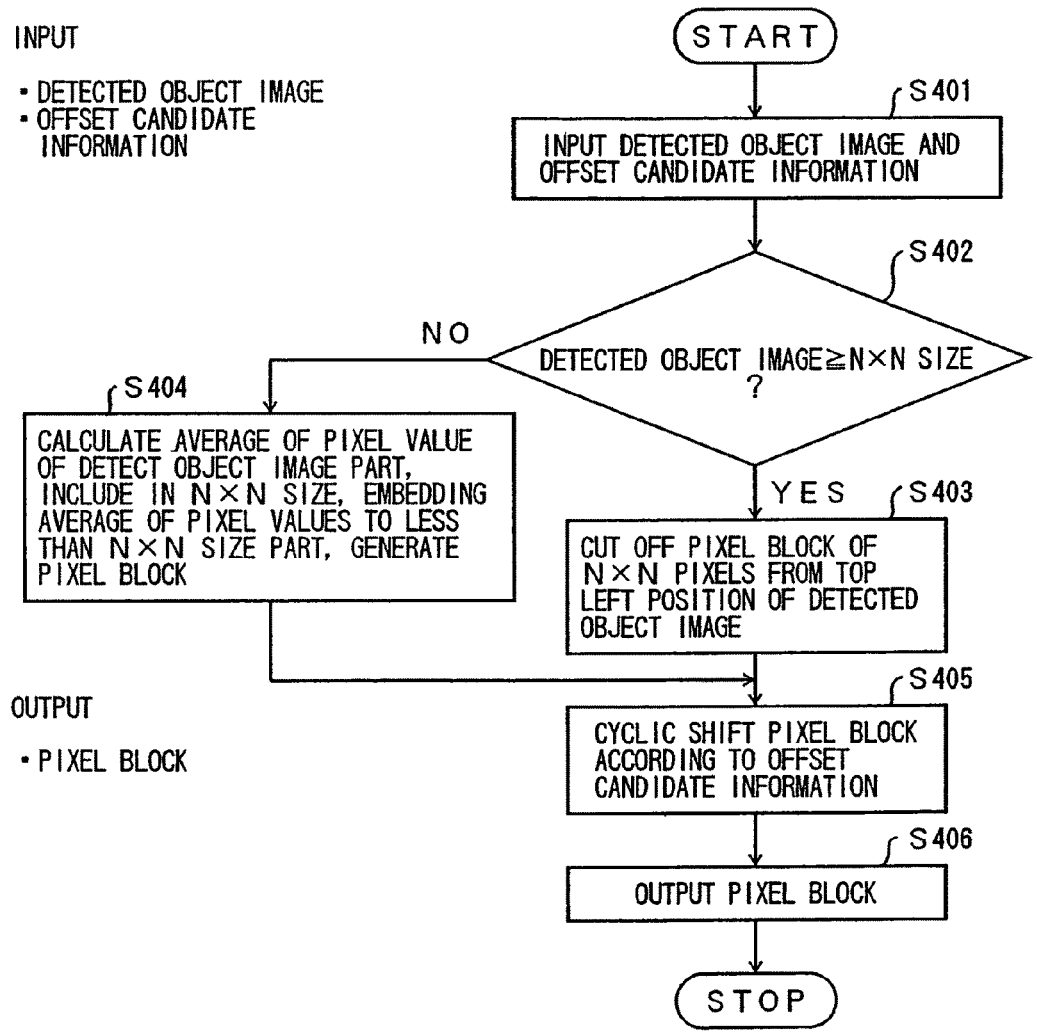
FIG. 32 is a flow chart showing the process of the block generation portion of a position marker detection portion according to a fourth embodiment of the present invention.

FIG. 31 is a diagram describing the process of the block generation portion according to the fourth embodiment of the present invention and FIG. 32 is flow chart showing the process of a block generation portion according to the fourth embodiment of the present invention.

Step 401) The block generation portion 233 of the position marker detection portion 230 in the present embodiment inputs the detected object image 201 and the offset candidate information 204.

Step 402) The block generation portion 233 judges whether the detected object image 201 is N×N size or more, and shifts the processing to Step 403 if it is, and to Step 404 if it is not.

Step 403) The block generation portion 233 cuts a block of size N×N from the top left of the detected object image.

Step 404) When the detected object image 201 is small and it is not possible to cut a block of N×N size, the block generation portion 233 cuts only a portion corresponding to the detected object image (FIG. 31A), and the empty portion of the block is filled with an average value of the pixel values of the portion corresponding to the detected object image and processed as that.

Step 405) The block generation portion 233 uses the block obtained by the processing described above, performs cyclic shift in the same manner as described above for the third embodiment and obtains a pixel block.

Step 406) The block generation portion 233 outputs the obtained pixel block 205.

The following is a description of the process of the block generation portion 241 of the watermark detection portion 240.

The block generation portion 241 of the watermark detection portion 240 of the previously described third embodiment inputs the detected object image 201 and the offset information 231, and uses processing the same as that for the block generation portion 233 of the position marker detection portion 230 (inputting offset information as offset candidate information) to obtain and output the pixel block 246.

When there is watermark detection using the present embodiment, the necessary size of the detected object image is an arbitrary size of N×N or more and so it is possible to perform detection on a small object when compared to the third embodiment.

Fifth Embodiment

The following is a description of a fifth embodiment of the present invention. Those portions not described below are the same as those of the previously described second embodiment.

This embodiment will describe the watermark detection portion.

Figure 33:
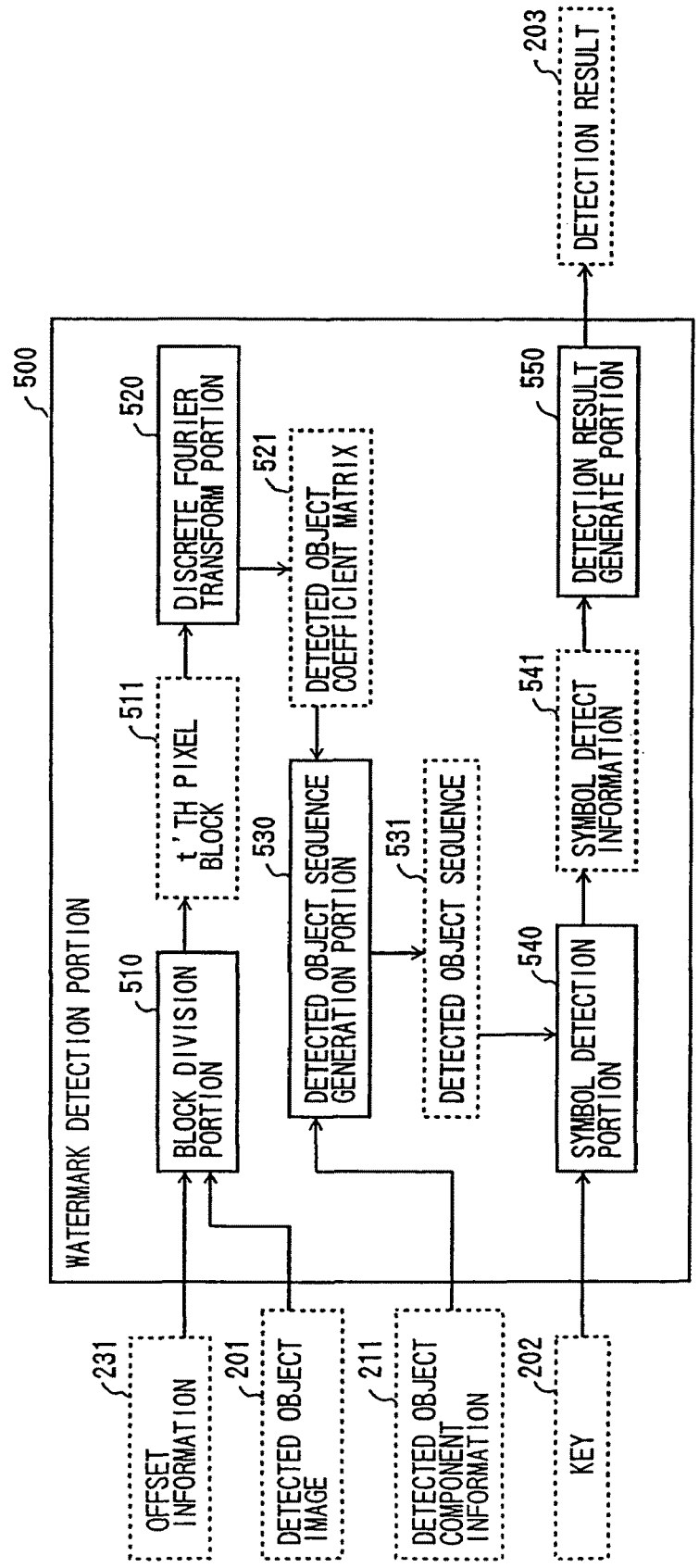
FIG. 33 is a diagram showing the configuration of the watermark detection portion according to a fifth embodiment of the present invention.

FIG. 33 is a diagram showing the configuration of the watermark detection portion according to the fourth embodiment of the present invention.

The watermark detection portion 500 shown in the figure includes a block division portion 510, a discrete Fourier transform portion 520, a detected object sequence generation portion 530, a symbol detection portion 540, and a detection result generation portion 550.

Figure 34:
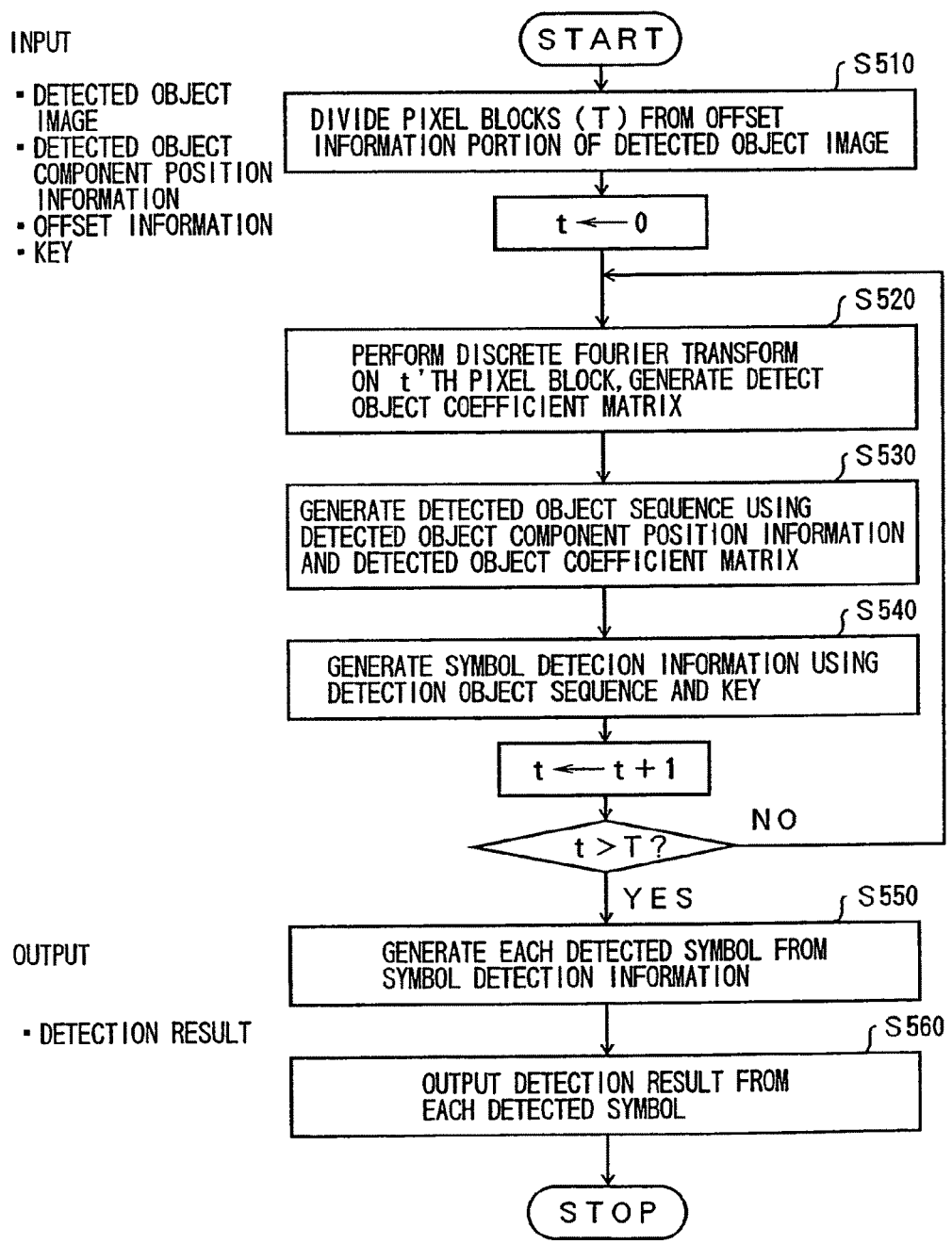
FIG. 34 is a flow chart showing the process of the watermark detection portion according to the fifth embodiment of the present invention.

FIG. 34 is flow chart showing the process of the watermark detection portion according to the fifth embodiment of the present invention.

Figure 35:
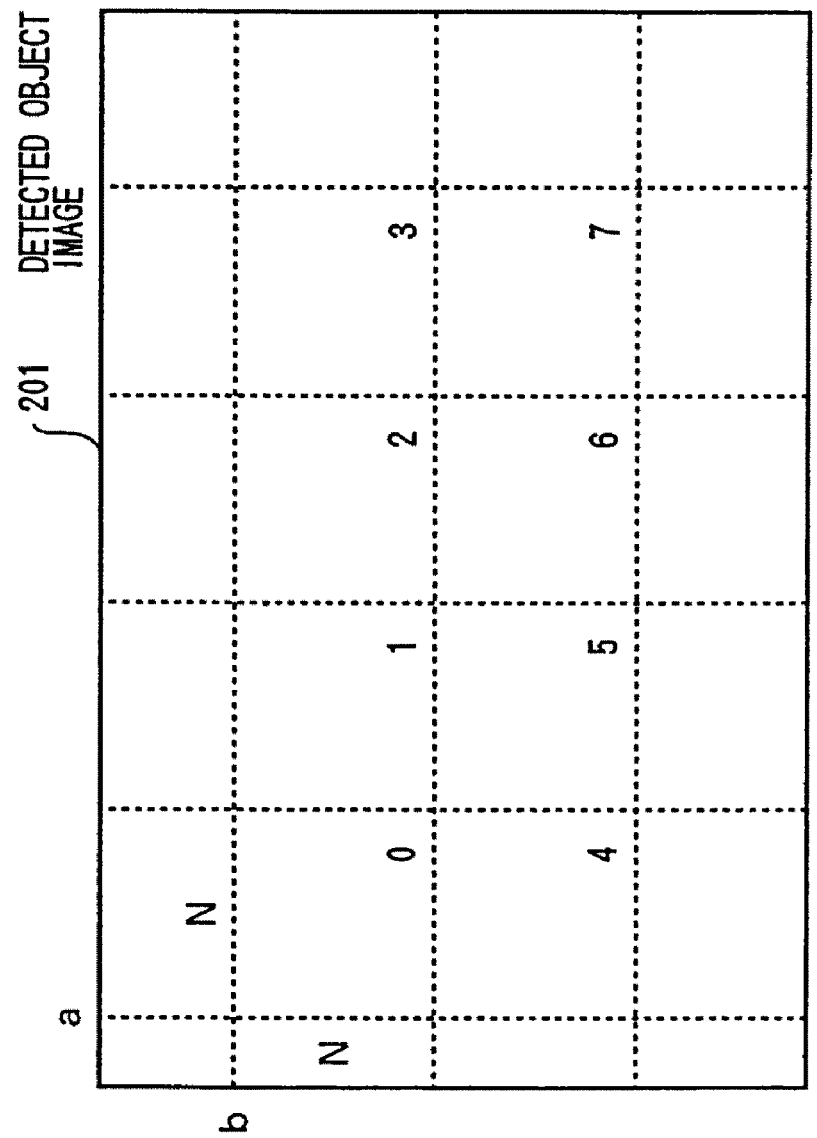
FIG. 35 is a diagram describing the process of a block division portion according to a fifth embodiment of the present invention.

Step 510) The watermark detection portion 500 inputs the detected object image 201, the detected object component position information 211, the offset information 231 and the key 202 and, first of all, in the block division portion 510, divides the detected object image 201 into T pixel blocks of N×N size, from a position offset from the top left of the detected object image 201 by the amount of the offset (a, b), and then gives numbers from 0 &tilde& T−1 to each of the pixel blocks obtained by division as shown in FIG. 35.

The following processing is performed for the t'th (0<=t<T) pixel block.

Step 520) The discrete Fourier transform portion 520 performs a discrete Fourier transform on the t'th pixel block to obtain the detected object coefficient matrix 521.

Step 530) The detected object sequence generation portion 530 generates a detected object sequence using the detected object component position information 211 and the detected object coefficient matrix 521.

Step 540) The symbol detection portion 540 determines the correlation value between the detected object sequence 531 and a sequence generated from the key 202 and sends symbol detection information to the detection result generation portion 550.

Step 550) After the symbol detection information 541 has been determined for each t, the detection result generation portion 550 performs symbol detection for those symbol candidate values having the largest correlation value, for each symbol position of the symbol detection information 541.

Step 560) The detection result generation portion 550 then determines the detected symbols from all of the symbol positions, inversely transforms the detect symbols into the watermark format and outputs this as the detection result 203.

The following is a description of the symbol detection portion 540 in the present embodiment.

Figure 36:
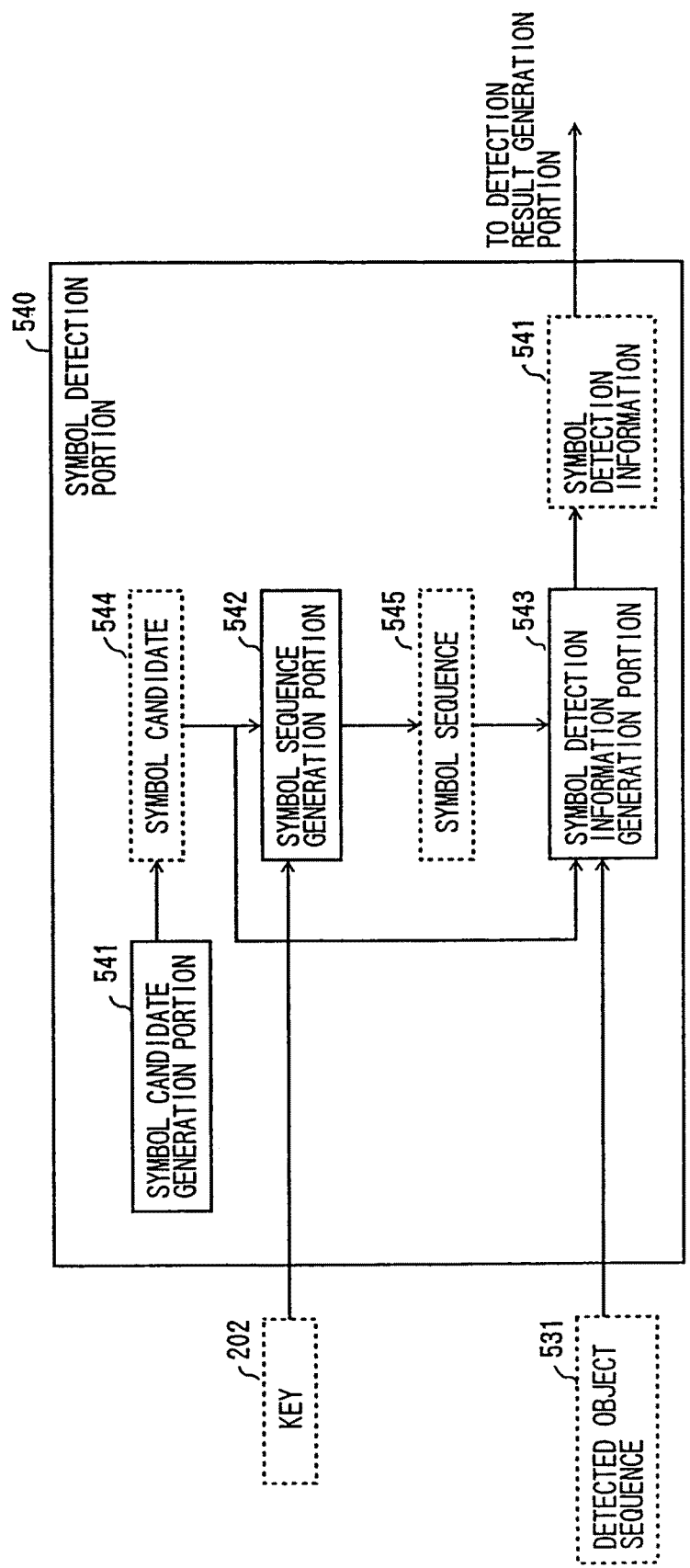
FIG. 36 is a diagram showing the configuration of a symbol detection portion according to the fifth embodiment of the present invention.

FIG. 36 is a diagram showing the configuration of the symbol detection portion according to the fifth embodiment of the present invention. The symbol detection portion 540 comprises a symbol candidate generation portion 541, a symbol sequence generation portion 542 and a symbol detection information generation portion 543 shown in the figure. The symbol detection portion 540 inputs the key 202 and the detected object sequence 531 (obtained from the t'th pixel block) and for each symbol position for J symbols detected beforehand, generates the symbol detection information 541 for M symbol candidates and outputs it to the detection result generation portion 550. The following is a description of j'th symbol detection (where 1<=j<J).

Figure 37:
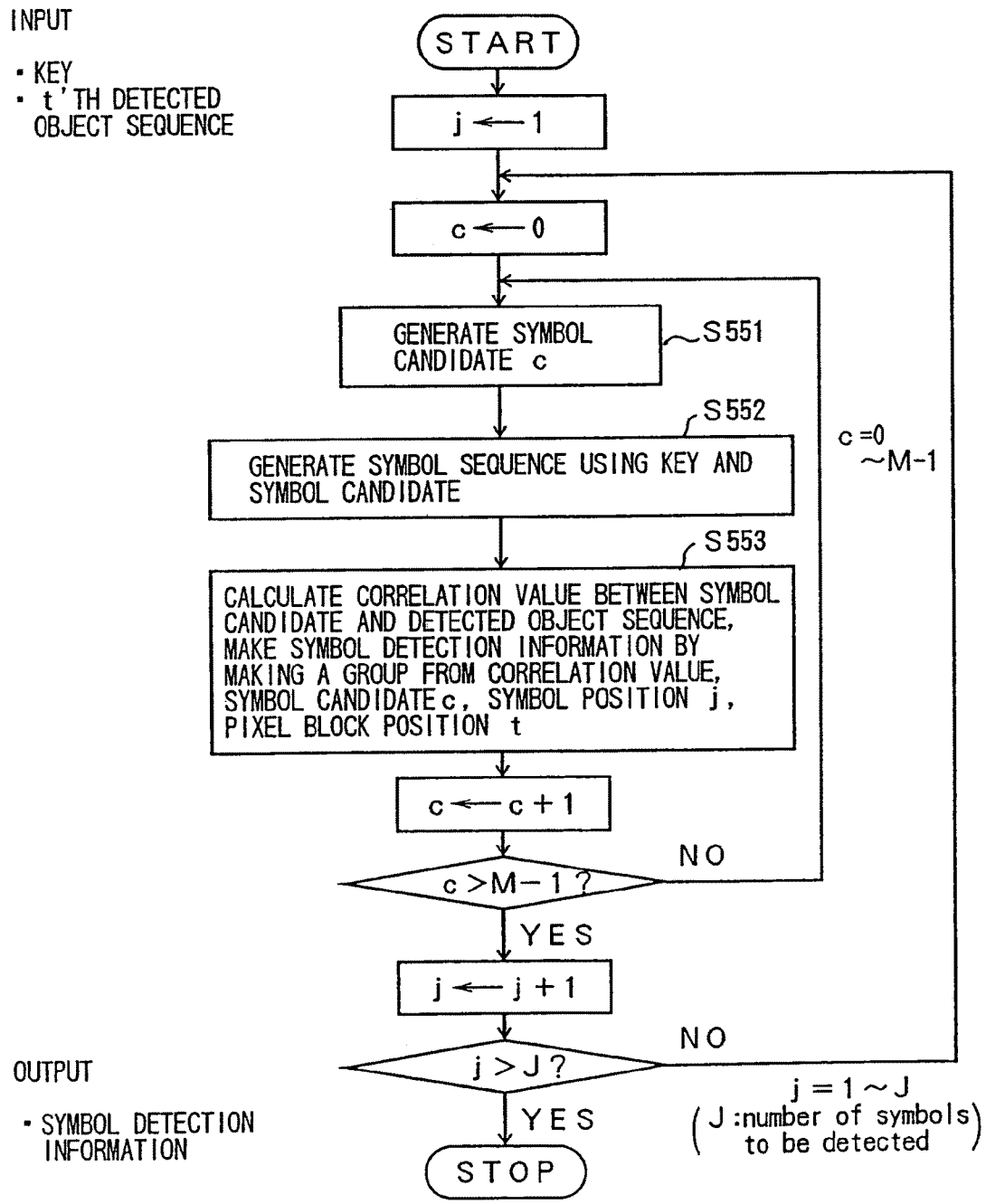
FIG. 37 is a flow chart showing the process of the symbol detection portion according to the fifth embodiment of the present invention.

FIG. 37 is flow chart showing the process of the symbol detection portion according to the fifth embodiment of the present invention.

Step 551) The symbol detection information 541 successively generates symbol candidates c for 0 to M−1, and performs the following processing of from Step 552 through Step 553 for each of the symbol candidates. M is the maximum symbol value obtained from a symbol transform in the previously described first embodiment.

Figure 38:
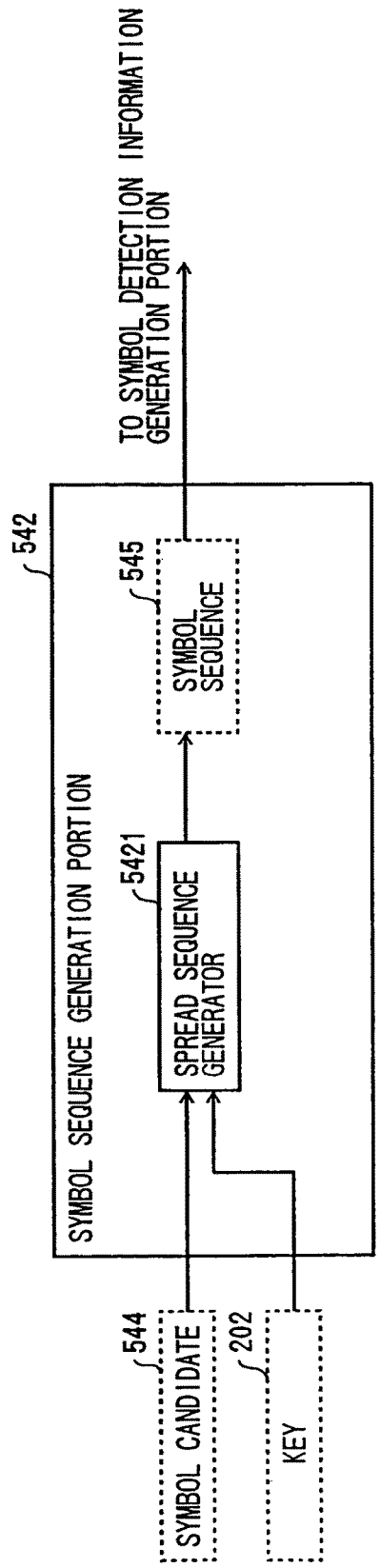
FIG. 38 is a diagram showing the configuration of the symbol sequence generation portion according to the fifth embodiment of the present invention.
Figure 39:
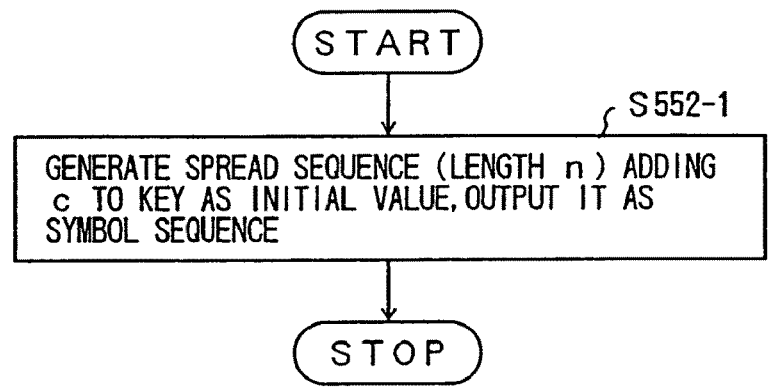
FIG. 39 is a flow chart showing the process of the symbol sequence generation portion according to the fifth embodiment of the present invention.

Step 552) The following is a description of the symbol sequence generation portion 542. FIG. 38 is a diagram showing the configuration of the symbol sequence generation portion according to the fifth embodiment of the present invention, and FIG. 39 is a flow chart showing the process of the symbol sequence generation portion according to the fifth embodiment of the present invention.

Step 552-1) The symbol sequence generation portion 542 inputs the key 202 and the symbol candidate c, and the symbol sequence generation portion 542 takes a value which is the sum of c and the key 202 as the initial value when generating the spread sequence $\{r_i^{(j)}\}$ (0<=i<n) for the length of the j'th item, and uses this as the symbol sequence 545 $\{p_i^{(j)}\}$ (0<=i<n) ($p_i^{(j)}:=r_i^{(j)}$ {0<=i<n}). The symbol sequence 545 is sent to the symbol detection information generation portion 543.

Step 553) The symbol detection information generation portion 543 inputs the detected object sequence 531, the symbol sequence 545, the symbol candidate c and the symbol position j currently being processed, uses the following formula to determine a correlation value $corr_c^{(j)\,(t)}$ between the symbol sequence 545 and the detected object sequence 531, and then generates the symbol detection information 4541 from the correlation value, symbol candidate, symbol position and pixel block.

$$corr_c^{(j)(t)} := \frac{\sum_{i=0}^{n-1}\left(p_i^{(j)} \cdot q_i\right)}{\sqrt{\sum_{i=0}^{n-1} p_i^{(j)2}} \sqrt{\sum_{i=0}^{n-1} q_i^2}}$$

The symbol detection information 541 is sent to the detection result generation portion 550.

The following is a description of the detection result generation portion 550.

Figure 40:
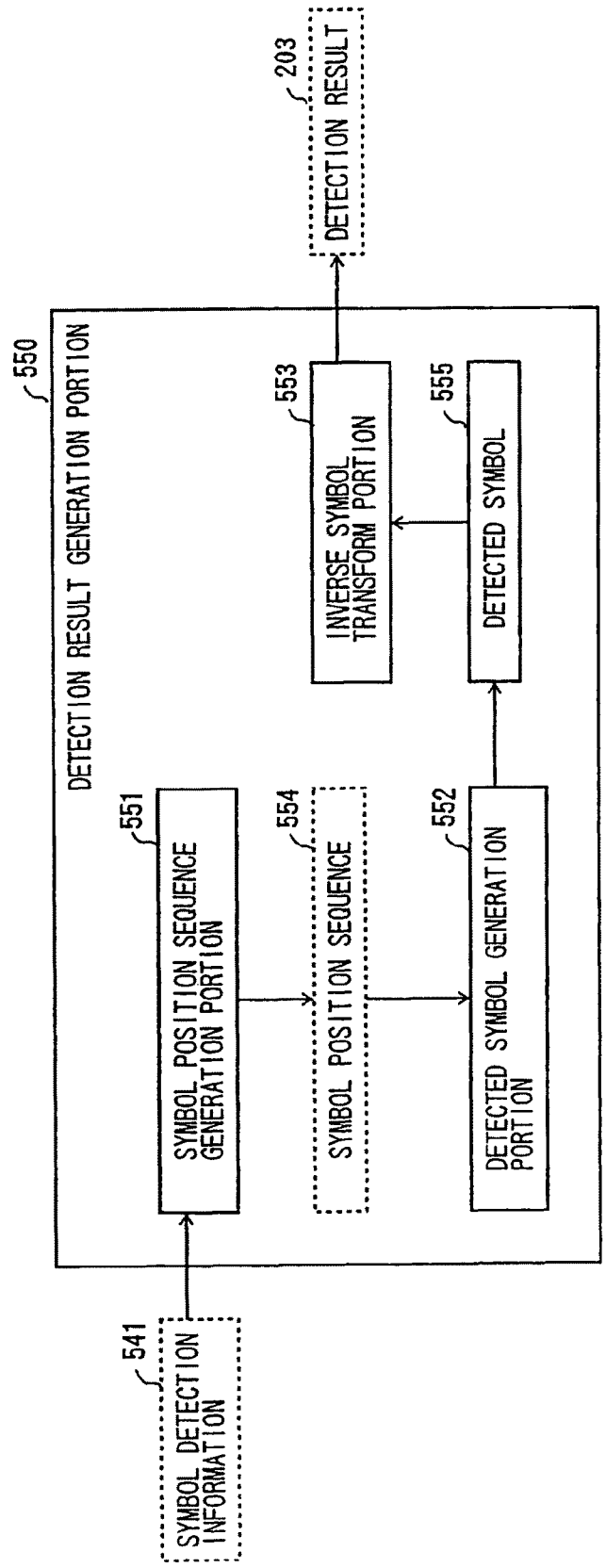
FIG. 40 is a diagram showing the configuration of a detection result generation portion according to the fifth embodiment of the present invention.

FIG. 40 is a diagram showing the configuration of the detection result generation portion according to the fifth embodiment of the present invention. The detection result generation portion 550 shown in the figure comprises a sequence generation portion 551 for each symbol position, a detected symbol generation portion 552 and an inverse symbol transform portion 553.

Figure 41:
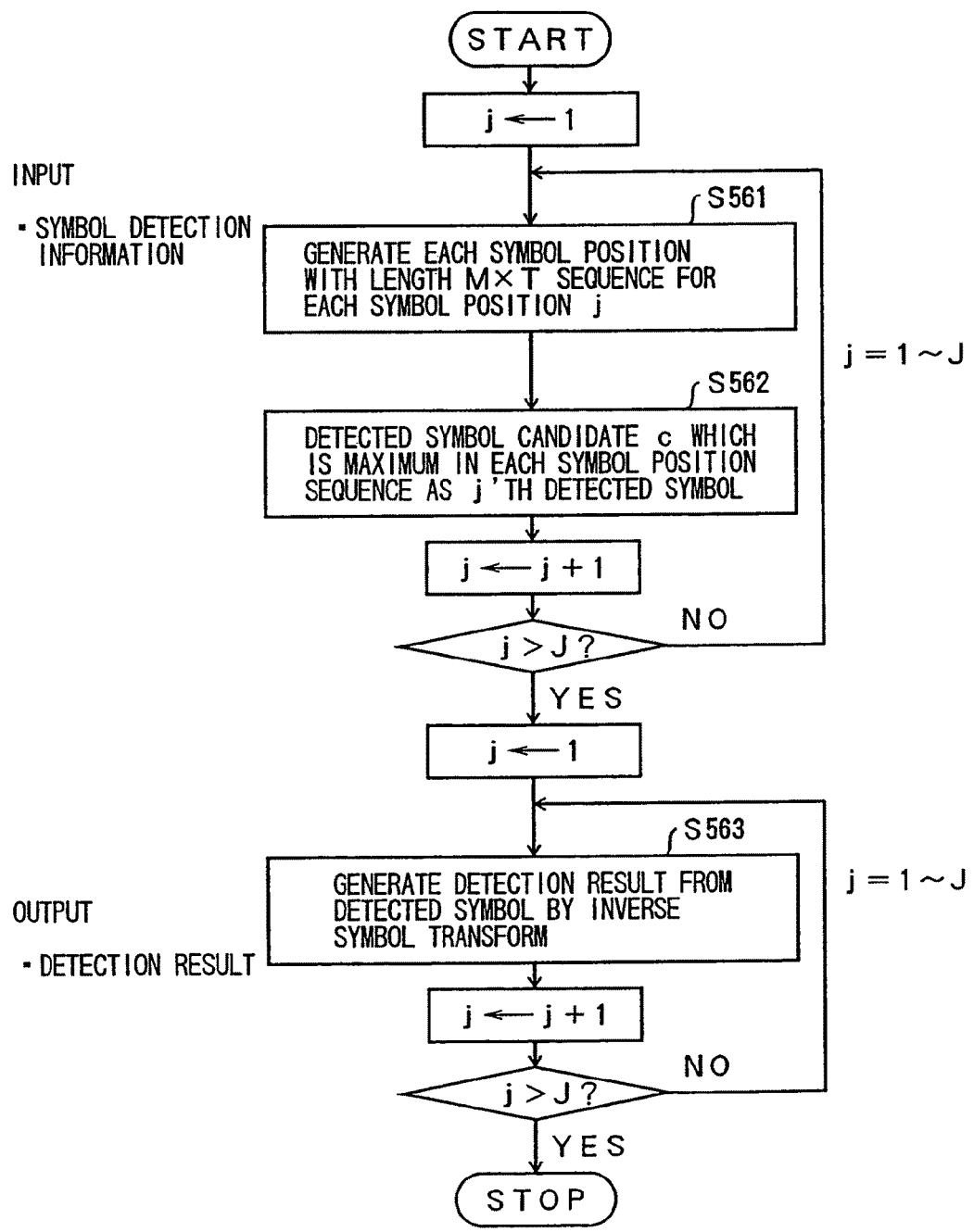
FIG. 41 is a flow chart showing the process of the detection result generation portion according to the fifth embodiment of the present invention.

FIG. 41 is a flow chart showing the process of the detection result generation portion according to the fifth embodiment of the present invention.

Step 561) The detection result generation portion 550 inputs the symbol detect information 546 and take a detected symbol 555 as the detection result 203 (watermark). First, the sequence generation portion 551 for each symbol position divides the symbol detection information 541 of each symbol position j, and generates a symbol position sequence 554 of $corr_c^{(j)\,(t)}$ (0<=c<M, 0<t<T) for each symbol position with a length M×T, for each j from j=1 &tilde& J and sends the symbol position sequence 554 to the detected symbol generation portion 552.

Step 562) The detected symbol generation portion 552 inputs the symbol position sequence 554 for each symbol position j, determines a symbol candidate c for when the value of the correlation is the greatest for the sequence, for each symbol position, and generates a detected symbol $s_j$ (1<j<J).

Step 563) After all of the s j have been determined, the inverse symbol transform portion 553 performs a transform from the symbol expression into the original watermark expression (for example, the inverse transform, corresponding to the transform in the first embodiment, is processing to regard the values for the four detected symbols (with the value for each of the detect symbols being from 0 to 255) as individual ASCII codes and convert them into four 8-bit characters), and generates and outputs the detection result 203.

The detection result 203 indicates the watermark which is embedded in the detected object image.

With watermark detection in the present embodiment, the detected object image (having a size of 2N×2N or more) is divided into blocks and the symbol when the value of the correlation is greatest for all of the blocks is detected so that, when compared to the previously described second embodiment, it is possible to perform a more accurate detection.

Sixth Embodiment

The following is description of a watermark detection portion of a sixth embodiment of the present invention. Portions other than those described below are the same as those of the previously described third embodiment.

Figure 42:
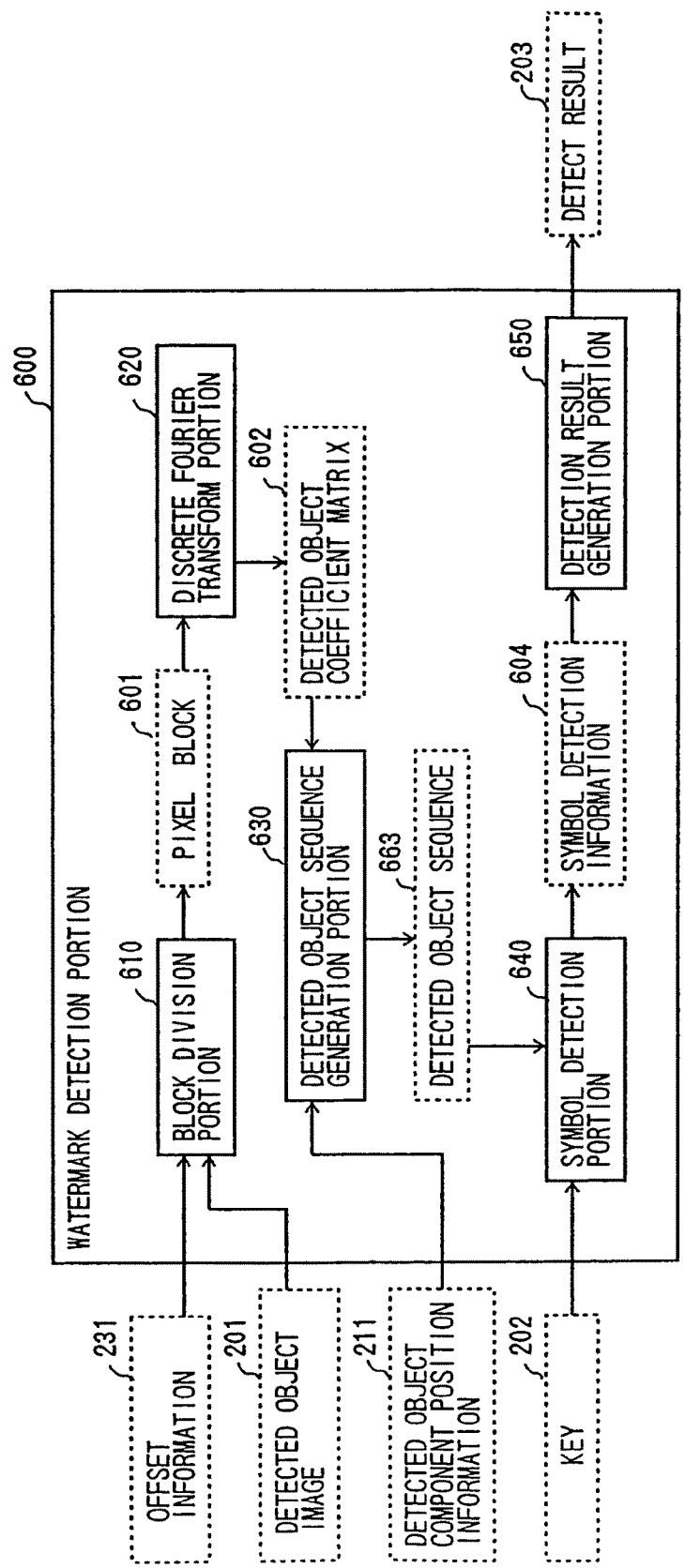
FIG. 42 is a diagram showing the configuration of a watermark detection portion according to a sixth embodiment of the present invention.

FIG. 42 is a diagram showing the configuration of the watermark detection portion according to the sixth embodiment of the present invention. The watermark detection portion 600 shown in the figure comprises a block division portion 610, a discrete Fourier transform portion 620, a detected object sequence generation portion 630, a symbol detection portion 640 and a detection result generation portion 650.

Figure 43:
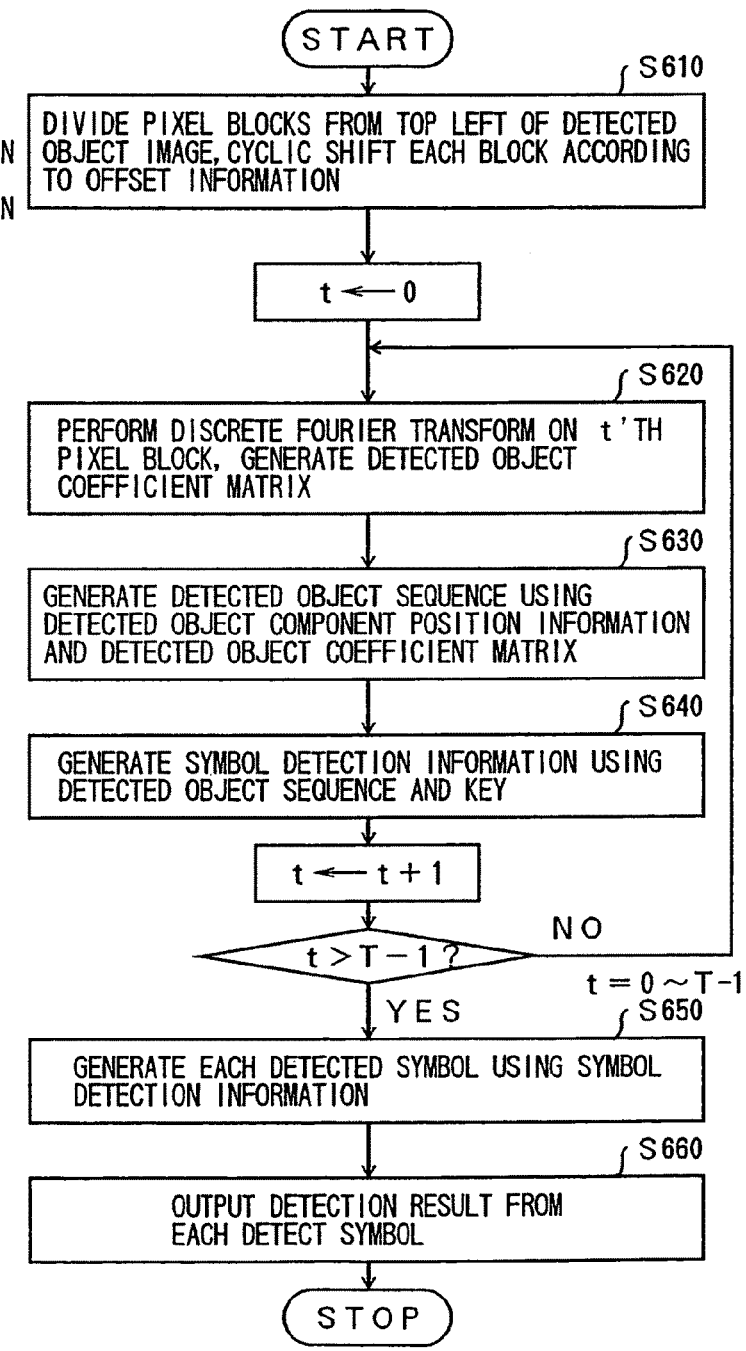
FIG. 43 is a flow chart showing the process of the watermark detection portion according to the sixth embodiment of the present invention.

FIG. 43 is a flow chart showing the process of the watermark detection portion according to the sixth embodiment of the present invention.

Figure 44:
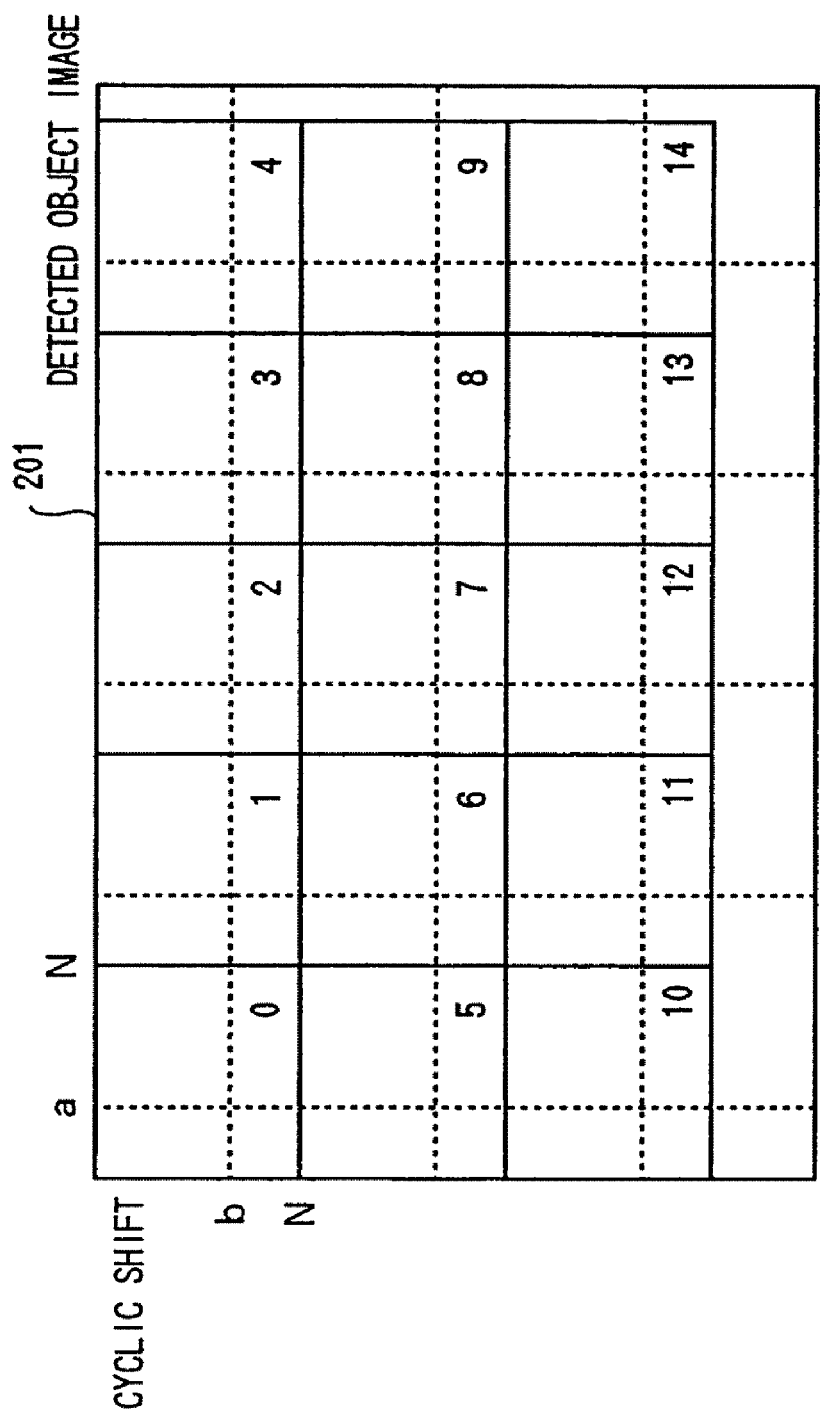
FIG. 44 is a diagram describing the process of a block division portion according to the sixth embodiment of the present invention.

Step 610) The watermark detection portion 600 inputs the detected object image 201, detected object component position information 211, offset information 231 and key 202 and outputs the watermark as the detection results 203. First, the block division portion 610 divides the detected object image 201 from the top left into blocks of N×N size as shown in FIG. 44, and uses the offset information (a, b), in the same manner as the block generation portion 233 of the position marker detection portion 230, to perform cyclic offset for each block and generate T pixel blocks of the N×N size. Furthermore, the block division portion 610 gives the number 0 &tilde& T−1 to each of the pixel blocks obtained by the division. The processing from Step 620 through Step 640 is repeated for the t'th pixel block (0<=t<T).

Step 620) The discrete Fourier transform portion 620 performs a discrete Fourier transform on the t'th pixel block 601 and obtains a detected object coefficient matrix 602.

Step 630) The detected object sequence generation portion 630 uses processing the same as that of the detected object sequence generation portion 235 of the position marker detection portion 230 to obtain a detected object sequence 663 which is sent to the symbol detection portion 640.

Step 640) The symbol detection portion 640 determines a value of the correlation between the detected object sequence and a sequence generated from the key 202, and generates symbol detection information 604. The processing from Step 620 onwards is repeated for up to the T'th item.

Step 650) Once the symbol detection information 604 has been obtained for each t, the detection result generation portion 650 takes, as a detected symbol the symbol candidate value that has the correlation value for each of the symbol positions of the symbol detection information 604.

Step 660) The detection result generation portion 650 determines the detected symbol from all of the symbol positions and outputs, as the detection result 203, the result of an inverse transform on the detected symbol into a watermark format.

The following is a description of a symbol detection portion 640 in the present embodiment.

Figure 45:
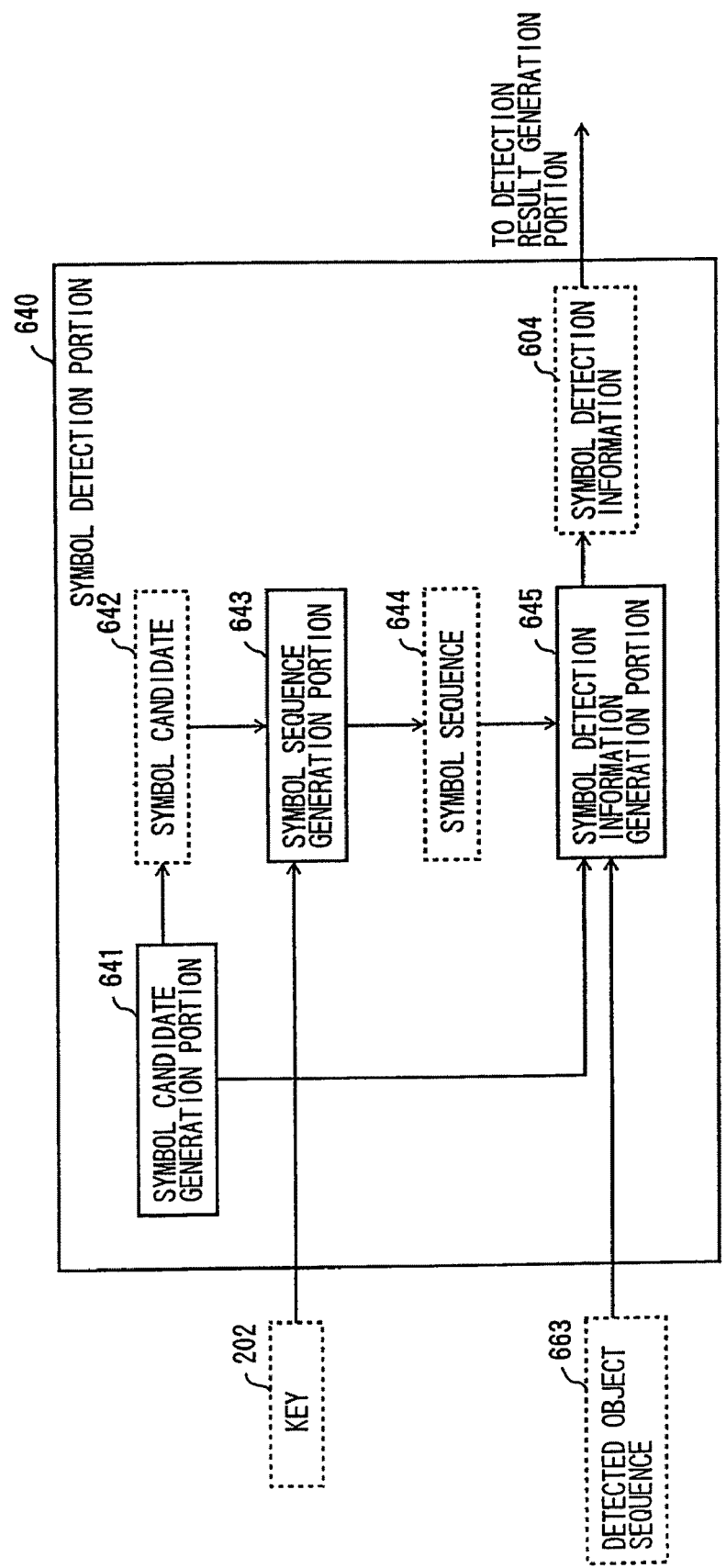
FIG. 45 is a diagram showing the configuration of a symbol detection portion according to the sixth embodiment of the present invention.

FIG. 45 is a diagram showing the configuration of the symbol detection portion according to the sixth embodiment of the present invention. The symbol detection portion 640 shown in the figure comprises a symbol candidate generation portion 641, a symbol sequence generation portion 643, and a symbol detection information generation portion 645.

The symbol detection portion 640 inputs the key 202 and the detected object sequence 663 (obtained from the t'th pixel block) and outputs the symbol detection information 604. The symbol detection information 604 is generated for the M symbol candidates 642, for each of the J symbol positions previously set for detection, and is output to the detection result generation portion 650. The following is a description of the j'th symbol detection (1<j<J).

Figure 46:
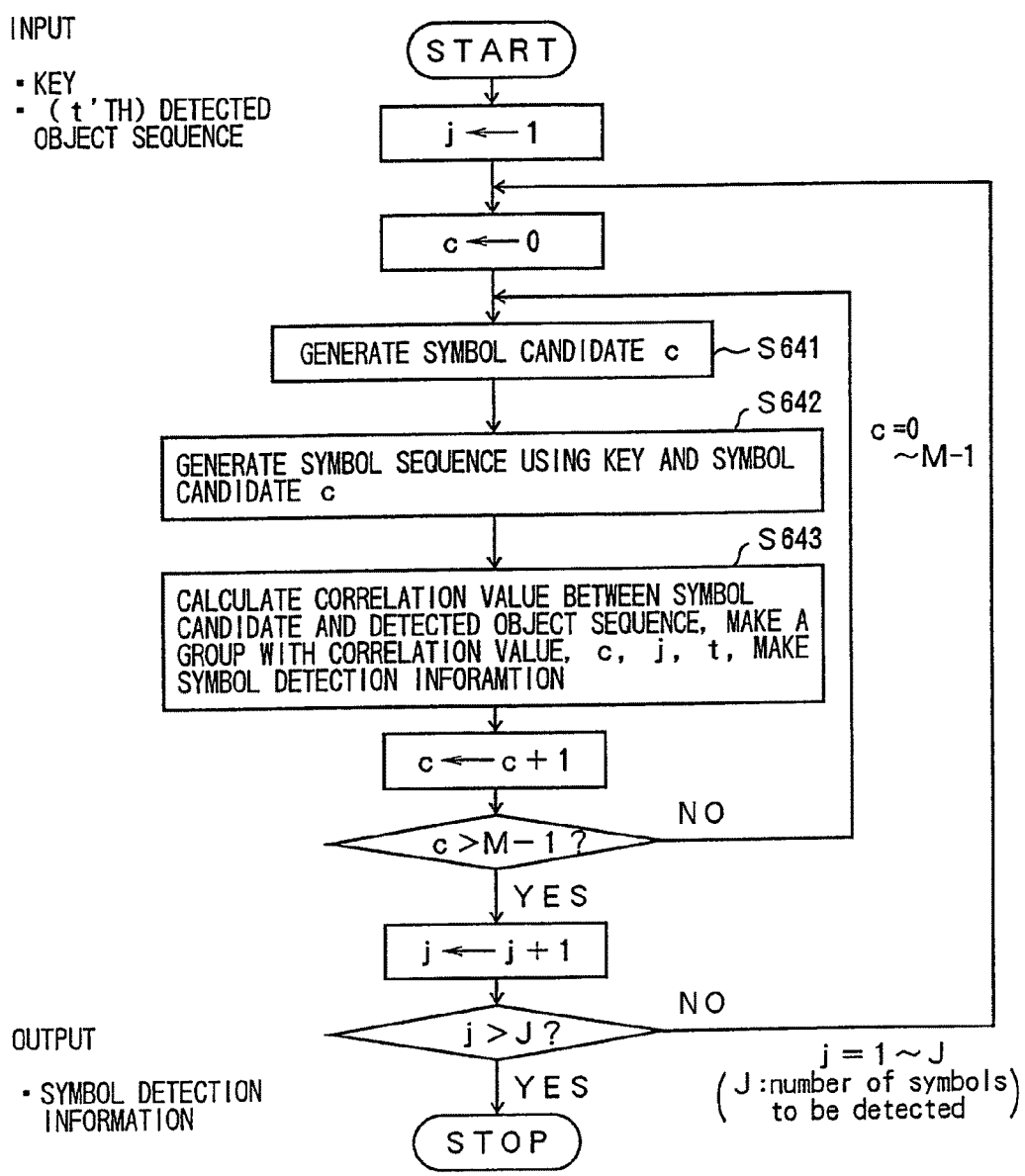
FIG. 46 is a flow chart showing the process of the symbol detection portion according to the sixth embodiment of the present invention.

FIG. 46 is a flow chart showing the process of the symbol detection portion according to the sixth embodiment of the present invention.

Step 641) In the symbol candidate generation portion 641, the symbol candidate c is successively generated for 0 to M−1, and the processing from Step 642 to Step 643 is performed for each symbol candidate 642. M expresses the maximum value of the symbol value from a symbol transform in the previously described first embodiment.

Figure 47:
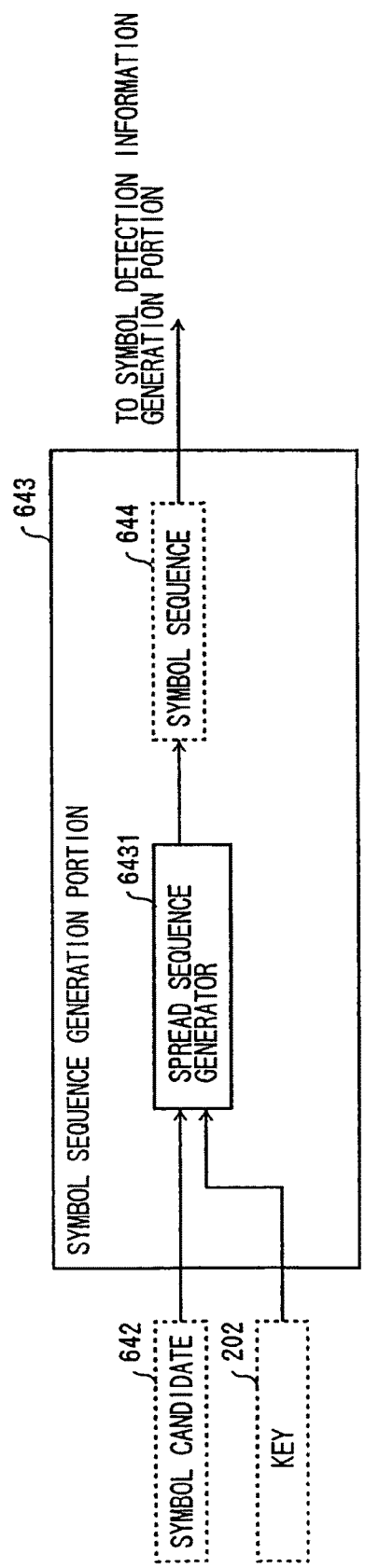
FIG. 47 is a diagram showing the configuration of a symbol sequence generation portion according to the sixth embodiment of the present invention.
Figure 48:
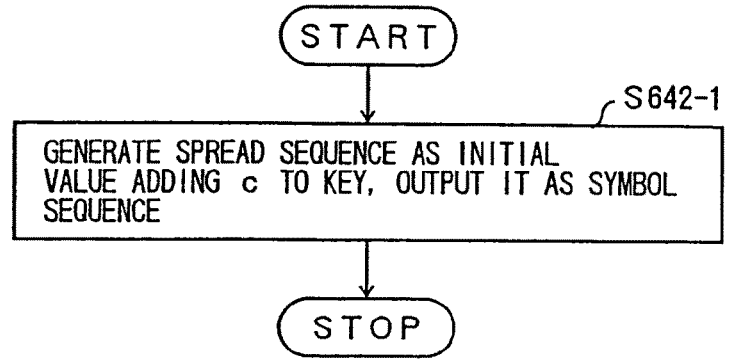
FIG. 48 is a flow chart showing the process of the symbol sequence generation portion according to the sixth embodiment of the present invention.

Step 642) FIG. 47 is a diagram showing the configuration of the symbol sequence generation portion according to the sixth embodiment of the present invention. FIG. 48 is a flow chart showing the process of the symbol sequence generation portion according to the sixth embodiment of the present invention.

Step 642-1) The symbol sequence generation portion 643 inputs the key 202 and the symbol information c and takes the sum of the key 202 and the symbol information c as the initial value and generates the spread sequence $\{r_i^{(j)}\}$ (0<=i<n) and uses this as it is, as the symbol sequence 644 $\{p_i^{(j)}\}$ (0<=i<n) ($p_i^{(j)}$:$r_i^{(j)}$ (0<=i<n)). The symbol sequence 644 is sent to the symbol detection information generation portion 645.

Step 643) The symbol detection information generation portion 645 inputs the detected object sequence 603, the symbol sequence 644, the symbol candidate c and the symbol position j currently being processed, and uses the following formula to determine the correlation value between the symbol sequence and detected object sequence, and generate the symbol detection information $corr^{(j)\,(t)}$ for sets of the correlation value, symbol candidate, symbol position and pixel block position.

$$corr_c^{(j)(t)} := \frac{\sum_{i=0}^{n-1}\left(p_i^{(j)} \cdot q_i\right)}{\sqrt{\sum_{i=0}^{n-1} p_i^{(j)2}} \sqrt{\sum_{i=0}^{n-1} q_i^2}}$$

The symbol detection information 604 is sent to the detection result generation portion 650.

The following is a description of the detection result generation portion 650 in the present embodiment.

Figure 49:
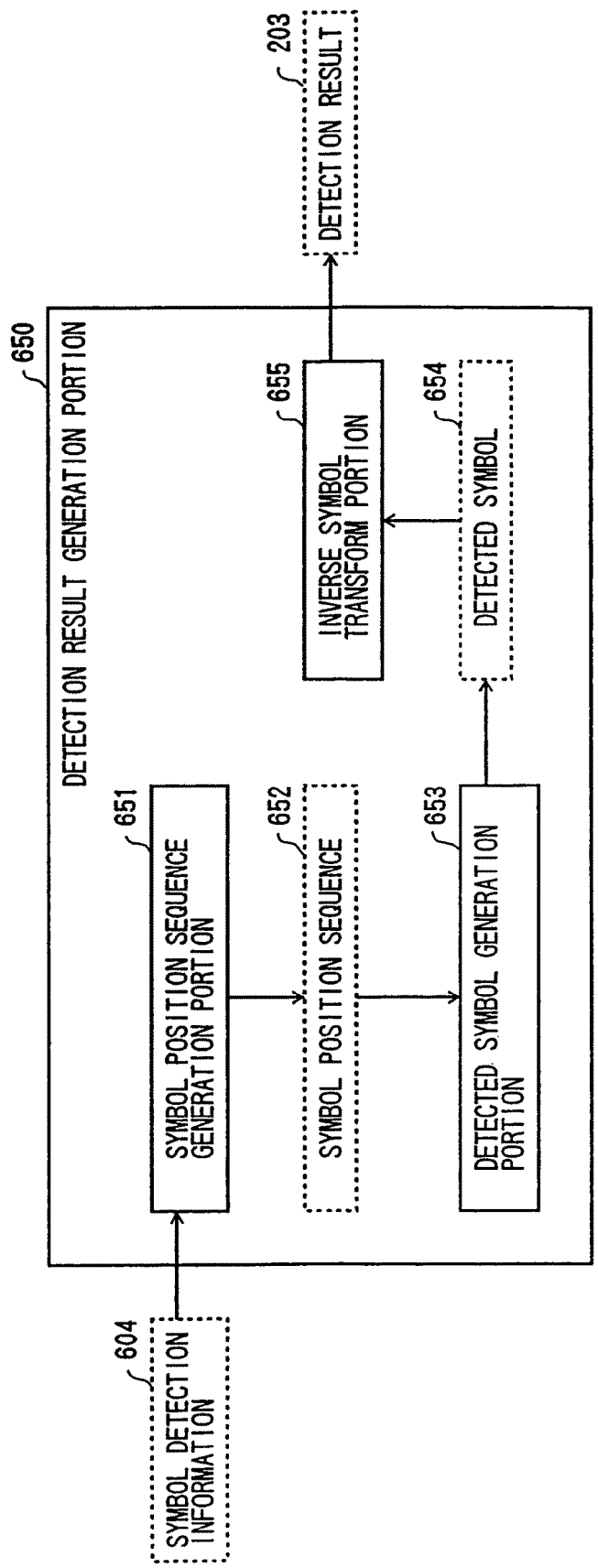
FIG. 49 is a diagram showing the configuration of a detection result generation portion according to the sixth embodiment of the present invention.

FIG. 49 is a diagram showing the configuration of the detection result generation portion according to the sixth embodiment of the present invention. The detection result generation portion 650 shown in the figure comprises a sequence generation portion 651 for each symbol position, a detected symbol generation portion 653, and an inverse symbol transform portion 655.

Figure 50:
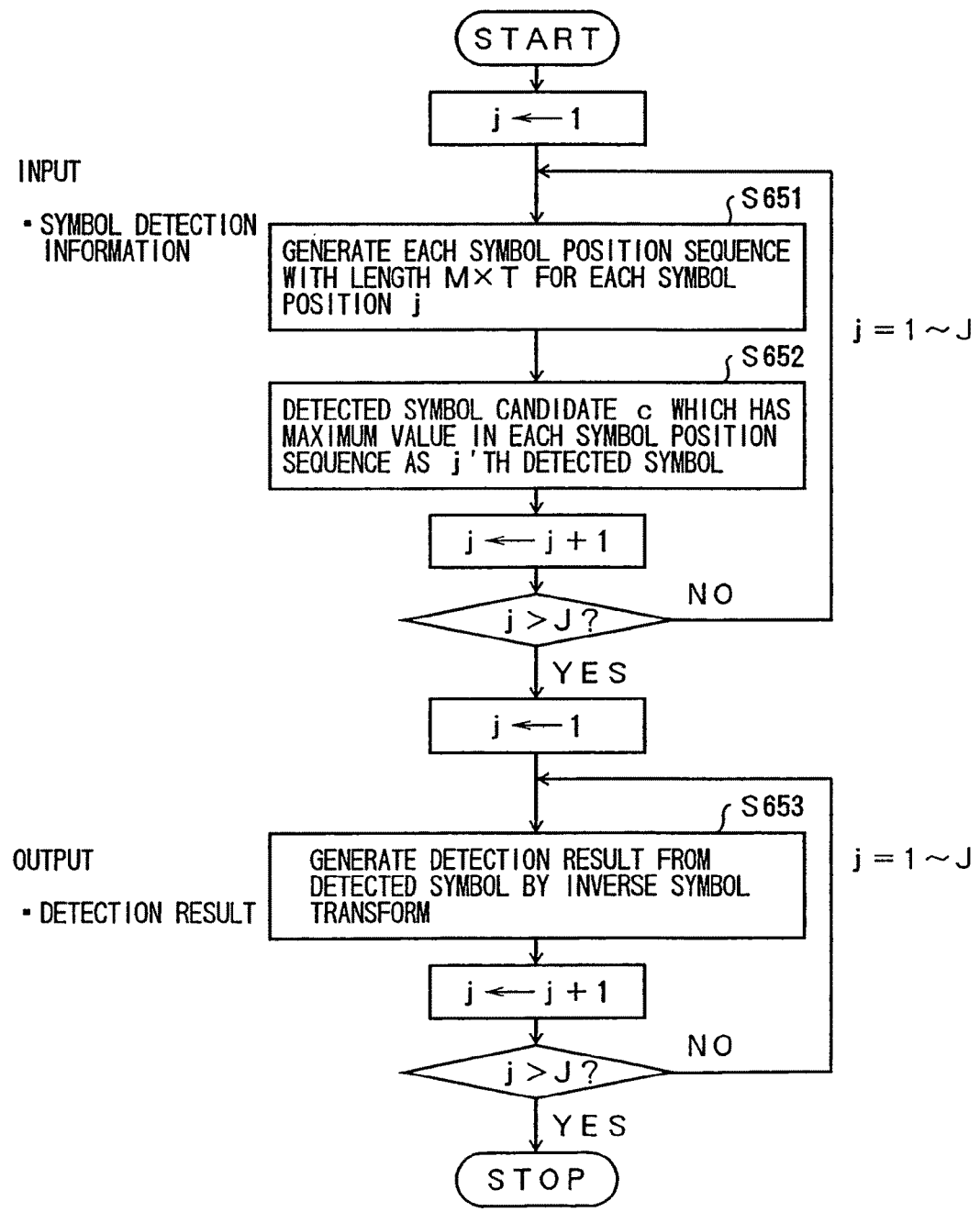
FIG. 50 is a flow chart showing the process of the detection result generation portion according to the sixth embodiment of the present invention.

FIG. 50 is a flow chart showing the process of the detection result generation portion according to a sixth embodiment of the present invention.

Step 651) The detection result generation portion 650 inputs the symbol detect information 604 and, first of all, in the sequence generation portion 651 for each symbol position, divides the symbol detection information 604 for each symbol position j, and for j=1 ~ J generates a symbol position sequence $corr_c^{(j)\,(t)}$ ((0<=c<M, 0<=t<T) for each symbol position of length M×T, and sends the symbol position sequence 652 to the detected symbol generation portion 653.

Step 652) The detected symbol generation portion 653 inputs the symbol position sequence 652 for each symbol position j, finds the symbol candidate c for when there is the maximum correlation within the sequence for each symbol position, and generates a detected symbol $s_j$ (1<=j<J). This processing is repeated until all of the $s_j$ are determined.

Step 653) After all of the detected symbols sj have been determined, the inverse symbol transform portion 655 converts from the symbol expression into the watermark expression (for example, with the inverse transform corresponding to the first embodiment having four symbols (with the values of the four symbols (where the value of each symbol is from 0 ~ 255) being regarded as ASCII codes in processing for conversion into four 8-bit characters), and the detection result 203 is generated and output. The detection results 203 indicates the watermark embedded in the detected object image.

With watermark detection according to the present embodiment, the minimum size of the detected object image becomes N×N and thereby enables detection from a smaller partial image than does the fifth embodiment. In addition, the number of blocks used for detection is larger than the number used by the fifth embodiment and so it is possible to perform detection at a higher accuracy than with the fifth embodiment.

In addition, when compared to the third embodiment (which can only detect from one block), it is possible to perform higher accuracy detection.

Seventh Embodiment

The following is a description of a watermark detection portion of a seventh embodiment of the present invention. Those portions not described below are the same as those of the previously described fourth embodiment.

Figure 51:
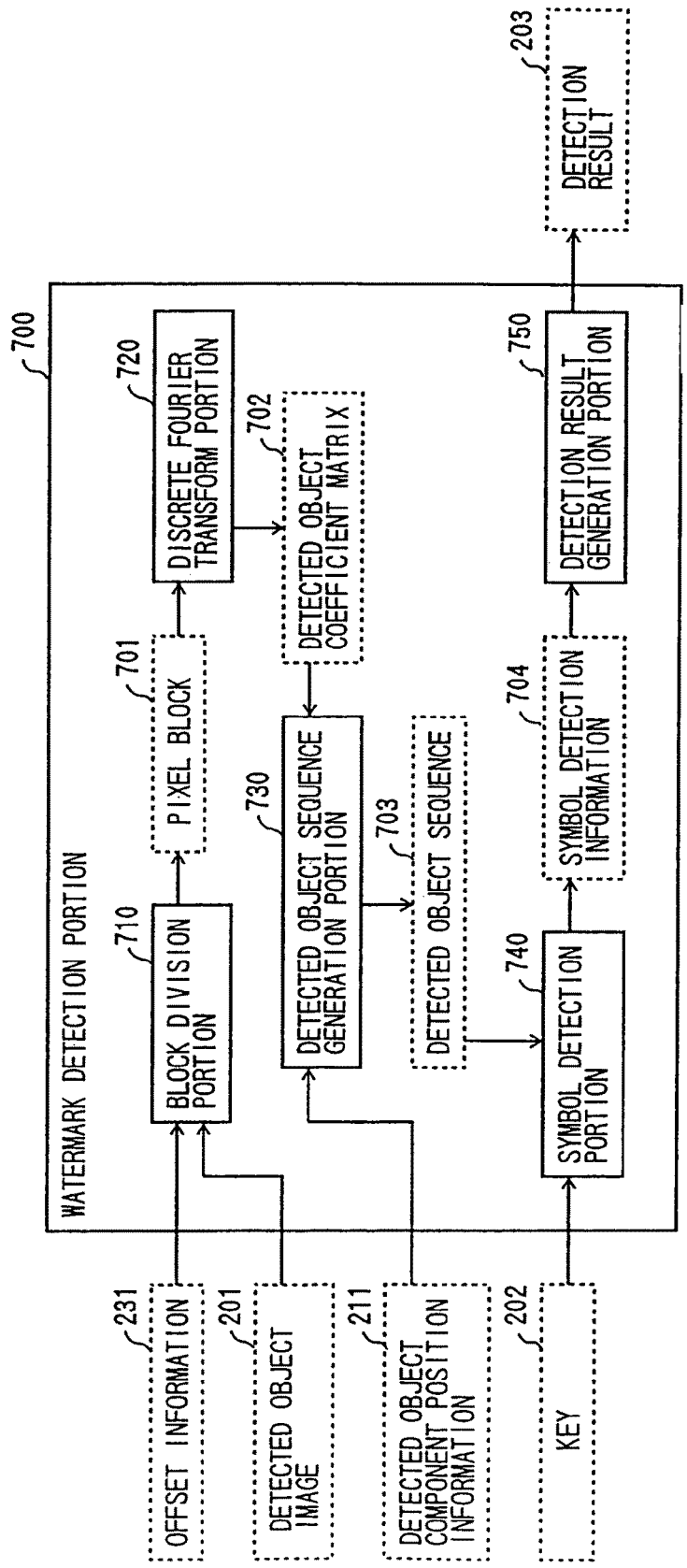
FIG. 51 is a diagram showing the configuration of the watermark detection portion according to the seventh embodiment of the present invention.

FIG. 51 is a diagram showing the configuration of the watermark detection portion according to the seventh embodiment of the present invention. The watermark detection portion 700 shown in the figure comprises a block division portion 710, a discrete Fourier transform portion 720, a detected object sequence generation portion 730, a symbol detection portion 740, and a detection result generation portion 750.

Figure 52:
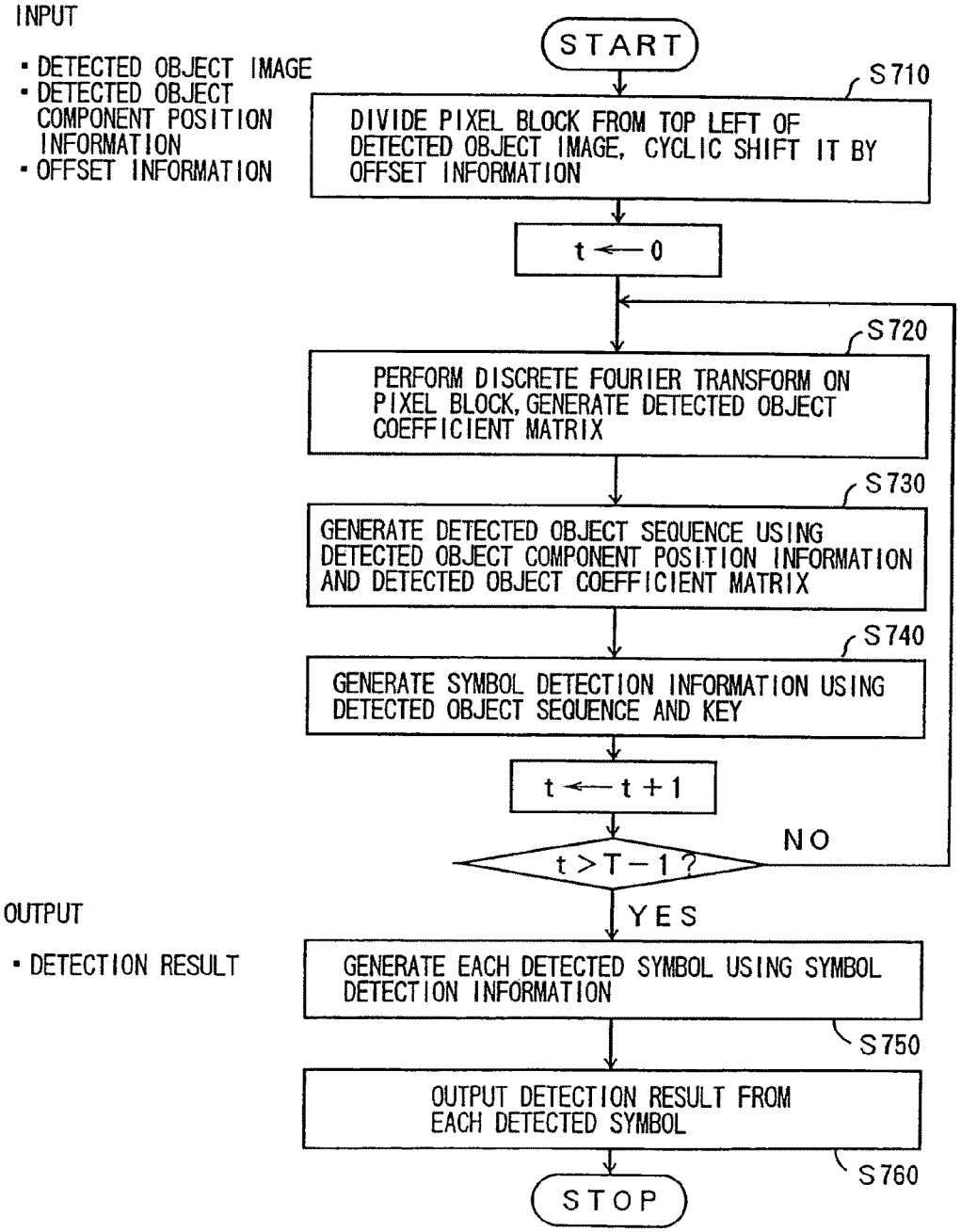
FIG. 52 is a flow chart showing the process of a watermark detection portion according to the seventh embodiment of the present invention.

FIG. 52 is a flow chart showing the process of the watermark detection portion according to the seventh embodiment of the present invention.

Figure 53:
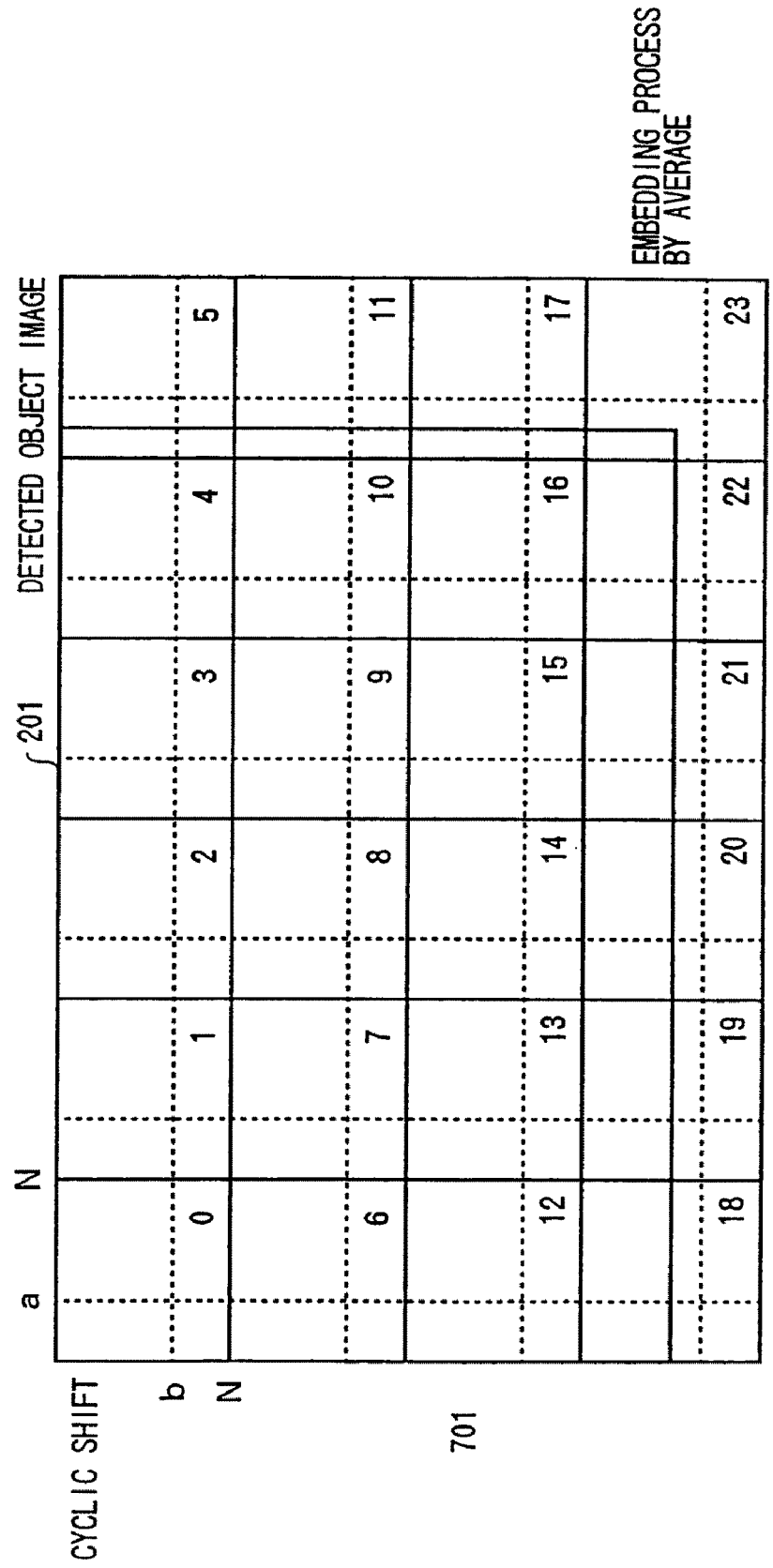
FIG. 53 is a diagram describing the process of a block division portion according to the seventh embodiment of the present invention.

Step 710) The watermark detection portion 700 inputs the detected object image 201, detected object component position information 211, offset information 231 and key 202, and, first of all, in the block division portion 710 divides the detected object image 201 from the top left into blocks of N×N size as shown in FIG. 53, and uses the offset (a, b) in the same manner as the block generation portion 233 of the position marker detection portion 230, and performs cyclic shift for each block while generating T pixel blocks of the N×N size. When this is done, those blocks around the edge of the detected object image 201 that do not make up an N×N size are cut for only that portion that corresponds to the detected object image 201, and remaining portion of the N×N block is filled with a mean value of the pixel values of the portion corresponding to the detected object image 201. The block division portion 710 numbers each of the pixel blocks obtains by division, with a number from 0 ~ T−1.

Step 720) The discrete Fourier transform portion 720 perform a discrete Fourier transform on the t'th pixel block and obtains a detected object coefficient matrix 702.

Step 730) The detected object sequence generation portion 730 uses processing the same as that of the detected object sequence generation portion 235 of the position marker detection portion 230, to obtain a detected object sequence 703 and send it to the symbol detection portion 740.

Step 740) The symbol detection portion 740 determines a correlation value of the detected object sequence 703 and a sequence generated from the key 202, and then generates symbol detection information 704.

Step 750) After the symbol detection information 704 has been obtained for each of the t, the detection result generation portion 750 makes the symbol candidate value of the symbol detection information 704 with the maximum correlation value into a detected symbol, for each of the symbol positions of the symbol detection information 704.

Step 760) After the detected symbol has been determined from each of the symbol positions, the detection result generation portion 750 inverse transforms the detected symbol into the watermark format and outputs the result as the detection result 203.

The following is a description of the symbol detection portion 740 in the present embodiment.

Figure 54:
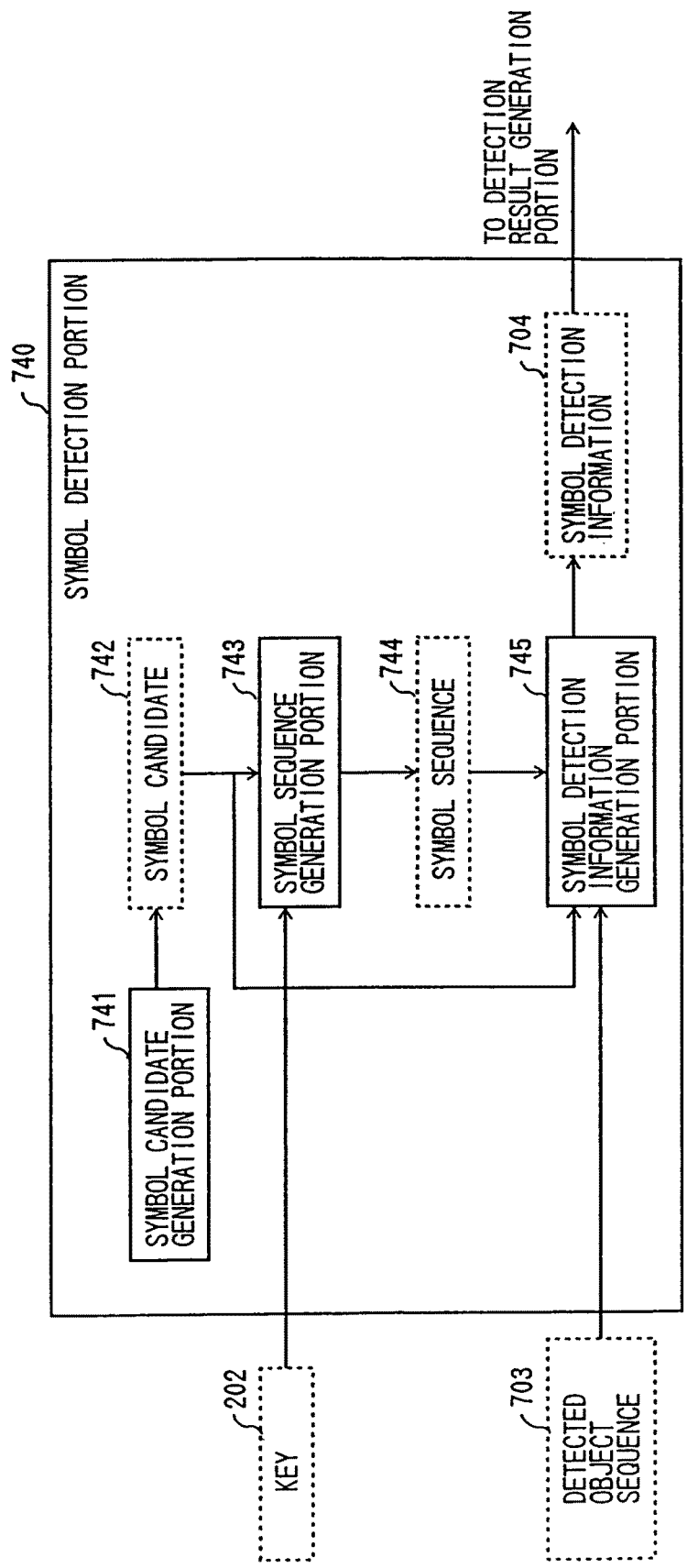
FIG. 54 is a diagram showing the configuration of a symbol detection portion according to the seventh embodiment of the present invention.

FIG. 54 is a diagram showing the configuration of the symbol detection portion according to the seventh embodiment of the present invention. The symbol detection portion 740 shown in the figure comprises a symbol candidate generation portion 741, a symbol sequence generation portion 743 and a symbol detection information portion 745.

The symbol detection portion 740 inputs the key 202 and the detected object sequence 703 (obtained from the t'th pixel block) and for each of the predetermined j symbol positions detected, generates the symbol detection information 704 for M symbol candidates 742 and outputs the symbol detection information 704 to the detection result generation portion 750.

The following is a description of the j'th symbol detection (1<=j<J).

Figure 55:
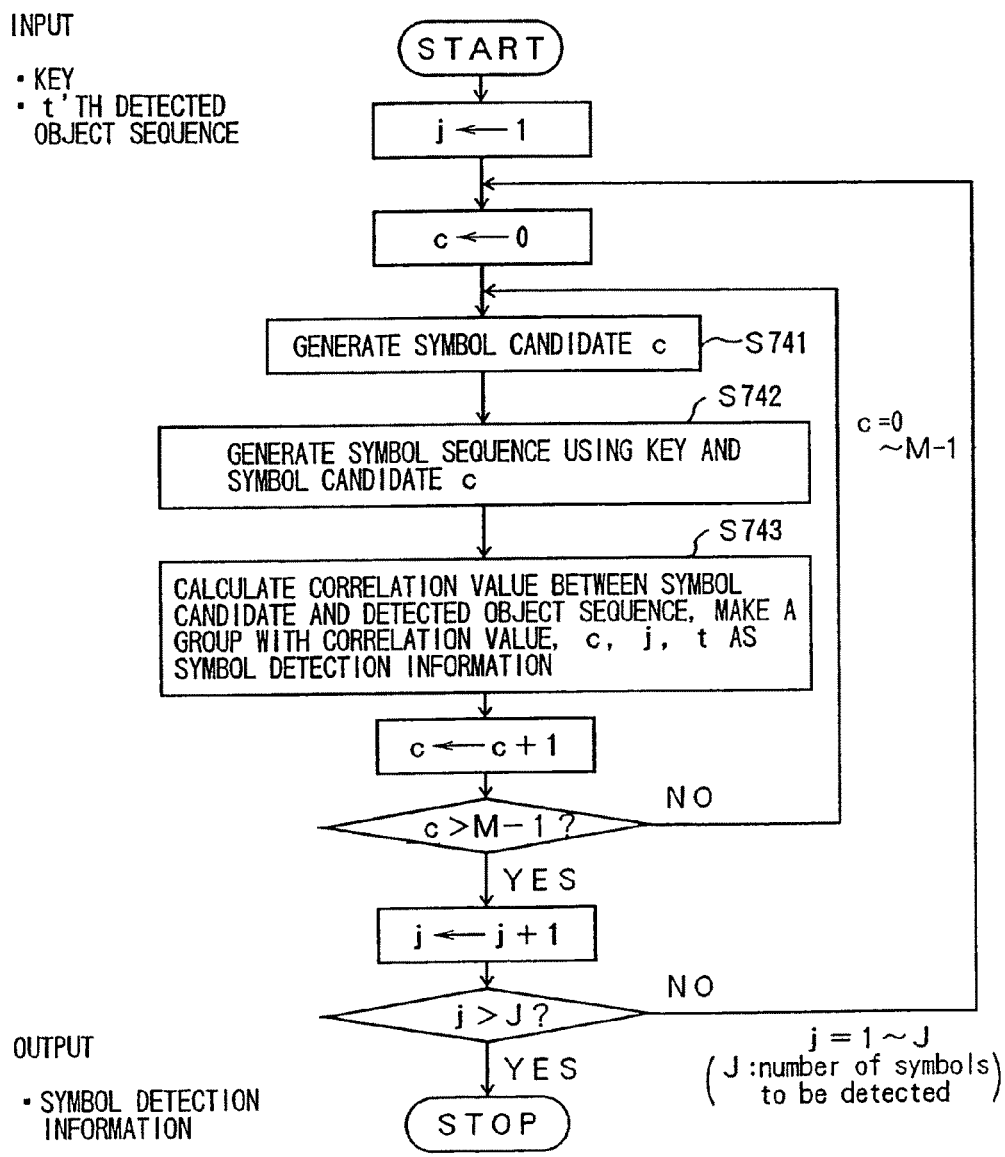
FIG. 55 is a flow chat showing the process of the symbol detection portion according to the seventh embodiment of the present invention.

FIG. 55 is a flow chart showing the process of the symbol detection portion according to the seventh embodiment of the present invention.

Step 741) The symbol candidate generation portion 741 successively generates symbol candidates c for 0 to M−1 and performs the processing from Step 742 to Step 743 for each of the symbol candidates. M expresses the maximum value of the symbol value in the previously described first embodiment.

Figure 56:
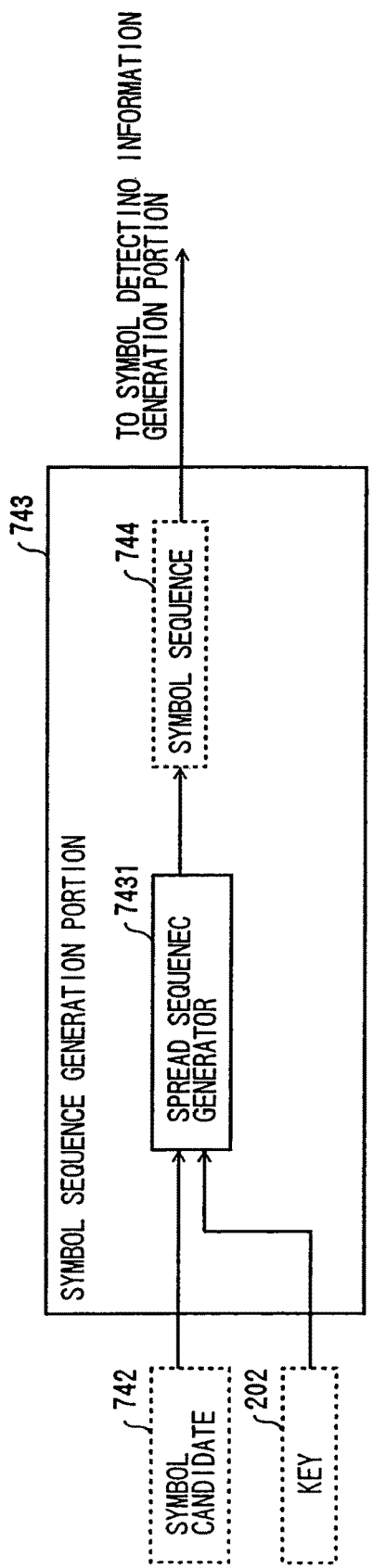
FIG. 56 is a diagram showing the configuration of a symbol sequence generation portion according to the seventh embodiment of the present invention.
Figure 57:
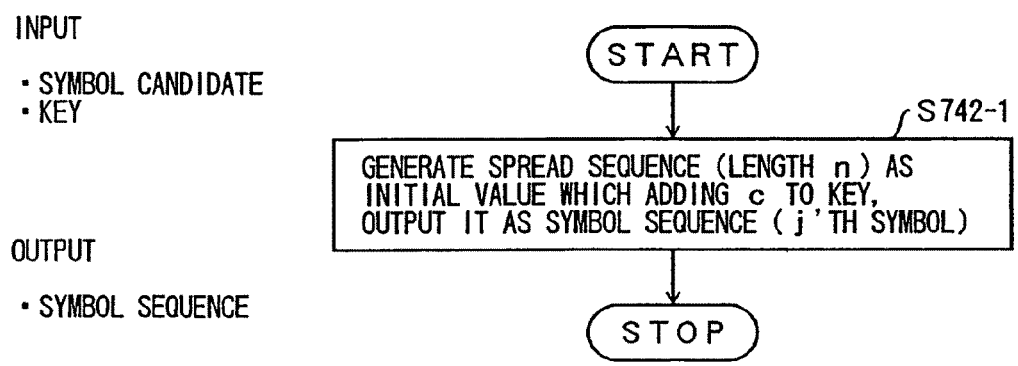
FIG. 57 is a flow chart showing the process of the symbol sequence generation portion according to the seventh embodiment of the present invention.

Step 742) The following is a description of the configuration and process of the symbol sequence generation portion 743. FIG. 56 is a diagram showing the configuration of the symbol sequence generation portion according to the seventh embodiment of the present invention and FIG. 57 is a flow chart showing the process of the symbol sequence generation portion according to the seventh embodiment of the present invention.

Step 742-1) The symbol sequence generation portion 743 inputs the key 202 and the symbol candidate c, and takes a value which is the sum of c and the key 202 as the initial value when the spread sequence generator 7431 generates a j'th spread sequence $\{r_i^{(j)}\}$ ($0<=i<n$) and output it as a symbol sequence 744 $\{p_i^{(j)}\}$ ($0<=i<n$) ($p_i^{(j)}:=r_i^{(j)}$ ($0<=i<n$)). The symbol sequence 744 is sent to the symbol detection information generation portion 745.

Step 743) The symbol detection information generation portion 745 inputs the detected object sequence 703, the symbol sequence 744, the symbol candidate c and the symbol position j currently being processed, uses the following formula to determine the correlation value of the symbol sequence 744 and the detected object sequence 703, groups the correlation value, symbol candidate, symbol position and the pixel block position and generates the symbol detection information $corr_c^{(j)\,(t)}$.

$$corr_c^{(j)(t)} := \frac{\sum_{i=0}^{n-1}(p_i^{(j)} \cdot q_i)}{\sqrt{\sum_{i=0}^{n-1}p_i^{(j)2}}\sqrt{\sum_{i=0}^{n-1}q_i^2}}$$

The symbol detection information 704 is sent to the detection result generation portion 750.

The following is description of the detection results generation portion 750 in the present embodiment.

Figure 58:
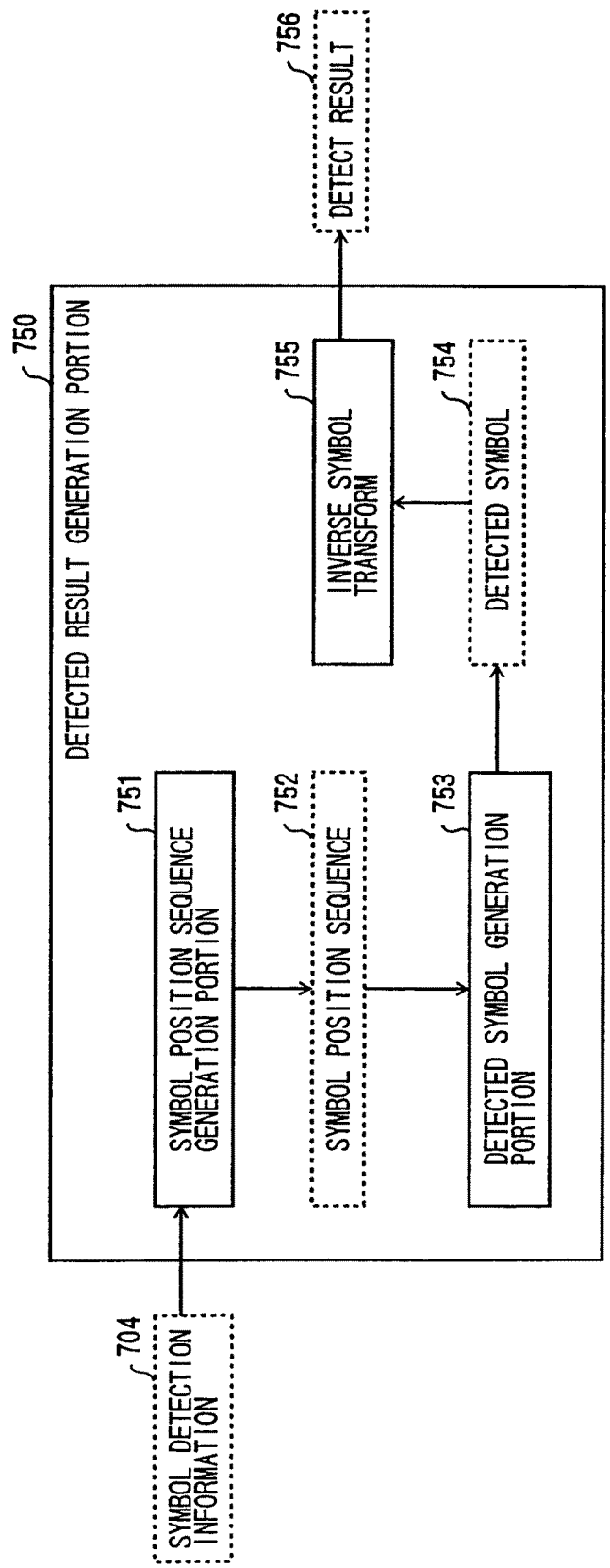
FIG. 58 is a diagram showing the configuration of a detection results generation portion according to the seventh embodiment of the present invention.

FIG. 58 is a diagram showing the configuration of the detection result generation portion according to the seventh embodiment of the present invention. The detection result generation portion 750 shown in the figure comprises the sequence generation portion 751 for each symbol position, a detected symbol generation portion 753 and an inverse symbol transform portion 755.

Figure 59:
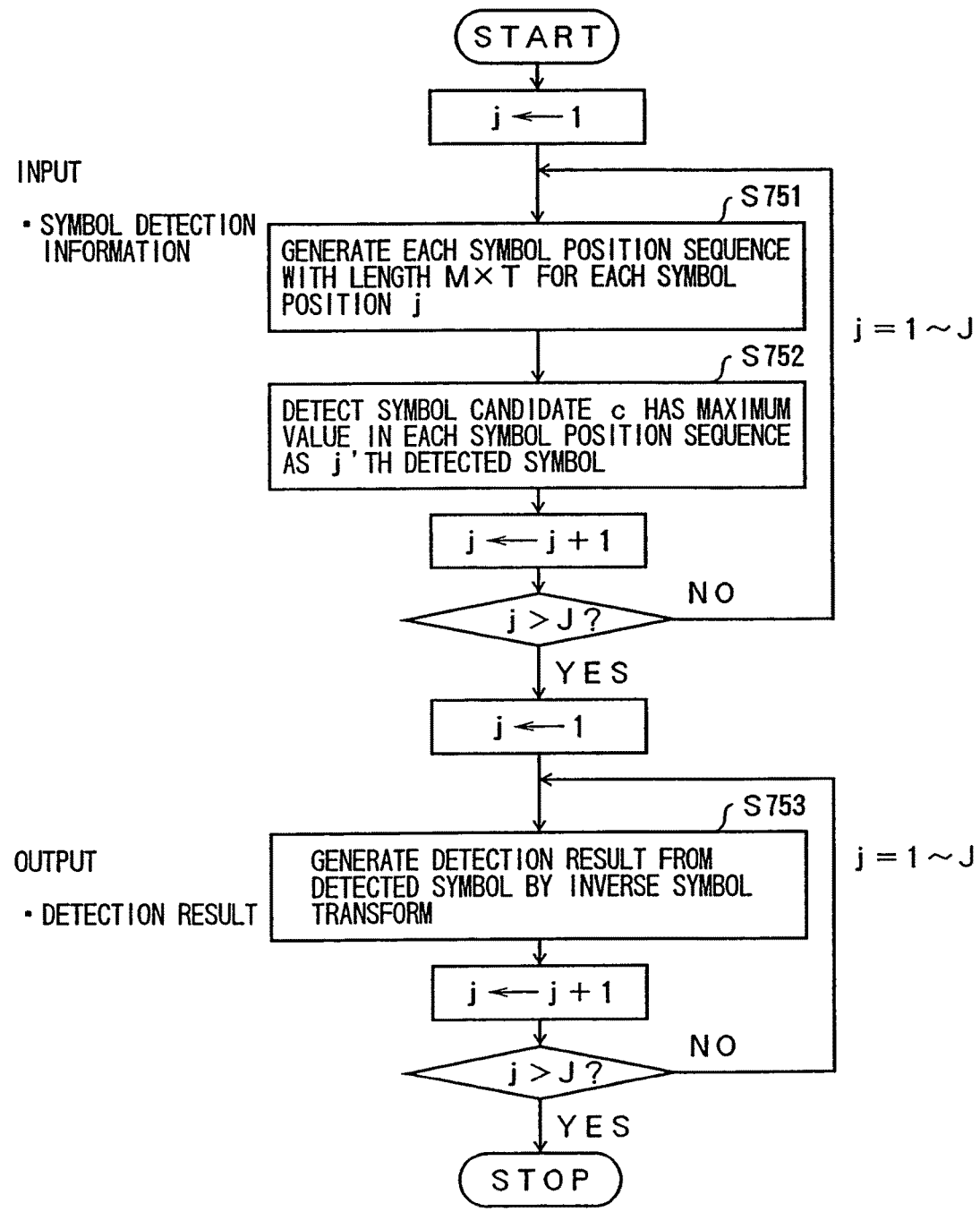
FIG. 59 is a flow chart showing the process of the detection results generation portion according to the seventh embodiment of the present invention.

FIG. 59 is a flow chart showing the process of the detection result generation portion according to the seventh embodiment of the present invention.

Step 751) The detection result generation portion 750 inputs the symbol detection information 704, and first of all, in the sequence generation portion 751 for each symbol position, divides the symbol detection information 704 into each symbol position j, generates a symbol position sequence $corr_c^{(j)\,(t)}$ ($0<=c<M, 0<=t<T$) of length M×T for each of j=1 ˜& J, and sends the symbol position sequence 752 to the detected symbol generation portion 753.

Step 752) The detected symbol generation portion 753 inputs the symbol position sequence 752 for each symbol position, finds a symbol candidate c having the maximum correlation value in the sequences for each symbol position j, and generates a detected symbol $s_j$ ($0</=j<J$). The processing of Step 751 and Step 752 is repeated until all $s_j$ are determined.

Step 753) After all $s_j$ are determined, the inverse symbol transform portion 755 transforms the symbol expression into a watermark expression (for example, with the inverse transform corresponding to the first embodiment having four symbols (with the values of the four symbols (where the value of each symbol is from 0 ˜& 255) being regarded as ASCII codes in processing for conversion into four 8-bit characters), and generates and outputs the detection result 203.

The detection result 203 indicates the watermark embedded in the detected object image 201.

With the watermark detection in the present embodiment, there is no limit relating to a minimum size of the detected object image and so it is possible to perform detection from a partial image smaller than that of the previously described sixth embodiment. In addition, the number of blocks used for detection is greater than for the sixth embodiment and so it is possible to perform detection at a higher accuracy when compared to the sixth embodiment. In addition, it is also possible to perform detection at a higher accuracy when compared to the fourth embodiment (which only uses one block for detection).

Eighth Embodiment

The following is a description of the position marker detection portion that uses offset candidate information to divide the detected object image into blocks and outputs an addition block which is the sum of the pixel values of the pixel blocks.

Those portions not described in the following are the same as those of the previously described second embodiment.

Figure 60:
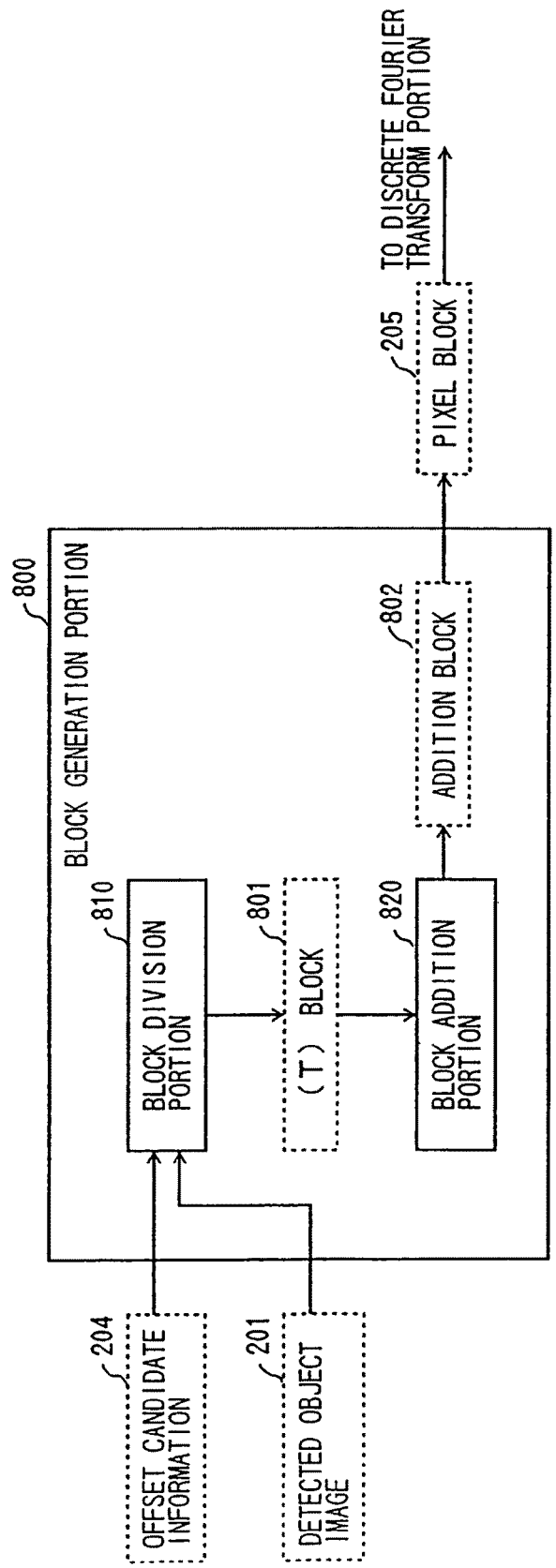
FIG. 60 is a diagram showing the configuration of a block generation portion of a position marker detection portion according to an eighth embodiment of the present invention.

FIG. 60 is diagram showing the configuration of a block generation portion of a position marker detection portion according to an eighth embodiment of the present invention.

The block generation portion 800 of the position marker detection portion 230 has a block division portion 810 and a block addition portion 820.

Figure 61:
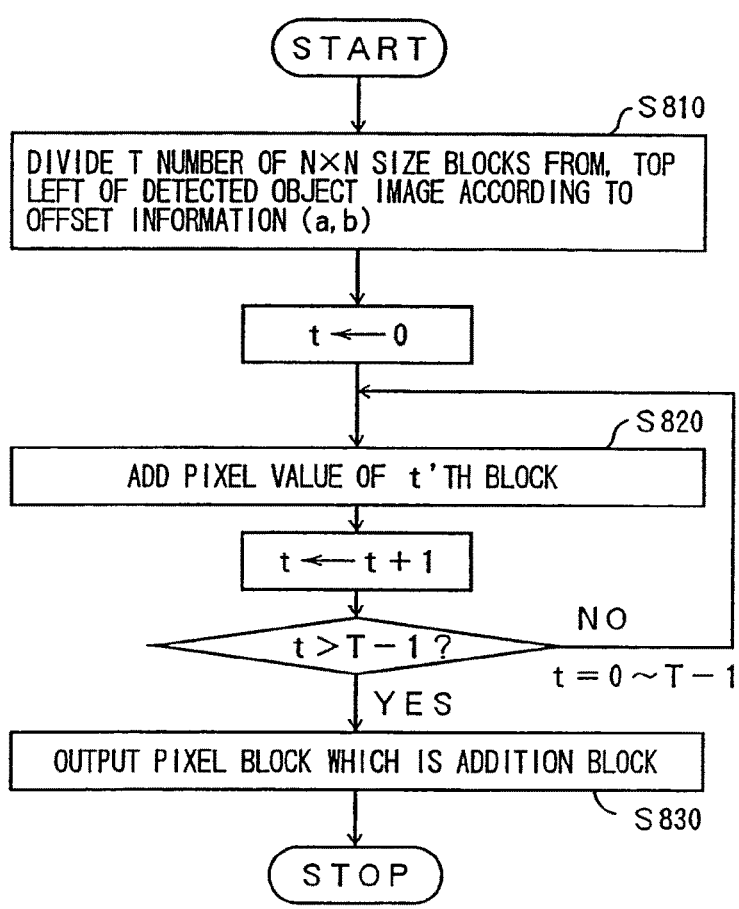
FIG. 61 is a flow chart showing the process of the block generation portion of the position marker detection portion according to the eighth embodiment of the present invention.

FIG. 61 is a flow chart showing the process of the block generation portion of the position marker detection portion according to the eighth embodiment of the present invention.

Figure 62:
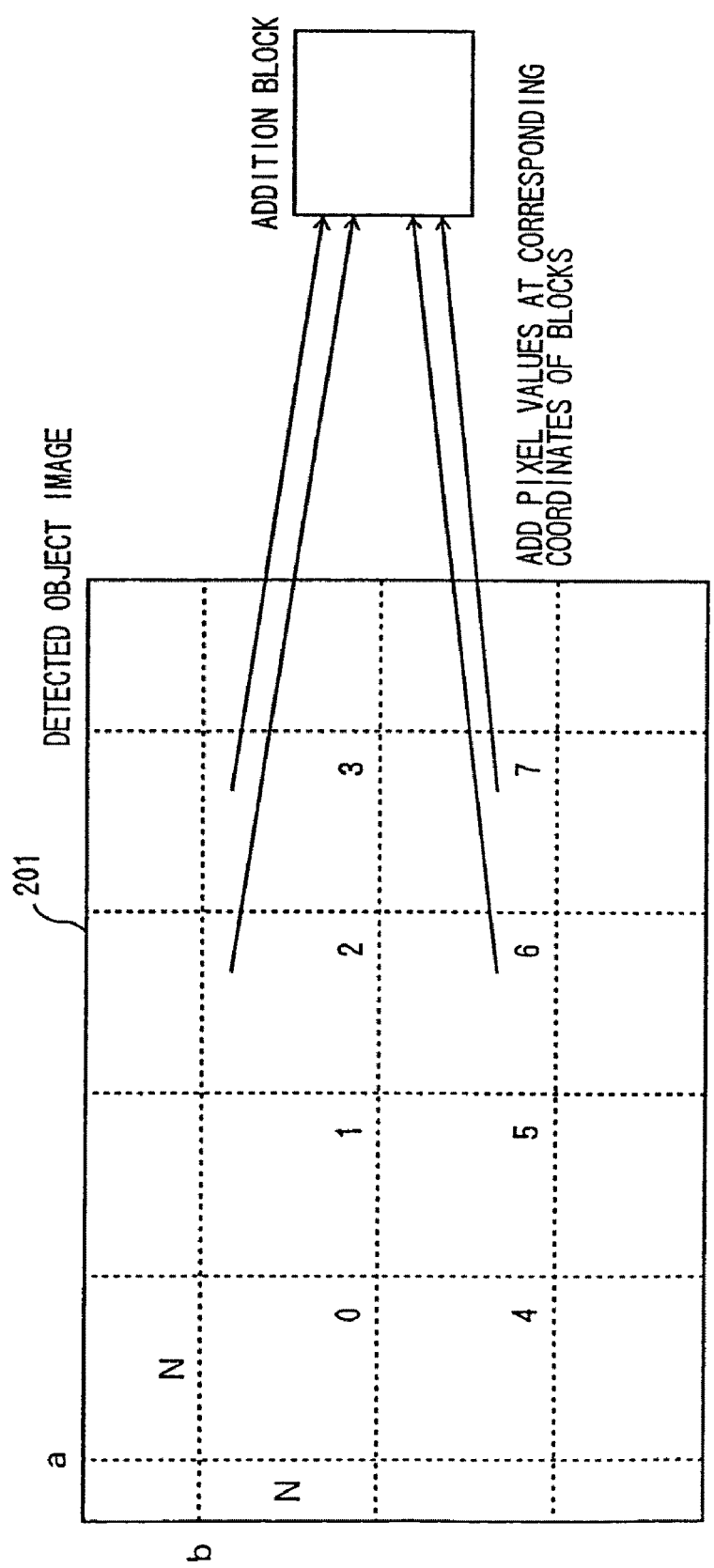
FIG. 62 is a diagram describing the process of the block generation portion according to the eighth embodiment of the present invention.

Step 810) The block generation portion 800 inputs the detected object image 201 and the offset candidate information 204 and in the block division portion 810, divides the detected object image 201 into T N×N sized pixel blocks displaced from the top left of the detected object image 201 by the offset candidate information 204 (a, b) as shown in FIG. 62.

Step 820) Next, the block addition portion 820 adds all of the blocks and generates the addition block 802. When a block is expressed as a formula, $B_{ij}^{(t)}:=t\text{'th block}(0<=i<N, 0<=j<N, 0<=t<T)$, the addition block $A_{ij}$ (0<=i<N, 0<=j<N) is obtained by $$A_{ij} = \sum_{t=0}^{T} B_{ij}^{(t)} \quad (0 \le i < N, 0 \le j < N)$$

Step 830) The block generation portion 800 outputs the addition block 802 to the discrete Fourier transform portion 234 as the pixel block 205.

The following is a description of the block generation portion 241 of the watermark detection portion 240 in the present embodiment.

The block generation portion 241 of the watermark detection portion 240 inputs the detected object image 201 and the offset information, and, in the same manner as the block generation portion 233 of the position marker detection portion 230, (inputs the offset information as the offset candidate information and) divides the detected object image 201 into T N×N sized blocks displaced by the offset information (a, b). Then, the block generation portion 241, adds these displaced blocks and generates an addition block. This addition block is then output to the discrete Fourier transform portion 242 as the pixel block 246.

The watermark detection in the present embodiment is performed by dividing the detected object image (of size 2N×2N or more) into blocks of N×N size, detecting the position marked from the block which is the sum of all blocks and detecting the watermark.

Because of the addition of the T blocks, the watermark pattern which is a repeated pattern of the N×N size is emphasized T times while the pattern of the original image has a lower correlation between blocks and so is gradually cancelled by the addition. This is to say that the detection from the addition block reduces the influence of the original image and at the same time emphasizes the watermark pattern so that it is possible to perform detection at a higher accuracy than with the previously described second embodiment.

In addition, when compared to the second embodiment, the amount of processing required for detection increases by the portion required to generate the addition block but this amount of processing is so small that it can be ignored when compared to the amount of processing for the other portions of the detection processing. Furthermore, it is also possible to perform high-speed processing several times faster when compared to detecting one block at a time as in the fifth embodiment.

Ninth Embodiment

The following is a description of a ninth embodiment, of the position marker detection portion and the watermark detection portion which perform processing to divide the detected object image into blocks, and make an addition block by adding the pixel values of the divided blocks, use the offset information to perform cyclic offset of this addition block and generate a pixel block. Moreover, those portions that are not described in the following are the same as those of the previously described third embodiment.

Figure 63:
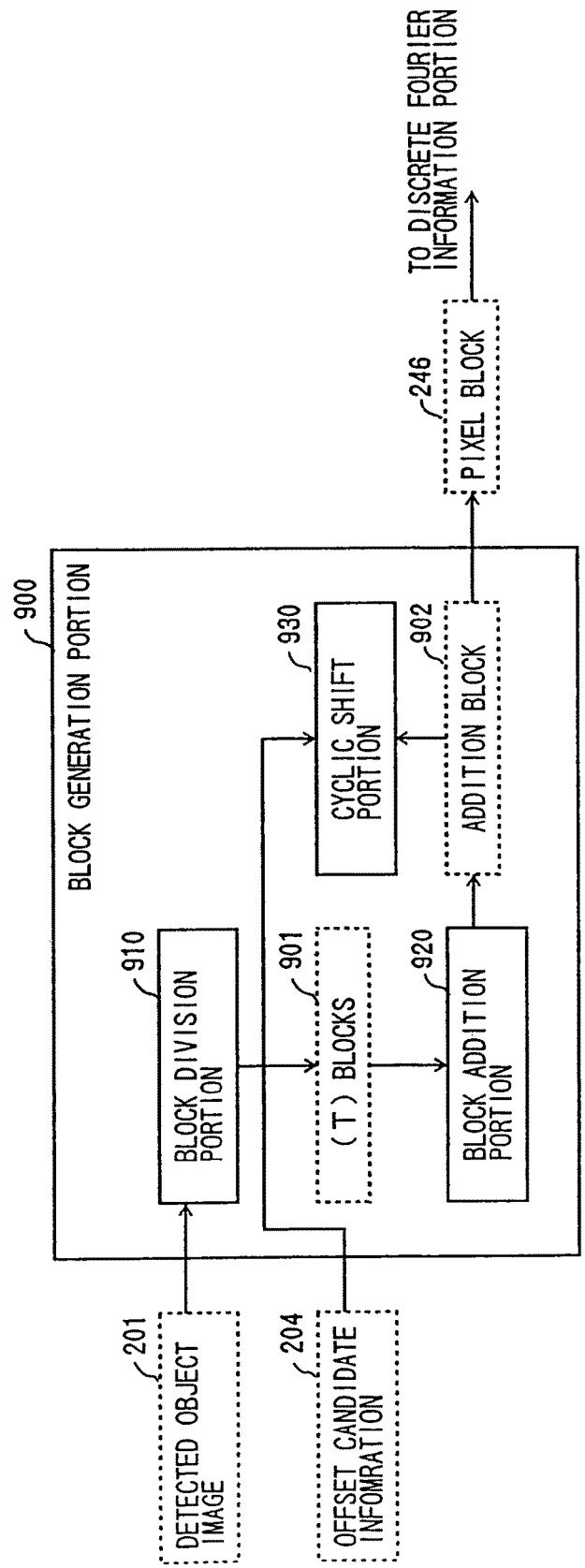
FIG. 63 is a diagram showing the configuration of the block generation portion of the position marker detection portion according to a ninth embodiment of the present invention.

FIG. 63 is a diagram showing the configuration of the block generation portion of the position marker detection portion according to the ninth embodiment of the present invention. The block generation portion 900 shown in the figure comprises a block division portion 910, a block addition portion 920 and a cyclic shift portion 930.

Figure 64:
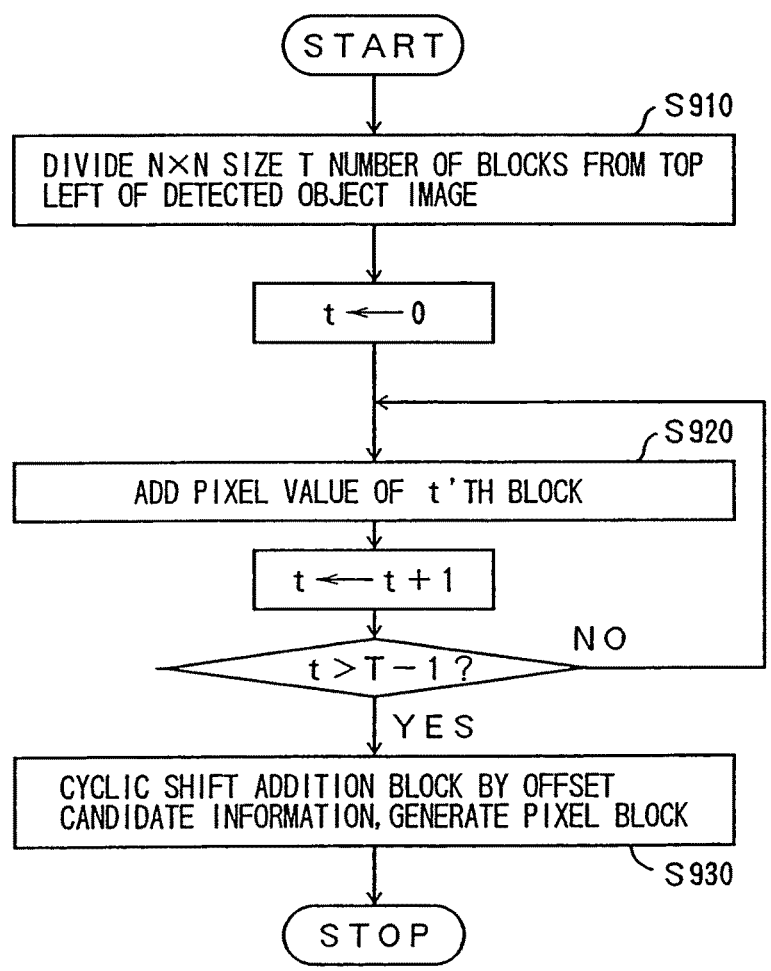
FIG. 64 is a flow chart showing the process of the block generation portion of the position marker detection portion according to the ninth embodiment of the present invention.

FIG. 64 is a flow chart showing the process of the block generation portion of the position marker detection portion according to the ninth embodiment of the present invention.

Figure 65:
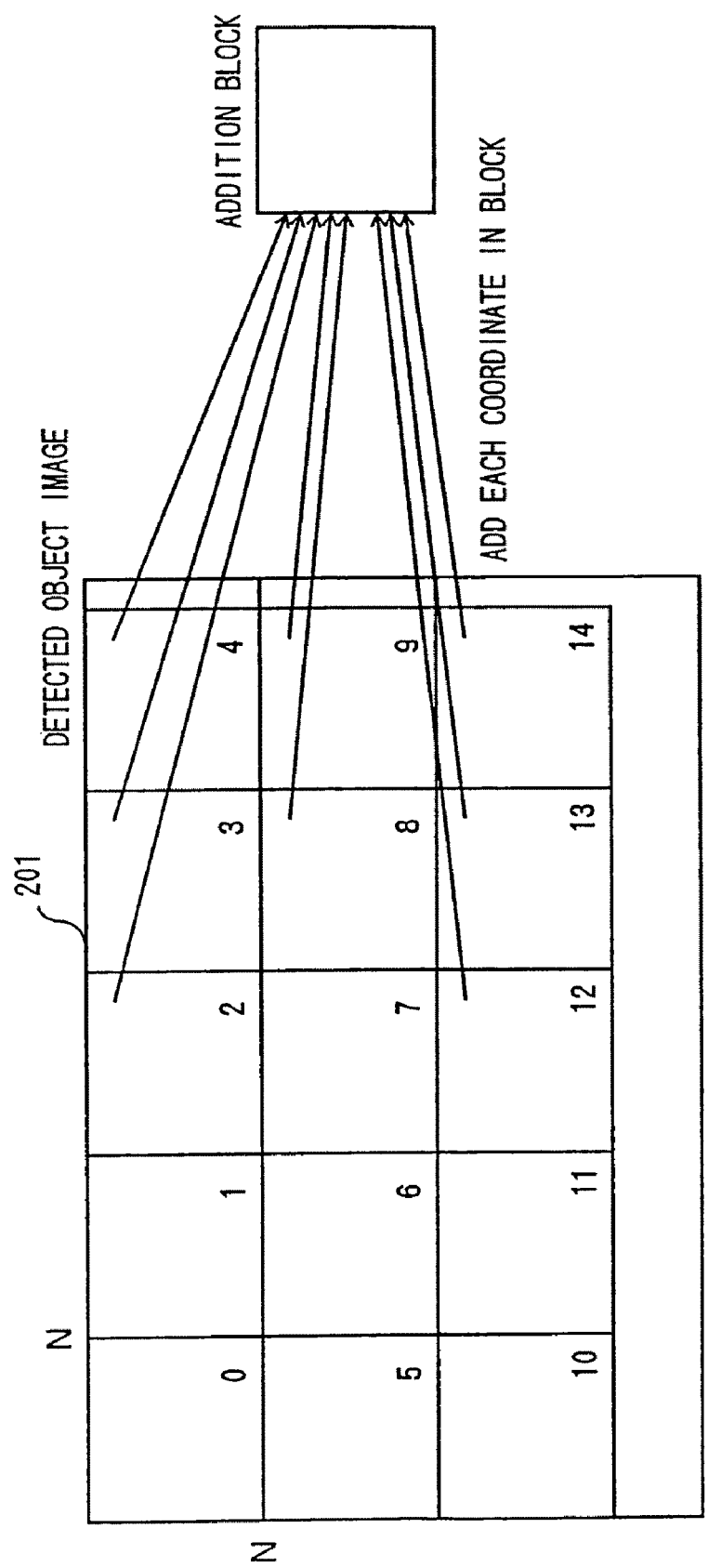
FIG. 65 is a diagram describing the block division of the block generation portion according to the ninth embodiment of the present invention.

Step 910) The block generation portion 900 inputs the detected object image 201 and the offset candidate information 204 and, in the block division portion 910, divides the detected object image 201 from the top left into T blocks of N×N size, as shown in FIG. 65.

Step 920) Next, the block addition portion 920 adds all of these blocks and generates the addition block 902. When a block is expressed as a formula $B_{ij}^{(t)}:t\text{'th block}(0<=i<N, 0<=j<N, 0<=t<T)$, the addition block $A_{ij}$ (0<=i<N, 0<=j<N) is obtained by $$A_{ij} = \sum_{t=0}^{T} B_{ij}^{(t)} \quad (0 \le i < N, 0 \le j < N)$$

The following is a description of the process of the cyclic shift portion 930 in the block generation portion 900 of the position marker detection portion 230 in the present embodiment.

Figure 66:
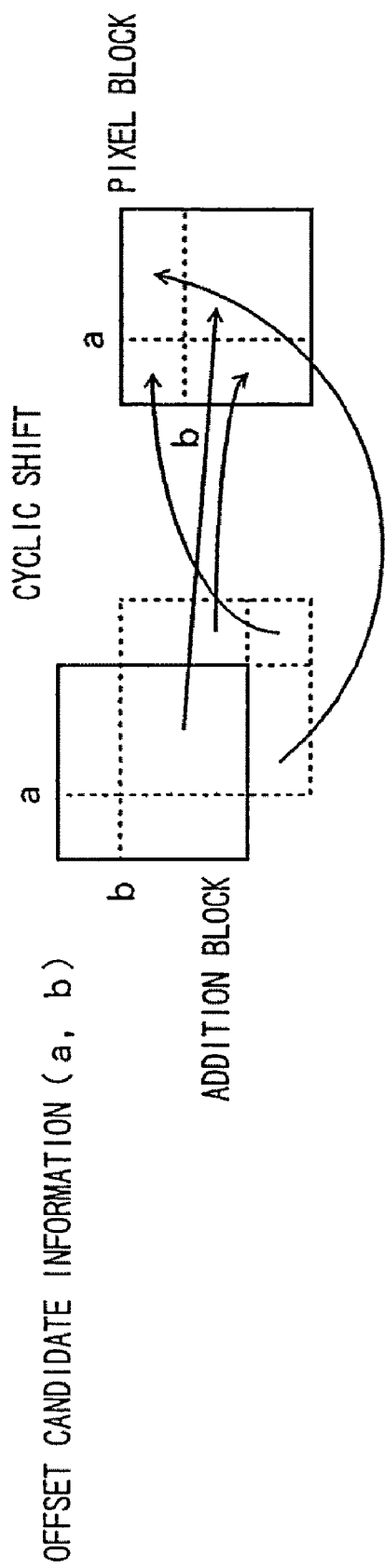
FIG. 66 is a diagram describing the process of a cyclic shift portion of the block generation portion according to the ninth embodiment of the present invention.

FIG. 66 is a diagram describing the process of the cyclic shift portion of the block generation portion according to the ninth embodiment of the present invention.

As shown in the figure, the cyclic shift portion 930 uses the offset candidate information 204 as the basis for cyclic shift of the addition block 902 and generates the pixel block 205.

The pixel block 203 is output to the discrete Fourier transform portion 234. When the addition block is described $A_{ij}$: addition block (0<=i<N, 0<=j<N), the pixel block 246 obtained by cyclic shift using the offset candidate information (a, b) is obtained by $C_{ij} = A_{(i+a)\%N, (j+b)\%N}(0<=i<N, 0<=j<N)$ The following is a description of the block generation portion (not shown in the figure) of the watermark detection portion 240 in the present embodiment.

The block generation portion 241 of the watermark detection portion 240 inputs the detected object image 201 and the offset information 231 and, in the same manner as the block generation portion 900 of the position marker detection portion 230, (inputs the offset information as offset candidate information and) divides the detected object image 201 from the top left into T blocks of N×N pixels.

Then, an addition portion inside the block generation portion 241, adds all of these blocks and generates an addition block. Then, in a cyclic shift portion of the block generation portion 241, the offset information is used as the basis for cyclic shift of the addition block to generate the pixel block 246, which is output to the discrete Fourier transform portion 242.

The watermark detection in the present embodiment has a necessary minimum size of N×N pixels for the detected object image and therefore enables detection from a detected object image much smaller than in the eighth embodiment.

Furthermore, when compared to the eighth embodiment, the number of divided blocks T is larger and so, when there is detection, the influence of the original image is lessened and the watermark pattern is emphasized so that it is possible to perform detect at a higher accuracy than with the eighth embodiment.

Also, since adding the blocks means that the influence of the original image is lessened when there is detection and that the watermark pattern is emphasized, it is possible to perform detection at higher accuracy than with the third embodiment.

In addition, when compared to the third embodiment, the amount of processing required for detect increases by the amount required to generate the addition block, but when compared to the amount of processing for portions of the detection processing, is so small that it can be ignored. In addition, when compared to detection such as in the sixth embodiment which performs detection for one block at a time, it is possible to perform processing that is several times faster.

Tenth Embodiment

The following is a description of a tenth embodiment of the position marker detection portion 230. Portions not described in the following are the same as the previously described fourth embodiment.

In the present embodiment, the position marker detection portion 230 divides the detected object image into blocks and, when it does, a block at an edge of the detected object image may have an empty portion. In this case, a mean value is determined for pixel values of a portion of the block including the detected object image, and the empty portion of the block is filled with the mean value. The present embodiment therefore differs from the ninth embodiment in this respect.

Figure 67:
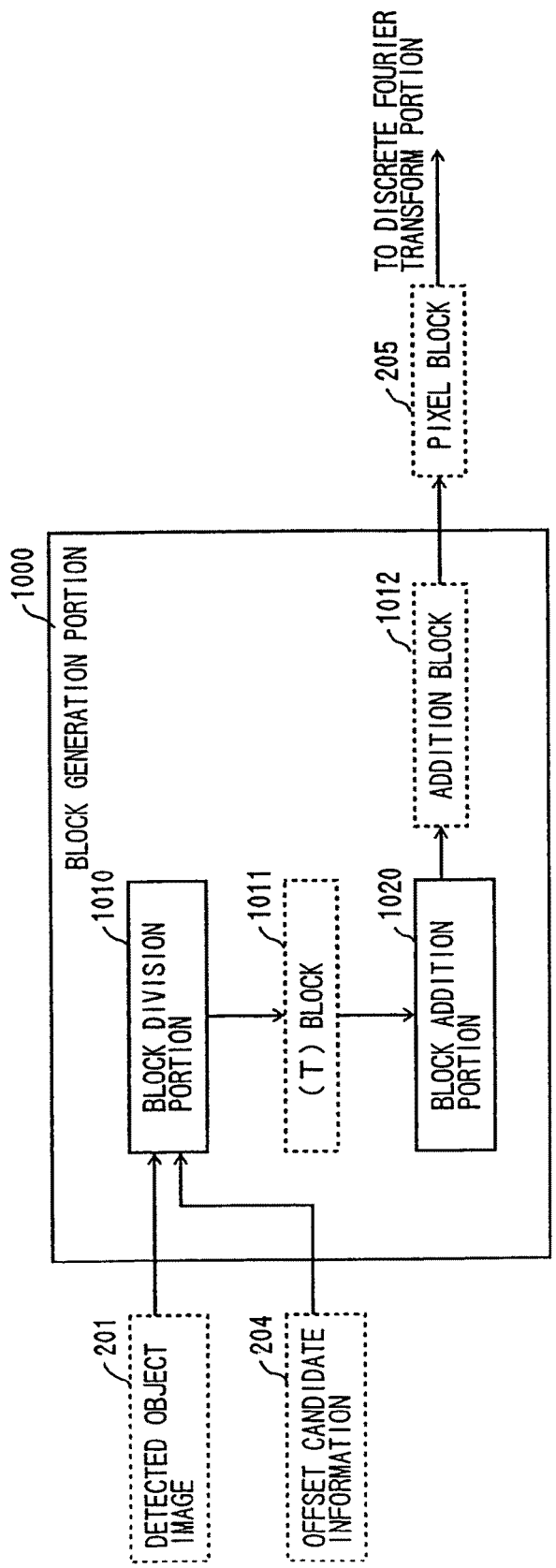
FIG. 67 is a diagram showing the configuration of a block generation portion of a position marker detection portion according to a tenth embodiment of the present invention.

FIG. 67 is diagram showing the configuration of the block generation portion of the position marker detection portion according to the tenth embodiment of the present invention. The block generation portion 1000 comprises a block division portion 1010, a block addition portion 1020 and a cyclic shift portion 1030.

Figure 68:
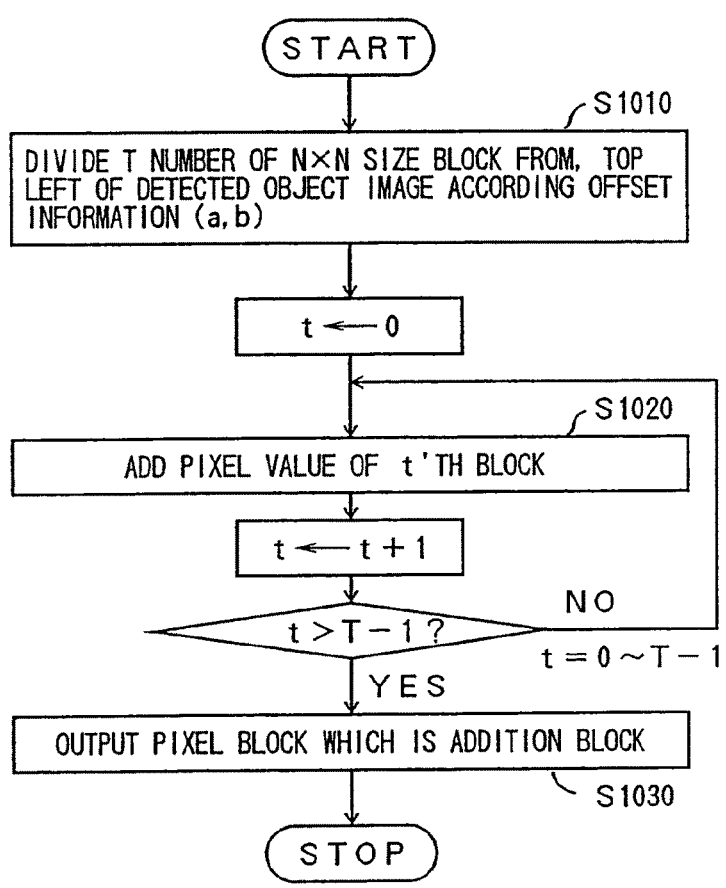
FIG. 68 is a flow chart showing the process of the block generation portion of the tenth embodiment of the present invention.

FIG. 68 is a flow chart showing the process of the block generation portion of the position marker detection portion of the tenth embodiment of the present invention.

Figure 69:
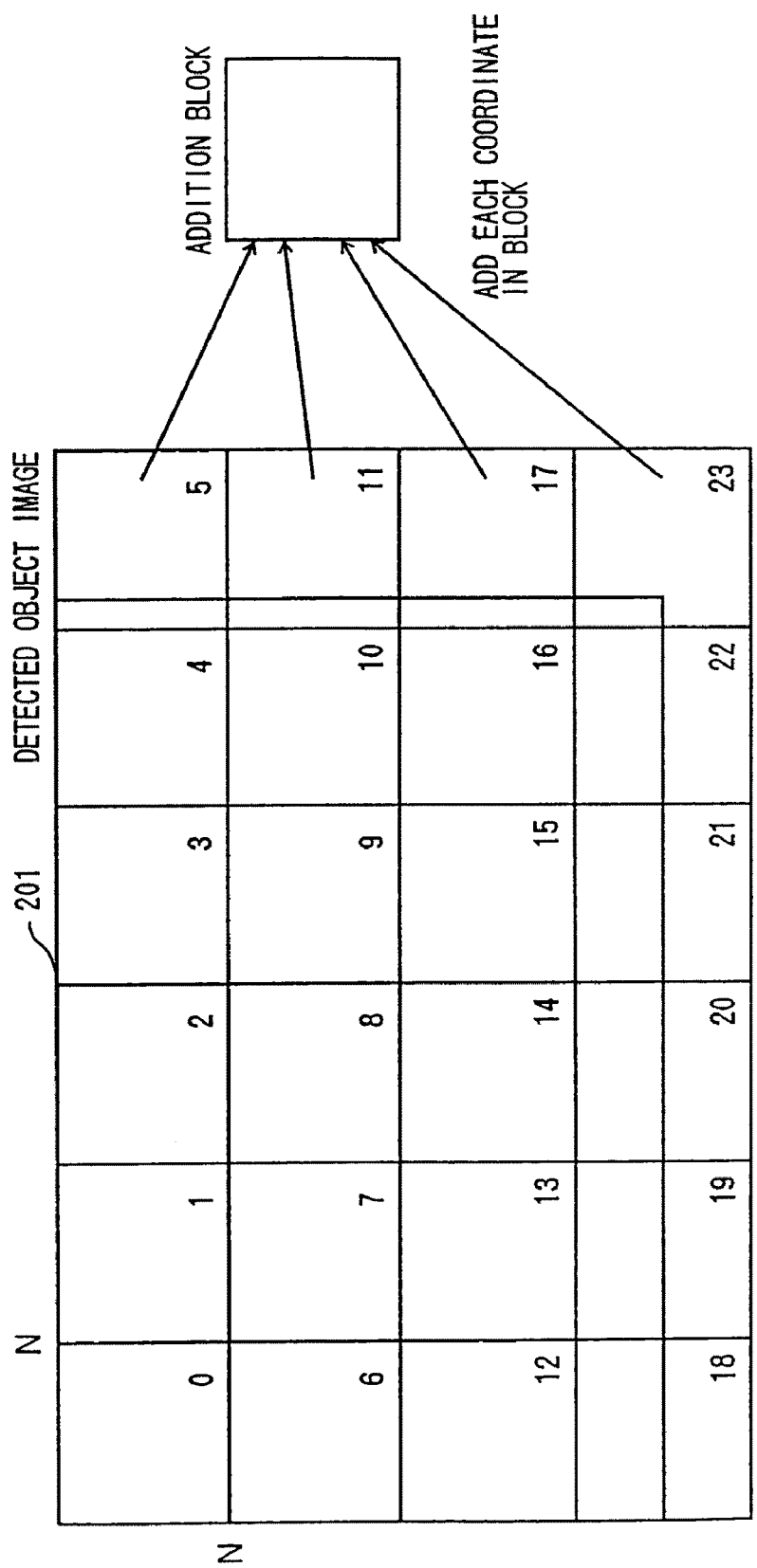
FIG. 69 is a diagram describing the process of the block generation portion of the tenth embodiment of the present invention.
Figure 70:
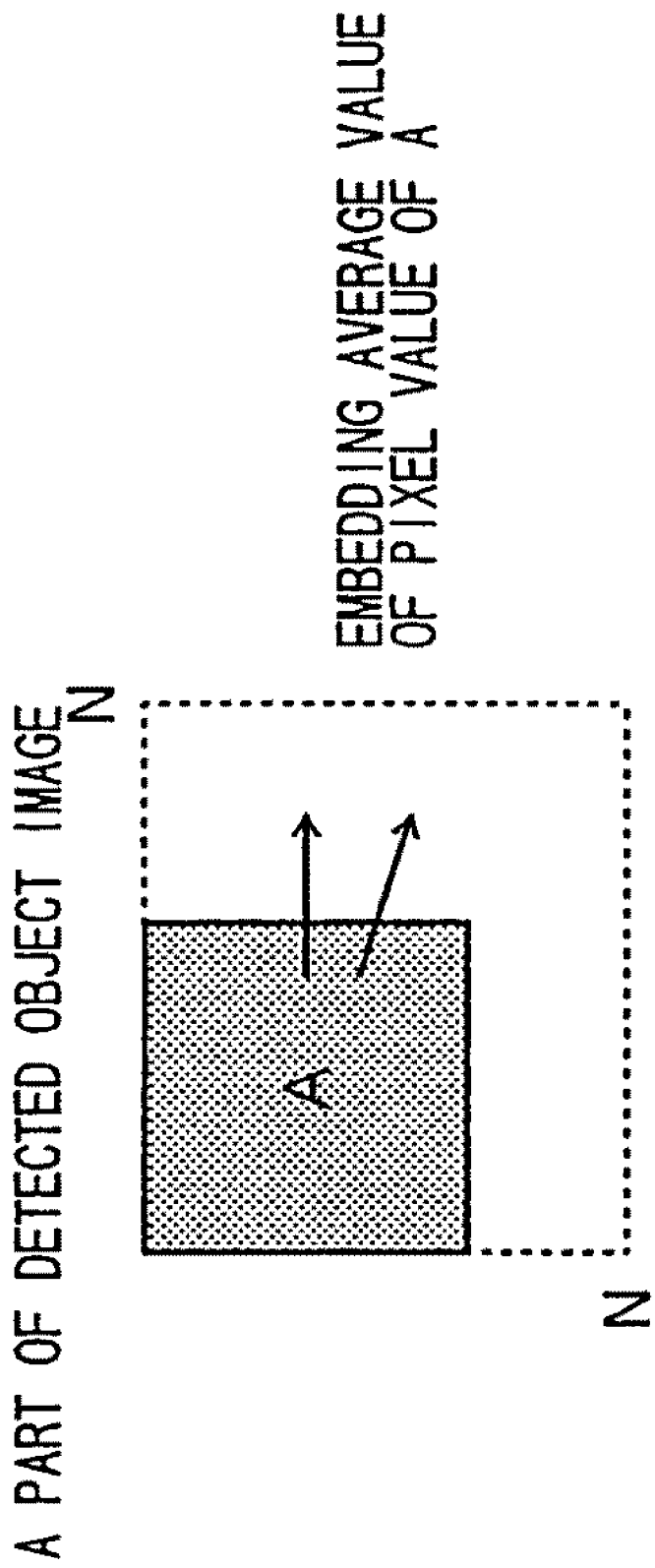
FIG. 70 is a diagram showing division processing of the block generation portion according to the tenth embodiment of the present invention.

Step 1010) The block generation portion 1000 inputs the detected object image 201 and the offset candidate information 204 and as shown in FIG. 69, the block division portion 1010 divides the detected object image 201 from the top left into T blocks of N×N pixels. When it does this, as shown in FIG. 70, an empty portion of a block at an edge of the detected object image is filled with a mean value of the pixel values of the portion of the block including the detected object image 201.

Step 1020) Then, in the block addition portion 1020, all of these blocks are added and an addition block 1012 is generated. Expressing a block as a formula gives $B_{ij}^{(t)}$: $t$'th block ($0<=i<N, 0<=j<N, 0<=t<T$)

and the addition block $A_{ij}$ ($0<=i<N, 0<=j<N$) is obtained by $$A_{ij} = \sum_{t=0}^{T} B_{ij}^{(t)} \quad (0 \le i < N, 0 \le j < N)$$

The following is a description of the process of the cyclic shift portion 1030 in the block generation portion 1000 of the position marker detection portion 230 in the present embodiment.

Figure 71:
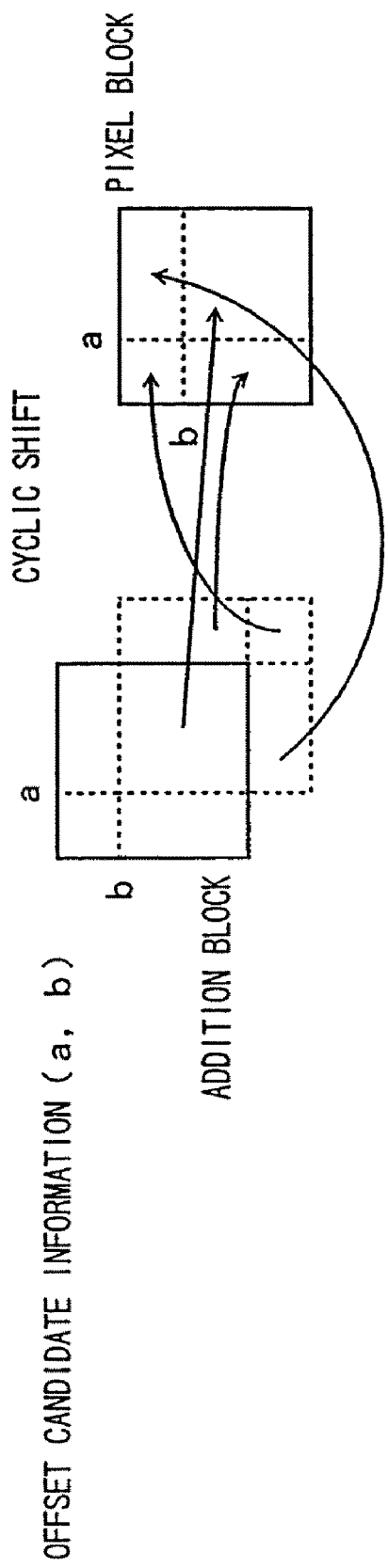
FIG. 71 is a diagram showing the process of a cyclic shift portion according to the tenth embodiment of the present invention.

FIG. 71 is a diagram showing the process of the cyclic shift portion according to the tenth embodiment of the present invention.

The cyclic shift portion 1030 uses the offset candidate information 204 as the basis for cyclic shift of the addition block 1012 and generates the pixel block 205. The pixel block 205 is output to the discrete Fourier transform portion 234. Expressing the addition block 1012 as a formula gives $A_{ij}$: addition block ($0<=i<N, 0<=j<N$) and the pixel block 205 obtained by cyclic shift using the offset candidate information (a, b) is obtained by $C_{ij} = A_{(i+a) \% N, (j+b) \% N}$ ($0<=i<N, 0<=j<N$)

The following is a description of the block generation portion (not shown in the figure) of the watermark detection portion in the tenth embodiment of the present invention.

The block generation portion of the watermark detection portion in the tenth embodiment of the present invention inputs the detected object image and the offset information, and in the same manner as the block generation portion of the position marker detection portion, (inputs the offset information as the offset candidate information and), divides the detected object image from the top left into T blocks of N×N pixels.

Then, a block addition portion, adds all of the blocks to generate an addition block. Then, a cyclic shift portion uses the offset information as the basis for cyclic shift of the addition block and generates the pixel block 246 which is then output to the discrete Fourier transform portion 242.

Watermark detection in the present embodiment has an arbitrary size for a minimum necessary size of the detected object image and enables detection from a detected object image smaller than that for the ninth embodiment.

Furthermore, the number of divided blocks T is smaller than for the ninth embodiment and so the influence of the original image is lessened when there is detection, and the watermark pattern is more emphasized, so that it is possible to perform detection at a higher accuracy than for the ninth embodiment.

In addition, since the addition of the blocks reduces the influence of the original image when there is detection and emphasizes the watermark pattern, it is possible to perform detection at a higher accuracy than for the fourth embodiment.

In addition, when compared to the fourth embodiment, the amount of processing required for the watermark detection increases by the amount needed to generate the addition block, but when compared to the amount of processing for other portions of the detection processing, it is small enough to be ignored. Furthermore, it is also possible to perform processing that is faster in proportion to the number of blocks, when compared to the seventh embodiment that performs detection for one block at a time.

Eleventh Embodiment

The following is a description of a watermark detection apparatus according to an eleventh embodiment of the present invention.

The watermark detection apparatus according to the present embodiment is an apparatus for detecting an embedded watermark from an image resulting from processing (such as partial cutting, irreversible compression or the like) being applied to an embedding obtained using the method of the first embodiment, described above.

Figure 72:
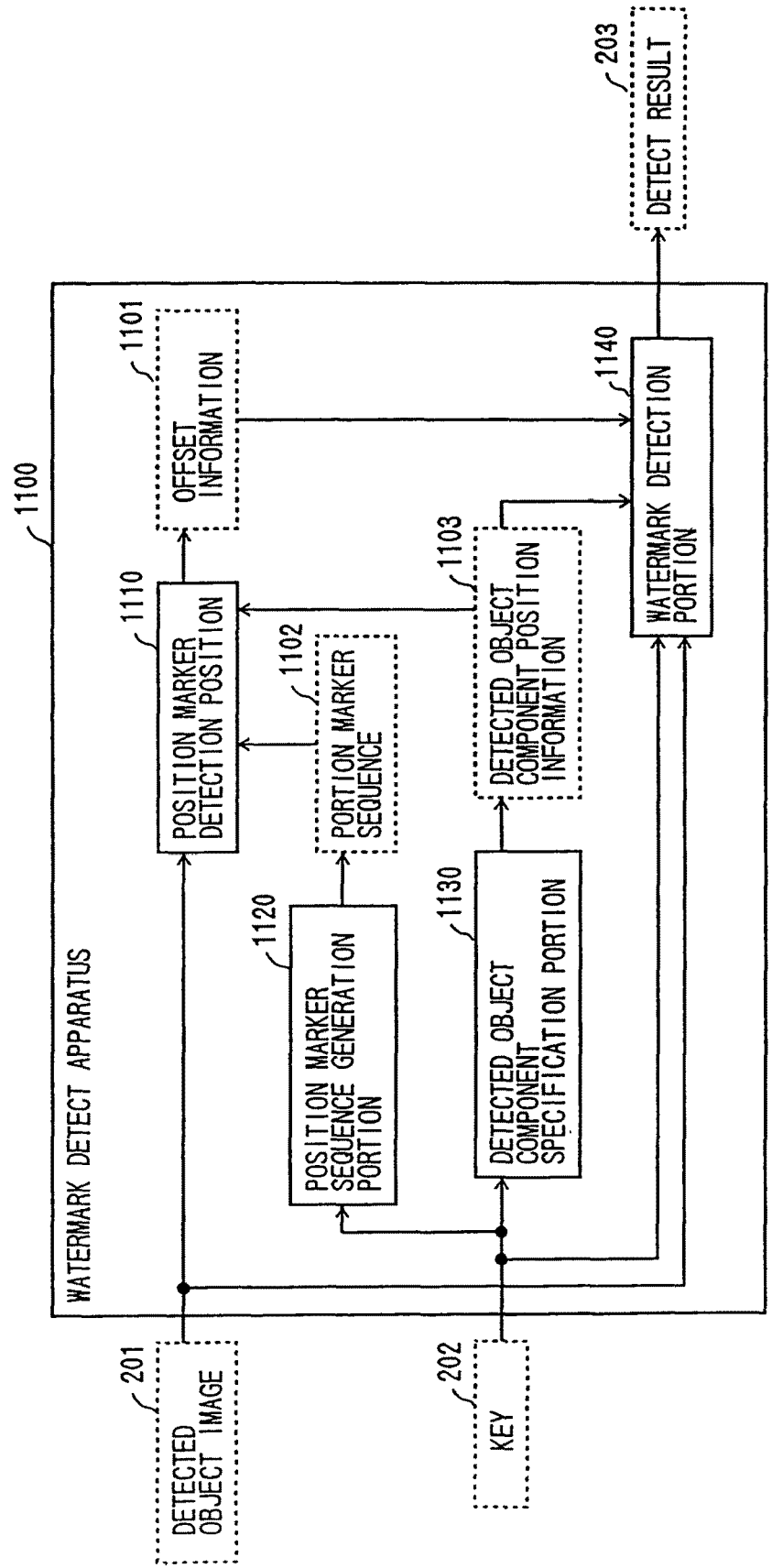
FIG. 72 is a diagram showing the configuration of a watermark detection apparatus according to a an eleventh embodiment of the present invention.

FIG. 72 is a diagram showing the configuration of the watermark detection apparatus according to the eleventh embodiment of the present invention. The watermark detection apparatus 1100 shown in the figure comprises a position marker detection portion 1110, a position marker sequence generating portion 1120, a detected object component specification portion 1130 and a watermark detection portion 1140.

Figure 73:
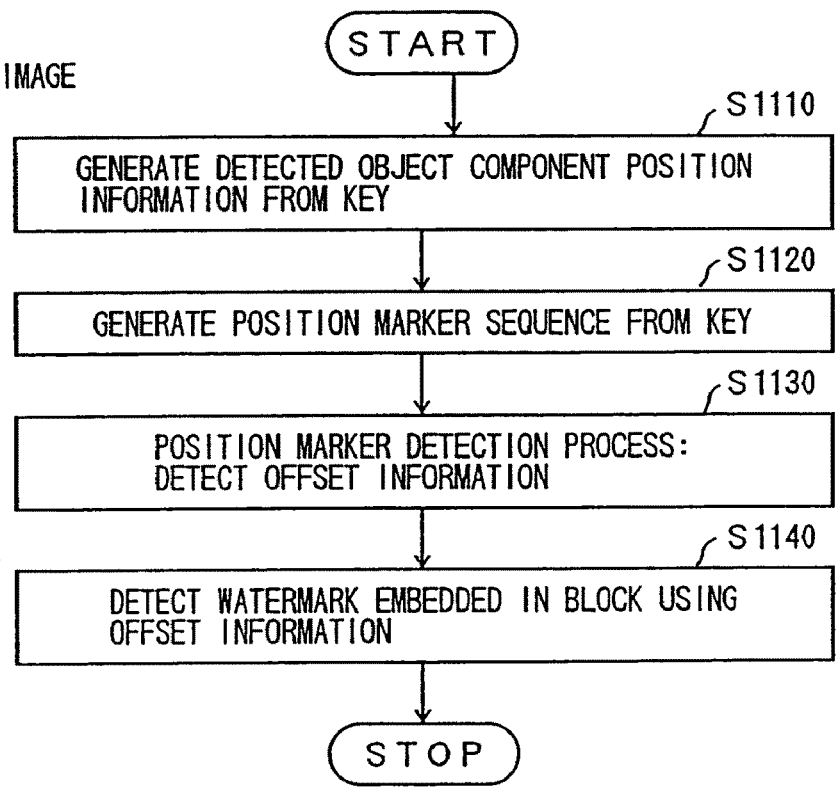
FIG. 73 is a diagram showing the process of an watermark detection apparatus according to the eleventh embodiment of the present invention.

FIG. 73 is a diagram showing the configuration of the watermark detection apparatus according to the eleventh embodiment of the present invention.

Step 1110) The watermark detection apparatus 1100 inputs the detected object image 201 and the key 202 used when there was embedding. First, in the detected object component specification portion 1130 of the information detection apparatus 1100, a method the same as that used by the embedding object component specification portion 130 in the previously described first embodiment is used to generate detected object component position information 1103 from the key 202, and then send this detected object component position information 1103 to the position marker detection portion 1110 and the watermark detection portion 1140.

Step 1120) The position marker sequence generating portion 1120 generates a position marker sequence 1102 from the key 202 and sends the position marker sequence 1102 to the position marker detection portion 1110.

Step 1130) The position marker detection portion 1110 cuts pixel blocks of N×N size (where N is the size of the embedded watermark pattern in the first embodiment) from the top left of the detected object image 201 and outputs offset information 1101 which indicates the degree to which the start point of the embedded watermark pattern is displaced from the start point of the cut pixel block, and sends it to the watermark detection portion 1140.

Step 1140) The watermark detection portion 1140 inputs the detected object image 201, the key 202, the detected object component position information 1103 and the offset information 1101, cuts N×N size pixel blocks from the top left of the detected object image 201, and uses the offset information 1101, the key 202 and the detected object component position information 1103 to detect the watermark embedded in the pixel block and output the detection result 203.

The following is a description of the detected object component specification portion 1130 in the present embodiment.

Figure 74:
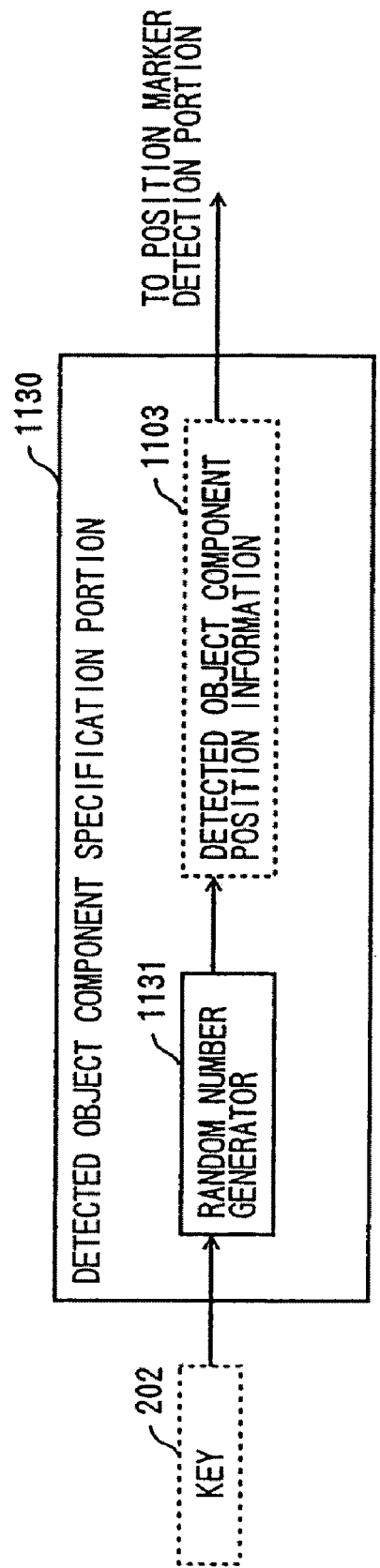
FIG. 74 is a diagram showing the configuration of a detected object component specification portion according to an eleventh embodiment of the present invention.
Figure 75:
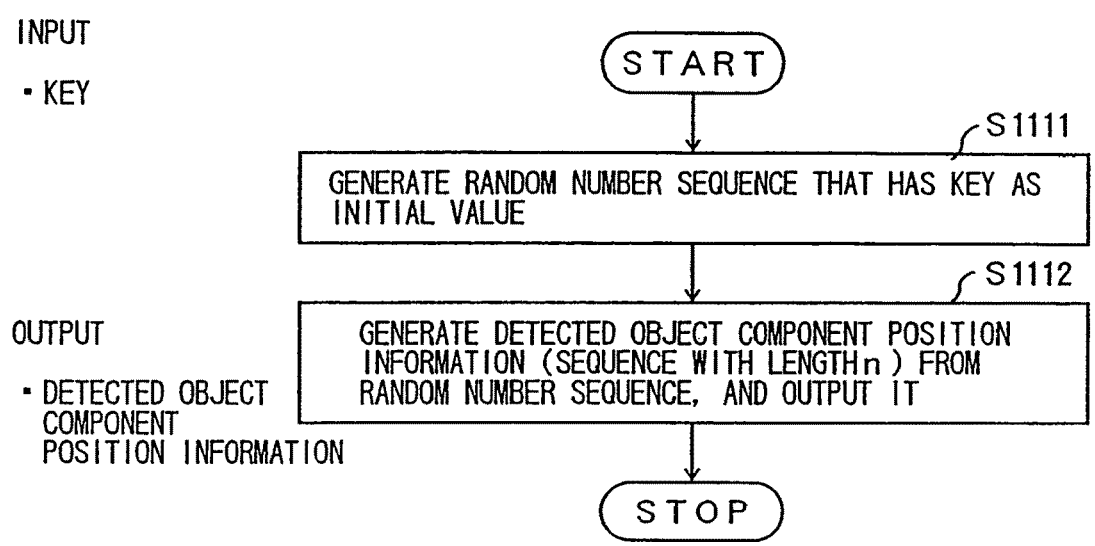
FIG. 75 is a flow chart shoring the process of the detected object component specification portion according to the eleventh embodiment of the present invention.

FIG. 74 is a diagram showing the configuration of the detected object component specification portion according to the eleventh embodiment of the present invention, and FIG. 75 is a flow chart showing the process of the detected object component specification portion according to the eleventh embodiment of the present invention.

Step 1111) The detected object component specification portion 1130 inputs the key 202 and uses a random number generator 1131 to generate a random number sequence that has the key 202 as an initial value.

Step 1112) Furthermore, the detected object component specification portion 1130 uses the generated random number sequence as the basis for generating the detected object component position information 1103 which is a sequence having the same length as the length n of the embedding sequence used in the first embodiment. The detected object component position information 1103 is configured as follows.

$Lk=(xk,yk,zk)(0<=k<n)$ xk: embedding object component coefficient x-direction second degree;
yk: embedding object component coefficient y-direction second degree;
zk: flag expressing real or imaginary for the embedding object coefficient (where or not it is a real number component or an imaginary number component)

The detected object component specification portion 1130 performs exactly the same process as the embedding object component specification portion in the first embodiment. That is to say, it inputs the same key, and the embedding object component position information generated by the embedding object component specification portion of the first embodiment is exactly the same as the detected object component position information 1103 generated by the detected object component specification portion 1130 of the present embodiment. The generated detected object component position information 1103 is sent to the position marker detection portion 1110.

The following is a description of the position marker sequence generating portion 1120 in the present embodiment.

Figure 76:
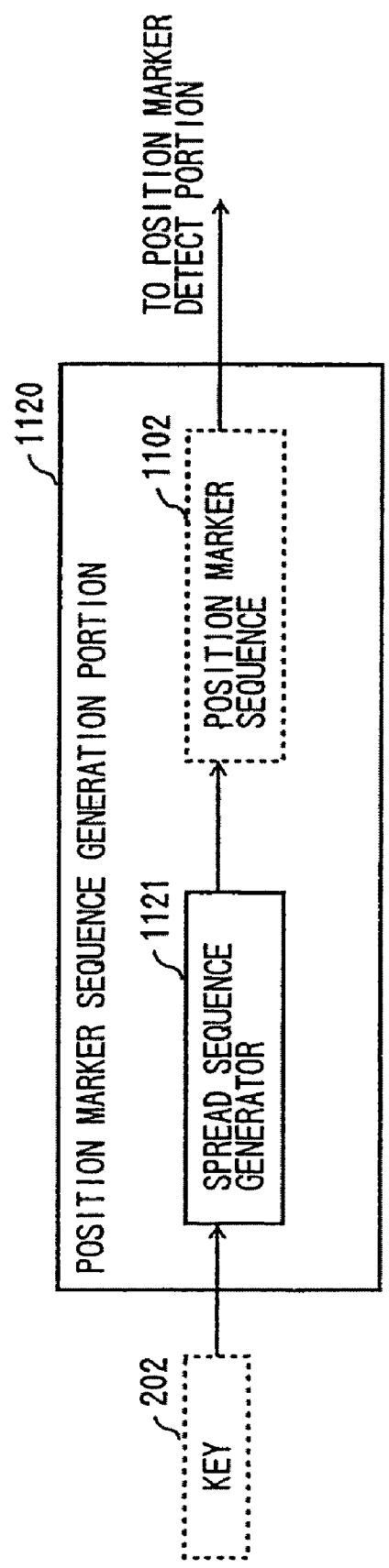
FIG. 76 is a diagram showing the configuration of a position marker sequence generation portion according to the eleventh embodiment of the present invention.
Figure 77:
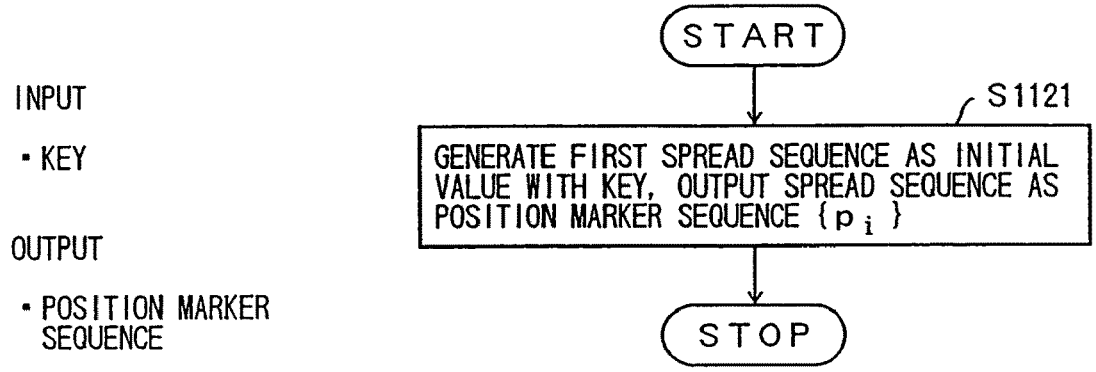
FIG. 77 is a flow chart showing the process of the position marker sequence generation portion according to the eleventh embodiment of the present invention.

FIG. 76 is diagram showing the configuration of the position marker sequence generating portion according to the eleventh embodiment of the present invention and FIG. 77 is a flow chart showing the process of the position marker sequence generating portion according to the eleventh embodiment of the present invention.

Step 1121) The position marker sequence generating portion 1120 inputs the key 202 and uses a spread sequence generator 1121 to generate a spread sequence $\{r_i^{(0)}\}$ ($0<=i<n$) of 0'th length n and having the key 202 as its initial value, and uses this spread sequence as it is as the position marker sequence $\{p_i\}$ ($0<=i<n$) ($p_i:=r_i^{(0)}$ ($0<=i<n$)). The spread sequence generator 1121 of the position marker sequence generating portion 1120 uses an process the same as the spread sequence generator 122 of the position marker sequence generating portion 120 of the first embodiment.

The following is a description of the position marker detection portion of the present embodiment.

Figure 78:
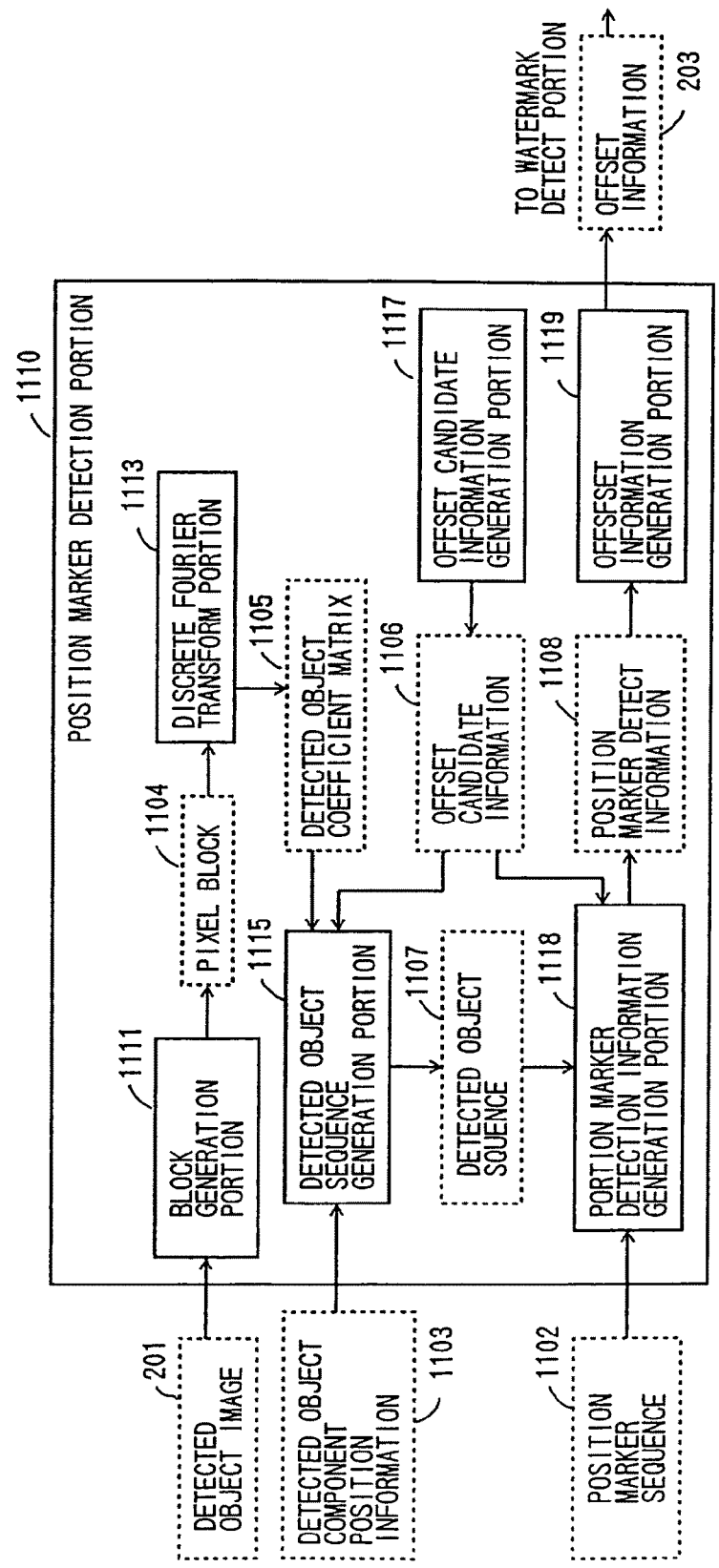
FIG. 78 is a diagram showing the configuration of a position marker detection portion according to the eleventh embodiment of the present invention.

FIG. 78 is a diagram showing the configuration of the position marker detection portion of the eleventh embodiment of the present invention.

The position marker detection portion 1110 shown in the figure comprises a block generating portion 1111, a discrete Fourier transform portion 1113, a detected object sequence generating portion 1115, an offset candidate information generating portion 1117, a position marker detection information generating portion 1118, and an offset information generating portion 1119.

Figure 79:
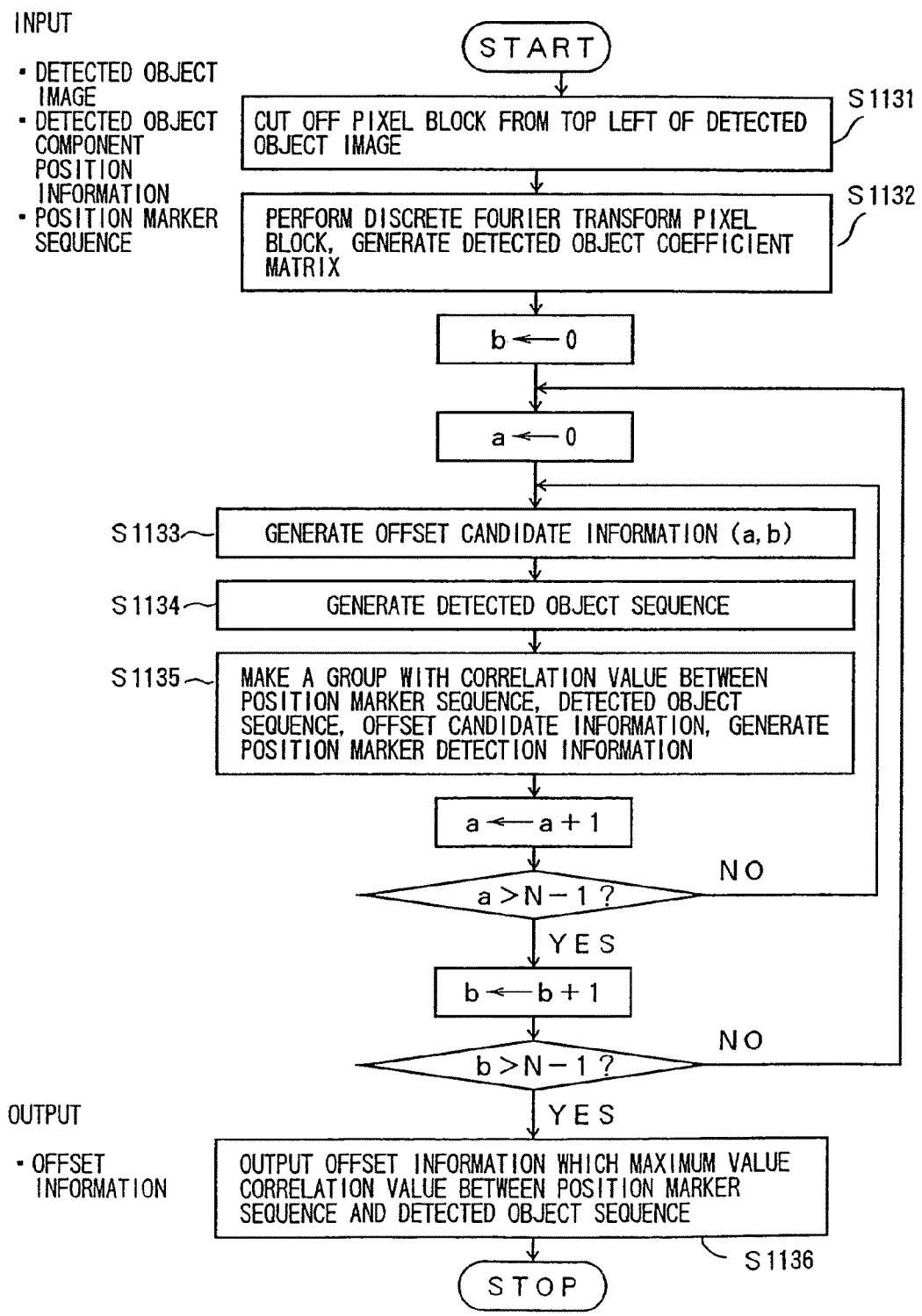
FIG. 79 is a flow chart showing the process of the position marker sequence generation portion according to the eleventh embodiment of the present invention.

FIG. 79 is a flow chart showing the process of the position marker detection portion of the eleventh embodiment of the present invention.

Step 1131) The position marker detection portion 1110 inputs the detected object image 201, the detected object component position information 1103, and the position marker sequence 1102 and first of all, in the block generating portion 1111, cuts pixel blocks of N×N size from the top left of the detected object image 201.

Step 1132) Next, the discrete Fourier transform portion 1113 performs a discrete Fourier transform on the pixel block 1104 and generates a detected object coefficient matrix 1105.

Step 1133) Next, the offset candidate information generating portion 1117 successively generates offset candidate information (a, b) for (0, 0) to (N−1, N−1).

Figure 80:
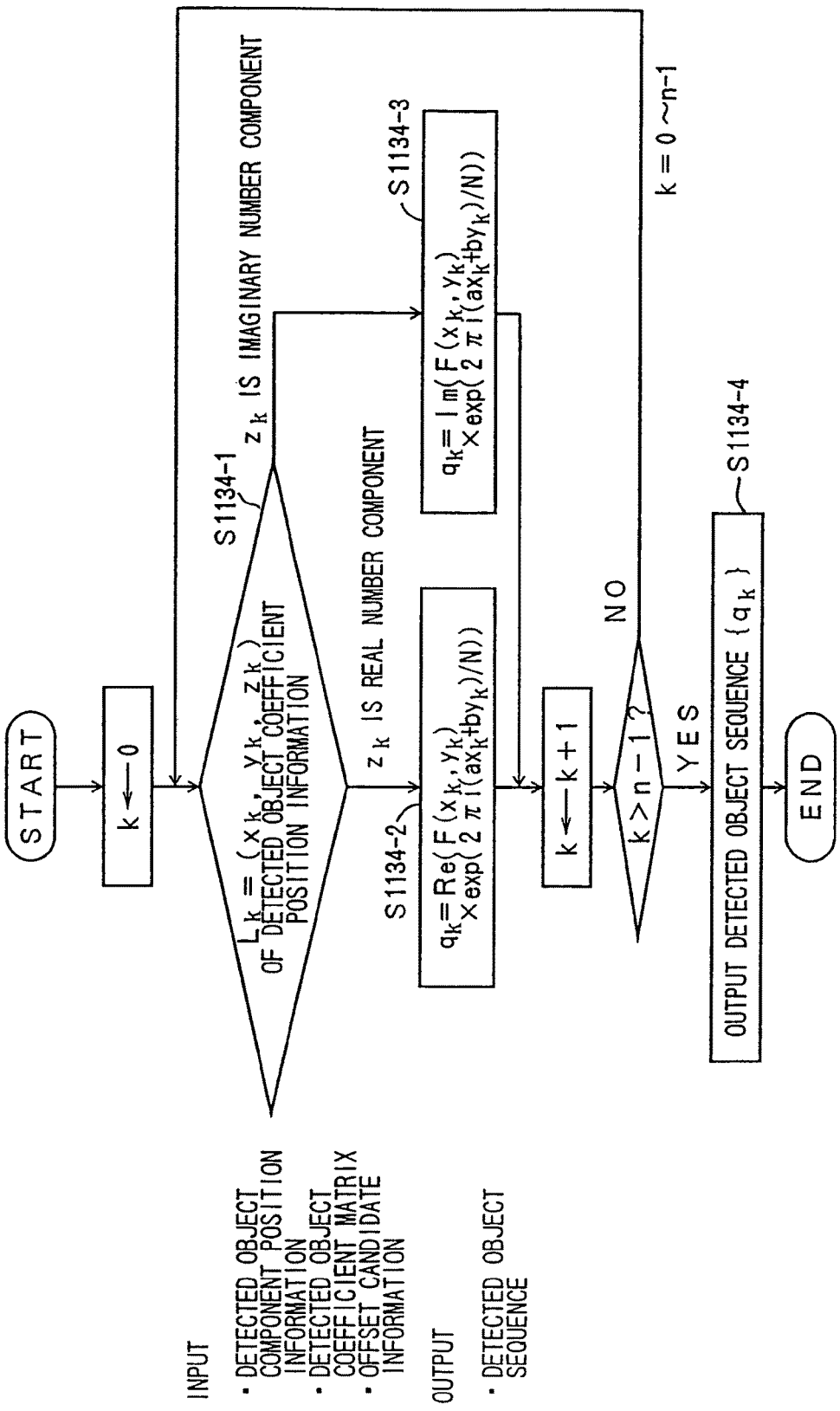
FIG. 80 is a flow chart showing the process of the detection object sequence generation of the position marker detection portion according to the eleventh embodiment of the present invention.

Step 1134) Next, the processing for the detected object sequence generating portion 1115 to the position marker detection information generating portion 1118 is performed for each of the offset candidate information 1106. The detected object sequence generating portion 1115 inputs the detected object component position information 1103, the detected object coefficient matrix 1105 and the offset candidate information 1106 and generates a detected object sequence 1107 as follows. FIG. 80 is a flow chart showing the process of the detected object sequence generating portion of the position marker detection portion of the eleventh embodiment of the present invention.

Step 1134-1) The detected object sequence generating portion 1115 expresses the detected object coefficient matrix 1105 as F(u, v) (0<=u<N, 0<=v<N), the detected object component position information 1103 as L k=(x k,yk,zk) (0<=k<n), the offset candidate information 1106 as (a, b) and the detected object sequence 1107 as {q k} (0<=k<n).

When zk is a value that expresses a real number component, there is a shift to Step 1134-2 and when z k is a value that express an imaginary number component, there is a shift to Step 1134-3.

Step 1134-2) Processing for the real number component of $$q_k := F(x_k, y_k) \times e^{\frac{a \cdot x1 + b \cdot yk}{N}}$$

is performed for k=0 &tilde& n−1

Step 1134-3) Processing for the imaginary number component of $$q_k := F(x_k, y_k) \times e^{\frac{a \cdot x1 + b \cdot yk}{N}}$$

is performed for k=0 &tilde& n−1.

Step 1134-4) The detected object sequence {q k} is output.

Step 1135) Next, the position marker detection information generating portion 1118 uses the following formula to determine the value of the correlation between the position marker sequence 1102 and the detected object sequence 1107, group it with the offset candidate information 1106 and output it as the position marker detection information $corr_{ab}$.

$$corr_{ab} := \frac{\sum_{i=0}^{n-1}(p_i \cdot q_i)}{\sqrt{\sum_{i=0}^{n-1} p_i^2 \sum_{i=0}^{n-1} q_i^2}}$$

The processing from the detected object sequence generating portion 1115 and the position marker detection information generating portion 1118 is repeated until the offset candidate information (a, b) has passed from (0, 0) &tilde& (N−1, N−1), and all of the position marker detection information 1108 is sent to the offset information generating portion 1119.

Step 1136) The offset information generating portion 1119 takes the offset candidate information (a, b) for that item of input position marker detection information 1108 for which the value of the correlation between the position marker sequence 1102 and the detected object sequence 1109 is greatest, outputs it as the offset information 1101 and sends it to the watermark detection portion 1140.

The offset information 1101 output from the position marker detection portion 1110 indicates the degree to which the start point of the watermark pattern was offset from the top left of the detected object image 201 when it was embedded.

The following is a description of the watermark detection portion 1140 in the present embodiment.

Figure 81:
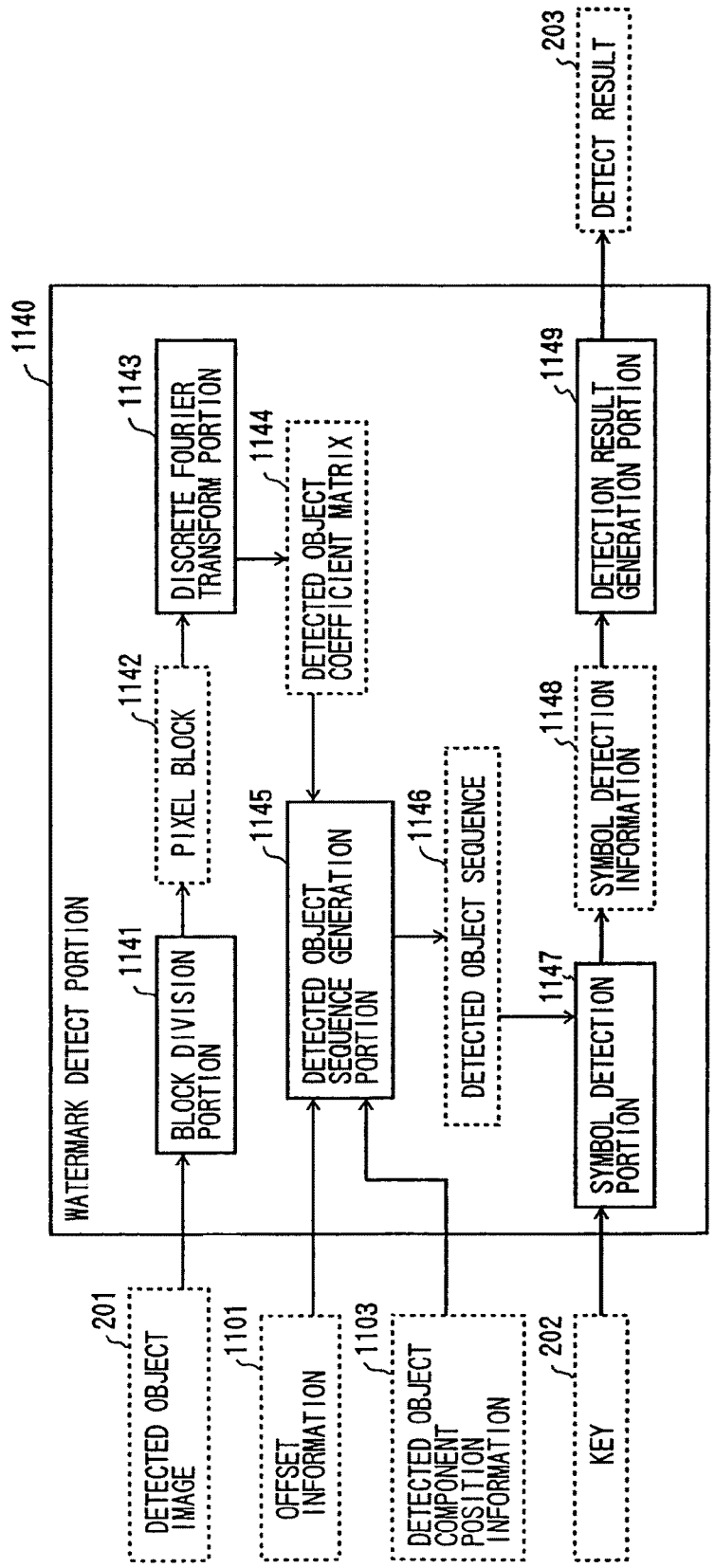
FIG. 81 is a diagram showing the configuration of a watermark detection portion according to the eleventh embodiment of the present invention.

FIG. 81 is a diagram showing the configuration of the watermark detection portion according to the eleventh embodiment of the invention. The watermark detection portion 1140 in the figure comprises a block generating portion 1141, a discrete Fourier transform portion 1143, a detected object sequence generating portion 1145, a symbol detection portion 1147 and a detection result generating portion 1149.

Figure 82:
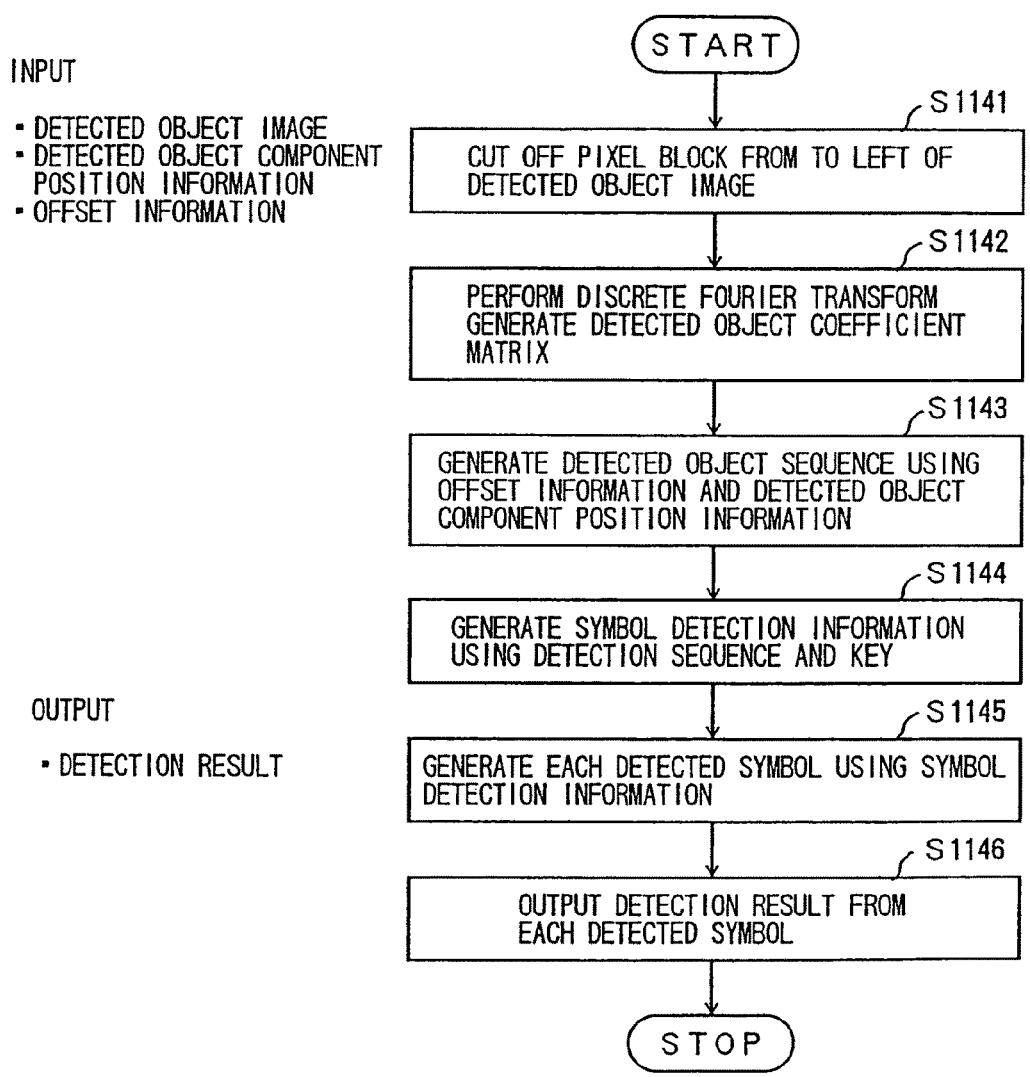
FIG. 82 is a flow chart showing the process of the watermark detection portion according to the eleventh embodiment of the present invention.

FIG. 82 is a flow chart showing the process of the watermark detection portion according to the eleventh embodiment of the present invention.

Step 1141) The block generating portion 1141 inputs the detected object image 201, detected object component position information 1103, offset information 1101 and key 202 and, first of all, in the block generating portion 1141, cuts pixel blocks 1142 of a size N×N from the top left of the detected object image 201, and sends the pixel blocks 1142 to the discrete Fourier transform portion 1143.

Step 1142) The discrete Fourier transform portion 1143 performs a discrete Fourier transform on the pixel blocks 1142 and generates are detected object coefficient matrix 1144 which is then sent to the detected object sequence generating portion 1145.

Step 1143) The detected object sequence generating portion 1145 obtains a detected object sequence 1146 (using the offset information 1101 as the offset candidate information) by a processing the same as that of the detected object sequence generating portion 1115 of the position marker detection portion 1110, and sends the detected object sequence 1146 to the symbol detection portion 1147.

Step 1144) The symbol detection portion 1147 determines the value of the correlation between the detected object sequence 1146 and a sequence generated from the key 202, and generates symbol detection information 1148.

Step 1145) The detection result generating portion 1149 obtains the symbol detection information 1148 and then, for each of symbol positions of the symbol detection information 1148, selects, as a detected symbol, a symbol candidate value having a maximum value of the correlation.

Step 1146) After all of the detected symbols have been determined from all of the symbol positions, a result of performing an inverse transform on the detected symbol to produce a watermark is output as the detection result 203.

The following is a description of the symbol detection portion 1147 in the present embodiment.

Figure 83:
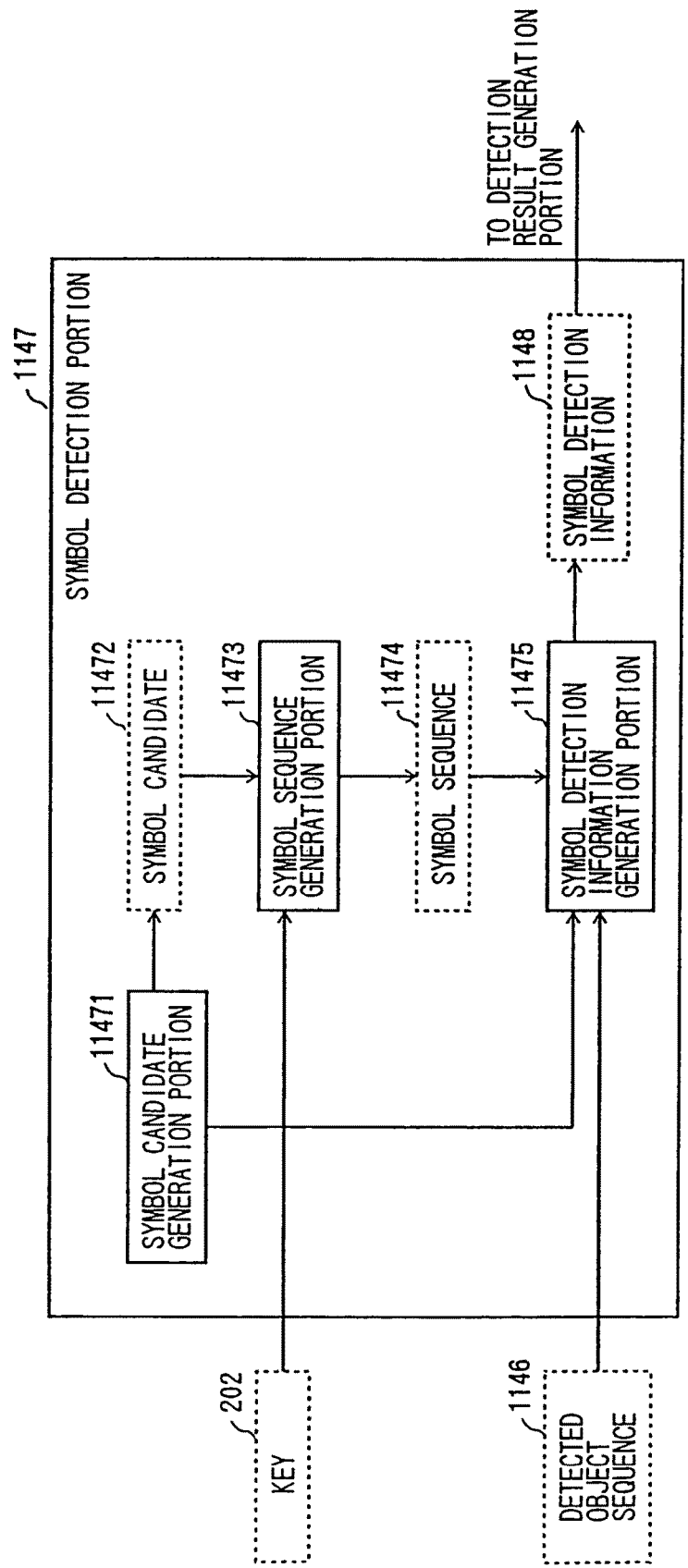
FIG. 83 is a diagram showing the configuration of a symbol detection portion according to the eleventh embodiment of the present invention.

FIG. 83 is diagram showing the configuration of the symbol detection portion according to the eleventh embodiment of the present invention. In the figure, the symbol detection portion 1147 comprises a symbol candidate generating portion 11471, a symbol sequence generating portion 11473 and a symbol detection information generating portion 11475. The symbol detection portion 1147 inputs the key 202 and the detected object sequence 1146 and for each of predetermined J symbol positions detected, generates the symbol detection information 1148 for M symbol candidates, and outputs the symbol detection information 1148 to the detection result generating portion 1149. The following is a description of the j'th ($1<=j<J$) symbol detection.

Figure 84:
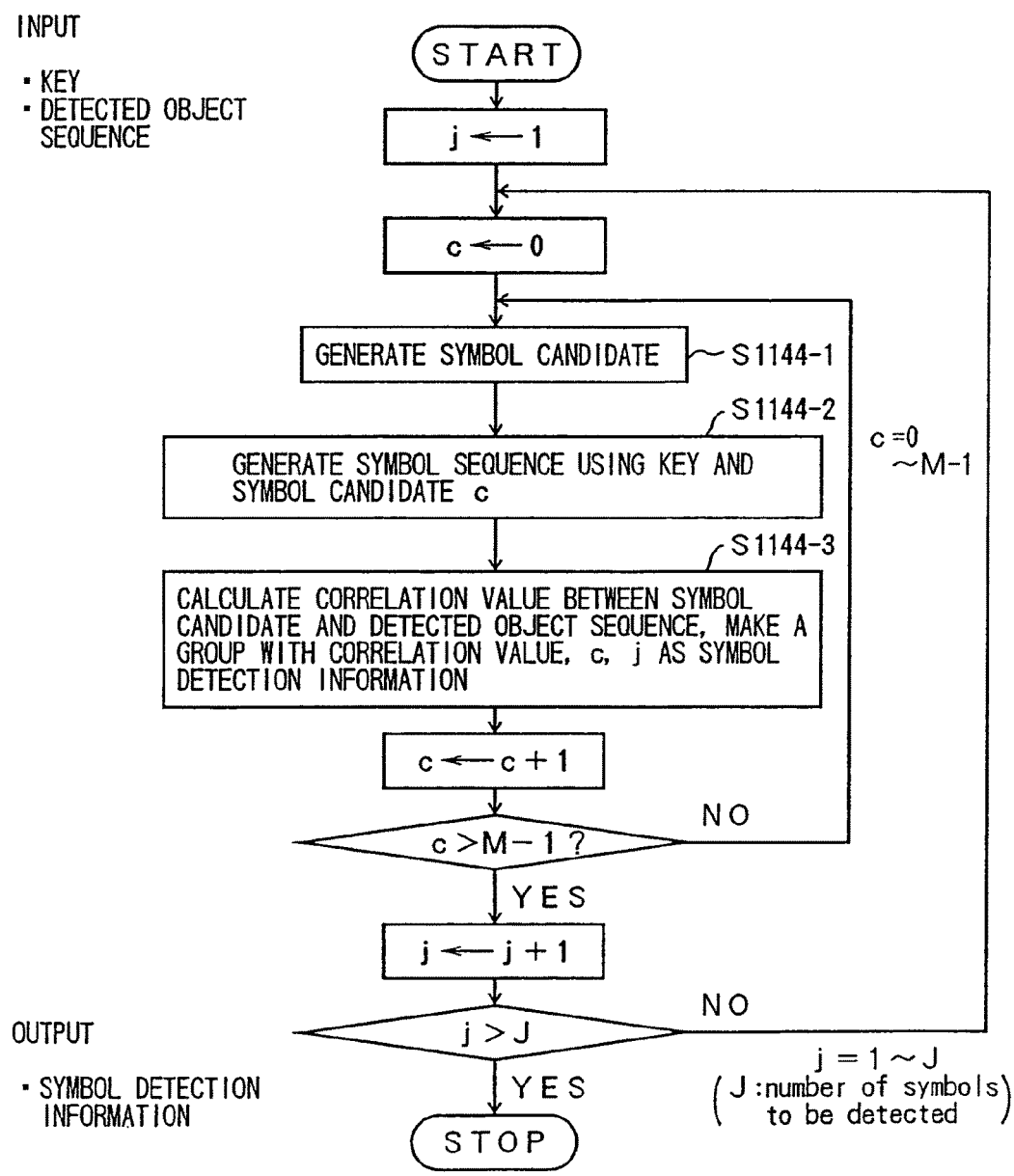
FIG. 84 is a flow chart showing the process of the symbol detection portion according to the eleventh embodiment of the present invention.

FIG. 84 is a flow chart showing the process of the symbol detection portion according to the eleventh embodiment of the present invention.

Step 1144-1) The symbol candidate generating portion 11471 successively generates symbol candidates c from 0 to M−1, and the processing from Step 1144-2 &tilde& Step 1144-3 is performed for each symbol candidate. M expresses the maximum value of the symbol value due to symbol conversion in the previously described first embodiment.

Step 1144-2) The following is a description of the symbol sequence generating portion 11473.

Figure 85:
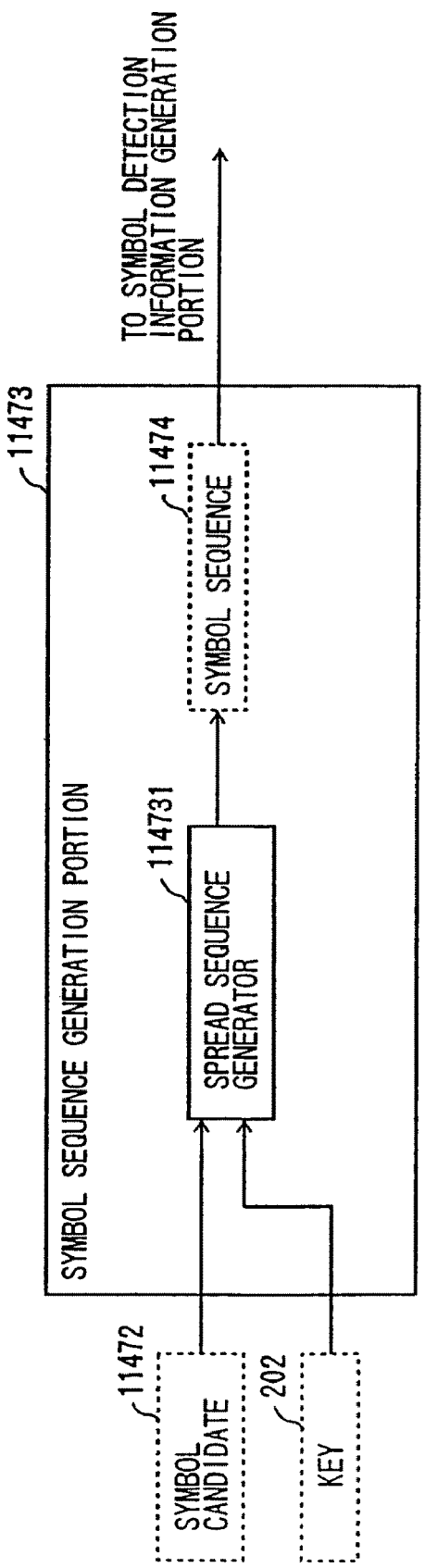
FIG. 85 is a diagram showing the configuration of the symbol generation portion according to the eleventh embodiment of the preset invention.
Figure 86:
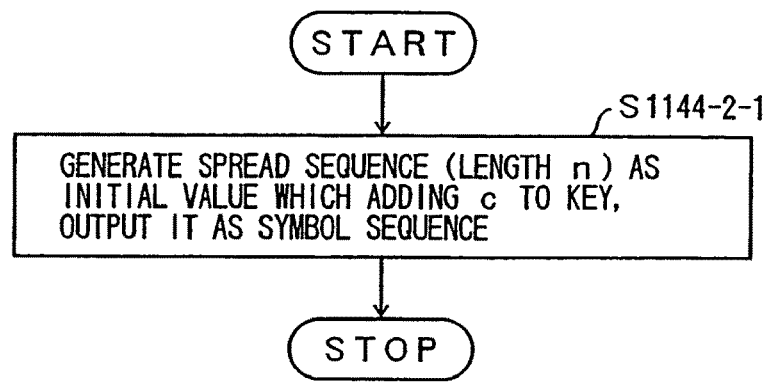
FIG. 86 is a flow chart showing the process of the symbol generation portion according to the eleventh embodiment of the present invention.

FIG. 85 is diagram showing the configuration of the symbol sequence generating portion according to the eleventh embodiment of the present invention and FIG. 86 is a flow chart showing the process of the symbol sequence generating portion according to the eleventh embodiment of the present invention.

Step 1144-2-1) The symbol sequence generating portion 11473 inputs the key 202 and the symbol candidate c, and takes a value which is the sum of c and the key 202 as an initial value for a spread sequence generator 114731 generating the j'th spread sequence $\{r_i^{(j)}\}$ of length n, which is used as it is as a symbol sequence 11474 $\{p_i^{(j)}\}$ ($0<=i<n$) ($p_i^{(j)}>:=r_i^{(j)}$ ($0<=i<n$)). The symbol sequence 11474 is sent to the symbol detection information generating portion 11475.

Step 1144-3) The symbol detection information generating portion 11475 inputs the detected object sequence 1146, the symbol sequence 11474, the symbol candidate c and the symbol position j that is currently being processed and uses the following formula to determined the value of the correlation between the symbol sequence 11474 and the detected object sequence 1146. The correlation value, the symbol candidate and the symbol position are then grouped and the symbol detection information $corr_c^{(j)}$ generated.

$$corr := \frac{\sum_{i=0}^{n-1}(p_i^{(j)} \cdot q_i)}{\sum_{i=0}^{n-1} q_i^2}$$

The symbol detection information 1148 is sent to the detection result generating portion 1149.

The following is a description of the detection result generating portion 1149.

Figure 87:
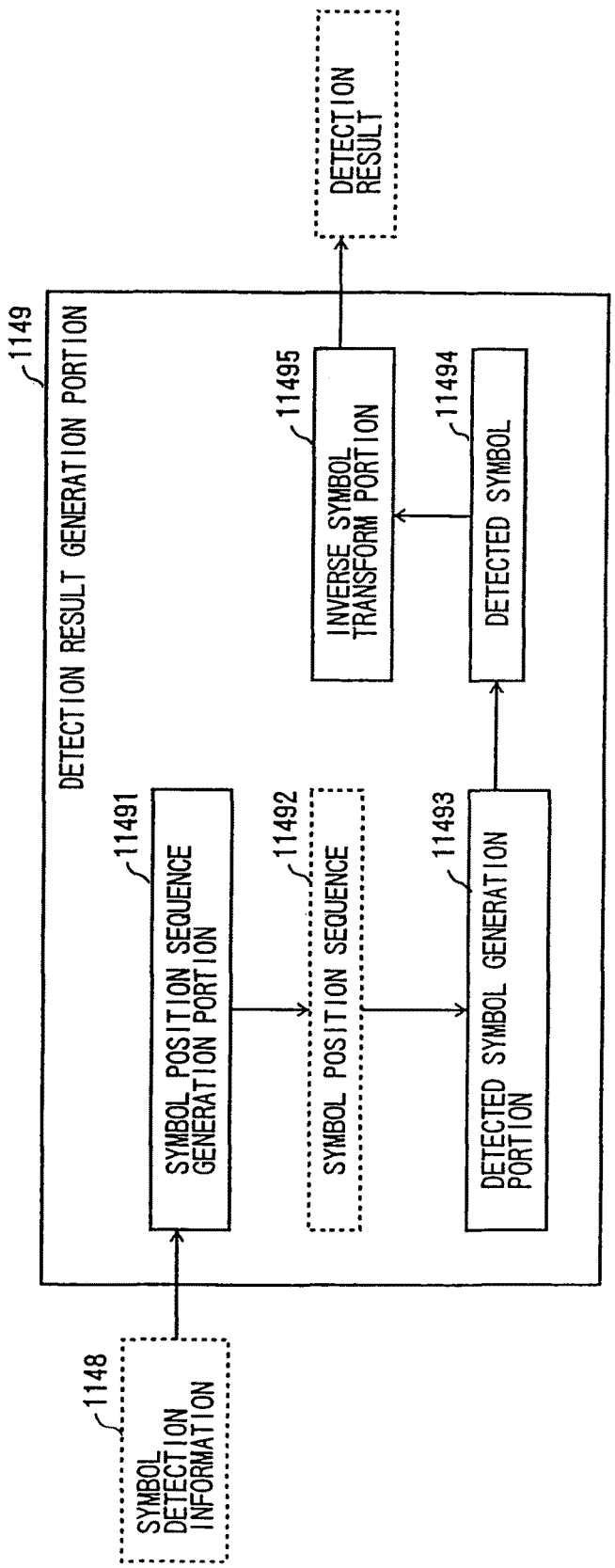
FIG. 87 is a diagram showing the configuration of a detection results generation portion according to the eleventh embodiment of the present invention.

FIG. 87 is diagram showing the configuration of the detection result generating portion according to the eleventh embodiment of the present invention. The detection result generating portion 1149 shown in the figure comprises a sequence generating portion 11491 for each of the symbol positions, a detected symbol generating portion 11493 and an inverse symbol transform portion 11495.

Figure 88:
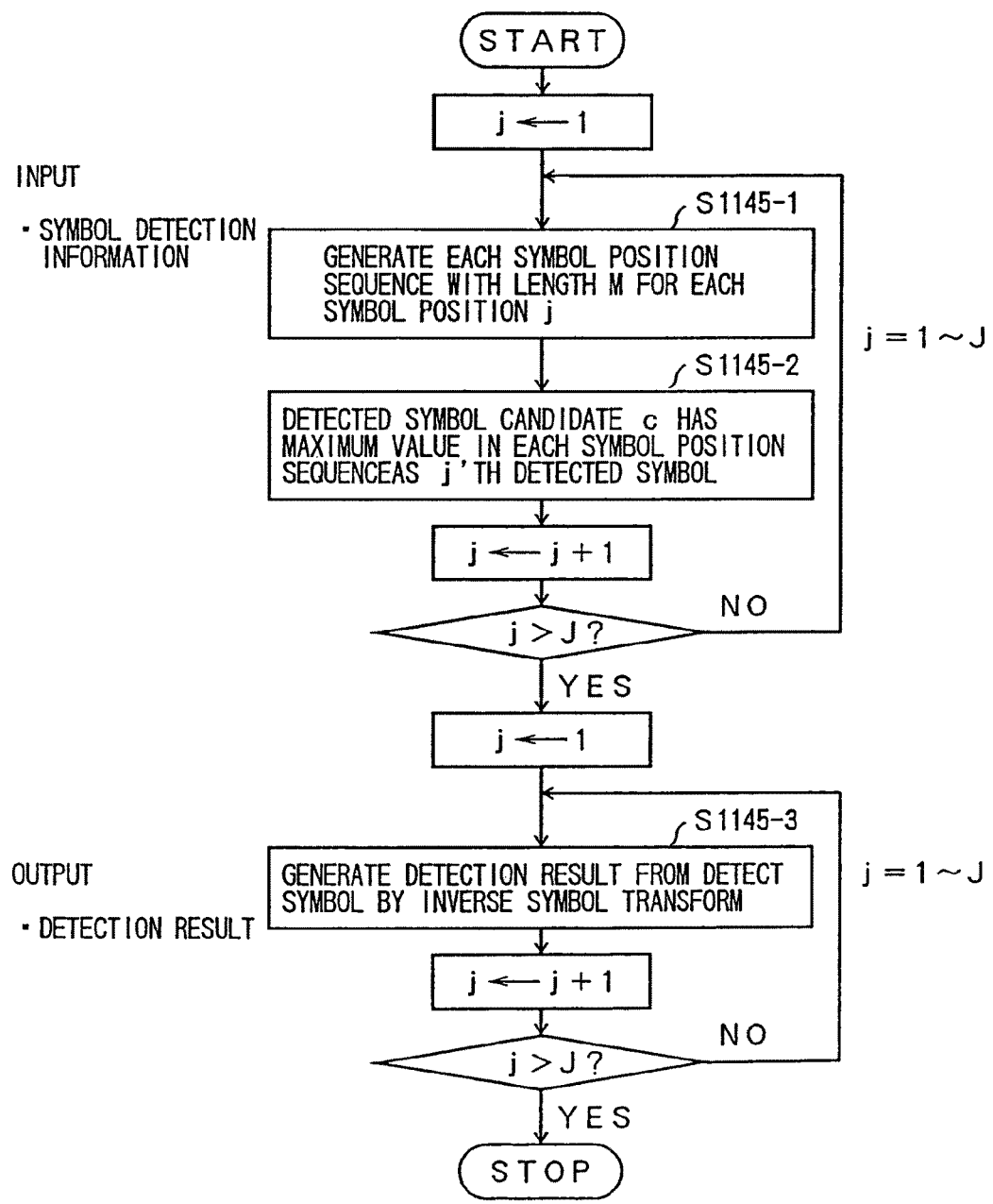
FIG. 88 is a flow chart showing the process of the detection results generation portion according to the eleventh embodiment of the present invention.

FIG. 88 is a flow chart showing the process of the detection result generating portion according to the eleventh embodiment of the present invention.

Step 1145-1) The detection result generating portion 1149 inputs the symbol detection information 1148 and first of all, in the sequence generating portions 11491 for each of the symbol positions, divides the symbol detection information 1148 for each symbol position j, and generates a symbol position sequence $corr_c^{(j)}$, ($0<=c<M$) of length M for each of the symbol positions for j=1 &tilde& J, and sends the symbol position sequence 11492 to the detected symbol generating portion 11493.

Step 1145-2) The detection symbol generating portion 11493 inputs the symbol position sequence 11492 for each of the symbol positions and finds the symbol candidate c in the sequence for each symbol position j, for which the value of the correlation is maximum, and generates a detected symbol $s_j$ ($1</=j<J$).

Step 1145-3) After all of the sj have been determined, the inverse symbol transform portion 11495 transforms from symbol expression into the original watermark expression (with, for example, the inverse transform corresponding to the transform in the first embodiment having four symbols (where the value of each symbol is from 0 &tilde& 255) being regarded as ASCII code in processing for conversion into four 8-bit characters), and generates and outputs the detection result 203.

The detection result indicates the watermark embedded in the detected object image 201.

This ends the processing for the watermark detection apparatus in the eleventh embodiment.

Watermark detection in the present embodiment involves cutting a block from the top left of the detected object image, performing a discrete Fourier transform and obtaining the detected object coefficient matrix 1105, and then multiplying a phase difference determined by the second degree of the coefficient and the offset, with the component specified by the detected object component position information 1103, and generating the detected object sequence. The aspect relating to the parallel displacement of the Fourier transform uses $$F(u, v)^{-2\pi i \frac{a \cdot u + b \cdot u}{N}} \leftarrow \rightarrow f(x-a, y-b)$$

(with <- -> expressing a Fourier transform/inverse transform). By this, the discrete Fourier transform necessary when there is detection is only applied once, and it is possible to perform processing that is faster than the detection processing of the first through the tenth embodiments. Using a computer simulation for a comparison of the processing times for a block size of N=128 gave a second embodiment to eleventh embodiment ratio of 65:1.

In addition, it is possible to perform detection when there is a partial image (of size N×N or more) cut from an arbitrary position of an embedded image embedded with a watermark according to the first embodiment.

Twelfth Embodiment

The following is a description of a twelfth embodiment, using an example of a block generating portion in the position marker detection portion. In this embodiment, the block generating portion, when the detected object image is divided into blocks, determines an average value of a portion of a block including the detected object image, and a remaining empty portion of the block is filed with the average value. In the following description, those portions that are not described are the same as the previously described eleventh embodiment.

Figure 89:
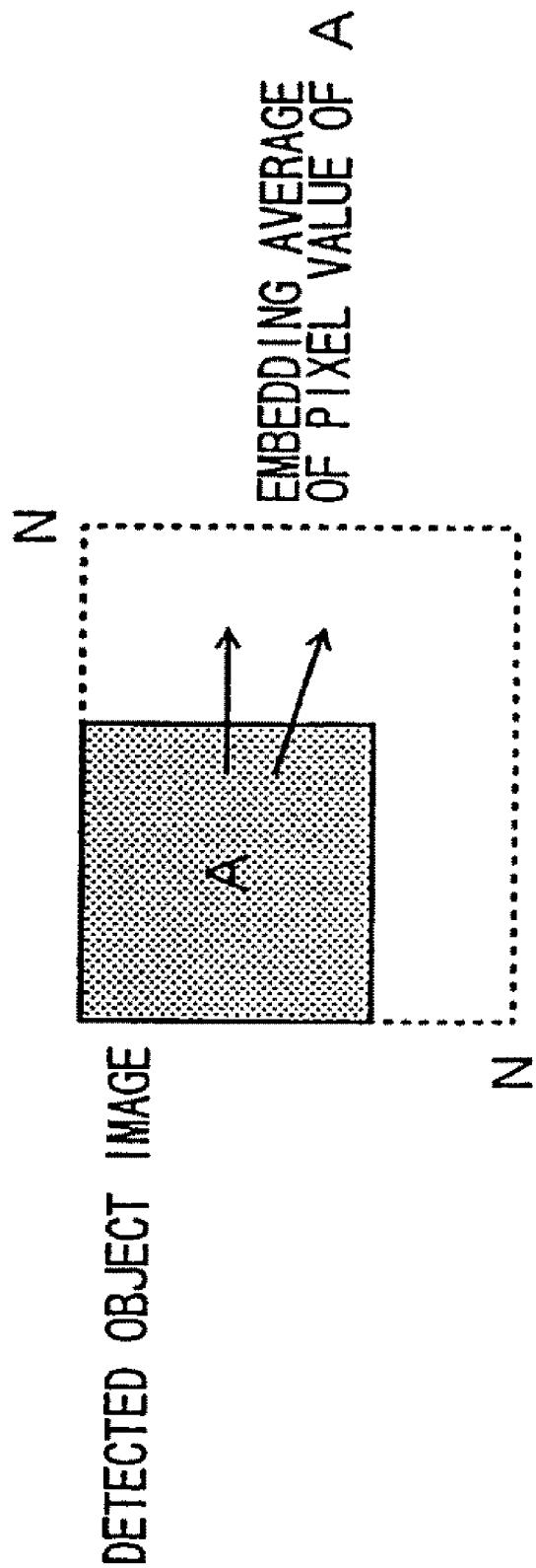
FIG. 89 is a diagram describing the process of the position marker detection portion according to a twelfth embodiment of the present invention.

FIG. 89 is a diagram describing the process of the block generating portion of the position marker detection portion according to the twelfth embodiment of the present invention.

The block generating portion 1111 of the position marker detection portion 1110 inputs the detected object image 201 and cuts blocks of N×N size from the top left of the detected object image. If the detected object image is smaller than the N×N size, a portion of a block containing the detected object image is cut (see A in the figure), and the remaining empty portion is filled with a mean value of the pixel value of the portion containing the detected object image.

A block obtained by this processing is output as a pixel block in the same manner as the previously described eleventh embodiment.

The following is a description of the block generation process of the watermark detection portion in the present embodiment. The block generation process of the watermark detection portion in the present embodiment inputs the detected object image, and uses a processing the same as that of the block generating portion in the position marker detection portion to obtain and output a pixel block.

When compared to the previously described eleventh embodiment, watermark detection using the present embodiment uses an arbitrary size from the necessary size of N×N or more and therefore enables detection from a smaller detected object image.

Thirteenth Embodiment

The following is a description of a thirteenth embodiment of the present invention, for the watermark detection portion, the symbol detection portion and the detection result generating portion. Those portions not described in the following are the same as those of the previously described eleventh embodiment.

Figure 90:
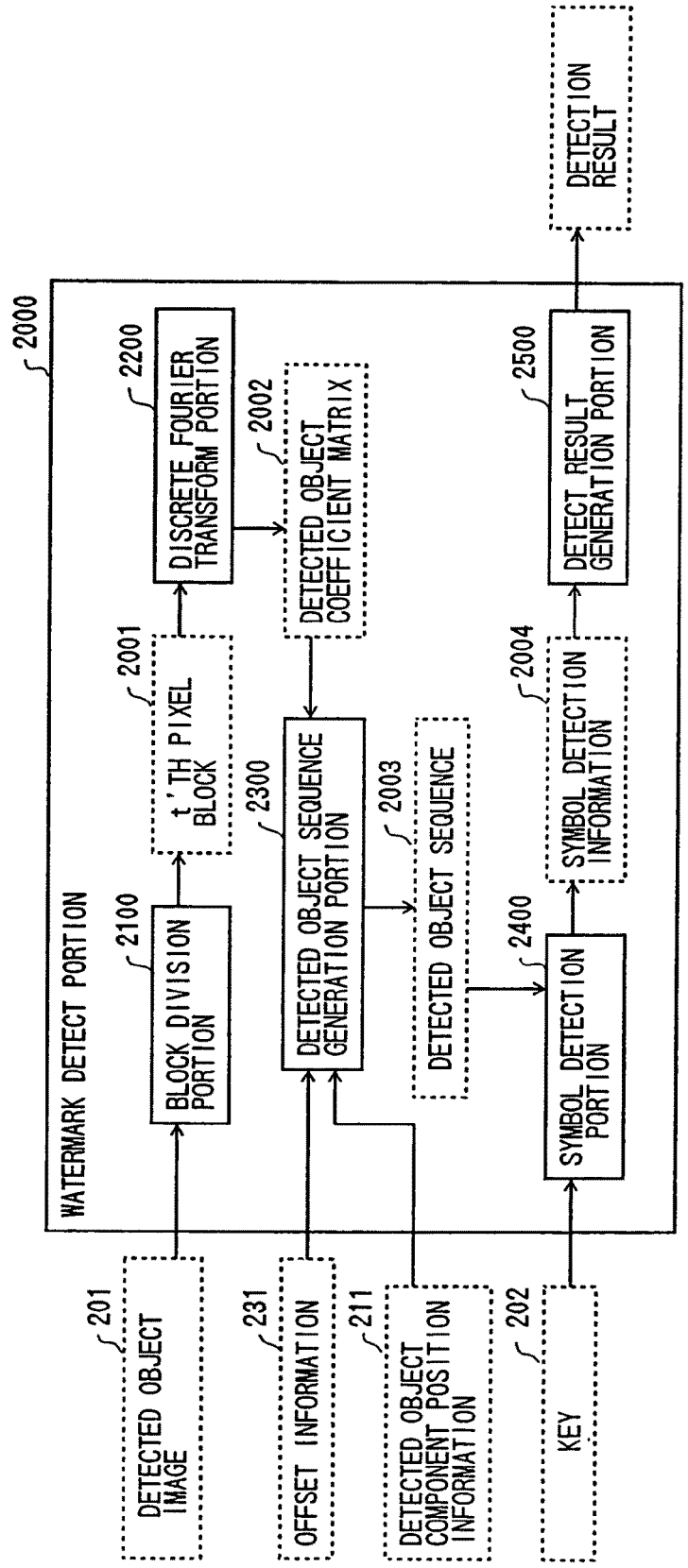
FIG. 90 is a diagram showing the configuration of the watermark detection portion according to a thirteenth embodiment of the present invention.

FIG. 90 is a diagram showing the configuration of the watermark detection portion according to the thirteenth embodiment of the present invention. The watermark detection portion 2000 shown in the figure comprises a block division portion 2100, a discrete Fourier transform portion 2200, a detected object sequence generating portion 2300, a symbol detection portion 2400, and a detection results generating portion 2500.

Figure 91:
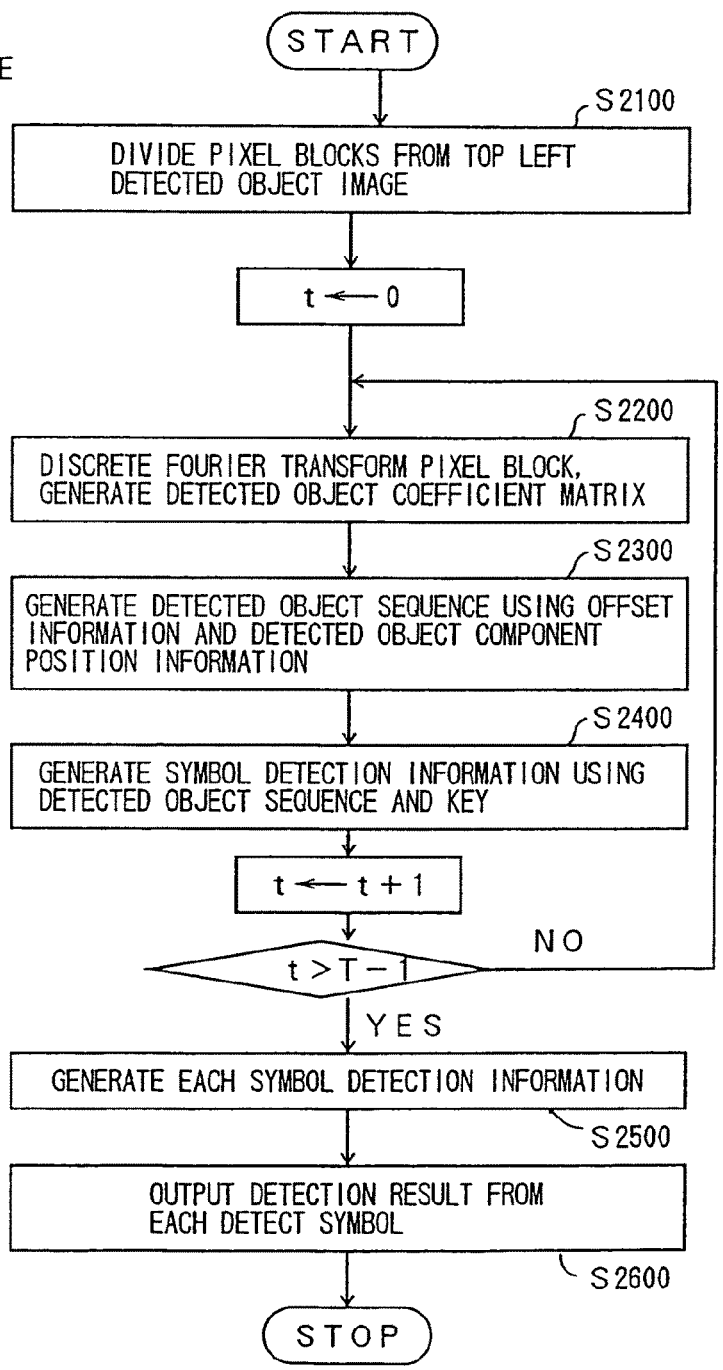
FIG. 91 is a flow chart showing the process of the watermark detection portion according to the thirteenth embodiment of the present invention.

FIG. 91 is a flow chart showing the process of the watermark detection portion according to the thirteenth embodiment of the present invention.

Figure 92:
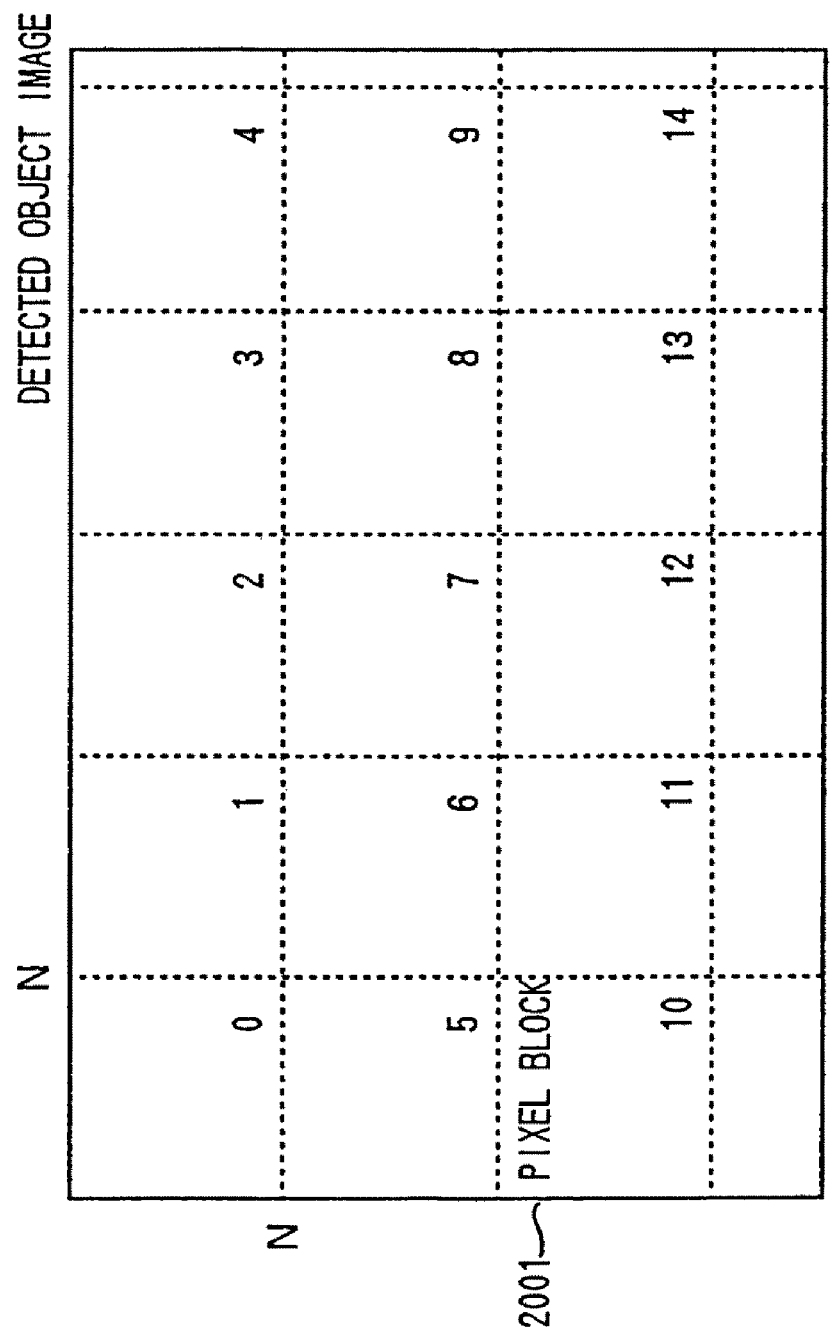
FIG. 92 is a diagram describing the process of a block division portion according to the thirteenth embodiment of the present invention.

Step 2100) The watermark detection portion 2000 inputs the detected object image 201, the detected object component position information 211, the offset information 231 and the key 202 and first of all, in the block division portion 2100 divides the detected object image 201 from the top left into T pixel blocks 2001 of N×N size as shown in FIG. 92.

Step 2200) The pixel blocks 2001 obtained by division are given numbers from 0 &tilde& T−1. The processing of Step 2300 &tilde& Step 2400 is repeated for the t'th pixel block (0<=t<T).

Step 2300) The discrete Fourier transform portion 2200 performs a discrete Fourier transform on the t'th pixel block to obtain a detected object coefficient matrix 2002.

Step 2400) The detected object sequence generating portion 2300 performs a processing the same as that of the detected object sequence generating portion of the position marker detection portion to obtain a detected object sequence 2003 which is then sent to the symbol detection portion 2400.

Step 2500) The symbol detection portion 2400 determines the value of the correlation between the detected object sequence 2003 and a sequence generated from the key 202, and generates symbol detection information 2004.

Step 2600) The detection result generating portion 2500 obtains the symbol detection information 2004 for each t, and then for each symbol position of the symbol detection information 2004, selects a detected symbol having a maximum value of the correlation from all of the symbol positions, and outputs a result of performing an inverse transform on the detected symbol to produce a digital watermark, as a detection result.

The following is a description of the symbol detection portion 2400 in the present embodiment.

Figure 93:
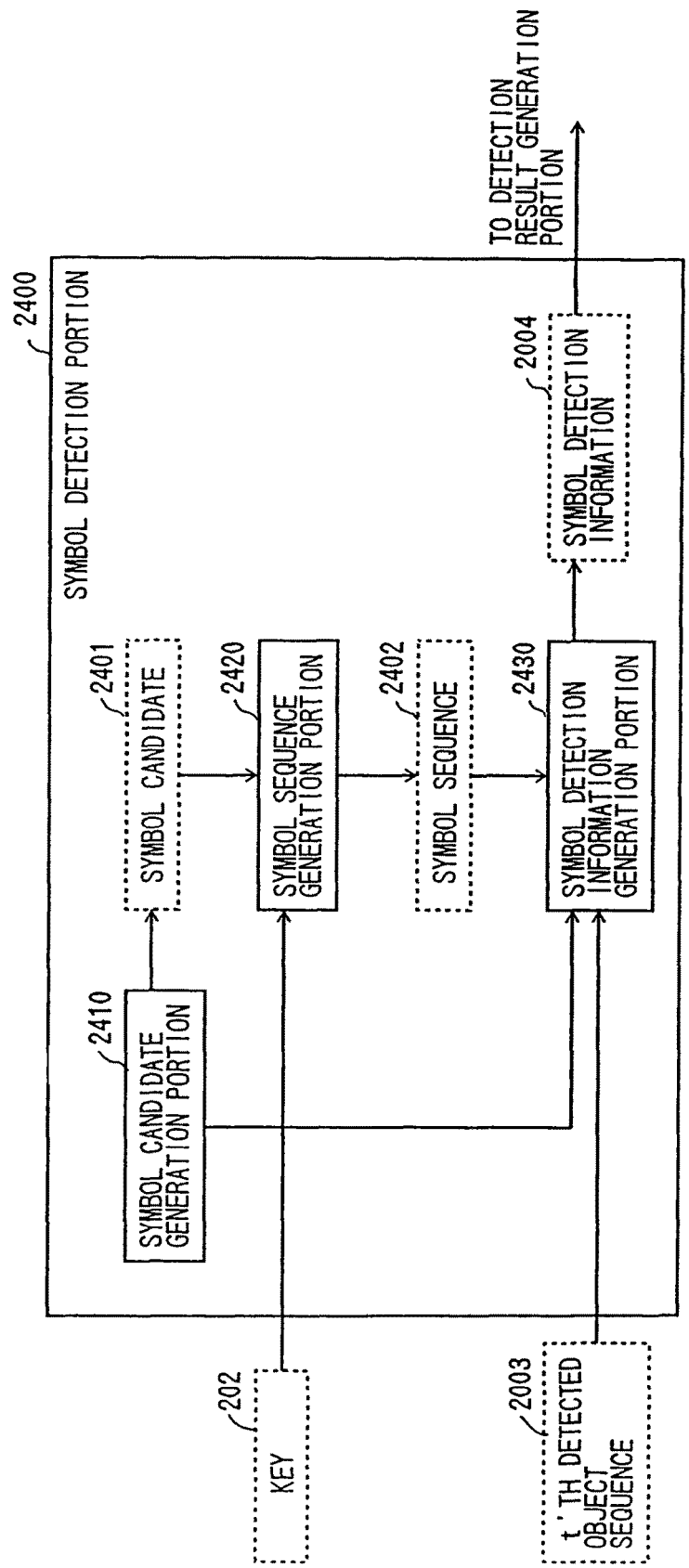
FIG. 93 is a diagram showing the configuration of a symbol detection portion according to the thirteenth embodiment of the present invention.

FIG. 93 is diagram showing the configuration of the symbol detection portion according to the thirteenth embodiment of the present invention. The symbol detection portion 2400 in the figures comprises a symbol candidate generating portion 2410, a symbol sequence generating portion 2420 and a symbol detection information generating portion 2430.

The symbol detection portion 2400 inputs the key 202 and the detected object sequence 2003 (obtained from the t'th pixel block) and generates symbol detection information 2004 for M symbol candidates for each symbol positions for a predetermined number J of detected symbols, and outputs the symbol detection information 2004 to the detection result generating portion 2500.

Figure 94:
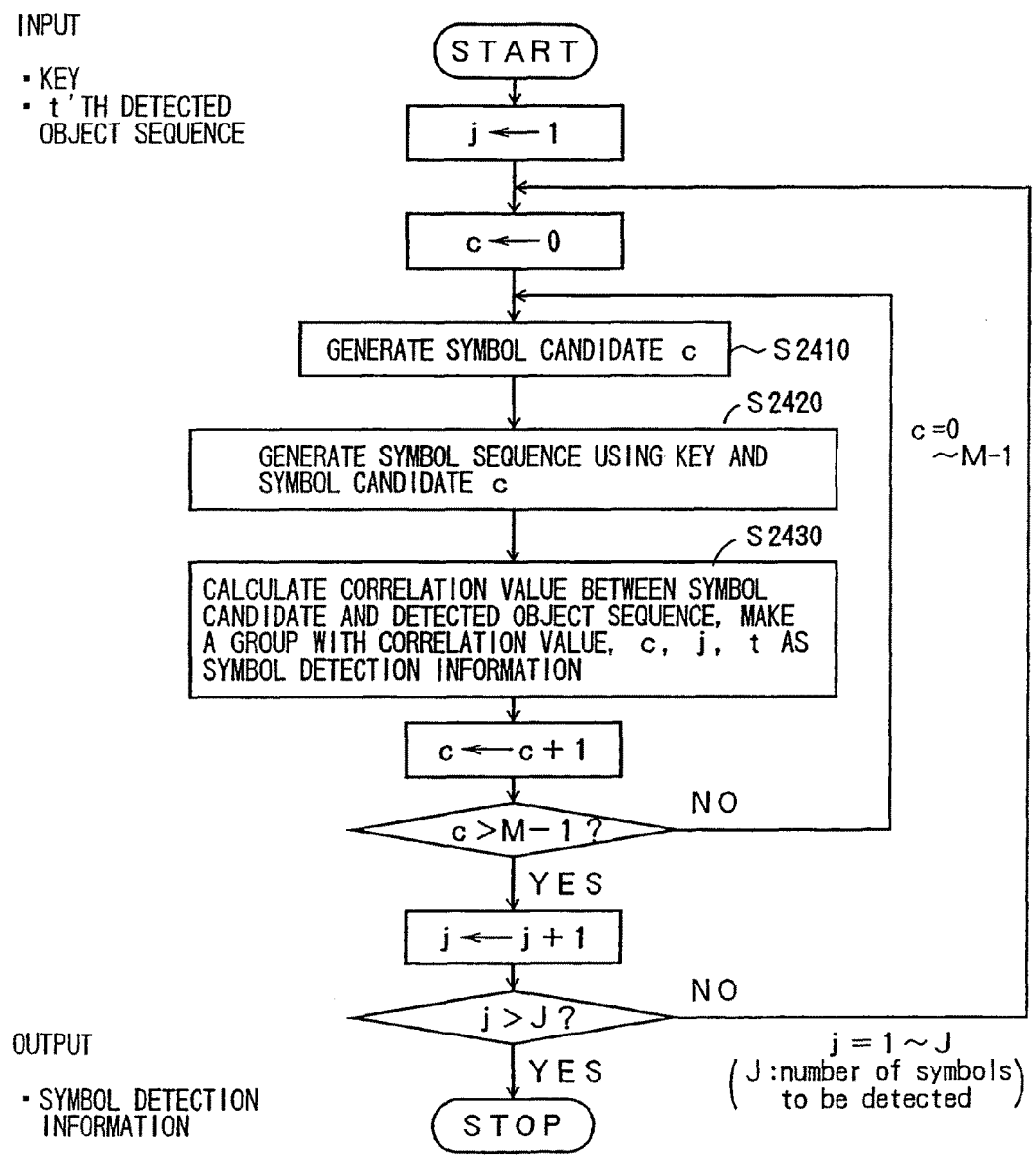
FIG. 94 is a flow chart showing the process of the symbol detection portion of the thirteenth embodiment of the present invention.

FIG. 94 is a flow chart showing the process of the a symbol detection portion of the thirteenth embodiment of the present invention.

Step 2410) The symbol candidate generating portion 2410 successively generates symbol candidates c from 0 &tilde& M−1 and repeats the processing of Step 2420 &tilde& Step 2430 for each symbol candidate. M expresses the maximum value for the symbol value due to symbol transform in the first embodiment.

Figure 95:
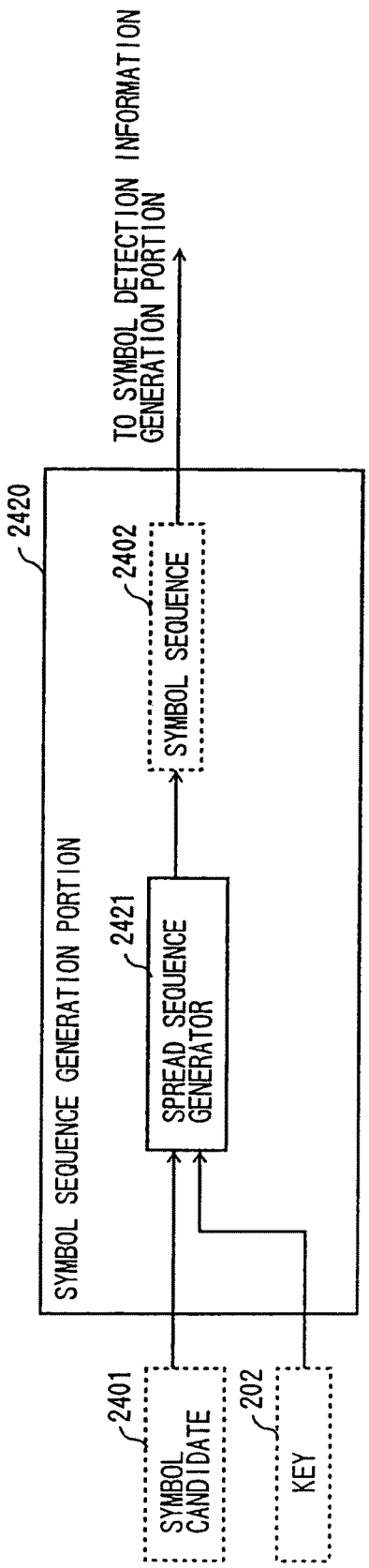
FIG. 95 is a diagram showing the configuration of a symbol sequence generation portion according to the thirteenth embodiment of the present invention.
Figure 96:
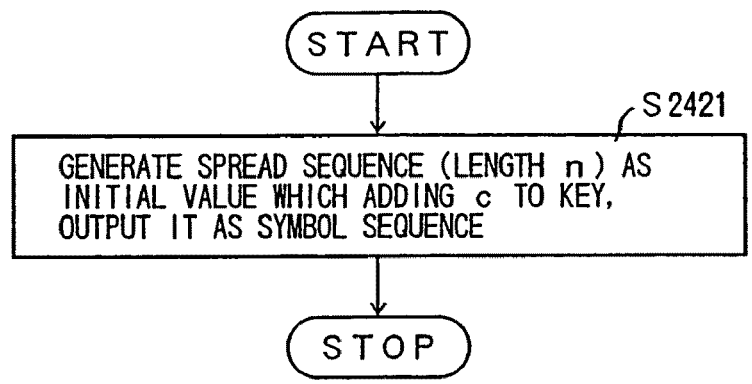
FIG. 96 is a flow chart showing the process of the symbol sequence generation portion according to the thirteenth embodiment of the present invention.

Step 2420) The following is a description of the symbol sequence generating portion 2420. FIG. 95 is a diagram showing the configuration of the symbol sequence generating portion according to the thirteenth embodiment of the present invention, and FIG. 96 is a flow chart showing the process of the symbol sequence generating portion according to the thirteenth embodiment of the present invention.

Step 2421) The symbol sequence generating portion 2420 inputs the key 202 and the symbol candidate c, and uses the sum of the key 202 and the symbol candidate c as an initial value for a spread sequence generator 2421 generating the j'th spread sequence $\{r_i^{(j)}\}$ of length n, and using it as it is as the symbol sequence 2402.

$\{p_i^{(j)}\}\{0<=i<n\}(p_i^{(j)}:=r_i^{(j)}(0<=i<n))$.

The symbol sequence 2402 is sent to the symbol detection information generating portion 2430.

Step 2430) The symbol detection information generating portion 2430 inputs the detected object sequence 2003, the symbol sequence symbol 2402, the symbol candidate c and uses the symbol position j that is currently being processed, and the following formula to determine the value of the correlation between the symbol sequence 2402 and the detected object sequence 2003, group the correlation value, the symbol candidates, symbol position j and the pixel block position and generate the symbol detection information $\mathrm{corr}_c^{(j)\,(t)}$.

$$\mathrm{corr}_c^{(j)(t)} := \frac{\sum_{i=0}^{n-1}\left(p_i^{(j)} \cdot q_i\right)}{\sqrt{\sum_{i=0}^{n-1} p_i^{(j)2}}\sqrt{\sum_{i=0}^{n-1} q_i^2}}$$

The symbol detection information 2004 is sent to the detection result generating portion 2500.

The following is a description of the detection result generating portion 2500 in the present embodiment.

Figure 97:
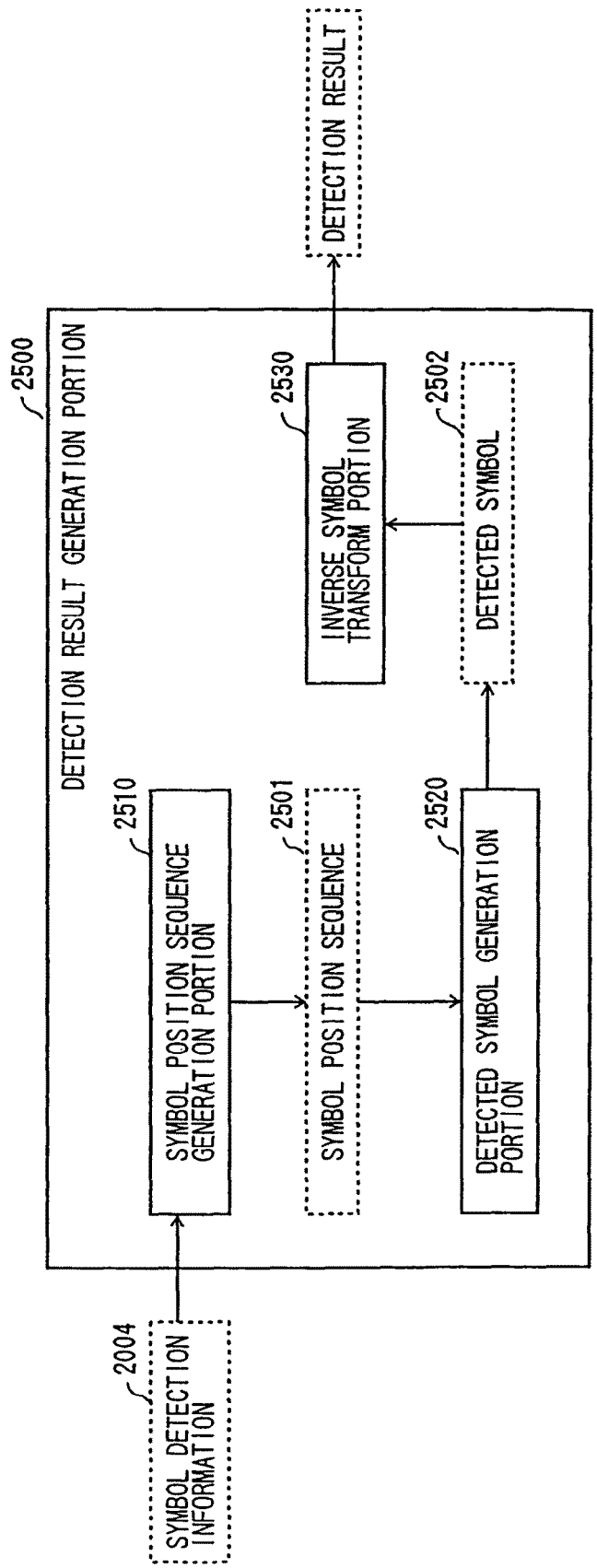
FIG. 97 is a diagram showing the configuration of a detection result generation portion according to the thirteenth embodiment of the preset invention.

FIG. 97 is diagram showing the configuration of the detection result generating portion according to the thirteenth embodiment of the present invention. The detection result generating portion 2500 in the thirteenth embodiment of the present invention comprises a sequence generating portion 2510 for each of the symbol positions j, a detected symbol generating portion 2520 and an inverse symbol transform portion 2530.

Figure 98:
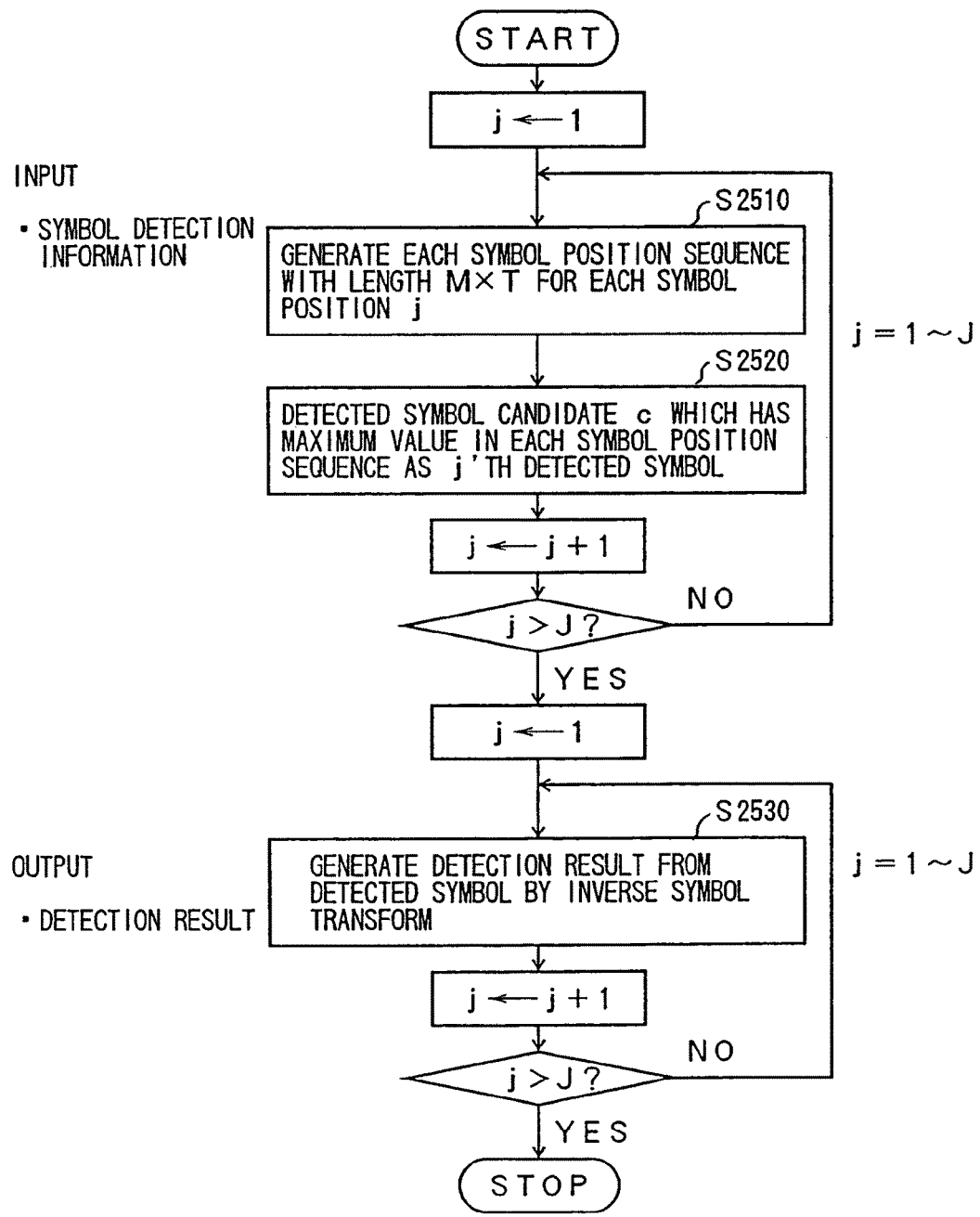
FIG. 98 is a flow chart showing the process of the detection result generation portion according to the thirteenth embodiment of the present invention.

FIG. 98 is a flow chart showing the process of the detection result generating portion according to the thirteenth embodiment of the present invention.

Step 2510) The detection result generating portion 2500 inputs the symbol detection information 2004 and first of all, in the sequence generating portion 2510 for each of the symbol positions, divides the symbol detection information 2004 into each symbol position j, and generates a symbol position sequence $$\text{corr}_c^{(t)(j)}(0<=c<M, 0<=t<T)$$

of length M x T for each symbol position, for each j from j=1 &tilde& J, and sends the symbol position sequence 2501 to the detected symbol generating portion 2520.

Step 2520) The detected symbol generating portion 2520 inputs each symbol position sequence 2501, determines the symbol candidate c having the maximum correlation value in each sequence for each symbol position j, and generates a detected symbol s j (0<=j<J). This processing is repeated until all of the $s_j$ are determined.

Step 2530) Once all of the $s_j$ have been determined, the inverse symbol transform portion 2530 transforms the symbol expression into an original watermark expression, and generates and outputs a detection result. For example, the inverse transform corresponds to the transform in the first embodiment having four symbols with the values of the four symbols (where the value of each symbol is from 0 &tilde& 255) being regarded as ASCII codes in processing for conversion into four 8-bit characters.

The detection result indicates the watermark embedded in the detected object image 201.

Information detection in the present embodiment divides the detected object image 201 into blocks (of size N×N of more), and detects the symbol for which the correlation is maximum in all the blocks so that it is possible to perform detection at a higher accuracy when compared to the previously described eleventh embodiment. Furthermore, the number of discrete Fourier transforms necessary for detection processing is the same as the number of blocks and so it is possible to perform faster processing than in the fifth embodiment.

Fourteenth Embodiment

The following is a description of processing when a block of N×N size cannot be cut from the detected object image 201 in the block division portion of the watermark detection portion of a fourteenth embodiment of the present invention.

Figure 99:
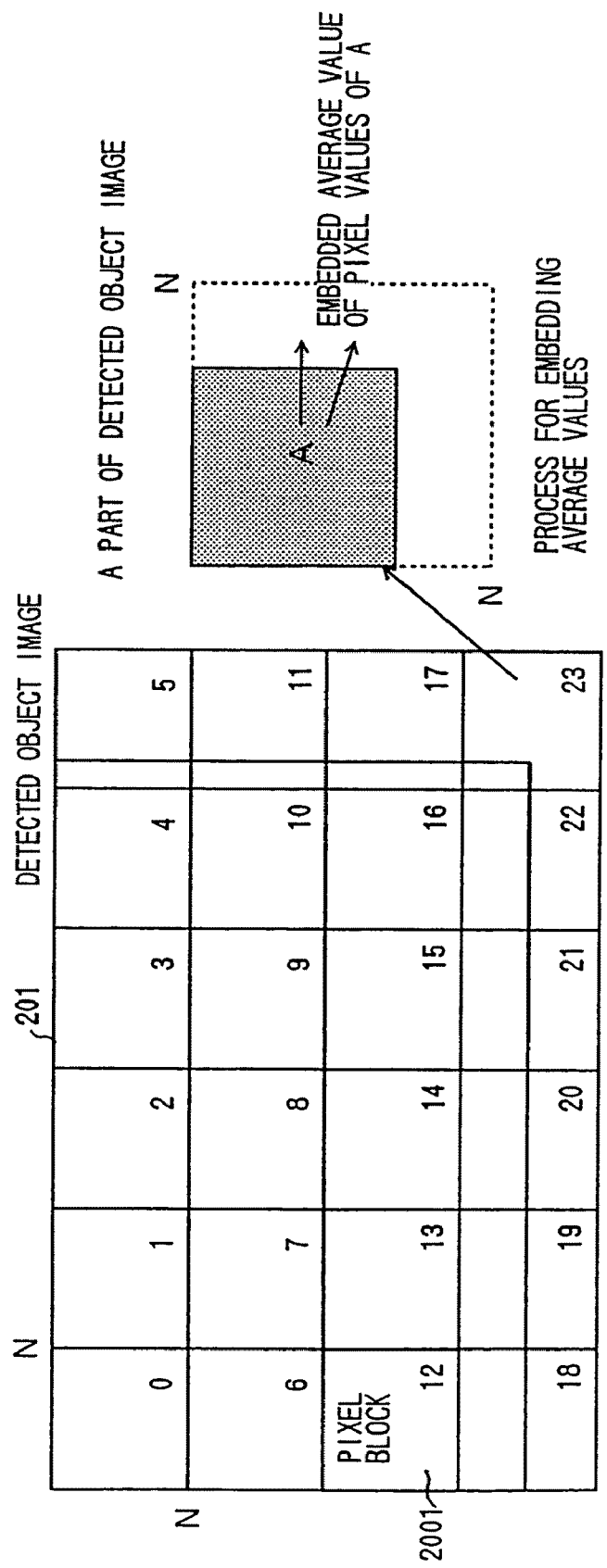
FIG. 99 is a diagram describing the process of a block division portion of a watermark detection portion according to a fourteenth embodiment of the present invention.

FIG. 99 is a diagram describing the process of the block division portion of the watermark detection portion according to the fourteenth embodiment of the present invention.

The block division portion 2100 divides the detected object image 201 from the top left into blocks of N×N size. When it does this, a block of an edge of the detected object image 201 may have an empty portion. In this case, a mean value is determined for the pixel values of the portion of the block including the detected object image, an the empty portion of the block is filled with that mean value and processed. Numbers from 0 &tilde& T−1 are given to the pixel blocks obtained by the division.

Information detection according to the present embodiment is improved because of the arbitrary size used as the necessary minimum size of the detected object image, and enables detection from a detected object image that is much smaller than that of the previously described thirteenth embodiment.

Furthermore, the number of discrete Fourier transforms necessary for detection processing is the same as that of the number of blocks and so it is possible to have faster processing than in the sixth embodiment.

Fifteenth Embodiment

The following is a description of the position marker detection portion and the watermark detection portion of the fifteenth embodiment of the present invention.

Figure 100:
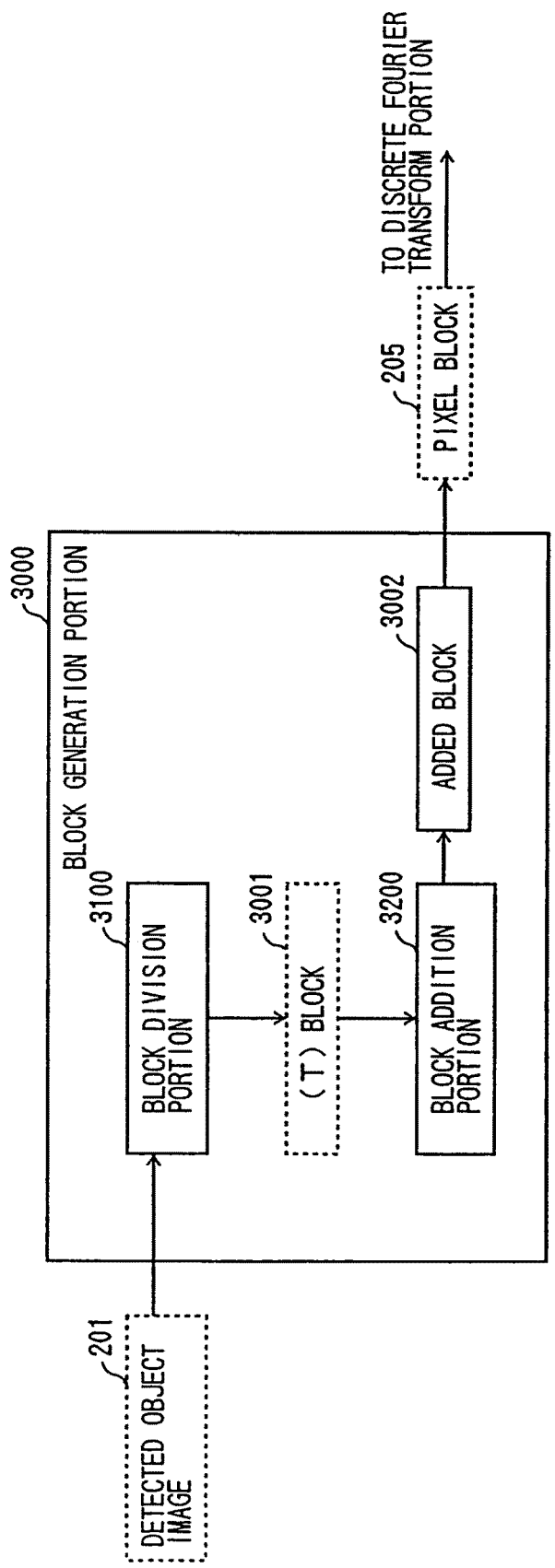
FIG. 100 is a diagram showing the configuration of a block generation portion of a position marker detection portion according to a fifteenth embodiment of the present invention.

FIG. 100 is a diagram showing the configuration of the block generating portion of the position marker detection portion according to a fifteenth embodiment of the present invention. The block generating portion 3000 shown in the figure comprises a block division portion 3100 and a block addition portion 3200.

Figure 101:
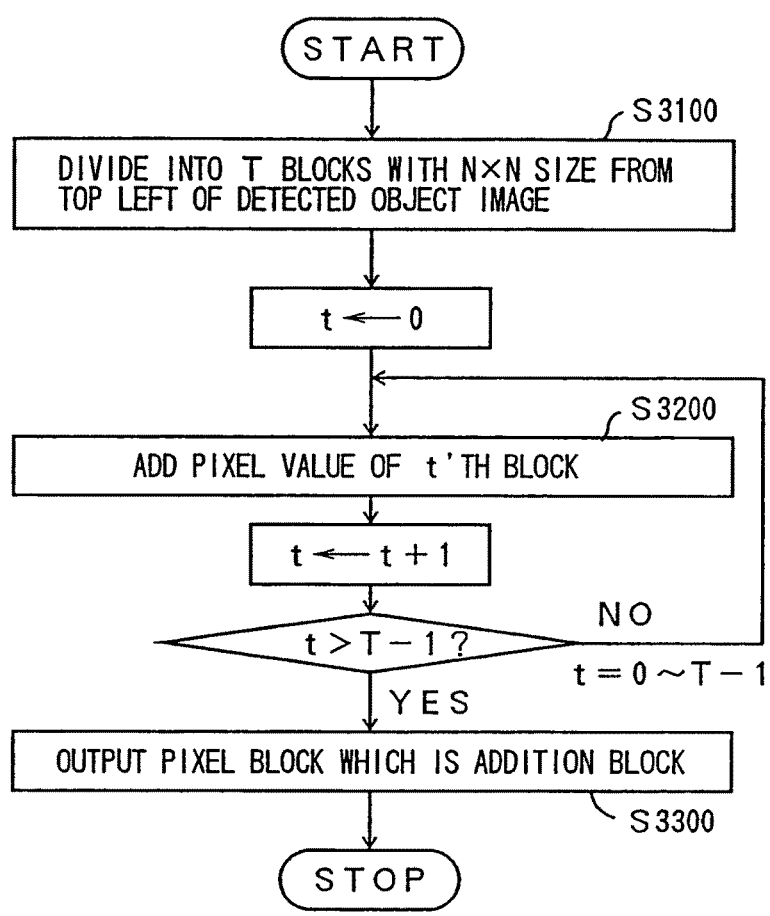
FIG. 101 is a flow chart showing the process of the block generation portion according to the fifteenth embodiment of the present invention.

FIG. 101 is a flow chart showing the process of the block generating portion of the position marker detection portion according to the fifteenth embodiment of the present invention.

Figure 102:
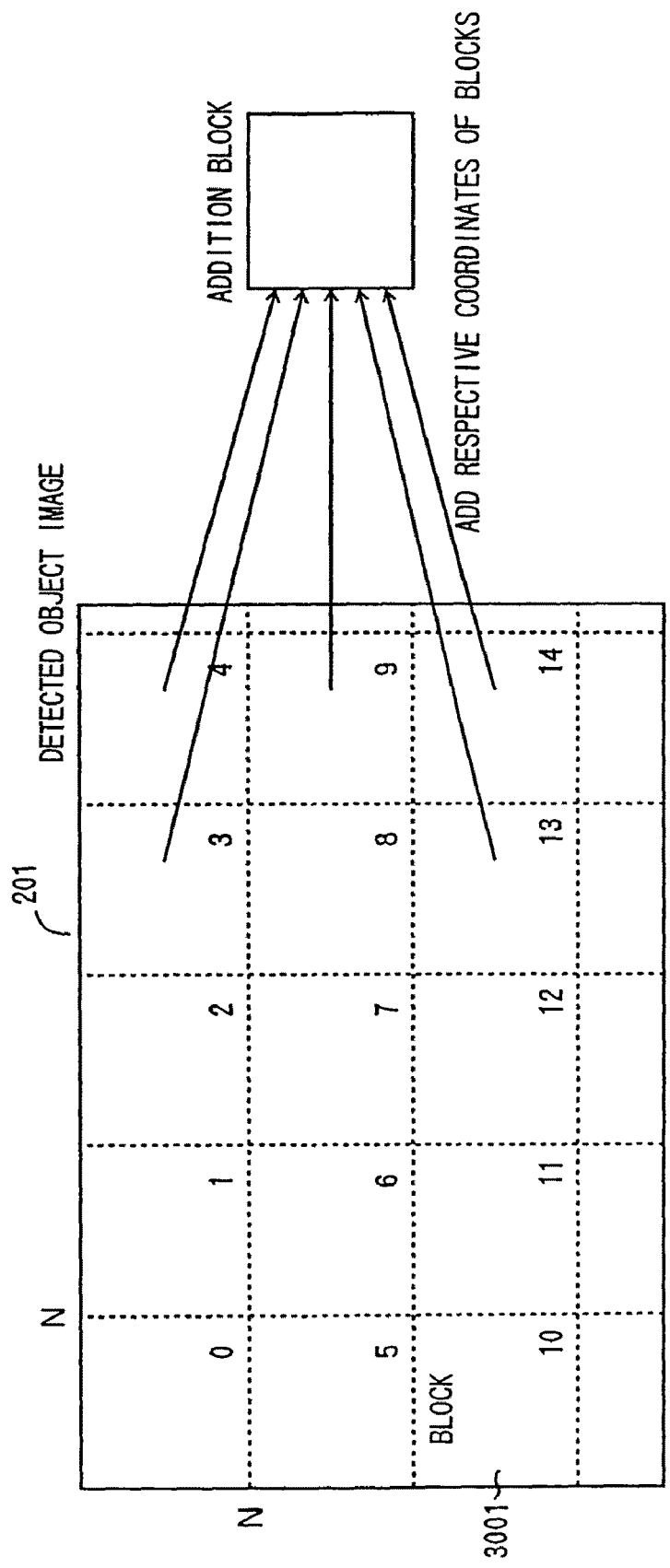
FIG. 102 is a diagram describing the process of the block generation portion according to the fifteenth embodiment of the present invention.

Step 3100) The block generating portion 3000 inputs the detected object image 201 and as shown in FIG. 102, the block division portion 3100 divides the detected object image 201 into T blocks of N×N pixels, from the top left.

Step 3200) Next, the block addition portion 3200 adds all of these blocks and generates an addition block 3002. Expressing this as a formula gives the following. When $B_{ij}^{(t)}$: t'th block (0<=i<N, 0<=j<N, 0<=t<T), the addition block $A_{ij}$ (0<=i<N, 0<=j<N) is obtained from $$A_{ij} = \sum_{t=0}^{T} B_{ij}^{(t)} \ (0 \le i < N, 0 \le j < N)$$

This addition block 3002 is output to the discrete Fourier transform portion as the pixel block 205.

Information detection with the present embodiment divides the detected object image 201 (of a size of N×N or more) into blocks of N×N size and performs detection of the position marker and detection of the watermark from blocks which are the sum of all of the blocks.

The adding of T blocks means that the watermark pattern which is a repeated pattern of size N×N is emphasized T times, and that the original image pattern has a lower correlation between blocks, and is gradually cancelled by addition. This is to say that detection from the addition block lessens the influence of the original image and at the same time emphasizes the watermark pattern so that it is possible to perform detection at a higher accuracy than the eleventh embodiment.

In addition, when compared to the eleventh embodiment, the amount of processing for detection increases by the amount required for generating the added block, but when compared to the amount of processing for other portions of detection processing, this amount of processing is so small as to be able to be ignored. In addition, when compared to the thirteenth embodiment that performs detection of one block at a time, it is possible to perform processing that is faster in proportion to the number of blocks.

Furthermore, only one discrete Fourier transform is necessary when there is detection processing and so it is possible to have faster processing than any of embodiments two through ten.

Sixteenth Embodiment

The following is a description of a sixteenth embodiment of the present invention, for the position marker detection portion and the block generating portion. Those portions not described in the following are the same as those of the twelfth embodiment.

Figure 103:
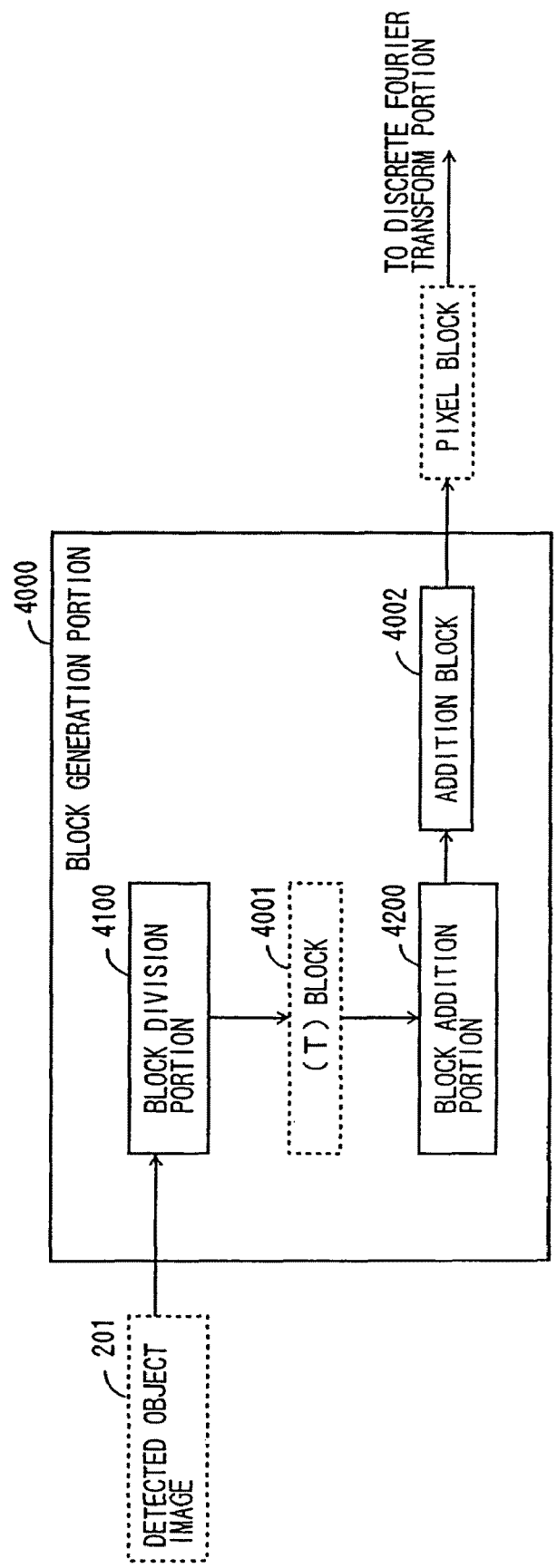
FIG. 103 is a diagram showing the configuration of a block generation portion of a position marker detection portion according to a sixteenth embodiment of the present invention.

FIG. 103 is a diagram showing the configuration of the block generating portion of the position marker detection portion according to the sixteenth embodiment of the present invention. The block generating portion 4000 in the figure comprises the block division portion 4100, and a block addition portion 4200.

Figure 104:
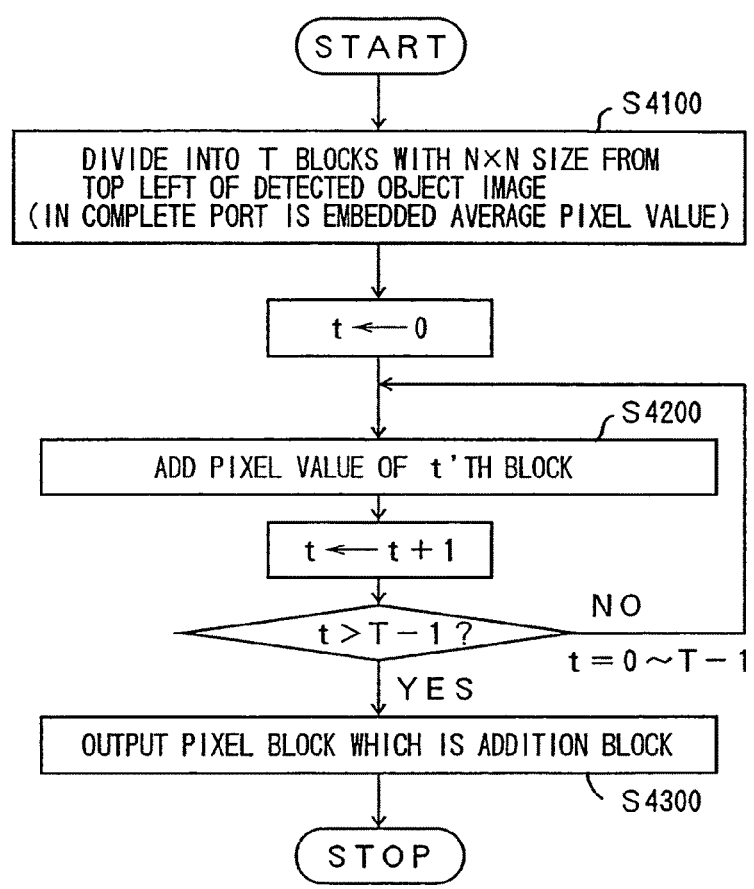
FIG. 104 is a flow chart showing the process of the block generation portion of the position marker detection portion according to the sixteenth embodiment of the present invention.

FIG. 104 is flow chart showing the process of the block generating portion of the position marker detection portion according to the sixteenth embodiment of the present invention.

Figure 105:
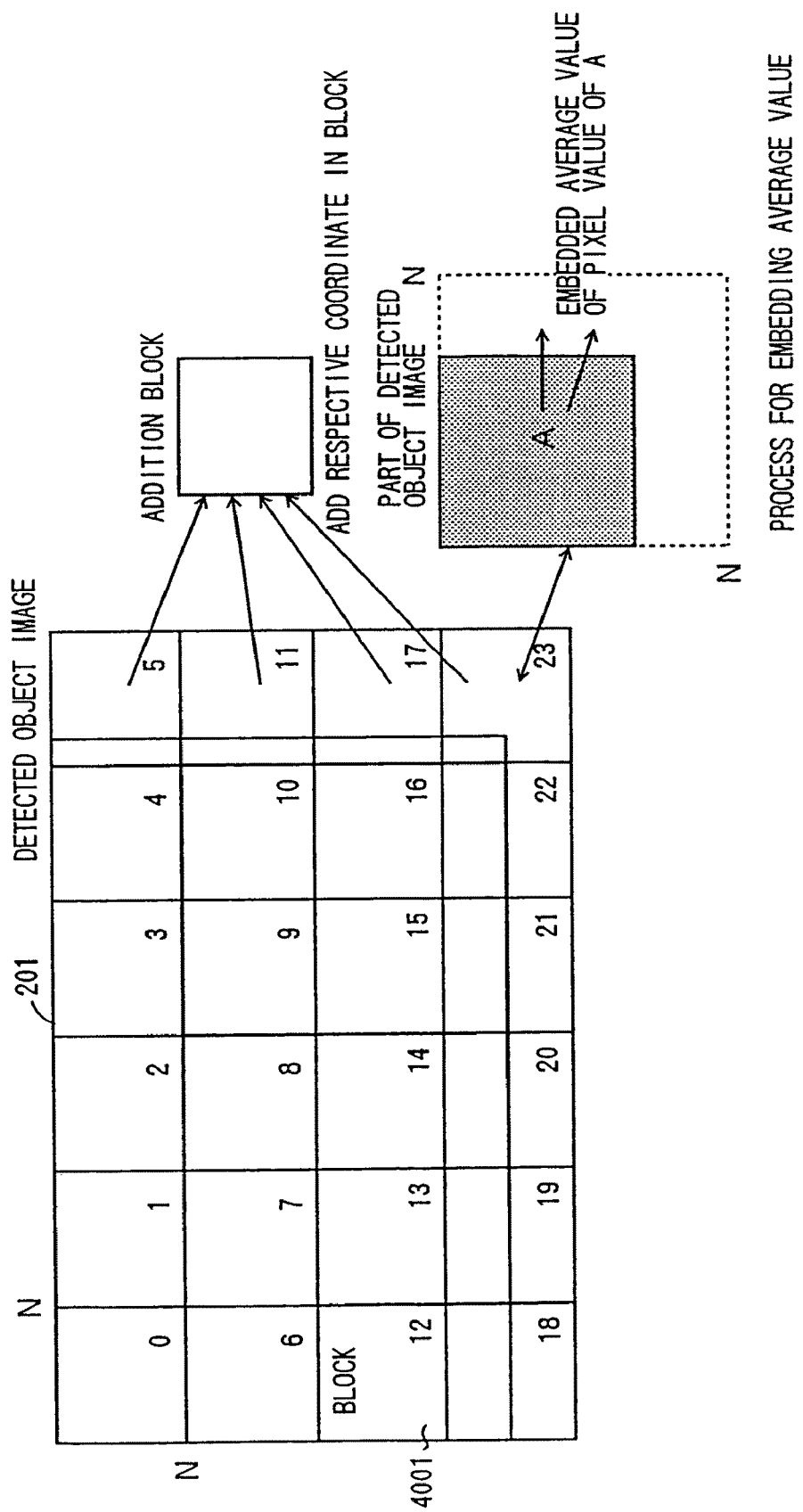
FIG. 105 is a diagram describing the process of the block generation portion according to the sixteenth embodiment of the present invention.

Step 4100) The block generating portion 4000 inputs the detected object image 201 and as shown in FIG. 105 divides the detected object image 201 from the top left into T blocks of N×N pixels. When it does this, a block at an edge of the detected object image 201 may have an empty portion. In this case a mean value is determined for the pixel value of the portion of the block including the detected object image 201 and the empty portion filled with this mean value.

Step 4200) After this, the block addition portion 4200 adds all of the blocks and generates an addition block 4001. Expressing this as a formula gives the following. When $B_{ij}^{(t)}$:$t$'th block($0<=i<N, 0<=j<N, 0<=t<T$), the addition block $A_{ij}$ ($0<=i<N$, $0<=j<N$) is obtained from $$A_{ij} = \sum_{i=0}^{T} B_{ij}^{(t)} \ (0 \le i < N, 0 \le j < N)$$

Step 4300) This addition block is output to the discrete Fourier transform portion as the pixel block.

The following is a description of the block generating portion in the watermark detection portion of the present embodiment.

The watermark detection portion of the present embodiment inputs the detected object image 201 and in the same manner as the block generating portion 4000 of the position marker detection portion, divides the detected object image from the top left into T blocks of N×N pixels.

After this, in the block addition portion all of these blocks are added to generate an addition block. This addition block is output to the discrete Fourier transform portion as a pixel block.

Information detection in the present embodiment described above uses an arbitrary size as the necessary minimum size of the detected object image and, when compared to the previously described fifteenth embodiment, enables detection from a smaller detected object image.

Furthermore, when compared to the fifteenth embodiment, the number T of divided blocks is larger and so the influence of the original image is lessened in detection, and the watermark pattern is more emphasized, and so it is possible to perform detection at a higher accuracy than with the fifteenth embodiment.

In addition, adding the blocks lessens the influence of the original image when there is detection, and also emphasizes the watermark pattern, so that it is possible to perform pattern detection at a higher accuracy than with the twelfth embodiment.

In addition, when compared to the twelfth embodiment, the amount of processing for detection increases by the portion required for generating the addition block, but when compared to the amount of processing for other portions of detection processing, is small enough to be ignored. Also, it is possible to perform detection at a higher accuracy when compared to detection in the case such as with the fourteenth embodiment where detection is performed one block at a time.

Seventeenth Embodiment

The following is a description of a seventeenth embodiment of the present invention, for the detected object sequence generating portion of the position marker detection portion. Those portions not described in the following are the same as the sixteenth embodiment.

In the present embodiment, the detected object sequence generating portion of the position marker detection portion of each of the embodiments two through sixteen has as the final stage the generation of the detected object sequence as disclosed for each of the embodiments, but then performs the processing described below to make the mean of the detected object sequence zero, and then uses these detected object sequence that has had this processing implemented, in later processing.

When $\{q_i\}$: detected object sequence prior to processing ($0<=i<n$)

$$ave := \frac{1}{n}\sum_{i=0}^{n-1} q_i$$

is determined and the average is made zero by $q_i:=q_i-ave$ ($0<=i<n$).

According to the present embodiment, the mean of the detected object sequence becomes zero and each item has a value that is either positive or negative. This means that when the values for the correlation are added later, correlation values other than those having a valid peak for the position marker detection information are kept low so that when compared to those embodiments for which this processing is not performed, it becomes possible to perform detection at a better accuracy for valid peaks of the position marker detection information.

Eighteenth Embodiment

The following is a description of the detected object sequence generating portion of the watermark detection portion according to an eighteenth embodiment of the present invention. Those portions not described in the following are the same as portions of the previously described embodiments two through seventeen.

The detected object sequence generating portion of the watermark detection portion according to the previously described embodiments two through seventeen performs final stage processing to generate a detected object sequence as previously described for each of the embodiments, performs processing as described below so that the average for the detected object sequence is zero, and then uses this detected object sequence that has had this processing implemented, in later processing.

When
$\{q_i\}$: detected object sequence prior to processing ($0<=i<n$), $$ave := \frac{1}{n}\sum_{i=0}^{n-1} q_i$$

is determined and the average is made zero by $q_i:=q_i-ave$ ($0<=i<n$).

According to the present embodiment, the average of the detected object sequence becomes zero and each item has a value that is either positive or negative. This means that when the values for the correlation are added later, correlation values other than those having a valid peak for the symbol detection information are kept low so that when compared to those embodiments for which this processing is not performed, it becomes possible to perform detection at a better accuracy for valid peaks of the symbol detection information.

Nineteenth Embodiment

The following is a description of the offset information generating portion of the position marker detection portion according to a nineteenth embodiment of the present invention. In the following description, those portions not described are the same as those of the previously described second through eighteenth embodiments.

Figure 106:
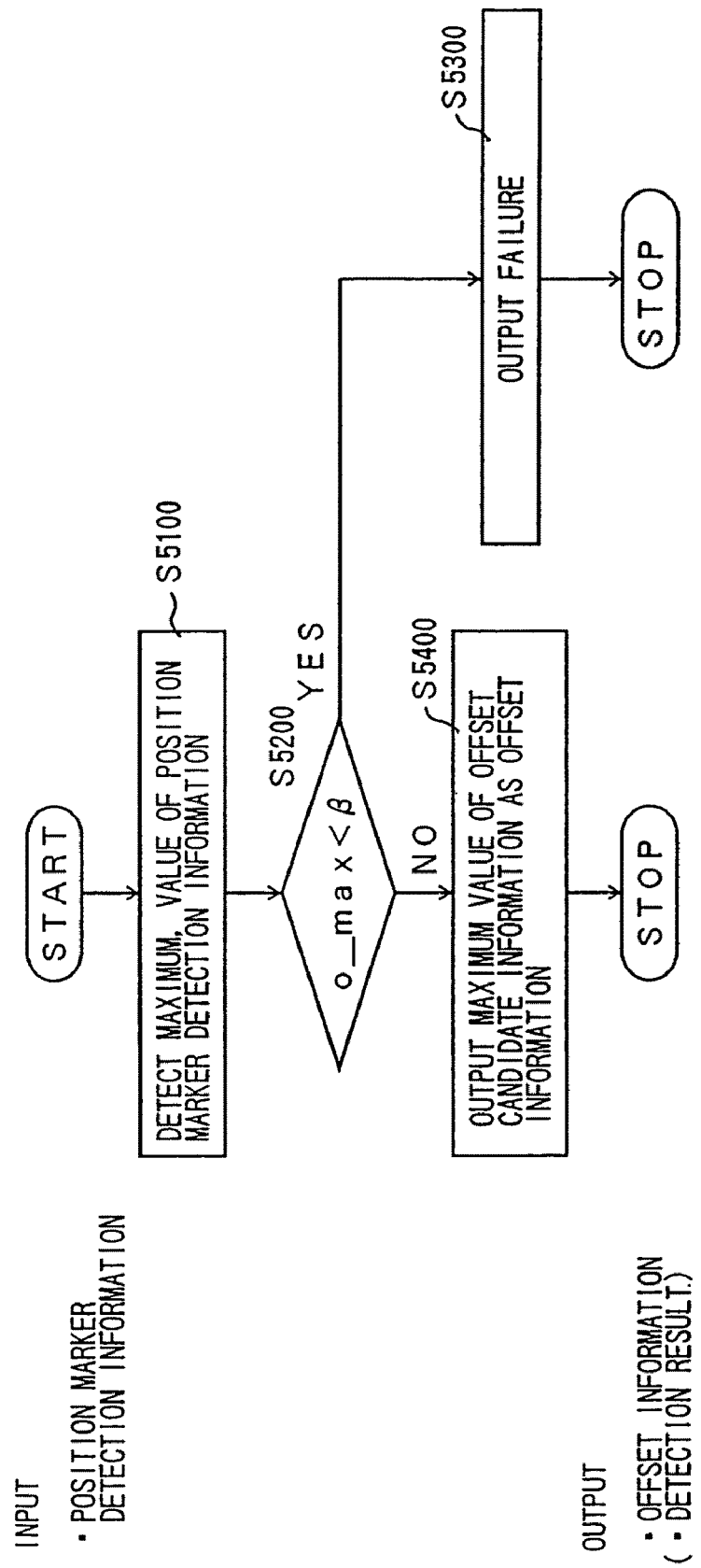
FIG. 106 is a flow chart showing the process of an offset information generation portion of a position marker detection portion according to a nineteenth embodiment of the present invention.

FIG. 106 is a flow chart showing the process of the offset information generating portion of the position marker detection portion according to the nineteenth embodiment of the present invention.

Step 5100) The offset information generating portion inputs the position marker detection information and, first of all, determines the maximum value 0 max in all of the position marker detection information.

Step 5200) Then a threshold value beta which has been determined beforehand is used to separate the processing as follows. There is a shift to Step 5300 when 0 max<beta and a shift to Step 5400 otherwise.

Step 5300) A detection result indicating that the detection of the offset information has failed is output externally to the offset information detection apparatus, and the process is terminated.

Step 5400) The offset candidate information (a, b) when the maximum value 0max is taken is output as offset information and sent to the watermark detection portion.

According to the nineteenth embodiment described above, detection does not continue unless the position marker detection information, that is, the value of the correlation between the position marker sequence and the detected object sequence is above the threshold value beta. This means that detection is not attempted and the output of an erroneous detection result is thus prevented in cases such as when the detected object image is an image that has no embedded information, or when detection is not possible due to severe damage to the embedded image, thereby increasing the reliability of the output detection result.

Twentieth Embodiment

The following is a description of the detection result generating portion of the watermark detection portion according to a twentieth embodiment of the present invention. Those portions not described in the following are the same as those of the previously described 2nd through 19th embodiments.

Figure 107:
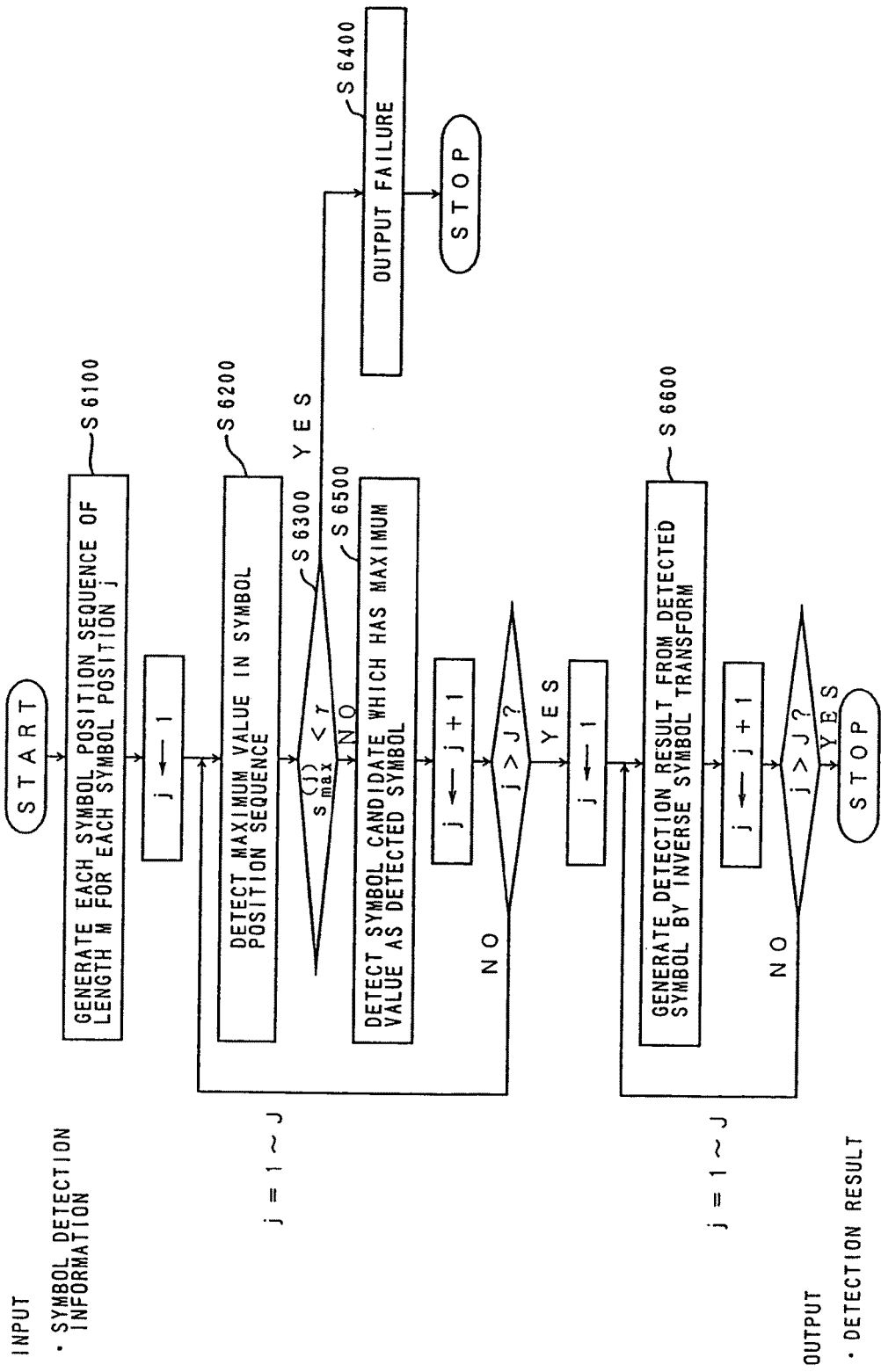
FIG. 107 is a flow chart showing the process of a detection results generation portion of a watermark detection portion according to a twentieth embodiment of the present invention.

FIG. 107 is flow chart showing the process of the detection result generating portion of the watermark detection portion according to the twentieth embodiment of the present invention.

Step 6100) The detection result generating portion inputs the symbol detection information and, first of all, in the sequence generating portion that generates the symbol position sequence for each symbol position, divides the symbol detection information for each symbol position j.

Step 6200) The maximum value $s_{max}^{(j)}$ of the sequence for each j'th ($1<=j<J$) symbol position is determined and the processing branches as follows depending upon a predetermined threshold value gamma.

Step 6300) There is a shift to Step 6400 when $s_{max}^{(j)}$<gamma, otherwise there is a shift to Step 6500.

Step 6400) A detection result indicating that detection of a watermark embedded in the detected object image has failed is output and all processing in the detection result generating portion is terminated.

Step 6500) When $s_{max}^{(j)}$>gamma, the symbol candidate c corresponding to the maximum value for s max<(j)> is made the j'th detected symbol $s_j$ ($1<=j<J$).

Step 6600) After all $s_j$ have been determined, is transformed symbol expression is transformed into a watermark expression (with, for example, the inverse transform corresponding to the transform in the first embodiment having four symbols (with the values of the four symbols, where the value of each symbol is from 0 &tilde& 255) being regarded as ASCII code in processing of conversion into four 8-bit characters), and the detection results is generated and output.

According to the twentieth embodiment described above, detection does not continue unless the symbol detection information, that is, the value of the correlation between each symbol marker sequence and the detected object sequence, is above the threshold value gamma. This means that detection is not attempted and an output of an erroneous detection result is thus prevented in cases such as when the detected object image is an image that has no embedded information, or when detection is not possible due to severe damage to the embedded image, thereby increasing the reliability of the output detection result.

Twenty-First Embodiment

Finally, the following is a description of a twenty-first embodiment of the present invention. Those portions not described in the following are the same as portions of the previously described first through twentieth embodiments.

With the present embodiment, the spread sequence generator of the embedding sequence generator in the first embodiment, and the position marker sequence generating portion and spread sequence generator for the symbol sequence generating portion of the watermark detection portion of the twentieth embodiment use sequences (such as random sequences comprising either the two values of "+1" or "−1" obtained using a k'th degree generation polynomial expression (where k is a sufficiently large integer) such as that disclosed in pp. 128 of "Symbol Logic" (Shokohdoh) by Miyagawa et al., successively generated at random using either values of +1 or −1 at respective probabilities of ½).

In addition, with the present embodiment, the following is used as the calculation formula for determining the correlation in the symbol detection information generating portion of the symbol detection portion of the watermark detection portion in the twentieth embodiment.

When there is

{pi}: symbol sequence (0<=i<n)

{qi}: detected object sequence (0<=i<n), the value of the correlation for the two sequences is $$corr := \frac{\sum_{i=0}^{n-1}(p_i^{(j)} \cdot q_i)}{\sqrt{\sum_{i=0}^{n-1} q_i^2}}$$

The distribution of the value of the correlation in the symbol detection information generating portion is now considered.

$$\frac{q_i}{\sqrt{\sum_{i=0}^{n-1} q_i^2}} \quad (0 \le i < n)$$

is a sequence that obeys a distribution having an average which calculate each item of the sequence, to be zero average value (according to the eighteenth embodiment) and variance of 1/n.

Figure 108:
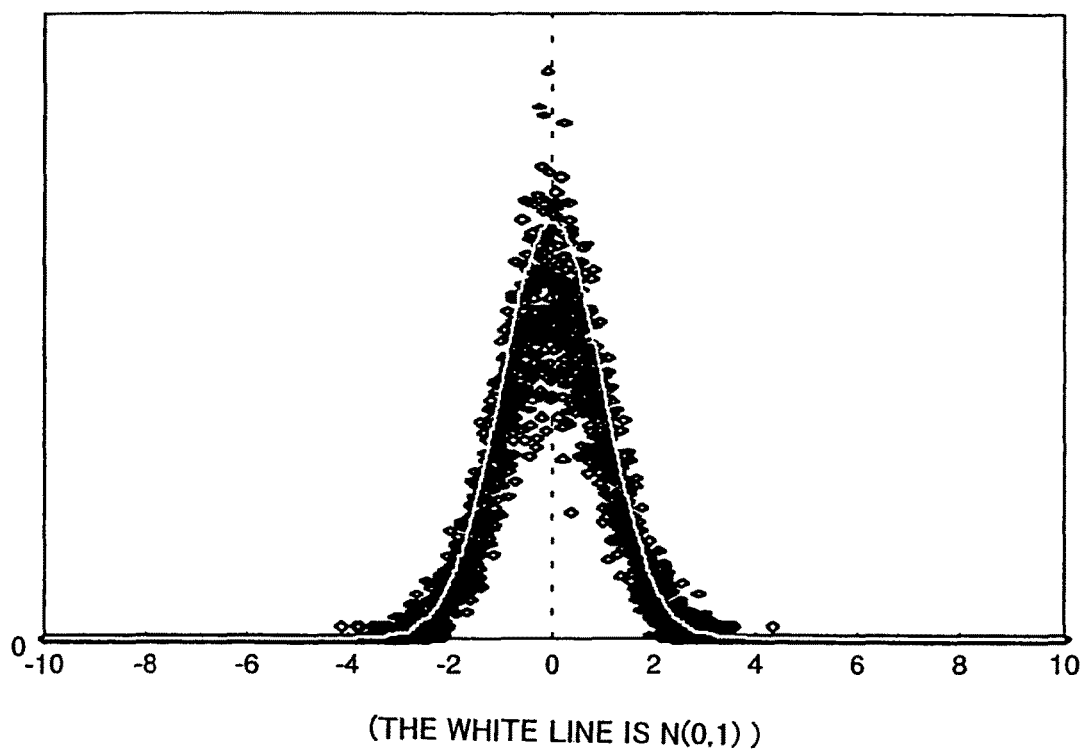
FIG. 108 is a graph showing the theoretical values and the corr values according to a computer simulation of a twenty-first embodiment of the present invention.

In addition, pi (0<=i<n) has the values of +1 or −1, each with a respective probability of ½, and obeys a distribution with an average of 0 and a variance of 1. If n is sufficiently large, $$\frac{p_i \cdot q_i}{\sqrt{\sum_{i=0}^{n-1} q_i^2}} \quad (0 \le i < n)$$

becomes a sequence obeying a distribution with an average of 0 and with a variance of 1. Here, using the central limit theorem of probability statistics when n is sufficiently large, $$corr := \frac{\sum_{i=0}^{n-1}(p_i^{(j)} \cdot q_i)}{\sqrt{\sum_{i=0}^{n-1} q_i^2}}$$

obeys a normal distribution with an average of 0 and a variance of 1. FIG. 108 is a graph (n=1024) showing the theoretical values N (0, 1) and the corr values according to a computer simulation of the twenty-first embodiment of the present invention, and from this, it can be seen that, as assumed, corr is N (0, 1).

Once it is known that corr is N (0, 1), the threshold value gamma in the twentieth embodiment can be determined by probability (a scale indicating the degree to which peaks have meaning).

Figure 109:
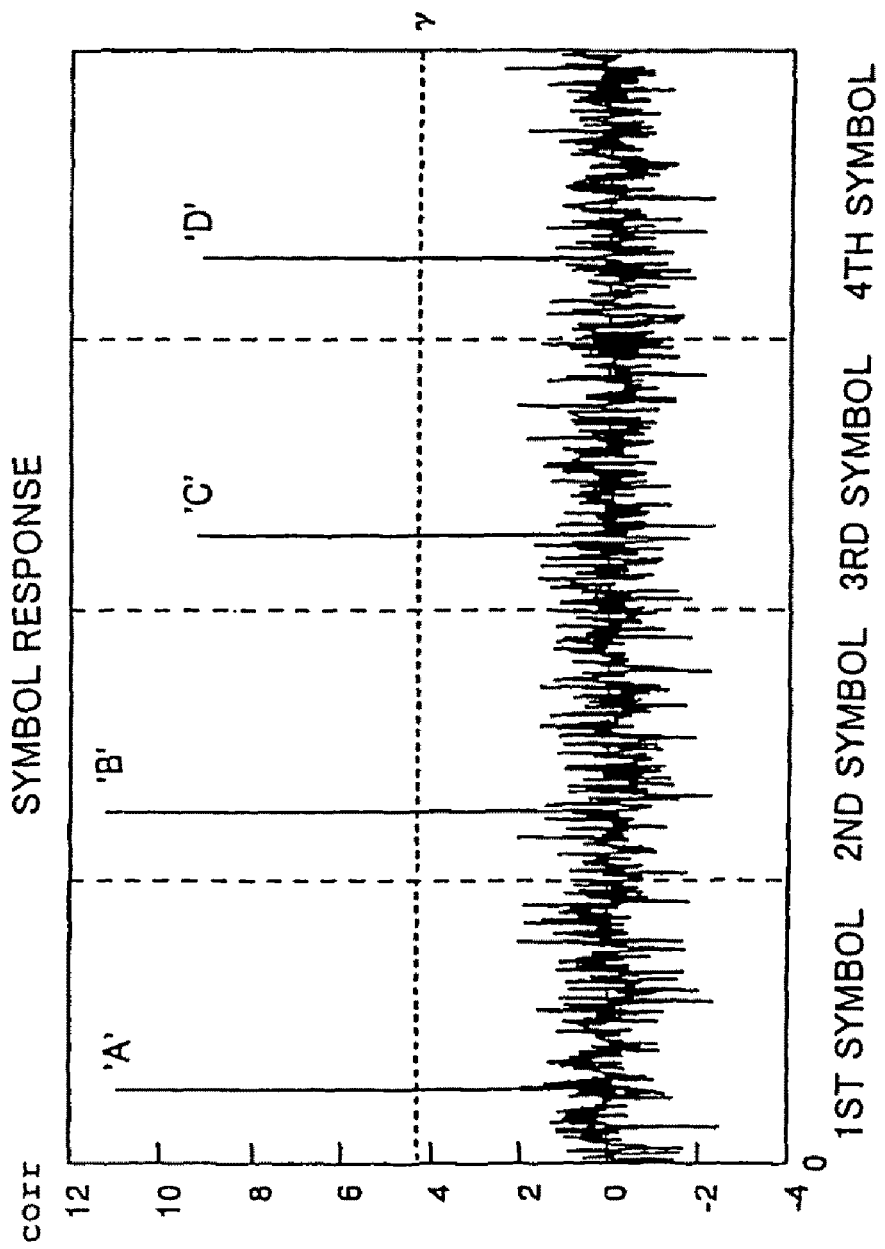
FIG. 109 is a graph of symbol detect information according to a computer simulation of the twenty-first embodiment of the present invention.

For example, a probability of 99.999% (which makes $10^{-9}$ the probability of a peak accidentally appearing above the threshold value) gives a threshold value gamma=4.26489 on a normal distribution table at that time. FIG. 109 is a graph of symbol detection information according to a computer simulation of the twenty-first embodiment of the present invention. As can be seen from the figure, the symbol values that express "A", "B", C" and "D" as the result of detection of the four symbols (with each symbol having a value of from 0 ˜& 255) all appear as significant peaks. The previously mentioned gamma is used to evaluate the degree of significance that a peak has (i.e, not an accidental value). In the example shown in FIG. 109, the value of each of the peaks is more than 4.26489 and so it can be judged to a probability of more than 99.999, that the peaks are significant.

According to the twenty-first embodiment, the distribution of the symbol detection information can be a normal distribution with an average of 0 and variance of 1 and so it is possible to specify the certainty of symbol detection. This means that it is possible to determine the degree of certainty of the detection result, increase the reliability of the detection result and improve the convenience.

To test the effectiveness of the proposed method, a computer simulation was run. The three test images were 512×512 pixels, 8-bit gray-scale images (Lena, Sailboat, and Baboon). The parameter values used in the simulation were N=128, n=1023, alpha=1.4, M=256. The value of (u n, v n) were selected from a medium frequency band specified by $$16 \le \sqrt{u_2^2 + v_2^2} \le 32$$

and 32-bit ASCII text (such as "ABCD") was used.

The following is a description of the image quality of watermarked images.

Figure 110:
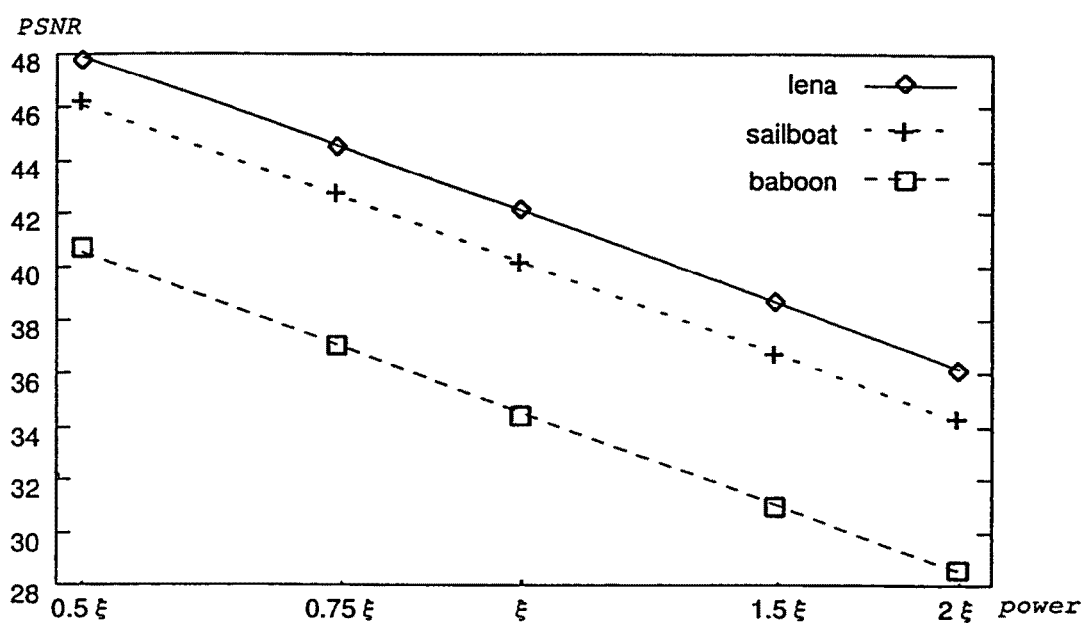
FIG. 110 is a diagram showing the PSNR when the embedding intensity of the present invention is changed.

FIG. 110 is diagram showing the PSNR when the embedding intensity (power) of the present invention was changed. The values for "power" shown in graph of FIG. 110 are relative to "power"=xi. The correspondence of PSNR to "power" varies from image to image due of the effect of local weighting.

Parallel displacement and cutting are shown in FIG. 111 as a result of watermark detect from the watermark image (Lena, power=xi, PSNR=42.107873). The offset response peak (14.761541) was detected at the offset (0,0). The symbol response peaks (11.180982 to 9.108589) were also detected for each symbol ('A', 'B', 'C', 'D') in the watermarked image, indicating a successful watermark detection.

Figure 113:
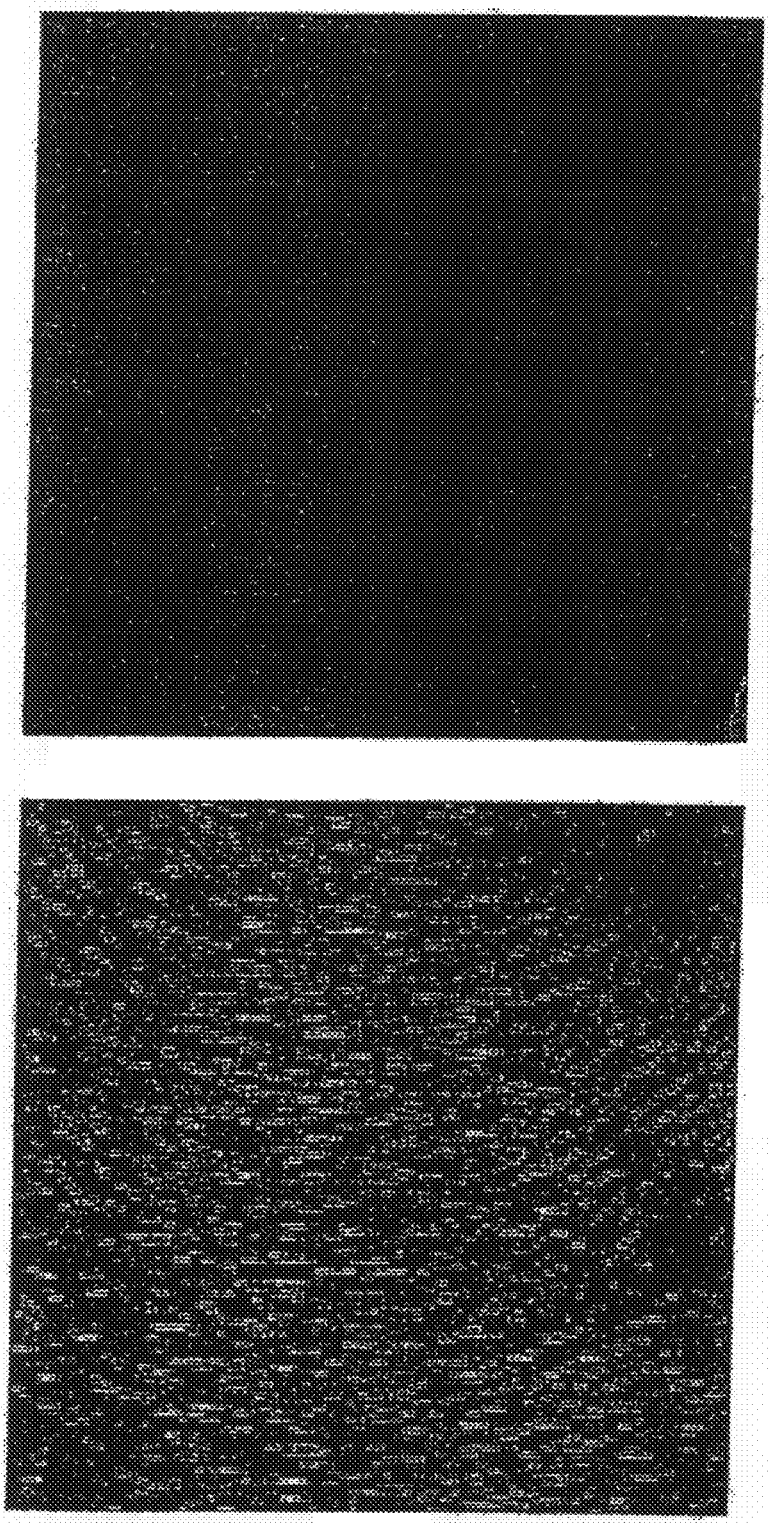
FIG. 113 is a diagram showing a failed detection and successful partial image using computer simulation of the present invention.

Next, there was an attempt at detecting watermark from a partial image cut from each image. FIG. 112 shows the offset detect success ratio (for when the correct offset was detected) when the size N×N of the partial image (having 50 start points chosen at random for each size) is changed and the symbol detect success ratio (for when all symbols were correctly detected and the four peak values had a minimum value larger than the threshold value of 4.26489). It is possible with almost total certainty to detect watermark on a partial image larger than N=256. The watermark is embedded in each block of 128×128 pixels bus as shown in FIG. 113 (A), images that include an edge have several large frequency component values that create a large amount of noise due to the original image as described before, and this is thought to have caused detect failure. Conversely, there was success with a comparatively flat image as shown in FIG. 113 (B), or with detect for images such as textured images. When there was detect using a differential with the original image, the noise due to the original image was cancelled, leading to successful detect.

The following is a description of the JPEG compression.

An attempt was made to detect watermark from an image obtained from irreversible JPEG compression of an image (Lena, sailboat, baboon, power=xi) having a watermark.

Figure 114:
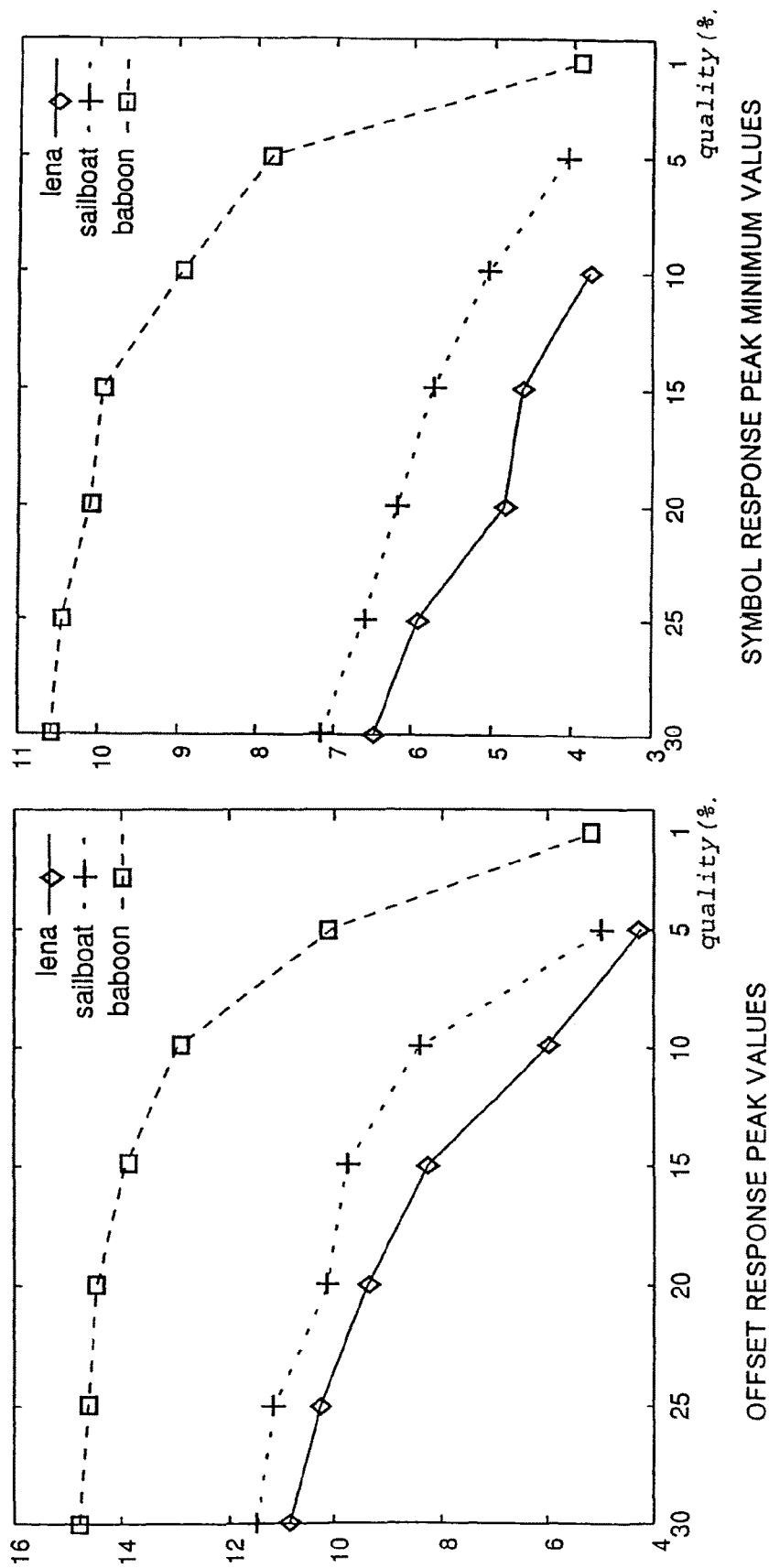
FIG. 114 is a diagram showing detection results from a JPEG compressed image using a computer simulation of the present invention.

FIG. 114 shows the minimum value for the symbol response peak and the offset response peak value when the quality parameter was changed. The lines in the graphs of that figure represent successes attained before stopping. If the threshold described previously is considered, the effective robustness will probably be somewhat less than that shown in FIG. 114.

An attempt was made to detect watermark in a watermarked image (Lena, power=xi) that had undergone grayscale level degradation. In the case of reduction to a black and white image, the offset response peak value3 obtained from a Floyd-Steinberg dithered image (FIG. 115 (A)) was 13.616614 and the symbol response peaks ranged from 9.395720 &tilde& 6.825329 and the watermark was successfully detected. In the case of a simple quantization (FIG. 115 (B)), the watermark was also successful, with an offset response peak of 10.388254 and symbol response peaks in the range from 8.133438 to 5.680073.

The following is a description of detect from a printed picture.

An image having a watermark (Lena, power=xi) was printed using a printer and an attempt was made to detect the watermark from an image that was read by a scanner. The watermarked image was converted to 72 dpi PostScript data and printed out on a black-and-white laser printer (RICOH SP-10PS Pro/6F), 600 dpi. The printed image was then scanned (EPSON GT-6000) to acquire a 72 dpi in 16-bit grayscale image. The scanned image was reduced to 8-bit grayscale and the watermark detection was performed on that image. In this case, the watermark detection was successful, with an offset response peak value of 9.080504 and symbol response peak values ranging from 8.139693 to 5.615208. The combination of printer and scanner resulted in a slight change in the aspect ratio. compensating for that aspect ratio change resulted in successful detection with an offset response peak value of 11.701824 and symbol response peak values ranging from 8.807638 to 6.623429.

Figure 116:
FIG. 116 is an example of a composite image using a computer simulation of the present invention.

We attempted to detect watermarks of two watermarked image (Lena and Sailboat, both with power=xi) in an image that was a 1:1 mixture of the two images (FIG. 116), using the respective keys of the two images. It was possible to detect the two different watermarks in the single mixed image, with an offset response peak value of 9.49749 for Lena and 9.883106 for the sailboat image and symbol response peak values ranging from 8.102563 to 6.325033 for the woman image and from 9.661891 to 7.285404 for Sailboat.

The following is a description of the detect processing time.

The offset search time using the method proposed by the present invention is $N^{<2>}$ and although a complete search is performed, but compared to a simple full search in which the block is resampled and a discrete Fourier transform is performed for each offset candidate, the amount of processing required for one search is small. Also, the processing can be speeded up by using a table of pre-calculated values for the computation of $e^{<-ix>}$ in the search processing. Computer simulations of the invention and the simple full search described above show that the ratio of processing times is 1:65. The discrete Fourier transformation was performed on 128×128 pixel blocks using the Fast Fourier Transform (FFT).

Twenty-Second Embodiment

Figure 117:
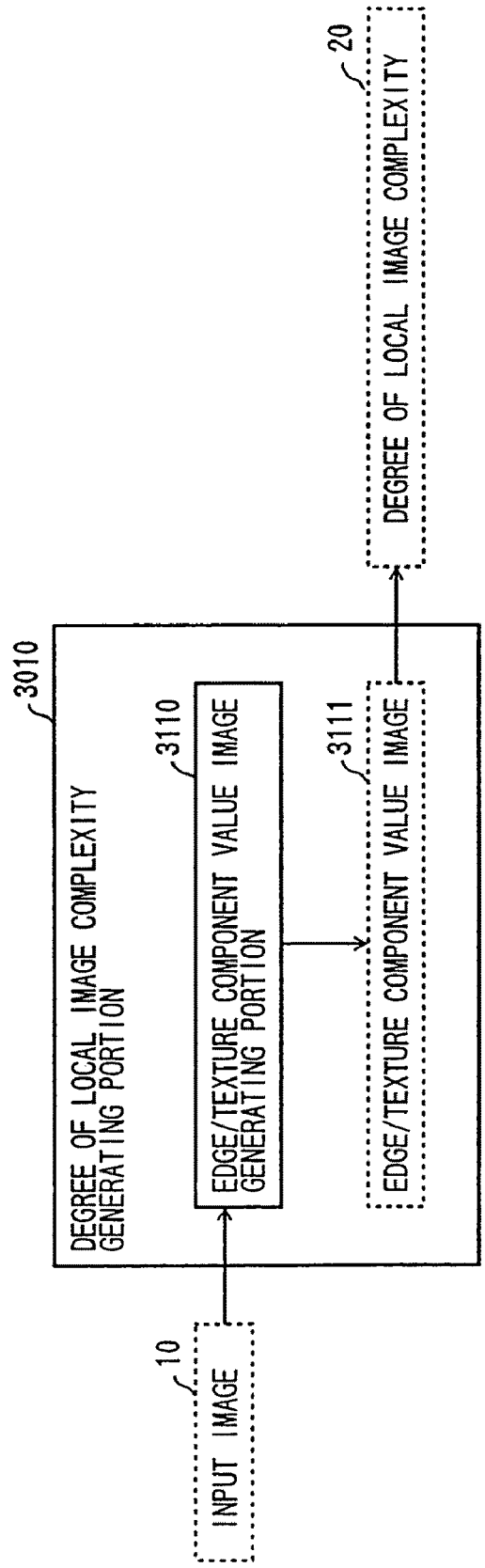
FIG. 117 is a diagram showing a configuration of a watermark embedding apparatus according to a twenty-second embodiment of the present invention.

FIG. 117 is a diagram showing a configuration of a degree of local image complexity generating portion of a water mark embedding apparatus according to a twenty-second embodiment of the present invention. The degree of local image complexity generating portion 3010 shown in the figure has an edge/texture component value image generating portion 3110.

Figure 118:
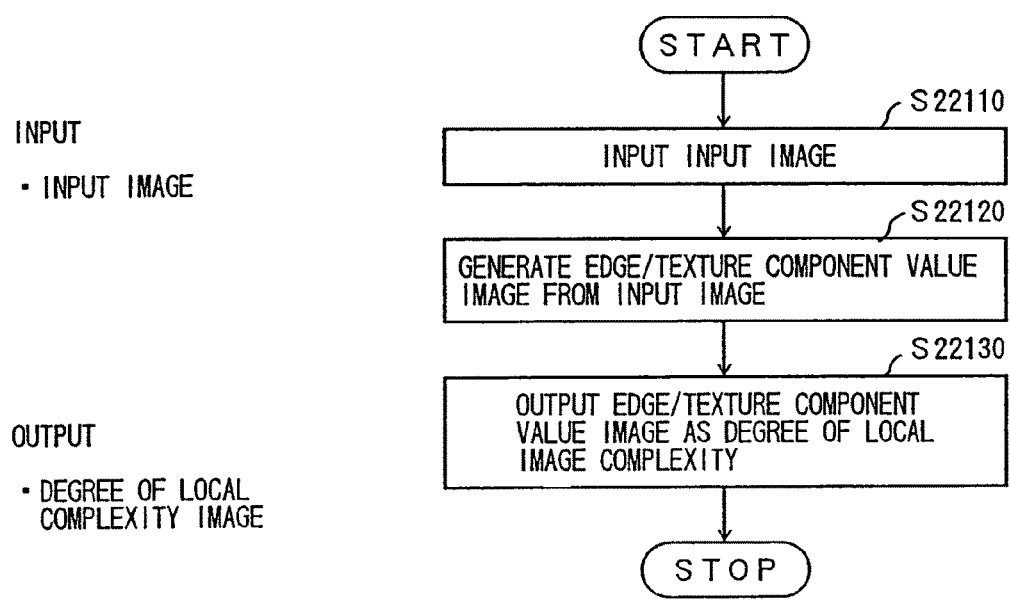
FIG. 118 is a flow chart showing the process of a watermark embedding apparatus according to a twenty-second embodiment of the present invention.

FIG. 118 is a flow chart showing the process of the degree of local image complexity generating portion according to the twenty-second embodiment of the present invention.

The degree of local image complexity generating portion 3010 inputs an input image 10 (Step 22110), generates an edge/texture component value image generating portion 3110 generates an edge/texture component value image 3111 from the input image 10 (Step 22120), and outputs the edge/texture component value image as the degree of local image complexity 20 (Step 22130).

In more detail, the edge/texture component value image generating portion 3110 uses the following procedure to create the edge/texture component value image.

Figure 119:
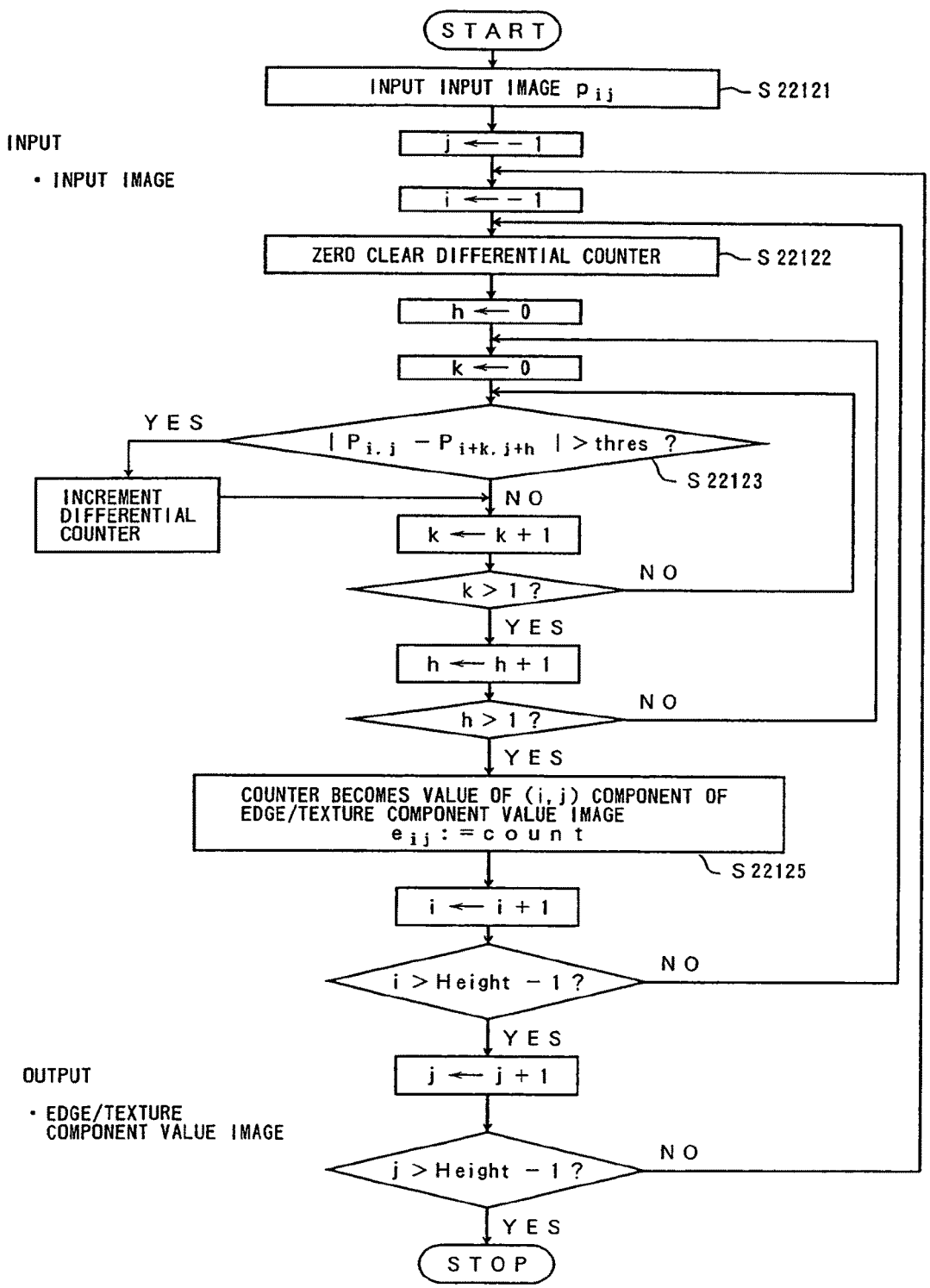

FIG. 119 is a flow chart showing the process of the edge/texture component value image generating portion according to the twenty-second embodiment of the present invention.

Step 22121) The edge/texture component value image generating portion 3110 expresses the input image 10 as $\{p_{ij}\}(0<=i<\text{Width}, 0<=j<\text{Height})$.

Step 22122 onward is repeated for $0<=i<\text{Width}, 0<=j<\text{Height}$.

Step 22122) The edge/texture component value image generating portion 3110 zeroes the count of the differential counter.

Step 22123) If, for $-1<=k<=1$, $-1<=h<=1$, $|p_{ij}-p_{i+k, j+h}|>$threshold value then there is shift to Step 22124, and if not, this processing is repeated until $(k, h) = (-1, -1)$ &tilde& $(k, h)$.

Step 22125) The value of the differential counter after the above processing of Step 22123 and Step 22124 has been repeated, becomes the value of the (i, j) coordinates of the edge/texture component value image. Expressing this as a formula gives $e_{ij}=\text{count}$ where $\{e_{ij}\}$: edge/texture component value image ($0<=i<\text{Width}, 0<=j<\text{Height}$)

According to the twenty-second embodiment of the present invention as described above, it is possible to generate a degree of local complexity for an image having a large value in the case of input image 10 having a small flat portion or when there is a edge or texture domain.

Figure 120:
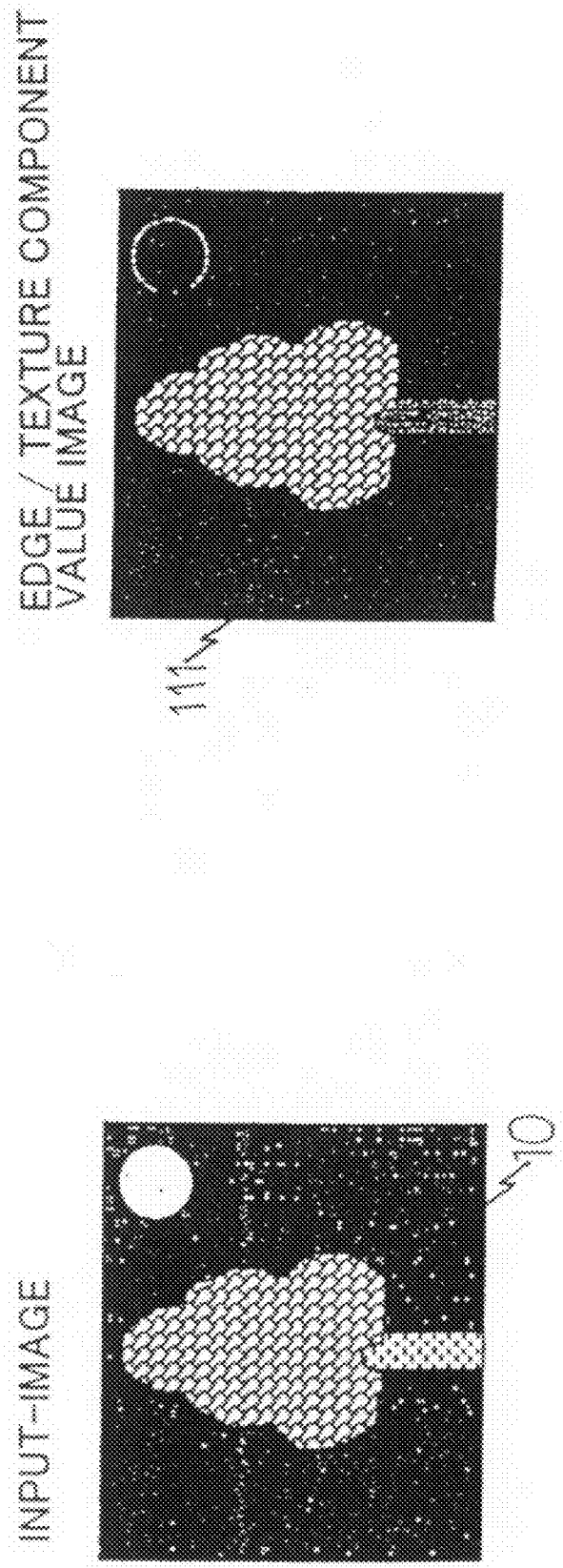

In addition, as shown in FIG. 120, the use of a threshold and a differential counter enables the generation of a degree of local complexity for an image having a similarly large value for images having sharp edges and soft textures.

Twenty-Third Embodiment

Figure 121:
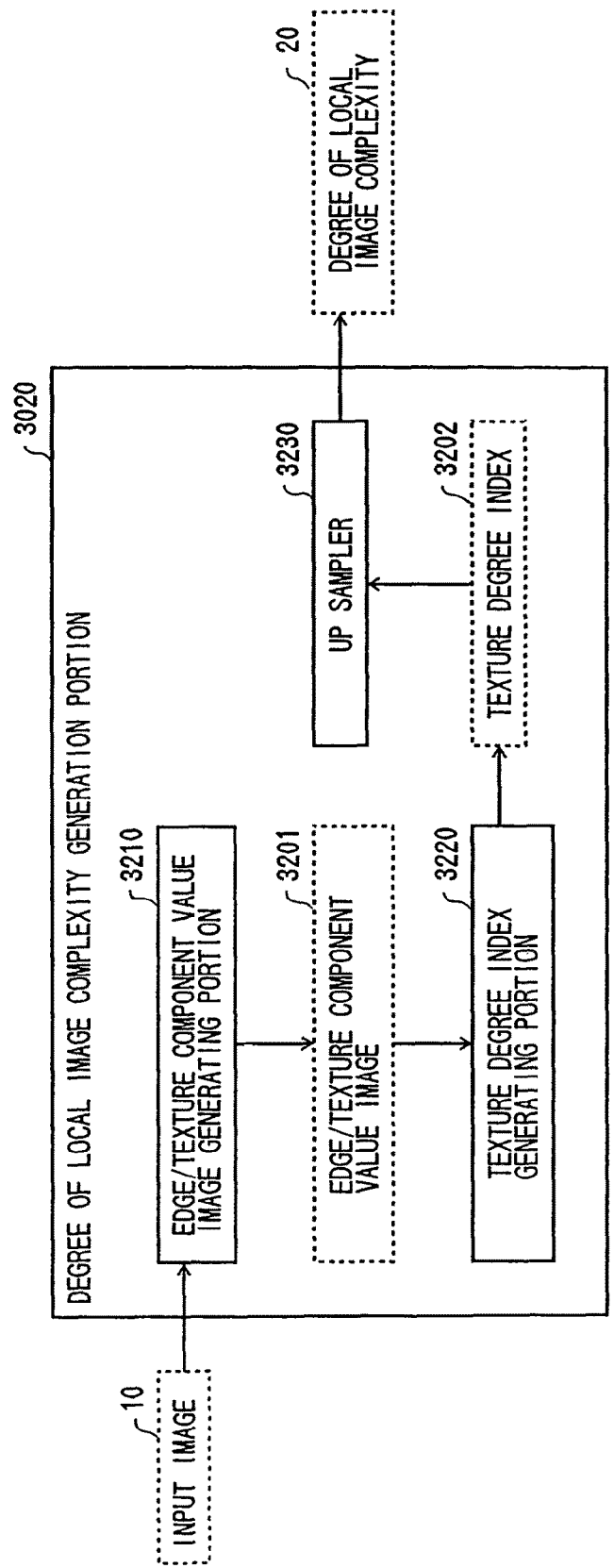

The following is description of the processing for a degree of local image complexity generating portion of a watermark embedding apparatus of the twenty-third embodiment of the present invention. FIG. 121 is a diagram showing the configuration of the degree of local image complexity generating portion according to the twenty-third embodiment of the present invention.

The degree of local image complexity generating portion 3020 shown in the figure comprises a edge/texture component value image generating portion 3210 of the twenty-second embodiment as shown in FIG. 117, and in addition, a texture degree index generating portion 3220 and an up-sampler 3230.

Figure 122:
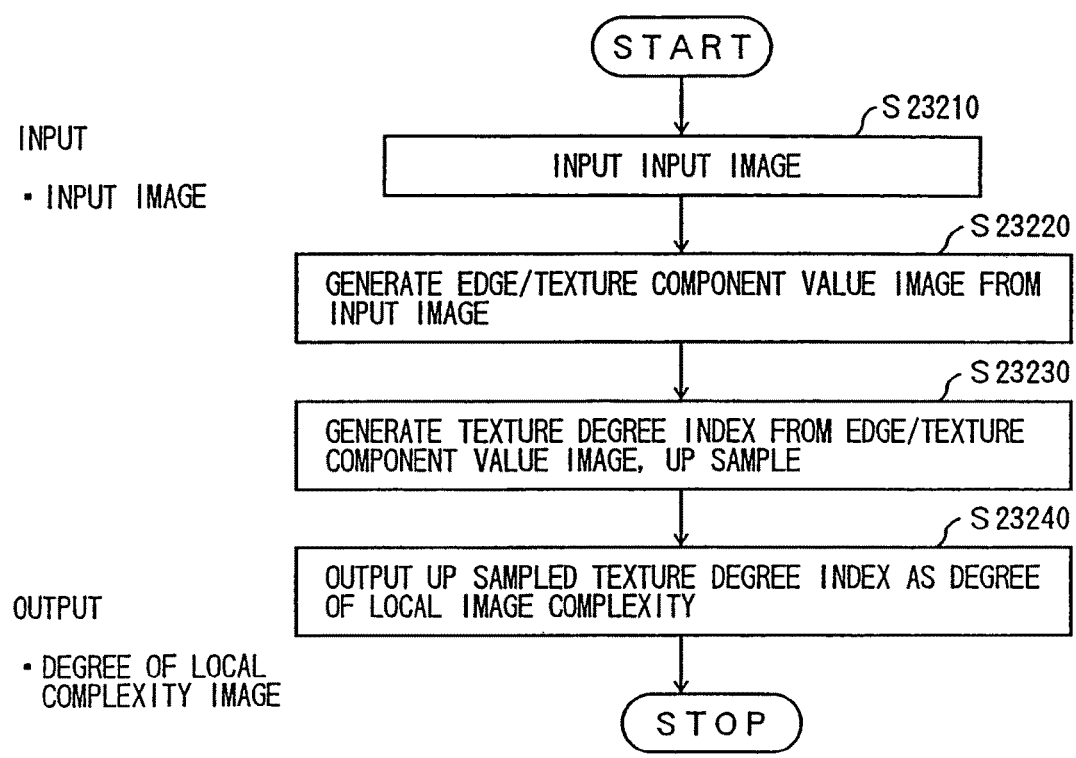

FIG. 122 is a flow chart showing the process of the degree of local image complexity generating portion according to the twenty-third embodiment of the present invention.

The degree of local image complexity generating portion 3020 inputs the input image 10 (Step 23210) and an edge/texture component value image generating portion 3210 generates the edge/texture component value image 3201 from the input image 10 (Step 23220).

Next, in the texture degree index generating portion 3220, a texture degree index 3202 is created from the edge/texture component value image 3201, and then the up-sampler 3230 up-samples the texture degree index 3202 (Step 23230), makes it the same size as the input image 10, and outputs it as the degree of local image complexity 20 (Step 23240).

Figure 123:
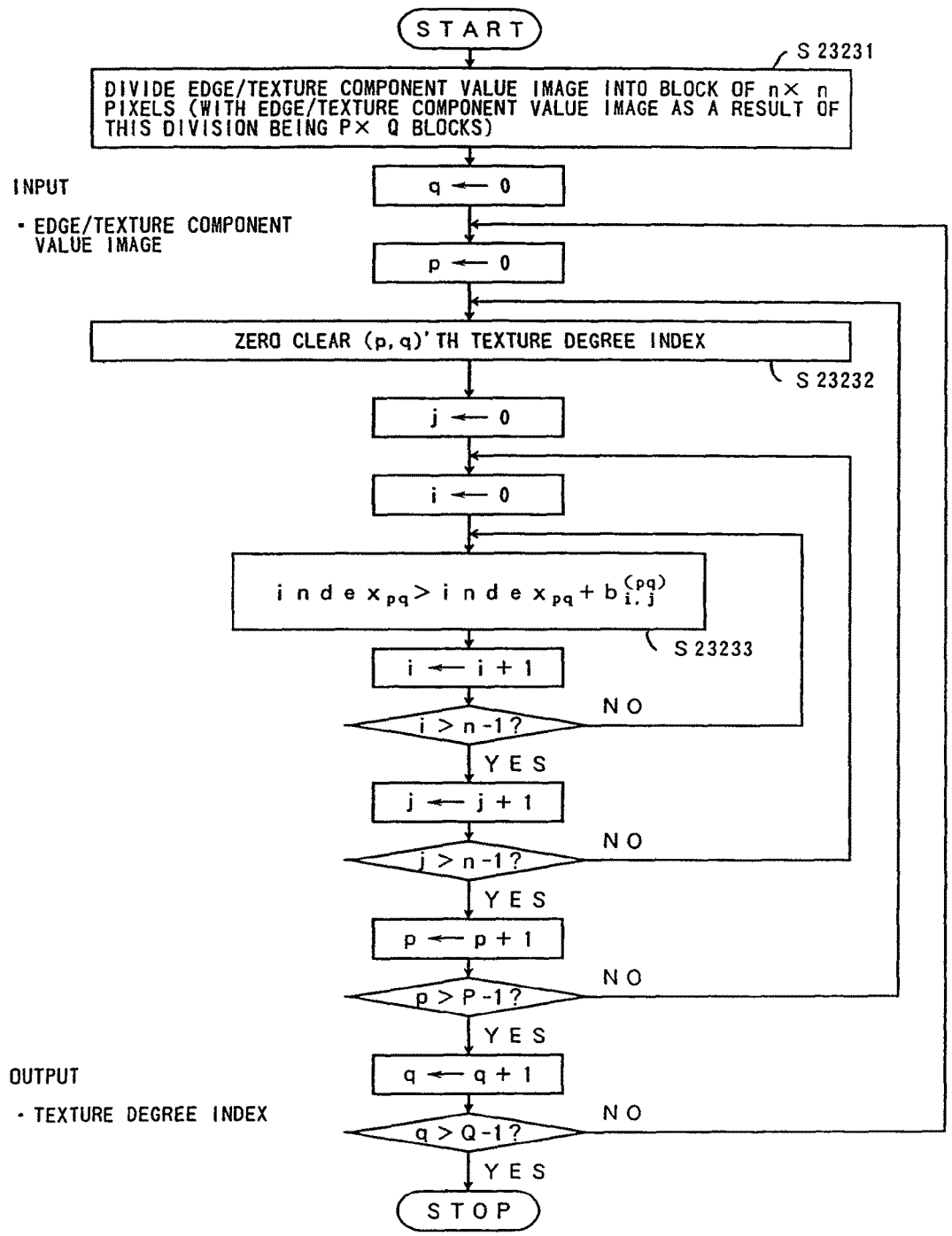

The following is a description of the process of the texture degree index generating portion 3220 described above. FIG. 123 is a flow chart showing the process of the texture degree index generating portion according to the twenty-third embodiment of the present invention.

Step 23231) The texture degree index generating portion 3220 divides the edge/texture component value image 3201 into blocks of n×n pixels (with the edge/texture component value image, which is the result of this division, being P×Q blocks).

The pixels in the (p, q)'th block are b ij (0<=i<n, 0<=j<n).

Step 23232) The (p, q)'th texture degree index index$_{pq}$ is zeroed.

Step 23233) Index$_{pq}$:

Index$_{pq}$+b$_{ij}^{(p,q)}$ with the processing repeated for (i, j)=(0, 0) &tilde& (n−1, n−1)
and when this ends, the processing from Step 23232 onward is repeated for
(p, q)=(0, 0) &tilde& (P−1, Q−1).

In other words, making {b$_{ij}$ (p,q)}: block pixel value of the (p, q)'th edge/texture component image (0<=i<n, 0<=j<n), means that the texture degree index index pq of the (p, q)'th block ((0<=p<P, 0<=q<Q) can be obtained by the following formula.

$$index_{pq} := \sum_{i=0}^{n-1} \sum_{j=0}^{n-1} b_{ij}^{(pq)}$$

The following is a description of the process of the up-sampler 3230 in the present embodiment.

Figure 124:
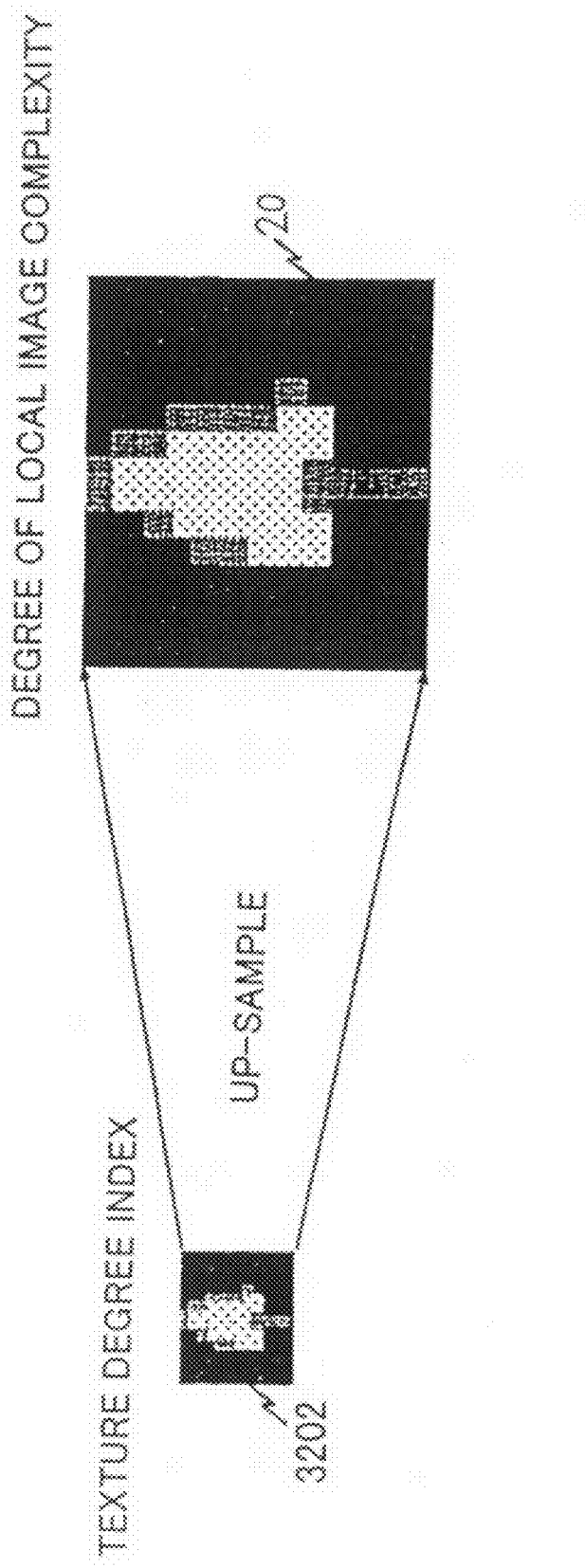

FIG. 124 is a diagram describing the process of an up-sampler according to the twenty-third embodiment of the present invention. The up-sampler 3230 inputs the texture degree index 3202 (P×Q pixel size) and magnifies it N times laterally and longitudinally so to generate and output a degree of local image complexity (of size Width×Height) of an image the same size as the input image 10.

As has been described above, according to the present embodiment, blocks of those block groups obtained by division of an edge/texture component value image into n×n pixels that include many large values, take large values for the texture degree index, while blocks that include many small values take small values for the texture degree index.

Figure 125:
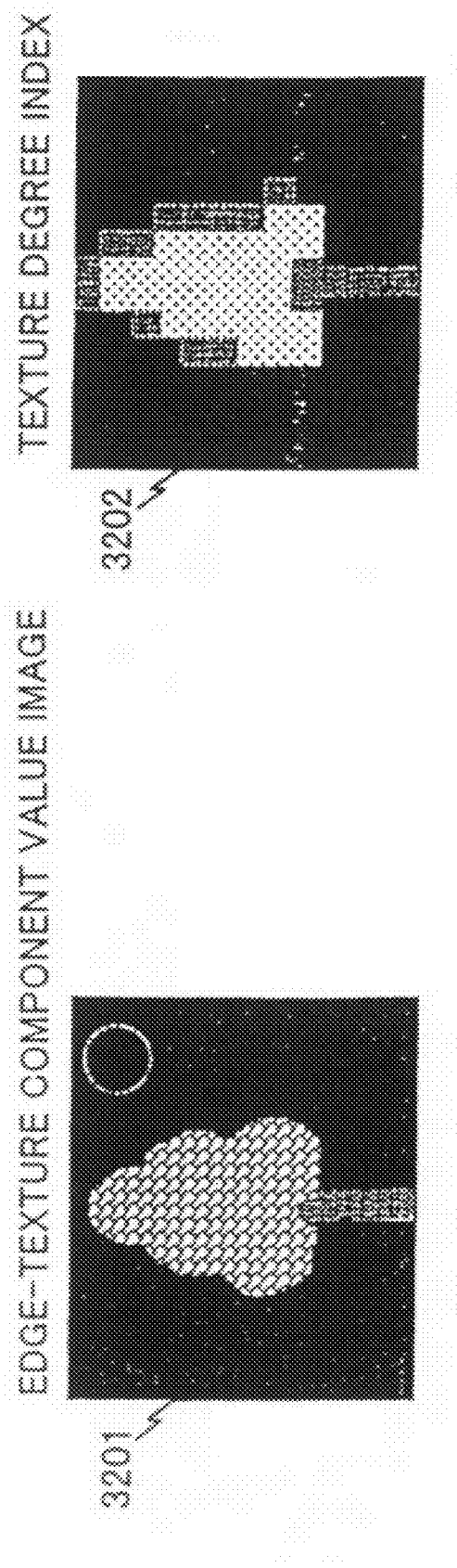

FIG. 125 is a diagram showing an edge/texture component value image and a texture degree index according to the twenty-third embodiment of the present invention. As shown in the figure, a simple edge portion (the top right portion of the same figure) within the edge/texture component value image 3201 has a small number of points having large values included in the block and so these have correspondingly small values for the texture degree index. This means that when compared to the twenty-second embodiment, the present embodiment enables the generation of an image degree of local image complexity having higher values.

Twenty-Fourth Embodiment

The following is description of a twenty-fourth embodiment of the present invention.

Figure 126:
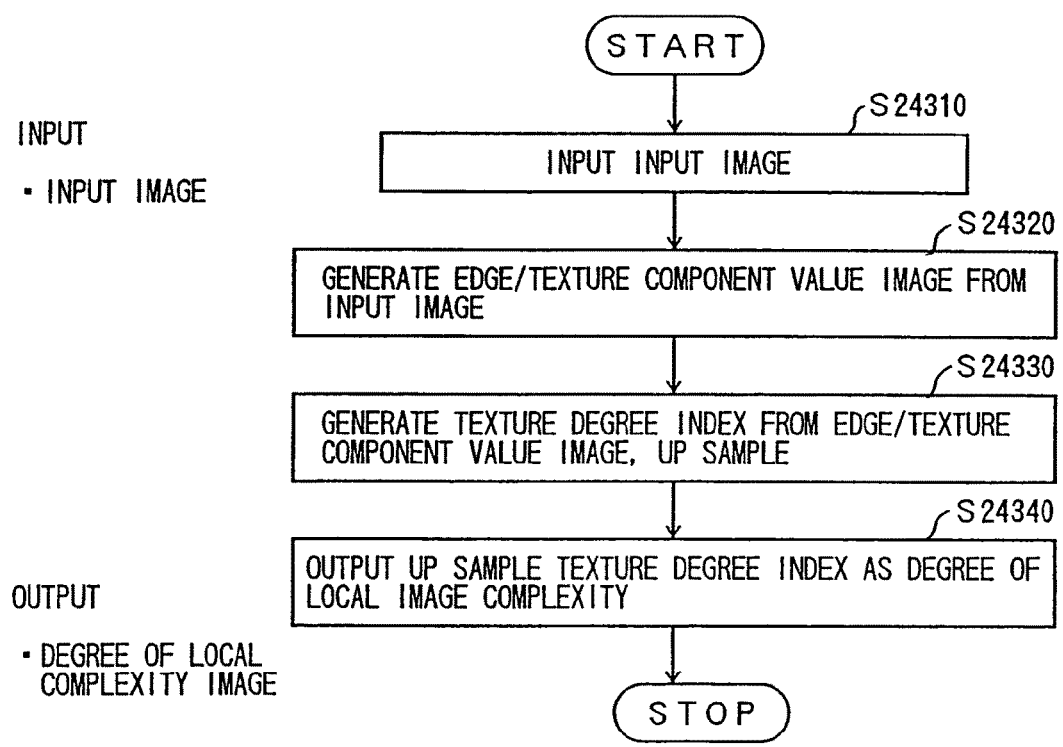

FIG. 126 is a flow chart showing the process of a degree of local image complexity generating portion of a watermark embedding apparatus according to the twenty-fourth embodiment of the present invention.

When the degree of local image complexity generating portion 3020 inputs the input image 10 (Step 24310), the edge/texture component value image generating portion 3210 generates the edge/texture component value image 3201 from the input image 10 (Step 24320). Next, in the texture degree index generating portion 3220 the texture degree index 3202 is created from the edge/texture component value image 3201 and then the up-sampler 3230 up-samples the texture degree index 3202 (Step 4330), makes it the same size as the input image 10 and outputs it as the degree of local image complexity.

Figure 127:
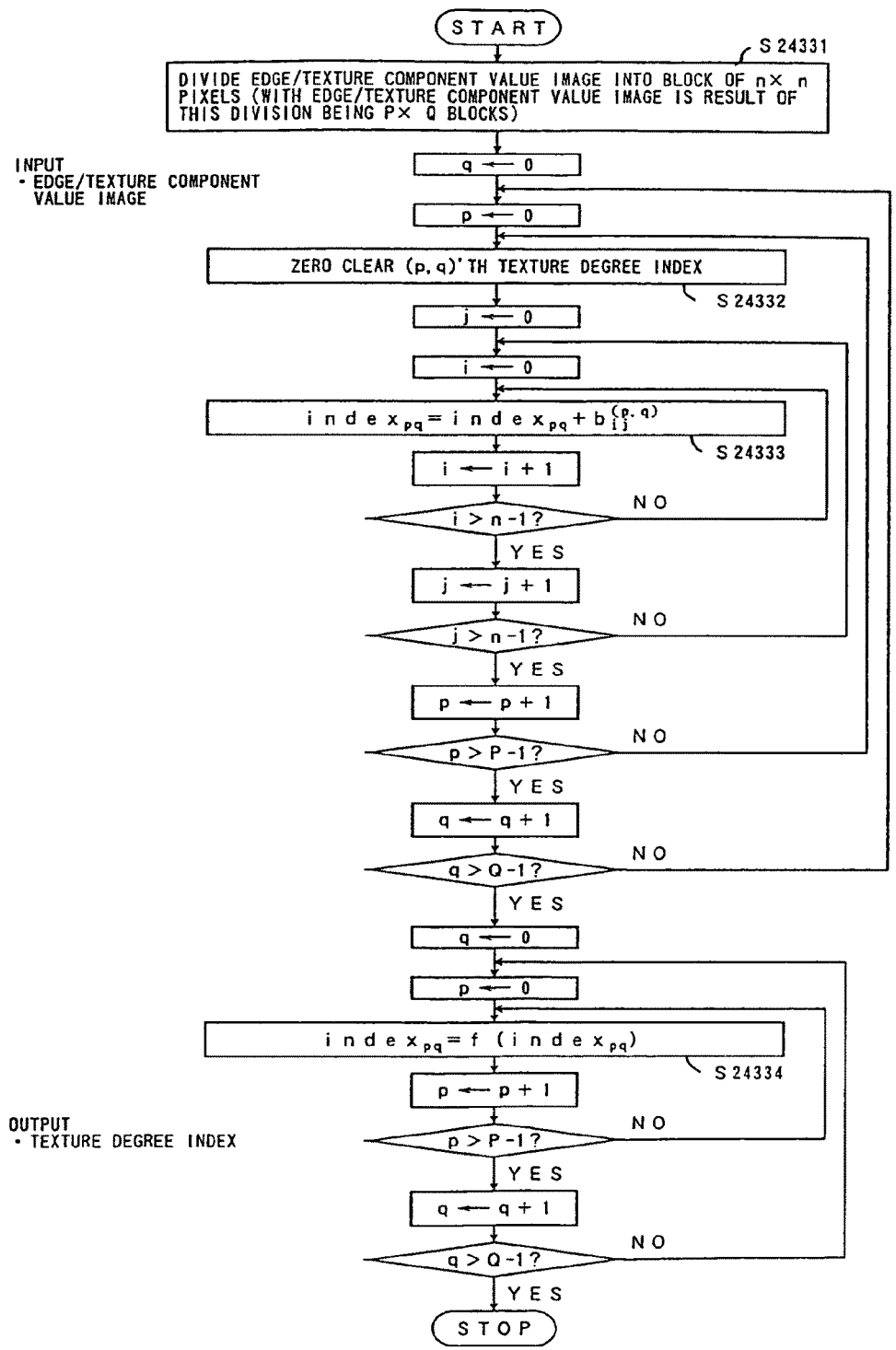

FIG. 127 is flow chart showing the process of the texture degree index generating portion according to the twenty-fourth embodiment of the present invention.

Step 24331 &tilde& Step 24333) The texture degree index generating portion 3220 uses a value mapped by a predetermined function f(x) for the determined texture degree index (indexpq), as the new texture degree index. Expressing this as a formula gives the following.

index$_{pq}$:f(index$_{pq}$)(0<=p<P,0<=q<Q)

According to the twenty-fourth embodiment, using the function to map the texture degree index 3202 obtained by the previously described twenty-third embodiment enables a value that is in agreement with more visual characteristics.

Twenty-Fifth Embodiment

The following is a description of a degree of local image complexity generating portion of a watermark embedding apparatus of a twenty-fifth embodiment of the present invention.

Figure 128:
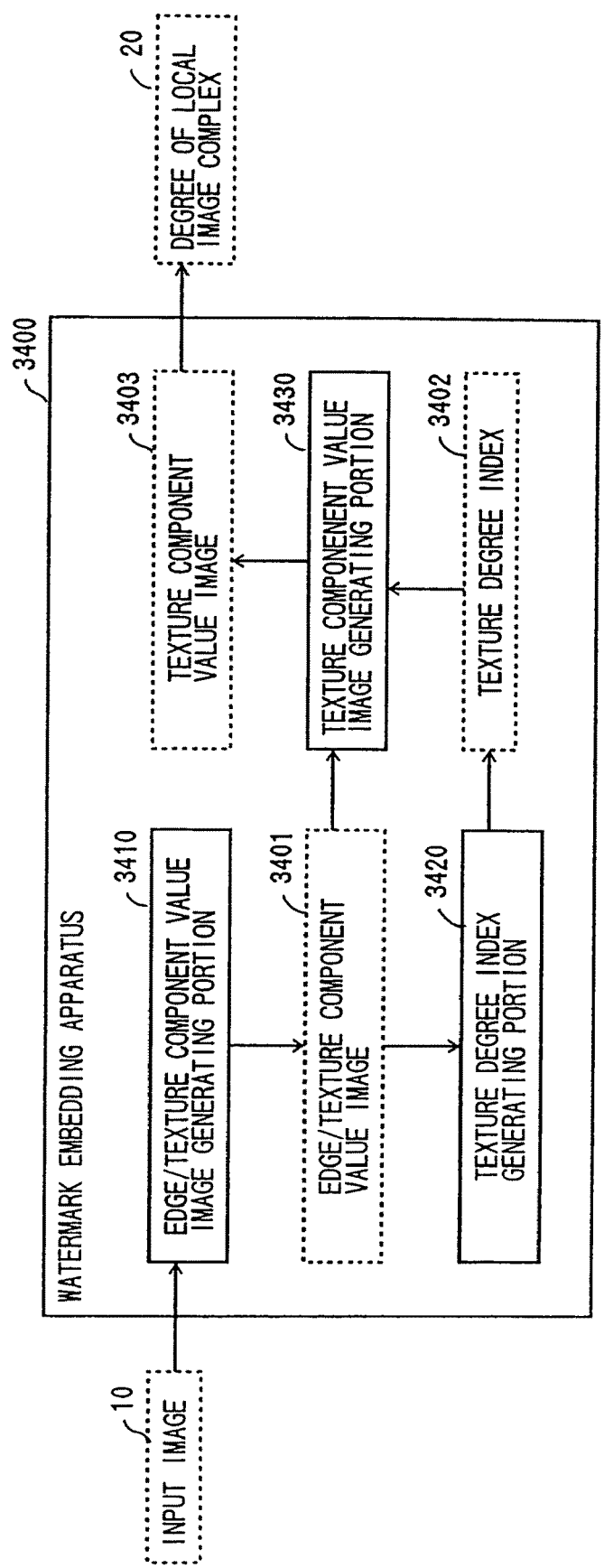

FIG. 128 is a diagram showing the configuration of the degree of local image complexity generating portion according to the twenty-fifth embodiment of the present invention. The degree of local image complexity generating portion 3400 shown in the figure comprises an edge/texture component value image generating portion 3410, a texture degree index generating portion 3420, and a texture component value image generating portion 3430. The texture component value image generating portion 3430 generates and outputs a texture component value image 3403 from a edge/texture component image 3401 and a texture degree index 3402.

Figure 129:
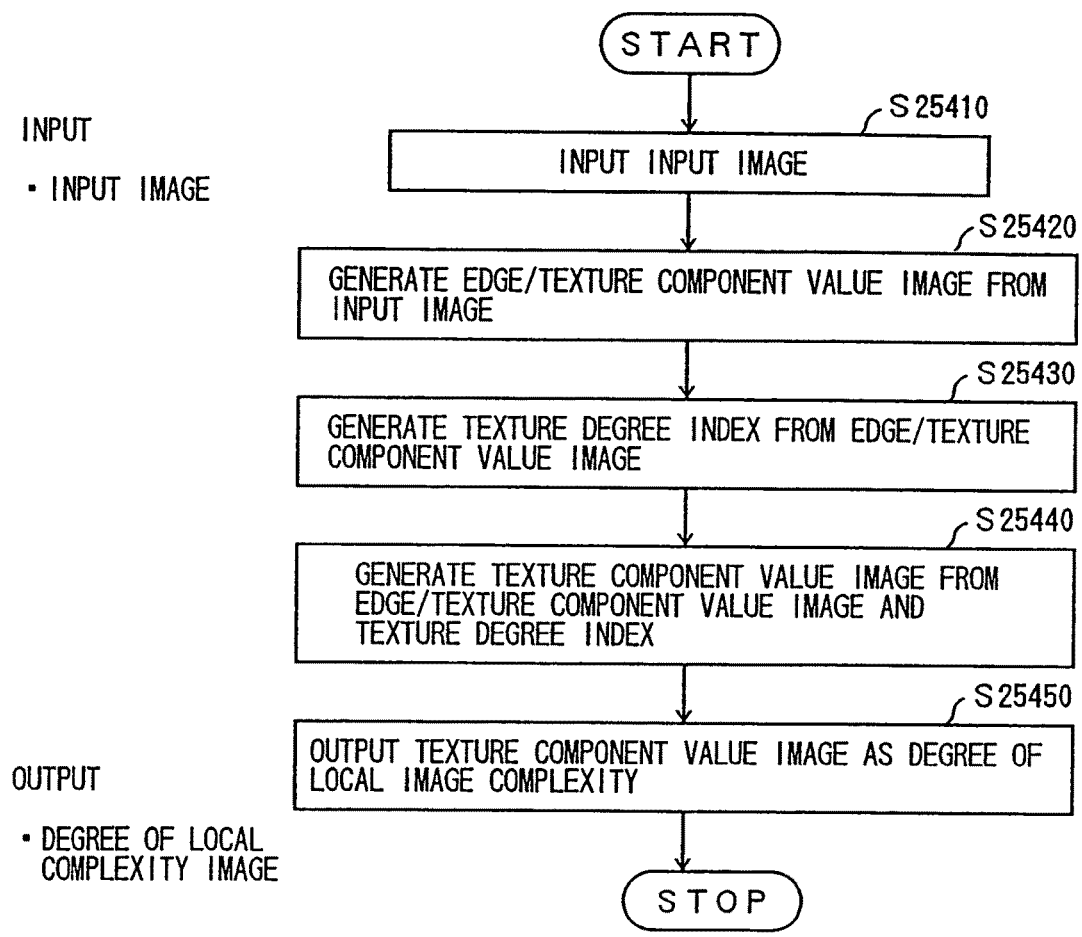

FIG. 129 is a flow chart showing the process of the degree of local image complexity generating portion according to the twenty-fifth embodiment of the present invention.

When the degree of local image complexity generating portion 3400 inputs the input image 10 (Step 25410), the edge/texture component value image generating portion 3410 generates the edge/texture component image 3401 from the input image 10 (Step 25420).

Next, the texture degree index generating portion 3420 generates the texture degree index 3402 from the edge/texture component image 3401 using the method of either the twenty-third or the twenty-fourth embodiment as the creation method (Step 25430). Then, the texture component value image generating portion 3430 generates the texture component value image 3403 from the edge/texture component image 3401 and the texture degree index 3402 (Step 25440) and outputs this as the local degree of image complexity (Step 25450).

The following is a description of the texture degree index generating portion 3420.

Figure 130:
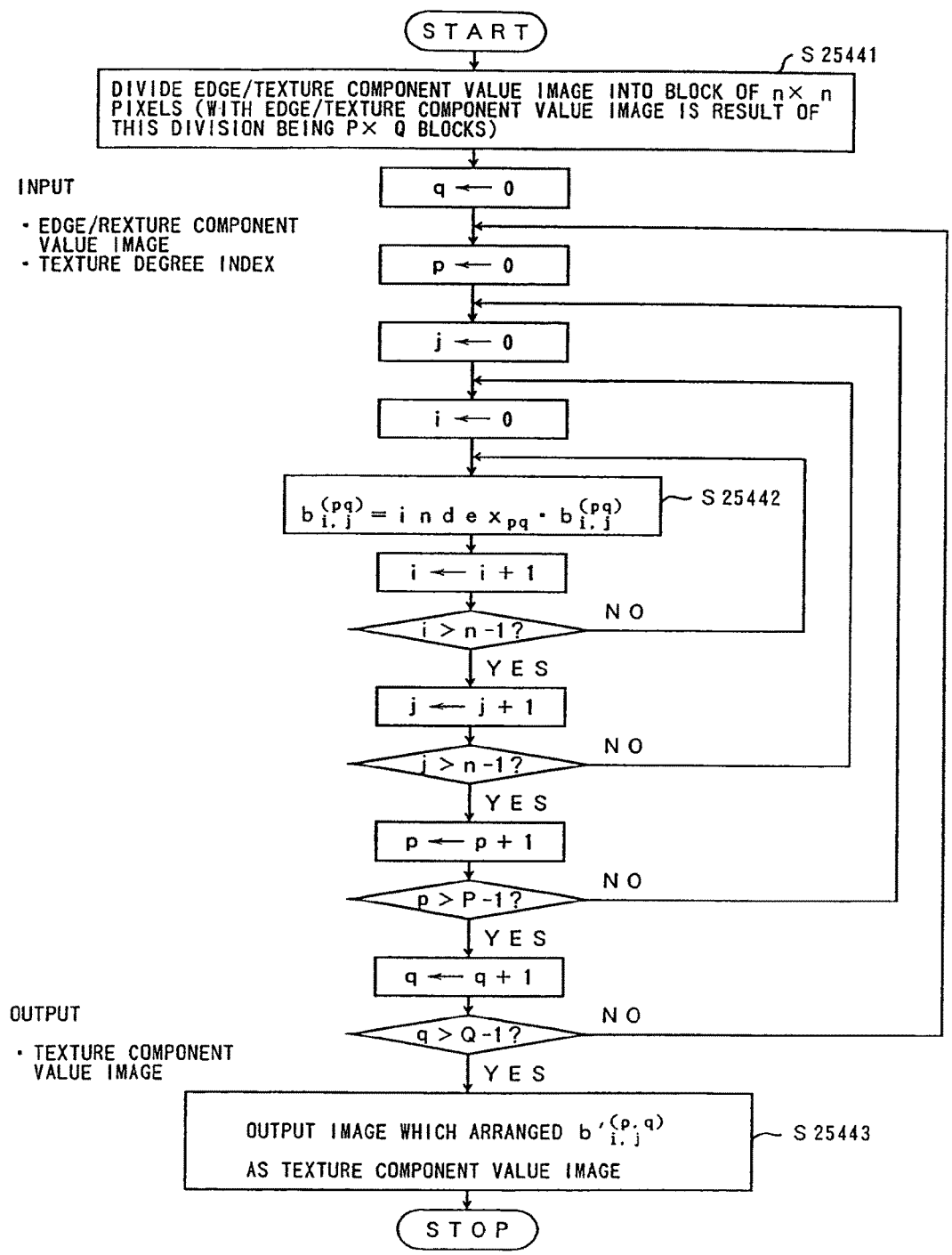

FIG. 130 is flow chart showing the process of the texture component value image generating portion according to the twenty-fifth embodiment of the present invention.

Step 25441) The texture component value image generating portion 3430 divides the edge/texture component 3401 into blocks of n×n pixels (with the edge/texture component value image, which is the result of division, consisting of P×Q blocks). Step 25442 is performed for each block.

Step 25442) The following is a description of the processing for the (p, q)'th block (0<=p<P, 0<=q<Q) of the texture component value image generating portion 3430.

Taking the block pixel value (0<=i<n, 0<=j<n) of the $\{b_{ij}^{(p,q)}\}$: (p, q)'th edge/texture component image, the texture component value image generating portion 3430 uses the following formula to determine the (p, q)'th texture component value block $\{b'_{ij}^{(p,q)}\}$, (0<=i<n, 0<=j<n).

$$b'_{ij}^{(p,q)} := \text{index}_{pq} \cdot b_{ij}^{(p,q)}$$

Step 25443) After this processing has been completed for all blocks, outputs the texture component value block 3403, which provides same position with edge/texture component value image 3401.

The following is a description of the image processing of the present embodiment, with reference to FIG. 131. The input image 10 shown in the figure comprises a background (of uniform pixel values), a sun (having an edge, and with a uniform interior), a tree trunk (having a light texture) and leaves (having a strong texture). In the edge/texture component image 3401 (with values larger for brighter portions), the handling is the same for both edges and textures. The portions for the tree trunk and leaves and the edge portion of the sun have largely different values for the edge/texture components. This is because of the use of the differential counter.

In the texture degree index 3402, the method of creating gives a small value for blocks that have little edge/texture component. Because of this, the texture degree index is small for the portions of the sun that do not have an edge. Conversely, the portions for the tree trunk and leaves have a large edge/texture component within the block and so have large values for the texture degree index 3402.

In the texture component value image 3403 (with brighter portions having larger values), the edge is weak, ad the texture becomes stronger which is in agreement with the objective. In addition, when compared to the output of the twenty-third embodiment, the block distortion is improved, and it is possible to generate a degree of image complexity for the image at a higher accuracy.

Twenty-Sixth Embodiment

The following is a description of a watermark embedding apparatus of a twenty-sixth embodiment.

FIG. 132 is a diagram showing the configuration of the watermark embedding apparatus according to the twenty-sixth embodiment of the present invention. The watermark embedding apparatus 3500 comprises a degree of local image complexity generating portion 3510, a watermark pattern generating portion 3520, and an image addition portion 3530.

The watermark embedding apparatus 3500 inputs an input image 51, a watermark 52, a key 53 and an intensity parameter 54.

FIG. 133 is a flow chart showing the process of the watermark embedding apparatus according to the twenty-sixth embodiment of the present invention.

Step 25610) First of all, the degree of local image complexity generating portion 3510 generates a degree of local image complexity ($e_{ij}$) from the input image 51 ($p_{ij}$). The degree of local image complexity ideally indicates the amount by which object image values can be changed when visual stimulation due to changes in pixel values is less than a certain amount. For example, this embodiment any one of the degree of local image complexity generating portion previously described for the twenty-second through twenty-fifth embodiments.

Step 26520) The watermark pattern generating portion 3520 uses the watermark 52 and the key 53 as the basis for generating a watermark pattern $w_{ij}$ 3502.

Step 26530) In the image addition portion 3530, the watermark pattern 3502 is adaptively added to the degree of local image complexity according to the following formula.

$$p'_{ij} := p_{ij} + \text{powers} \cdot e_{ij} \cdot w_{ij}$$

where, $\{p'_{ij}\}$: image having embedded information (0<=i<width, 0<=j<Height)

$\{p_{ij}\}$: input image (0<=i<width, 0<=j<Height)

$\{w_{ij}\}$: watermark pattern (0<=i<width, 0<=j<Height)

Step 26540) The image addition portion 3530 outputs the image p ij having the watermark embedded.

The following is a description of the watermark pattern 3502 in Step 26530.

A complex matrix F of N×N pixel size is prepared with a zero matrix as an initial value.

The k'th embedding coefficient position information Lx= (xk,yk,zk) (generated from the key) is used to change F(u, v).

When z k is a value that expresses a real number component, m k (generated from the key and the watermark) is added to the real number component of F(x k,y k). In addition, m k is add to the real number component of F (N−x k, N−y k) so as to maintain the symmetry of the Fourier transform coefficient. Expressing this as a formula gives $$F(xk,yk) := F(xk,yk) + mk \cdot \text{alpha}$$

$$F(N-xk,N-yk) := F(N-xk,N-yk) + mk \cdot \text{alpha}$$

where alpha is a parameter corresponding to the intensity of the basic watermark pattern.

When z k is a value that expresses an imaginary number component, m k is added to the imaginary number component of F (x k, y k). In addition, m k is subtracted from the imaginary number component of F(N−x k, N−y k).

Expressing this as a formula gives $$F(xk,yk) := F(xk,yk) + mk \cdot \text{alpha} \cdot i$$

$$F(N-xk,N-yk) := F(N-xk,N-yk) - mk \cdot \text{alpha} \cdot i$$

(where i is the imaginary number unit).

This is successively performed for k=0 . . . , n−1 and the obtained coefficient matrix F(u, v) has an inverse Fourier transform performed to give the basic watermark pattern.

According to the twenty-sixth embodiment described above, the degree of local complexity is used to weight the watermark pattern which is added to the input image to obtain the image having the watermark embedded and so it becomes possible to suppress the visual image deterioration that accompanies embedding, and when compared to conventional technologies, to improve the robustness when there is deterioration of the image to the same degree.

Twenty-Seventh Embodiment

The following is a description of a watermark embedding apparatus of a twenty-seventh embodiment of the present invention.

FIG. 134 is a diagram showing the configuration of the watermark embedding apparatus according to the twenty-seventh embodiment of the present invention. The watermark embedding apparatus 3600 shown in the figure comprises a block division portion 3610, a degree of local image complexity generating portion 3620, an adaptive watermark pattern generating portion 3630, a basic watermark pattern generating portion 3640 and an image addition portion 3650.

The watermark embedding apparatus 3600 inputs an input image 61, a watermark 62, a key 63 and an intensity parameter 64.

FIG. 135 is a flow chart showing the process of the watermark embedding apparatus according to the twenty-seventh embodiment of the present invention.

Step 27610) The block division portion 3610 divides the input image 61 (comprising Width×Height pixels), into blocks 3601 of N×N pixel size.

Step 27620) The divided blocks 3601 are used by the degree of local image complexity generating portion 3620 to generate a degree of local image complexity 3603 of a block size. In the same manner as the previously described twenty-fifth embodiment, the degree of local image complexity 3603 ideally expresses the amount by which the symmetrical pixel values can be changed when the visual stimulation due to changes in the image pixels is lower than a certain level. For example, any of the degree of local image complexity generating portion described for embodiments twenty-two through twenty-five can be used.

Step 27630) The basic watermark pattern generating portion 3640 uses the watermark 62 and the key 63 to generate a basic watermark pattern 3604. The basic watermark pattern 3604 is the same as that described as the "watermark pattern" in the twenty-sixth embodiment. Specifically, this is expressed by the following formula.

A complex matrix F of N×N size is prepared with a zero matrix as an initial value.

The k'th embedding coefficient position information Lk=(x k,y k,z k) (generated from the key) is used to change F (u, v).

When z k is a value that expresses a real number component, m k (generated from the key and the watermark) is added to the real number component of F (x k,y k). In addition m k is add to the real number component of F(N−x k, N−y k) so as to maintain the symmetry of the Fourier transform coefficient. Expressing this as a formula gives $$F(xk,yk):=F(xk,yk)+mk\cdot\text{alpha}$$

$$F(N-xk,N-yk):=F(N-xk,N-yk)+mk\cdot\text{alpha}$$

where, alpha is a parameter given to the intensity of the basic watermark pattern.

When z k is a value that expresses an imaginary number component, m k is added to the imaginary number component of F(x k,y k). In addition, m k is subtracted from the imaginary number component of F (N−x k,N−y k). Expressing this as a formula gives $$F(xk,yk):=F(xk,yk)+mk\cdot\text{alpha}\cdot i$$

$$F(N-xk,N-yk):=F(N-xk,N-yk)-mk\cdot\text{alpha}\cdot i$$

(where i is the imaginary number unit).

This is successively performed for k=0 . . . , n−1 and the obtained coefficient matrix F(u, v) has an inverse Fourier transform performed to give the basic watermark pattern.

Step 27630) Furthermore, the adaptive watermark pattern generating portion 3630 generates the adaptive watermark pattern 3602.

The method of determining the adaptive watermark pattern 3602 is expressed by the following formula.

$$p'_{ij} := p_{ij} + \text{power} \cdot \frac{\beta \cdot a_{ij} \cdot (e_{ij} - e_{min}) + (e_{max} - e_{ij}) \cdot b_{ij}}{e_{max} - e_{min}}$$

where
{$p'_{ij}$}: block having embedded information (0<=i<N, 0<=j<N)
{$p_{ij}$}: block (0<=i<N, 0<=j<N)
{$e_{ij}$}: degree of local image complexity (0<=i<N, 0<=j<N)
{$a_{ij}$}: adaptive watermark pattern (0<=i<N, 0<=j<N)
{$b_{ij}$}: basic watermark pattern (0<=i<N, 0<=j<N)
power: intensity parameter
e max: maximum value of the area according to the formula defining the degree of local image complexity
e min: minimum value of the area according to the formula defining the degree of local image complexity
beta: adaptive watermark pattern emphasis ratio Step 27660) After the blocks 3605 having the embedded watermark have been generated for all blocks 360, the blocks 3605 having the embedded watermark are arranged at the original block positions and an image 65 having the embedded watermark is obtained.

The following is a description of the adaptive watermark pattern generating portion 3630 in the present embodiment.

The adaptive watermark pattern generating portion 3630 emphasizes the orthogonal transform coefficient corresponding to the basic watermark pattern 3604, in accordance with the value of the amplitude of the orthogonal transform coefficient of the block that is currently being referred to.

FIG. 136 is a flow chart showing the process of the adaptive watermark pattern generating portion according to the twenty-seventh embodiment of the present invention.

Step 27461) The blocks that have been divided by the block division portion 3610 undergo a discrete Fourier transform to obtain a block coefficient matrix G (u, v).

Step 27642) The basic watermark pattern undergoes a discrete Fourier transform to generate a complex watermark coefficient matrix F (u, v) (0<=u<N, 0<=v<N).

Step 27643) When |G(u, v)|<alpha for (u,v)=(0, 0) &tilde& (N−1, N−1), there is a shift to Step 27644, and if not, there is a shift to Step 27645.

Step 27644) When |G(u, v)|<alpha, gamma:=alpha and there is shift to Step 27646.

Step 27645) When |G(u, v)|>/=alpha, gamma:=|G(u, v)|. Moreover, the alpha in Step 27644 and Step 27645 is threshold value that is determined beforehand.

Step 27646) F'(u,v):=F(u,v)·gamma.

Step 27647) F'(u,v) undergoes a discrete Fourier transform and is output as the adaptive watermark pattern 3602.

As has been described above, according to the present embodiment and as shown in FIG. 137, it is possible to perform image embedding using a watermark pattern that accurately reflects a local design in the input image. This is to say that there is no correlation between the design of the original block 3601 (diagonal lines of the left-front fan-shaped portion) and the basic watermark pattern 3604, but the adaptive watermark pattern 3602 accurately reflects the design of the block 3601. These degrees of local image complexity are used to give a weighting and adding enables the embedding of watermark in a shape that accurately reflects the original design of the block 3601 and that has a strong power.

In addition, the process and configuration of the embodiment described above is configured as a program that can easily realize the present invention by storage in a device connected to a computer used as an information embedding apparatus or a watermark embedding apparatus storage in a portable storage medium such as a floppy disk or CD-ROM or the like and installed to implement the present invention.

Twenty-Eighth Embodiment

With the present embodiment, it is possible to realize the watermark embedding apparatus described in the first through twenty-seventh embodiments, by an integrated circuit as shown in FIG. 138. The integrated circuit shown in FIG. 138 comprises a memory portion 1, a microprocessor portion 2, and an interface portion 3 having an external interface. Moreover, this figure only shows the main portion but also includes other circuits. The program stored in the memory portion 1 is run by the microprocessor portion 2. Various other configurations are also possible for the integrated circuit.

In addition, it is also possible to perform the watermark processing of the present invention by incorporating these integrated circuits into various devices such as a video camera and a playback device, for example.

As has been described above, according to the present invention, it is possible to have the following effects and applications.

For the authors, the purpose is to protect copyright over the content of the information and so the watermark must have robustness with respect to editing by various types of users, while for the users, it must be possible to use the content of the information while being unaware of the watermark and so it must not be possible to sense any deterioration of images that have undergone watermark processing.

According to the present invention, improving the image quality and the robustness over that of the conventional technology enables a copyright protection system to function more effectively, and enable authors to securely supply an information content, thereby promoting the flow of information over networks.

In a content distribution system, the present invention gives a content ID so as to uniquely identify the content, and this content ID is then embedded in the content to link the information of the author of the content with user conditions and the like, so that use in a content management system encourages the correct use of the content, and on the side of those holding rights, guarantees that one hold rights to the content.

In addition, the present invention embeds user information when the content is distributed so that is possible to suppress illegal copying.

Furthermore, embedding copy management signals used by DVD and the like can realize more rigid copy protection than at present.

Moreover, the present invention is not limited to the embodiments described above, as various modifications and applications are possible within the scope of the claims.

What is claimed is:

1. A watermark embedding method that embeds a watermark in a digital image, the method comprising:

determining a degree of local image complexity having a large value for texture regions in the image, and having a small value for flat regions and edge portions; and changing complex portions of the image more than low complex degree portions in accordance with the degree of local image complexity to obtain a watermark embedded image;

wherein the determining of the degree of local image complexity of the image includes performing the following:

obtaining an edge/texture component value image by measuring an edge and a texture region by using a counter which is incremented when a difference between each pixel and adjacent pixels in the input image is equal to or greater than a threshold, dividing the edge/texture component value image into small blocks, obtaining the sum of edge/texture component values in the block for each divided block, determining a texture degree index of the block as a value which is the sum mapped by a predetermined function, and multiplying each edge/texture component value in a divided block by a texture degree index corresponding to the divided block so as to obtain a texture component value image, and wherein the texture component value image is used as the degree of local image complexity for obtaining the watermark embedded image.

2. A watermark embedding apparatus that embeds a watermark in a digital image, comprising:

a determining arrangement to determine a degree of local image complexity having a large value for texture regions in the image, and having a small value for flat regions and edge portions; and a changing arrangement to change complex portions of the image more than low complex degree portions in accordance with the degree of local image complexity to obtain a watermark embedded image;

wherein the determining of the degree of local image complexity of the image includes performing the following:

obtaining an edge/texture component value image by measuring an edge and a texture region by using a counter which is incremented when a difference between each pixel and adjacent pixels in the input image is equal to or greater than a threshold, dividing the edge/texture component value image into small blocks, obtaining the sum of edge/texture component values in the block for each divided block, determining a texture degree index of the block as a value which is the sum mapped by a predetermined function, and multiplying each edge/texture component value in a divided block by a texture degree index corresponding to the divided block so as to obtain a texture component value image, and wherein the texture component value image is used as the degree of local image complexity for obtaining the watermark embedded image.

3. A computer readable storage medium having a program, which is executable by a processor, comprising:

a program code arrangement having program code for embedding a watermark in a digital image by performing the following:

determining a degree of local image complexity having a large value for texture regions in the image, and having a small value for flat regions and edge portions; and changing complex portions of the image more than low complex degree portions in accordance with the degree of local image complexity to obtain a watermark embedded image;

wherein the determining of the degree of local image complexity of the image includes performing the following:

obtaining an edge/texture component value image by measuring an edge and a texture region by using a counter which is incremented when a difference between each pixel and adjacent pixels in the input image is equal to or greater than a threshold, dividing the edge/texture component value image into small blocks, obtaining the sum of edge/texture component values in the block for each divided block, determining a texture degree index of the block as a value which is the sum mapped by a predetermined function, and multiplying each edge/texture component value in a divided block by a texture degree index corresponding to the divided block so as to obtain a texture component value image, and wherein the texture component value image is used as the degree of local image complexity for obtaining the watermark embedded image.

* * * * *